(12) United States Patent
Carrigan et al.

(10) Patent No.: US 11,785,387 B2
(45) Date of Patent: Oct. 10, 2023

(54) USER INTERFACES FOR MANAGING CONTROLLABLE EXTERNAL DEVICES

(71) Applicant: Apple Inc., Cupertino, CA (US)

(72) Inventors: Taylor G. Carrigan, San Francisco, CA (US); Patrick L. Coffman, San Francisco, CA (US); Christopher Patrick Foss, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 543 days.

(21) Appl. No.: 17/019,845

(22) Filed: Sep. 14, 2020

(65) Prior Publication Data
US 2020/0413197 A1    Dec. 31, 2020

Related U.S. Application Data

(63) Continuation of application No. 16/586,002, filed on Sep. 27, 2019, now Pat. No. 10,779,085.
(Continued)

(51) Int. Cl.
*H04R 5/04* (2006.01)
*G06F 3/0488* (2022.01)
(Continued)

(52) U.S. Cl.
CPC ............. *H04R 5/04* (2013.01); *G06F 3/0482* (2013.01); *G06F 3/0486* (2013.01);
(Continued)

(58) Field of Classification Search
CPC .. G06F 3/04812; G06F 3/0482; G06F 3/0486; G06F 3/0488; G06F 3/165;
(Continued)

(56) References Cited

U.S. PATENT DOCUMENTS

| | | |
|---|---|---|
| 5,086,385 A | 2/1992 | Launey et al. |
| 5,202,961 A | 4/1993 | Mills et al. |

(Continued)

FOREIGN PATENT DOCUMENTS

| | | |
|---|---|---|
| AU | 2907100826 A4 | 9/2007 |
| AU | 2008100011 A4 | 2/2008 |

(Continued)

OTHER PUBLICATIONS

Corrected Notice of Allowance received for U.S. Appl. No. 17/461,103, dated May 10, 2022, 2 pages.
(Continued)

*Primary Examiner* — Seth A Silverman
(74) *Attorney, Agent, or Firm* — DLA Piper LLP (US)

(57) ABSTRACT

An electronic device, with a display device, a communication device, one or more processors and memory, displays a first representation of a first controllable external device, where the first controllable external device is situated at a location. The device detects a first input corresponding to a selection of the first representation of the first controllable external device. In response to detecting the first input, the device transmits instructions, using the communication device, to the first controllable external device to perform a function if the first controllable external device is of a first type or displays, using the display device, a user interface for controlling characteristics of the first controllable external device.

18 Claims, 136 Drawing Sheets

Related U.S. Application Data

(60) Provisional application No. 62/855,895, filed on May 31, 2019.

(51) Int. Cl.
*G06F 3/16* (2006.01)
*G06F 3/04812* (2022.01)
*G06F 3/0482* (2013.01)
*G06F 3/0486* (2013.01)
*H04L 12/28* (2006.01)

(52) U.S. Cl.
CPC ........ *G06F 3/0488* (2013.01); *G06F 3/04812* (2013.01); *G06F 3/165* (2013.01); *H04L 12/282* (2013.01); *H04L 12/2809* (2013.01); *H04L 12/2812* (2013.01); *H04L 12/2814* (2013.01)

(58) Field of Classification Search
CPC ............. H04L 12/2809; H04L 12/2812; H04L 12/2814; H04L 12/282
See application file for complete search history.

(56) References Cited

U.S. PATENT DOCUMENTS

| | | | |
|---|---|---|---|
| 5,297,110 A | 3/1994 | Ohira et al. | |
| 5,795,301 A | 8/1998 | Nakamura et al. | |
| 5,974,235 A | 10/1999 | Nunally et al. | |
| 6,140,987 A | 10/2000 | Stein et al. | |
| 6,456,306 B1 | 9/2002 | Chin et al. | |
| 6,483,986 B1 | 11/2002 | Krapf | |
| 6,504,934 B1 | 1/2003 | Kasai et al. | |
| 6,901,439 B1 | 5/2005 | Bonasia et al. | |
| 6,912,429 B1 | 6/2005 | Bilger | |
| 6,931,594 B1 | 8/2005 | Jun | |
| 7,092,768 B1 | 8/2006 | Labuda | |
| 7,293,280 B1 | 11/2007 | Gupta et al. | |
| 7,401,351 B2 | 7/2008 | Boreczky et al. | |
| 7,571,014 B1 | 8/2009 | Lambourne et al. | |
| 7,656,393 B2 | 2/2010 | King et al. | |
| 7,730,223 B1 | 6/2010 | Bavor et al. | |
| 7,859,571 B1 | 12/2010 | Brown et al. | |
| 7,904,814 B2 | 3/2011 | Errico et al. | |
| 8,028,323 B2 | 9/2011 | Weel | |
| 8,031,230 B2 | 10/2011 | Takada | |
| 8,196,043 B2 | 6/2012 | Crow et al. | |
| 8,214,494 B1 | 7/2012 | Slavin | |
| 8,234,395 B2 * | 7/2012 | Millington ................. G06F 3/16 709/248 |
| 8,253,704 B2 | 8/2012 | Jang | |
| 8,290,603 B1 | 10/2012 | Lambourne | |
| 8,458,780 B1 | 6/2013 | Takkallapally et al. | |
| 8,516,374 B2 | 8/2013 | Fleischman et al. | |
| 8,745,500 B1 | 6/2014 | Kostello et al. | |
| 8,762,844 B2 | 6/2014 | Kim et al. | |
| 8,914,752 B1 | 12/2014 | Spiegel | |
| 8,954,889 B2 | 2/2015 | Fujibayashi | |
| 8,990,861 B2 | 3/2015 | Nishikawa et al. | |
| 9,021,526 B1 | 4/2015 | Baron et al. | |
| 9,042,556 B2 | 5/2015 | Kallai et al. | |
| 9,082,018 B1 | 7/2015 | Laska et al. | |
| 9,084,003 B1 | 7/2015 | Sanio et al. | |
| 9,112,849 B1 | 8/2015 | Werkelin Ahlin et al. | |
| 9,134,902 B2 | 9/2015 | Kang et al. | |
| 9,158,974 B1 | 10/2015 | Laska et al. | |
| 9,170,707 B1 | 10/2015 | Laska et al. | |
| 9,185,062 B1 | 11/2015 | Yang et al. | |
| 9,202,509 B2 | 12/2015 | Kallai et al. | |
| 9,247,363 B2 | 1/2016 | Triplett et al. | |
| 9,247,380 B1 | 1/2016 | Vincent | |
| 9,251,787 B1 | 2/2016 | Hart et al. | |
| 9,294,853 B1 | 3/2016 | Dhaundiyal | |
| 9,313,556 B1 | 4/2016 | Borel et al. | |
| 9,319,782 B1 | 4/2016 | Crump et al. | |
| 9,361,011 B1 | 6/2016 | Burns et al. | |
| 9,374,607 B2 | 6/2016 | Bates et al. | |
| D765,118 S | 8/2016 | Bachman et al. | |
| 9,431,021 B1 | 8/2016 | Scalise et al. | |
| 9,433,032 B1 | 8/2016 | Ghadge et al. | |
| 9,450,812 B2 | 9/2016 | Lee et al. | |
| 9,454,336 B1 | 9/2016 | Rudradevan et al. | |
| D773,510 S | 12/2016 | Foss et al. | |
| 9,519,413 B2 | 12/2016 | Bates | |
| 9,582,178 B2 | 2/2017 | Grant et al. | |
| 9,628,414 B1 | 4/2017 | Umapathy et al. | |
| D789,381 S | 6/2017 | Okumura et al. | |
| 9,680,982 B2 | 6/2017 | Fiedler | |
| 9,710,639 B1 | 7/2017 | Saini | |
| 9,727,346 B2 | 8/2017 | Shao | |
| 9,727,749 B2 | 8/2017 | Tzeng et al. | |
| 9,728,230 B2 | 8/2017 | Cudak et al. | |
| 9,750,116 B2 | 8/2017 | Witzgall | |
| 9,794,720 B1 | 10/2017 | Kadri | |
| 9,858,739 B1 | 1/2018 | Johnson et al. | |
| 9,898,175 B2 | 2/2018 | Fiedler | |
| 9,898,250 B1 | 2/2018 | Williams et al. | |
| 9,954,989 B2 | 4/2018 | Zhou | |
| 10,055,094 B2 | 8/2018 | Li et al. | |
| 10,068,364 B2 | 9/2018 | Cui | |
| 10,091,017 B2 | 10/2018 | Landow et al. | |
| 10,120,536 B2 | 11/2018 | Cha et al. | |
| 10,129,044 B2 | 11/2018 | Kangshang et al. | |
| 10,142,122 B1 | 11/2018 | Hill et al. | |
| 10,219,026 B2 | 2/2019 | Eim et al. | |
| 10,237,141 B2 | 3/2019 | Sasaki et al. | |
| 10,282,068 B2 | 5/2019 | Dubin et al. | |
| 10,284,980 B1 * | 5/2019 | Woo ................. H04N 21/4852 |
| 10,296,128 B1 | 5/2019 | Nold et al. | |
| 10,298,643 B1 | 5/2019 | Toal et al. | |
| 10,303,422 B1 * | 5/2019 | Woo ................. H04N 21/439 |
| 10,310,725 B2 | 6/2019 | Smith et al. | |
| 10,409,239 B2 | 9/2019 | Reeder et al. | |
| 10,436,977 B2 | 10/2019 | Bergman et al. | |
| 10,454,781 B2 | 10/2019 | Sasaki et al. | |
| 10,474,349 B2 | 11/2019 | Jang et al. | |
| 10,511,456 B2 | 12/2019 | Smith et al. | |
| 10,523,625 B1 | 12/2019 | Allen et al. | |
| 10,631,123 B2 | 4/2020 | O'keeffe | |
| 10,708,653 B1 | 7/2020 | Stinson et al. | |
| 10,713,699 B1 | 7/2020 | Lien et al. | |
| 10,732,819 B2 | 8/2020 | Wang et al. | |
| 10,779,085 B1 | 9/2020 | Carrigan | |
| 10,824,299 B2 | 11/2020 | Bai | |
| 10,833,887 B2 | 11/2020 | Wu | |
| 10,924,446 B1 | 2/2021 | Paul | |
| 10,963,145 B1 | 3/2021 | Voss et al. | |
| 11,079,913 B1 | 8/2021 | Kim et al. | |
| 2001/0030597 A1 | 10/2001 | Inoue et al. | |
| 2002/0002039 A1 | 1/2002 | Qureshey et al. | |
| 2002/0012526 A1 | 1/2002 | Sai et al. | |
| 2002/0060701 A1 | 5/2002 | Naughton et al. | |
| 2002/0063737 A1 | 5/2002 | Feig et al. | |
| 2002/0118605 A1 | 8/2002 | Born et al. | |
| 2002/0154888 A1 | 10/2002 | Allen et al. | |
| 2002/0168938 A1 | 11/2002 | Chang | |
| 2002/0180774 A1 | 12/2002 | Errico et al. | |
| 2003/0040813 A1 | 2/2003 | Gonzales et al. | |
| 2003/0063130 A1 | 4/2003 | Barbieri et al. | |
| 2003/0093790 A1 | 5/2003 | Logan et al. | |
| 2003/0110511 A1 | 6/2003 | Schutte et al. | |
| 2003/0112938 A1 | 6/2003 | Kanakubo et al. | |
| 2004/0003051 A1 | 1/2004 | Krzyzanowski et al. | |
| 2004/0032955 A1 | 2/2004 | Hashimoto et al. | |
| 2004/0131254 A1 | 7/2004 | Liang et al. | |
| 2004/0261010 A1 | 12/2004 | Matsuishi | |
| 2004/0264916 A1 | 12/2004 | Van et al. | |
| 2005/0055472 A1 | 3/2005 | Krzyzanowski et al. | |
| 2005/0094610 A1 | 5/2005 | De et al. | |
| 2005/0135198 A1 | 6/2005 | Wellen | |
| 2005/0144247 A1 | 6/2005 | Christensen et al. | |
| 2005/0162423 A1 | 7/2005 | Goggin | |
| 2005/0163345 A1 | 7/2005 | Van et al. | |
| 2005/0169503 A1 | 8/2005 | Howell et al. | |

(56) References Cited

U.S. PATENT DOCUMENTS

| | | |
|---|---|---|
| 2005/0275626 A1 | 12/2005 | Muller et al. |
| 2006/0002523 A1 | 1/2006 | Bettis et al. |
| 2006/0013554 A1 | 1/2006 | Poslinski et al. |
| 2006/0034586 A1 | 2/2006 | Millar et al. |
| 2006/0132455 A1 | 6/2006 | Rimas-ribikauskas et al. |
| 2006/0136173 A1 | 6/2006 | Case, Jr. et al. |
| 2006/0161621 A1 | 7/2006 | Rosenberg |
| 2006/0171453 A1 | 8/2006 | Rohlfing et al. |
| 2006/0221184 A1 | 10/2006 | Vallone et al. |
| 2006/0258289 A1 | 11/2006 | Dua |
| 2006/0279628 A1 | 12/2006 | Fleming |
| 2006/0280186 A1 | 12/2006 | Carlton et al. |
| 2007/0027682 A1 | 2/2007 | Bennett |
| 2007/0033632 A1 | 2/2007 | Baynger et al. |
| 2007/0050452 A1 | 3/2007 | Raju et al. |
| 2007/0061020 A1 | 3/2007 | Bovee et al. |
| 2007/0113294 A1 | 5/2007 | Field et al. |
| 2007/0162762 A1 | 7/2007 | Huh et al. |
| 2007/0165553 A1 | 7/2007 | Steinmann |
| 2007/0174774 A1 | 7/2007 | Lerman et al. |
| 2007/0192486 A1 | 8/2007 | Wilson et al. |
| 2007/0198111 A1 | 8/2007 | Oetzel et al. |
| 2007/0241945 A1 | 10/2007 | Moorer et al. |
| 2008/0074958 A1 | 3/2008 | Moran |
| 2008/0081558 A1 | 4/2008 | Dunko et al. |
| 2008/0091717 A1 | 4/2008 | Garbow et al. |
| 2008/0122796 A1 | 5/2008 | Jobs et al. |
| 2008/0165160 A1 | 7/2008 | Kocienda |
| 2008/0273712 A1 | 11/2008 | Eichfeld et al. |
| 2008/0273713 A1 | 11/2008 | Hartung et al. |
| 2008/0285772 A1 | 11/2008 | Haulick et al. |
| 2009/0125571 A1 | 5/2009 | Kiilerich et al. |
| 2009/0133070 A1 | 5/2009 | Hamano et al. |
| 2009/0153289 A1 | 6/2009 | Hope et al. |
| 2009/0199119 A1 | 8/2009 | Park et al. |
| 2009/0220206 A1 | 9/2009 | Kisliakov |
| 2009/0232028 A1 | 9/2009 | Baalbergen et al. |
| 2009/0282362 A1 | 11/2009 | Matsumoto |
| 2009/0299810 A1 | 12/2009 | Jardine et al. |
| 2009/0304205 A1 | 12/2009 | Hardacker et al. |
| 2010/0004031 A1 | 1/2010 | Kim |
| 2010/0064255 A1 | 3/2010 | Rottier et al. |
| 2010/0070490 A1 | 3/2010 | Amidon et al. |
| 2010/0081375 A1 | 4/2010 | Rosenblatt et al. |
| 2010/0106647 A1 | 4/2010 | Raman |
| 2010/0121636 A1 | 5/2010 | Burke et al. |
| 2010/0138007 A1 | 6/2010 | Clark et al. |
| 2010/0145485 A1 | 6/2010 | Duchene et al. |
| 2010/0178873 A1 | 7/2010 | Lee et al. |
| 2010/0191575 A1 | 7/2010 | Raleigh |
| 2010/0191833 A1 | 7/2010 | Hofrichter et al. |
| 2010/0201815 A1 | 8/2010 | Anderson et al. |
| 2010/0267370 A1 | 10/2010 | Lee |
| 2010/0284389 A1 | 11/2010 | Ramsay et al. |
| 2010/0296678 A1 | 11/2010 | Kuhn-rahloff et al. |
| 2010/0299639 A1 | 11/2010 | Ramsay et al. |
| 2010/0318917 A1* | 12/2010 | Holladay ............ H04L 41/0893 |
| | | 715/810 |
| 2010/0318928 A1 | 12/2010 | Neuman et al. |
| 2010/0318939 A1 | 12/2010 | Moon |
| 2010/0321201 A1 | 12/2010 | Huang et al. |
| 2011/0003665 A1 | 1/2011 | Burton et al. |
| 2011/0040754 A1 | 2/2011 | Peto et al. |
| 2011/0040760 A1 | 2/2011 | Fleischman et al. |
| 2011/0071656 A1 | 3/2011 | Mckiel |
| 2011/0145745 A1 | 6/2011 | Hyeon et al. |
| 2011/0159469 A1 | 6/2011 | Hwang et al. |
| 2011/0159927 A1 | 6/2011 | Choi |
| 2011/0173545 A1 | 7/2011 | Meola et al. |
| 2011/0228084 A1 | 9/2011 | Colciago |
| 2011/0249861 A1 | 10/2011 | Tokutake |
| 2011/0252357 A1 | 10/2011 | Chaudhri |
| 2011/0254683 A1 | 10/2011 | Soldan et al. |
| 2011/0255379 A1 | 10/2011 | Vidal |
| 2011/0275940 A1 | 11/2011 | Nims et al. |
| 2011/0291971 A1 | 12/2011 | Masaki et al. |
| 2012/0004920 A1 | 1/2012 | Kelly et al. |
| 2012/0054278 A1 | 3/2012 | Taleb et al. |
| 2012/0066632 A1 | 3/2012 | Sundermeyer et al. |
| 2012/0070129 A1 | 3/2012 | Lin et al. |
| 2012/0115608 A1 | 5/2012 | Pfeifer et al. |
| 2012/0169583 A1 | 7/2012 | Rippel et al. |
| 2012/0173767 A1 | 7/2012 | Kim et al. |
| 2012/0177339 A1 | 7/2012 | Chang et al. |
| 2012/0178431 A1 | 7/2012 | Gold |
| 2012/0197419 A1 | 8/2012 | Dhruv et al. |
| 2012/0210226 A1 | 8/2012 | Mccoy et al. |
| 2012/0222092 A1 | 8/2012 | Rabii |
| 2012/0223890 A1 | 9/2012 | Borovsky et al. |
| 2012/0260169 A1 | 10/2012 | Schwartz et al. |
| 2012/0266199 A1 | 10/2012 | Noonan et al. |
| 2012/0269361 A1* | 10/2012 | Bhow ................ H04N 21/8106 |
| | | 381/81 |
| 2012/0272230 A1 | 10/2012 | Lee |
| 2012/0274508 A1 | 11/2012 | Brown et al. |
| 2012/0282974 A1 | 11/2012 | Green et al. |
| 2012/0294118 A1 | 11/2012 | Haulick et al. |
| 2012/0311499 A1 | 12/2012 | Dellinger et al. |
| 2013/0022218 A1 | 1/2013 | Miyazawa et al. |
| 2013/0022221 A1 | 1/2013 | Kallai et al. |
| 2013/0027289 A1 | 1/2013 | Choi et al. |
| 2013/0047084 A1 | 2/2013 | Sanders et al. |
| 2013/0051755 A1 | 2/2013 | Brown et al. |
| 2013/0053107 A1 | 2/2013 | Kang et al. |
| 2013/0060352 A1 | 3/2013 | Kouda et al. |
| 2013/0073584 A1 | 3/2013 | Kuper et al. |
| 2013/0080516 A1 | 3/2013 | Bologh |
| 2013/0080955 A1 | 3/2013 | Reimann et al. |
| 2013/0094666 A1 | 4/2013 | Haaff et al. |
| 2013/0094770 A1 | 4/2013 | Lee et al. |
| 2013/0099672 A1 | 4/2013 | Lin et al. |
| 2013/0113822 A1 | 5/2013 | Putrevu et al. |
| 2013/0124207 A1 | 5/2013 | Sarin et al. |
| 2013/0124997 A1 | 5/2013 | Speir et al. |
| 2013/0132865 A1 | 5/2013 | Li |
| 2013/0138272 A1 | 5/2013 | Louise-Babando et al. |
| 2013/0141223 A1 | 6/2013 | Brandsma et al. |
| 2013/0159858 A1 | 6/2013 | Joffray et al. |
| 2013/0162411 A1 | 6/2013 | Moses et al. |
| 2013/0173794 A1 | 7/2013 | Agerbak et al. |
| 2013/0191454 A1 | 7/2013 | Oliver et al. |
| 2013/0194476 A1 | 8/2013 | Shimosato |
| 2013/0205375 A1 | 8/2013 | Woxblom et al. |
| 2013/0225152 A1 | 8/2013 | Matthews et al. |
| 2013/0227414 A1 | 8/2013 | Hwang et al. |
| 2013/0246522 A1 | 9/2013 | Bilinski et al. |
| 2013/0246916 A1 | 9/2013 | Reimann et al. |
| 2013/0282180 A1 | 10/2013 | Layton |
| 2013/0283161 A1* | 10/2013 | Reimann ............... G06F 3/0486 |
| | | 715/716 |
| 2013/0298021 A1 | 11/2013 | Park et al. |
| 2013/0305354 A1 | 11/2013 | King et al. |
| 2013/0322634 A1 | 12/2013 | Bennett et al. |
| 2013/0324081 A1 | 12/2013 | Gargi et al. |
| 2013/0329924 A1 | 12/2013 | Fleizach et al. |
| 2013/0331083 A1 | 12/2013 | Oslund |
| 2013/0346859 A1 | 12/2013 | Bates et al. |
| 2013/0347022 A1 | 12/2013 | Bates et al. |
| 2014/0013243 A1 | 1/2014 | Flynn et al. |
| 2014/0025798 A1 | 1/2014 | Apte et al. |
| 2014/0037107 A1 | 2/2014 | Marino et al. |
| 2014/0047020 A1 | 2/2014 | Matus et al. |
| 2014/0049447 A1 | 2/2014 | Choi |
| 2014/0068439 A1 | 3/2014 | Lacaze et al. |
| 2014/0068486 A1 | 3/2014 | Sellers et al. |
| 2014/0070959 A1 | 3/2014 | Bhargava et al. |
| 2014/0075311 A1 | 3/2014 | Boettcher et al. |
| 2014/0075321 A1 | 3/2014 | Masera |
| 2014/0080416 A1 | 3/2014 | Seo et al. |
| 2014/0082501 A1 | 3/2014 | Bae et al. |
| 2014/0087685 A1 | 3/2014 | Kellond et al. |
| 2014/0092292 A1 | 4/2014 | Kuznetsov et al. |
| 2014/0143678 A1 | 5/2014 | Mistry et al. |
| 2014/0143737 A1 | 5/2014 | Mistry et al. |

(56) References Cited

U.S. PATENT DOCUMENTS

| | | |
|---|---|---|
| 2014/0150029 A1 | 5/2014 | Avedissian et al. |
| 2014/0172136 A1 | 6/2014 | Ura et al. |
| 2014/0176298 A1 | 6/2014 | Kumar et al. |
| 2014/0181202 A1 | 6/2014 | Gossain |
| 2014/0181654 A1 | 6/2014 | Kumar et al. |
| 2014/0207707 A1 | 7/2014 | Na et al. |
| 2014/0215365 A1 | 7/2014 | Hiraga et al. |
| 2014/0218517 A1 | 8/2014 | Kim et al. |
| 2014/0232273 A1 | 8/2014 | Sasaki et al. |
| 2014/0236325 A1 | 8/2014 | Sasaki et al. |
| 2014/0237361 A1 | 8/2014 | Martin et al. |
| 2014/0237419 A1 | 8/2014 | Ryu |
| 2014/0257532 A1 | 9/2014 | Kim et al. |
| 2014/0258854 A1 | 9/2014 | Li |
| 2014/0267002 A1 | 9/2014 | Luna |
| 2014/0267068 A1 | 9/2014 | Smith et al. |
| 2014/0267549 A1 | 9/2014 | Pinter et al. |
| 2014/0267911 A1 | 9/2014 | Grant et al. |
| 2014/0270183 A1 | 9/2014 | Luna |
| 2014/0285017 A1 | 9/2014 | Noguchi et al. |
| 2014/0288680 A1 | 9/2014 | Hoffman et al. |
| 2014/0293046 A1 | 10/2014 | Ni |
| 2014/0313032 A1 | 10/2014 | Sager et al. |
| 2014/0334644 A1 | 11/2014 | Selig et al. |
| 2014/0335789 A1 | 11/2014 | Cohen et al. |
| 2014/0363024 A1 | 12/2014 | Apodaca |
| 2014/0364056 A1 | 12/2014 | Belk et al. |
| 2014/0365904 A1 | 12/2014 | Kim et al. |
| 2014/0365980 A1 | 12/2014 | Morrison et al. |
| 2014/0375819 A1 | 12/2014 | Larsen et al. |
| 2014/0380234 A1 | 12/2014 | Shim et al. |
| 2015/0008845 A1 | 1/2015 | Kim et al. |
| 2015/0010167 A1 | 1/2015 | Arling et al. |
| 2015/0032812 A1 | 1/2015 | Dudley |
| 2015/0033361 A1 | 1/2015 | Choi et al. |
| 2015/0042576 A1 | 2/2015 | Wang |
| 2015/0052222 A1 | 2/2015 | Farrell et al. |
| 2015/0058780 A1 | 2/2015 | Malik et al. |
| 2015/0067803 A1 | 3/2015 | Alduaiji |
| 2015/0071601 A1 | 3/2015 | Dabous et al. |
| 2015/0081072 A1* | 3/2015 | Kallai .............. H03G 5/165 700/94 |
| 2015/0082225 A1 | 3/2015 | Shearer |
| 2015/0089359 A1 | 3/2015 | Brisebois |
| 2015/0092009 A1 | 4/2015 | Deluca et al. |
| 2015/0095804 A1 | 4/2015 | Grossman et al. |
| 2015/0095937 A1 | 4/2015 | Tobin |
| 2015/0106721 A1 | 4/2015 | Cha et al. |
| 2015/0113407 A1 | 4/2015 | Hoffert et al. |
| 2015/0113418 A1 | 4/2015 | Sasaki et al. |
| 2015/0120768 A1 | 4/2015 | Wellen et al. |
| 2015/0130737 A1 | 5/2015 | Im et al. |
| 2015/0135068 A1 | 5/2015 | Chiu |
| 2015/0138101 A1 | 5/2015 | Park et al. |
| 2015/0142587 A1 | 5/2015 | Salgar et al. |
| 2015/0145435 A1 | 5/2015 | Ogawa |
| 2015/0146945 A1 | 5/2015 | Han |
| 2015/0147067 A1 | 5/2015 | Ryan et al. |
| 2015/0149599 A1 | 5/2015 | Caunter et al. |
| 2015/0159895 A1 | 6/2015 | Quam et al. |
| 2015/0160797 A1 | 6/2015 | Shearer et al. |
| 2015/0177914 A1 | 6/2015 | Coyner et al. |
| 2015/0180922 A1 | 6/2015 | Draznin et al. |
| 2015/0188724 A1 | 7/2015 | Kim et al. |
| 2015/0189426 A1 | 7/2015 | Pang |
| 2015/0193130 A1 | 7/2015 | Cho et al. |
| 2015/0193196 A1 | 7/2015 | Lin et al. |
| 2015/0198938 A1 | 7/2015 | Steele et al. |
| 2015/0200715 A1 | 7/2015 | Oiwa et al. |
| 2015/0201480 A1 | 7/2015 | Ogawa |
| 2015/0205511 A1 | 7/2015 | Vinna et al. |
| 2015/0205971 A1 | 7/2015 | Sanio et al. |
| 2015/0207849 A1 | 7/2015 | Bingzhou et al. |
| 2015/0215382 A1 | 7/2015 | Arora et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229782 A1 | 8/2015 | Zuidema et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0244539 A1 | 8/2015 | Ickman et al. |
| 2015/0248268 A1 | 9/2015 | Kumar et al. |
| 2015/0253735 A1 | 9/2015 | Watterson |
| 2015/0253960 A1 | 9/2015 | Lin et al. |
| 2015/0256957 A1* | 9/2015 | Kim .............. H04R 3/12 381/303 |
| 2015/0261493 A1 | 9/2015 | Lemmon et al. |
| 2015/0264304 A1 | 9/2015 | Chastney et al. |
| 2015/0309768 A1 | 10/2015 | Van Der Heide |
| 2015/0312299 A1 | 10/2015 | Chen |
| 2015/0319006 A1 | 11/2015 | Plummer et al. |
| 2015/0319046 A1 | 11/2015 | Plummer et al. |
| 2015/0324552 A1 | 11/2015 | Beckhardt |
| 2015/0332586 A1 | 11/2015 | Hamm et al. |
| 2015/0341227 A1 | 11/2015 | Tatzel et al. |
| 2015/0347738 A1 | 12/2015 | Ulrich et al. |
| 2015/0348493 A1 | 12/2015 | Chae et al. |
| 2015/0350031 A1 | 12/2015 | Burks et al. |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0358304 A1 | 12/2015 | Beckhardt et al. |
| 2015/0370230 A1 | 12/2015 | Duchene et al. |
| 2015/0370426 A1 | 12/2015 | Carrigan et al. |
| 2015/0378522 A1 | 12/2015 | Butts |
| 2016/0004417 A1 | 1/2016 | Bates |
| 2016/0004499 A1* | 1/2016 | Kim .............. H04S 7/30 715/716 |
| 2016/0005281 A1 | 1/2016 | Laska et al. |
| 2016/0026429 A1 | 1/2016 | Triplett |
| 2016/0033985 A1 | 2/2016 | Gulli' et al. |
| 2016/0037140 A1 | 2/2016 | Lindsey et al. |
| 2016/0037436 A1 | 2/2016 | Spencer et al. |
| 2016/0043905 A1 | 2/2016 | Fiedler |
| 2016/0043962 A1 | 2/2016 | Kim et al. |
| 2016/0048705 A1 | 2/2016 | Yang |
| 2016/0062487 A1 | 3/2016 | Foss et al. |
| 2016/0062567 A1 | 3/2016 | Yang et al. |
| 2016/0062582 A1 | 3/2016 | Wilson et al. |
| 2016/0062606 A1 | 3/2016 | Vega et al. |
| 2016/0070244 A1 | 3/2016 | Cipollo et al. |
| 2016/0073197 A1* | 3/2016 | Hammer .............. H04W 12/50 381/80 |
| 2016/0073482 A1 | 3/2016 | Fok et al. |
| 2016/0077734 A1 | 3/2016 | Buxton et al. |
| 2016/0085412 A1 | 3/2016 | Meganathan et al. |
| 2016/0088039 A1 | 3/2016 | Millington et al. |
| 2016/0092072 A1* | 3/2016 | So .............. G06F 3/165 345/173 |
| 2016/0093180 A1 | 3/2016 | Fitzgibbon et al. |
| 2016/0093338 A1 | 3/2016 | Laska et al. |
| 2016/0099901 A1 | 4/2016 | Allen et al. |
| 2016/0103830 A1 | 4/2016 | Cheong et al. |
| 2016/0117402 A1 | 4/2016 | Gowel |
| 2016/0127799 A1 | 5/2016 | Alsina et al. |
| 2016/0133297 A1 | 5/2016 | Thornton et al. |
| 2016/0134942 A1 | 5/2016 | Lo |
| 2016/0139752 A1 | 5/2016 | Shim et al. |
| 2016/0150135 A1 | 5/2016 | Chen |
| 2016/0150624 A1 | 5/2016 | Meerbeek et al. |
| 2016/0156687 A1 | 6/2016 | Leung |
| 2016/0156992 A1 | 6/2016 | Kuper |
| 2016/0162252 A1 | 6/2016 | Di Censo et al. |
| 2016/0165390 A1 | 6/2016 | Hartzell et al. |
| 2016/0173318 A1 | 6/2016 | Ha et al. |
| 2016/0179068 A1 | 6/2016 | Qian et al. |
| 2016/0183046 A1 | 6/2016 | Kwon |
| 2016/0187995 A1 | 6/2016 | Rosewall |

(56) References Cited

U.S. PATENT DOCUMENTS

| | | |
|---|---|---|
| 2016/0191992 A1 | 6/2016 | Kwon |
| 2016/0196042 A1 | 7/2016 | Laute et al. |
| 2016/0196106 A1 | 7/2016 | Hammer et al. |
| 2016/0202866 A1 | 7/2016 | Zambetti |
| 2016/0209939 A1 | 7/2016 | Zambetti et al. |
| 2016/0210983 A1 | 7/2016 | Amada et al. |
| 2016/0224233 A1 | 8/2016 | Phang et al. |
| 2016/0231902 A1 | 8/2016 | Sirpal et al. |
| 2016/0239167 A1 | 8/2016 | Reimann et al. |
| 2016/0246566 A1 | 8/2016 | Fullerton et al. |
| 2016/0253145 A1 | 9/2016 | Lee et al. |
| 2016/0255706 A1 | 9/2016 | Kim et al. |
| 2016/0259459 A1 | 9/2016 | Yang et al. |
| 2016/0267319 A1 | 9/2016 | Murillo et al. |
| 2016/0277903 A1 | 9/2016 | Poosala et al. |
| 2016/0286630 A1 | 9/2016 | Witzgall |
| 2016/0291924 A1 | 10/2016 | Bierbower et al. |
| 2016/0295340 A1 | 10/2016 | Baker et al. |
| 2016/0299669 A1 | 10/2016 | Bates |
| 2016/0299736 A1 | 10/2016 | Bates et al. |
| 2016/0320849 A1 | 11/2016 | Koo |
| 2016/0335041 A1 | 11/2016 | Wachter et al. |
| 2016/0336531 A1 | 11/2016 | Yokoyama |
| 2016/0342386 A1 | 11/2016 | Kallai et al. |
| 2016/0345039 A1 | 11/2016 | Billmeyer |
| 2016/0351191 A1 | 12/2016 | Vilermo et al. |
| 2016/0360344 A1 | 12/2016 | Shim et al. |
| 2016/0364123 A1 | 12/2016 | Burns et al. |
| 2016/0364129 A1 | 12/2016 | Mclean et al. |
| 2016/0364600 A1 | 12/2016 | Shah et al. |
| 2016/0366481 A1 | 12/2016 | Lim et al. |
| 2016/0366531 A1 | 12/2016 | Popova |
| 2016/0381476 A1 | 12/2016 | Gossain et al. |
| 2017/0003931 A1 | 1/2017 | Dvortsov et al. |
| 2017/0010794 A1 | 1/2017 | Cho et al. |
| 2017/0013562 A1 | 1/2017 | Lim et al. |
| 2017/0017531 A1 | 1/2017 | Choi et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0041727 A1 | 2/2017 | Reimann |
| 2017/0046025 A1 | 2/2017 | Dascola et al. |
| 2017/0053008 A1 | 2/2017 | Frenkel et al. |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0070775 A1 | 3/2017 | Taxier et al. |
| 2017/0078294 A1 | 3/2017 | Medvinsky |
| 2017/0078767 A1 | 3/2017 | Borel et al. |
| 2017/0083285 A1 | 3/2017 | Meyers et al. |
| 2017/0083494 A1 | 3/2017 | Kim et al. |
| 2017/0084135 A1 | 3/2017 | Yu |
| 2017/0092085 A1 | 3/2017 | Agarwal |
| 2017/0092270 A1 | 3/2017 | Newendorp et al. |
| 2017/0097621 A1 | 4/2017 | Ackmann et al. |
| 2017/0099270 A1 | 4/2017 | Anson |
| 2017/0115940 A1 | 4/2017 | Byeon |
| 2017/0127145 A1 | 5/2017 | Rajapakse |
| 2017/0134567 A1 | 5/2017 | Jeon et al. |
| 2017/0142087 A1 | 5/2017 | Maninder et al. |
| 2017/0185277 A1 | 6/2017 | Sundermeyer et al. |
| 2017/0193813 A1 | 7/2017 | Carroll et al. |
| 2017/0195772 A1 | 7/2017 | Han et al. |
| 2017/0206779 A1 | 7/2017 | Lee et al. |
| 2017/0235545 A1 | 8/2017 | Millington et al. |
| 2017/0242653 A1 | 8/2017 | Lang et al. |
| 2017/0251314 A1* | 8/2017 | Pye, Jr. ............... G06F 3/04817 |
| 2017/0285788 A1* | 10/2017 | Park ..................... H04W 4/80 |
| 2017/0302779 A1 | 10/2017 | Zhao et al. |
| 2017/0337791 A1 | 11/2017 | Gordon-carroll |
| 2017/0352380 A1 | 12/2017 | Doumbouya et al. |
| 2017/0357425 A1 | 12/2017 | Smith et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0359189 A1 | 12/2017 | Smith et al. |
| 2017/0359191 A1 | 12/2017 | Smith et al. |
| 2017/0359555 A1 | 12/2017 | Irani et al. |
| 2018/0014043 A1 | 1/2018 | Zhang et al. |
| 2018/0014077 A1 | 1/2018 | Hou et al. |
| 2018/0018081 A1 | 1/2018 | Dattilo-green et al. |
| 2018/0019889 A1 | 1/2018 | Burns et al. |
| 2018/0039916 A1 | 2/2018 | Ravindra |
| 2018/0040324 A1 | 2/2018 | Wilberding |
| 2018/0067712 A1 | 3/2018 | Behzadi et al. |
| 2018/0070187 A1 | 3/2018 | Drinkwater et al. |
| 2018/0088795 A1 | 3/2018 | Van Os et al. |
| 2018/0101297 A1 | 4/2018 | Yang et al. |
| 2018/0109754 A1 | 4/2018 | Kwon |
| 2018/0113577 A1 | 4/2018 | Burns et al. |
| 2018/0115788 A1 | 4/2018 | Burns et al. |
| 2018/0139292 A1 | 5/2018 | Koren et al. |
| 2018/0190279 A1 | 7/2018 | Anderson et al. |
| 2018/0199080 A1 | 7/2018 | Jackson et al. |
| 2018/0227341 A1 | 8/2018 | Rizzi |
| 2018/0228003 A1 | 8/2018 | O'driscoll et al. |
| 2018/0232592 A1 | 8/2018 | Stewart et al. |
| 2018/0232705 A1 | 8/2018 | Baker et al. |
| 2018/0246639 A1 | 8/2018 | Han et al. |
| 2018/0249113 A1 | 8/2018 | Faulkner |
| 2018/0308480 A1 | 10/2018 | Jang et al. |
| 2018/0329585 A1 | 11/2018 | Carrigan et al. |
| 2018/0329586 A1 | 11/2018 | Sundstrom et al. |
| 2018/0332559 A1 | 11/2018 | Gudivada et al. |
| 2018/0335903 A1 | 11/2018 | Coffman et al. |
| 2018/0337924 A1 | 11/2018 | Graham et al. |
| 2018/0341448 A1 | 11/2018 | Behzadi et al. |
| 2018/0351762 A1 | 12/2018 | Iyengar et al. |
| 2018/0364665 A1 | 12/2018 | Clymer et al. |
| 2018/0367578 A1 | 12/2018 | Verma et al. |
| 2019/0012069 A1 | 1/2019 | Bates |
| 2019/0012073 A1 | 1/2019 | Hwang |
| 2019/0012966 A1 | 1/2019 | Shi |
| 2019/0025943 A1 | 1/2019 | Jobs et al. |
| 2019/0026021 A1 | 1/2019 | Coffman et al. |
| 2019/0028419 A1 | 1/2019 | Sullivan |
| 2019/0056907 A1 | 2/2019 | So et al. |
| 2019/0089934 A1 | 3/2019 | Goulden et al. |
| 2019/0102145 A1 | 4/2019 | Wilberding et al. |
| 2019/0130185 A1 | 5/2019 | Delaney et al. |
| 2019/0138951 A1 | 5/2019 | Brownhill et al. |
| 2019/0208282 A1 | 7/2019 | Singh et al. |
| 2019/0265946 A1 | 8/2019 | Bae et al. |
| 2019/0286651 A1 | 9/2019 | Lee et al. |
| 2019/0294406 A1 | 9/2019 | Bierbower et al. |
| 2019/0295393 A1 | 9/2019 | Lee et al. |
| 2019/0342621 A1 | 11/2019 | Carrigan et al. |
| 2019/0342622 A1 | 11/2019 | Carrigan et al. |
| 2019/0361575 A1 | 11/2019 | Ni et al. |
| 2020/0050426 A1 | 2/2020 | Jung et al. |
| 2020/0050502 A1 | 2/2020 | Ghafourifar et al. |
| 2020/0104018 A1 | 4/2020 | Coffman et al. |
| 2020/0117329 A1 | 4/2020 | Wilson et al. |
| 2020/0135191 A1 | 4/2020 | Nourbakhsh |
| 2020/0152186 A1 | 5/2020 | Koh et al. |
| 2020/0154583 A1 | 5/2020 | Lee et al. |
| 2020/0186378 A1 | 6/2020 | Six et al. |
| 2020/0201491 A1 | 6/2020 | Coffman et al. |
| 2020/0201495 A1 | 6/2020 | Coffman et al. |
| 2020/0218486 A1 | 7/2020 | Behzadi et al. |
| 2020/0225817 A1 | 7/2020 | Coffman et al. |
| 2020/0225841 A1 | 7/2020 | Coffman et al. |
| 2020/0302913 A1 | 9/2020 | Marcinkiewicz |
| 2020/0314496 A1 | 10/2020 | Wittke |
| 2020/0379711 A1 | 12/2020 | Graham et al. |
| 2020/0379714 A1 | 12/2020 | Graham et al. |
| 2020/0379716 A1 | 12/2020 | Carrigan et al. |
| 2020/0379729 A1 | 12/2020 | Graham et al. |
| 2020/0379730 A1 | 12/2020 | Graham et al. |
| 2020/0382332 A1 | 12/2020 | Carrigan et al. |
| 2020/0382559 A1 | 12/2020 | Kramar et al. |
| 2020/0395012 A1 | 12/2020 | Kim et al. |
| 2021/0011588 A1 | 1/2021 | Coffman et al. |
| 2021/0043189 A1 | 2/2021 | Pyun |

(56) References Cited

U.S. PATENT DOCUMENTS

| | | | |
|---|---|---|---|
| 2021/0064317 A1 | 3/2021 | Juenger et al. |
| 2021/0065134 A1 | 3/2021 | Chhabra et al. |
| 2021/0092491 A1 | 3/2021 | Carrigan et al. |
| 2021/0099829 A1 | 4/2021 | Soto et al. |
| 2021/0158830 A1 | 5/2021 | Boehlke |
| 2021/0255816 A1 | 8/2021 | Behzadi et al. |
| 2021/0255819 A1 | 8/2021 | Graham et al. |
| 2021/0263702 A1 | 8/2021 | Carrigan |
| 2021/0266274 A1 | 8/2021 | Liu et al. |
| 2021/0323406 A1 | 10/2021 | So et al. |
| 2021/0349680 A1 | 11/2021 | Kim et al. |
| 2021/0352172 A1 | 11/2021 | Kim et al. |
| 2021/0392223 A1 | 12/2021 | Coffman et al. |
| 2022/0004356 A1 | 1/2022 | Kim et al. |
| 2022/0100367 A1 | 3/2022 | Carrigan et al. |
| 2022/0279022 A1 | 9/2022 | Kramar et al. |
| 2022/0279063 A1 | 9/2022 | Coffman et al. |
| 2022/0286549 A1 | 9/2022 | Coffman et al. |
| 2022/0303383 A1 | 9/2022 | Coffman et al. |
| 2022/0350482 A1 | 11/2022 | Carrigan et al. |
| 2022/0357825 A1 | 11/2022 | Wilson et al. |
| 2022/0365667 A1 | 11/2022 | Carrigan et al. |
| 2022/0377431 A1 | 11/2022 | Lerner et al. |
| 2023/0041125 A1 | 2/2023 | Kim et al. |
| 2023/0073844 A1 | 3/2023 | Coffman et al. |
| 2023/0082492 A1 | 3/2023 | Coffman et al. |
| 2023/0084551 A1 | 3/2023 | Coffman et al. |
| 2023/0098814 A1 | 3/2023 | Carrigan et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |

FOREIGN PATENT DOCUMENTS

| | | | |
|---|---|---|---|
| CN | 1641589 A | 7/2005 |
| CN | 1679019 A | 10/2005 |
| CN | 1863281 A | 11/2006 |
| CN | 101517557 A | 8/2009 |
| CN | 101627361 A | 1/2010 |
| CN | 102202192 A | 9/2011 |
| CN | 102281294 A | 12/2011 |
| CN | 102301323 A | 12/2011 |
| CN | 102740146 A | 10/2012 |
| CN | 102915630 A | 2/2013 |
| CN | 102932216 A | 2/2013 |
| CN | 103136497 A | 6/2013 |
| CN | 103260079 A | 8/2013 |
| CN | 103347116 A | 10/2013 |
| CN | 103593154 A | 2/2014 |
| CN | 103677711 A | 3/2014 |
| CN | 104076757 A | 10/2014 |
| CN | 104106036 A | 10/2014 |
| CN | 104155938 A | 11/2014 |
| CN | 104247449 A | 12/2014 |
| CN | 104284477 A | 1/2015 |
| CN | 104298188 A | 1/2015 |
| CN | 104429094 A | 3/2015 |
| CN | 104469512 A | 3/2015 |
| CN | 104581043 A | 4/2015 |
| CN | 104684207 A | 6/2015 |
| CN | 104766021 A | 7/2015 |
| CN | 104780654 A | 7/2015 |
| CN | 104820631 A | 8/2015 |
| CN | 104898603 A | 9/2015 |
| CN | 104956417 A | 9/2015 |
| CN | 105069118 A | 11/2015 |
| CN | 105159107 A | 12/2015 |
| CN | 105263114 A | 1/2016 |
| CN | 105373165 A | 3/2016 |
| CN | 105374192 A | 3/2016 |
| CN | 105474580 A | 4/2016 |
| CN | 105549947 A | 5/2016 |
| CN | 105553796 A | 5/2016 |
| CN | 105794231 A | 7/2016 |
| CN | 105900376 A | 8/2016 |
| CN | 105940678 A | 9/2016 |
| CN | 106030700 A | 10/2016 |
| CN | 106062810 A | 10/2016 |
| CN | 106383645 A | 2/2017 |
| CN | 107197441 A | 9/2017 |
| CN | 107533368 A | 1/2018 |
| CN | 107613235 A | 1/2018 |
| CN | 107819928 A | 3/2018 |
| CN | 109117078 A | 1/2019 |
| CN | 109196825 A | 1/2019 |
| CN | 109287140 A | 1/2019 |
| CN | 109302531 A | 2/2019 |
| CN | 109348052 A | 2/2019 |
| CN | 109688441 A | 4/2019 |
| CN | 109688442 A | 4/2019 |
| EP | 1133119 A2 | 9/2001 |
| EP | 1881649 A2 | 1/2008 |
| EP | 2018032 A1 | 1/2009 |
| EP | 2675195 A2 | 12/2013 |
| EP | 2750062 A2 | 7/2014 |
| EP | 2770673 A1 | 8/2014 |
| EP | 2784611 A2 | 10/2014 |
| EP | 2797391 A1 | 10/2014 |
| EP | 2879470 A1 | 6/2015 |
| EP | 2894948 A2 | 7/2015 |
| EP | 2933953 A1 | 10/2015 |
| EP | 2981093 A1 | 2/2016 |
| EP | 3038427 A1 | 6/2016 |
| EP | 3138300 A1 | 3/2017 |
| EP | 3255536 A1 | 12/2017 |
| EP | 3445058 A1 | 2/2019 |
| EP | 3460770 A1 | 3/2019 |
| EP | 3038427 B1 | 12/2019 |
| GB | 2402105 A | 12/2004 |
| GB | 2499123 A | 8/2013 |
| GB | 2512821 A | 10/2014 |
| GB | 2533101 A | 6/2016 |
| IN | 1038/MUM/2005 A | 6/2007 |
| JP | 4-175921 A | 6/1992 |
| JP | 6-178356 A | 6/1994 |
| JP | 2002-153678 A | 5/2002 |
| JP | 2004-110559 A | 4/2004 |
| JP | 2006-350819 A | 12/2006 |
| JP | 2008-99330 A | 4/2008 |
| JP | 2009-201127 A | 9/2009 |
| JP | 2011-124665 A | 6/2011 |
| JP | 2012-73839 A | 4/2012 |
| JP | 2012-123460 A | 6/2012 |
| JP | 2013-98613 A | 5/2013 |
| JP | 2014-71835 A | 4/2014 |
| JP | 2014-87126 A | 5/2014 |
| JP | 2014-160461 A | 9/2014 |
| JP | 2014-170982 A | 9/2014 |
| JP | 2014-186961 A | 10/2014 |
| JP | 2015-070327 A | 4/2015 |
| JP | 2015-125671 A | 7/2015 |
| JP | 2015-128043 A | 7/2015 |
| JP | 2015-128326 A | 7/2015 |
| JP | 2015-149710 A | 8/2015 |
| JP | 2015-154253 A | 8/2015 |
| JP | 2015-195222 A | 11/2015 |
| JP | 2015-211035 A | 11/2015 |
| JP | 2016-51661 A | 4/2016 |
| JP | 2016-72953 A | 5/2016 |
| JP | 2016-119600 A | 6/2016 |
| JP | 2017-41008 A | 2/2017 |
| JP | 2017-508195 A | 3/2017 |
| JP | 2017-84253 A | 5/2017 |
| JP | 2017-158202 A | 9/2017 |
| JP | 2018-7158 A | 1/2018 |
| JP | 2018-63826 A | 4/2018 |
| JP | 2019-526095 A | 9/2019 |
| KR | 2001-0091156 A | 10/2001 |
| KR | 10-2010-0036351 A | 4/2010 |
| KR | 10-2011-0022980 A | 3/2011 |
| KR | 10-2011-0093040 A | 8/2011 |
| KR | 10-2012-0059860 A | 6/2012 |
| KR | 10-2012-0079208 A | 7/2012 |
| KR | 10-2013-0115611 A | 10/2013 |

(56) References Cited

FOREIGN PATENT DOCUMENTS

| | | |
|---|---|---|
| KR | 10-2014-0148289 A | 12/2014 |
| KR | 10-2015-0005134 A | 1/2015 |
| KR | 10-2015-0043146 A | 4/2015 |
| KR | 10-1522311 B1 | 5/2015 |
| KR | 10-2015-0121177 A | 10/2015 |
| KR | 10-2015-0136440 A | 12/2015 |
| KR | 10-2016-0141847 A | 12/2016 |
| KR | 10-2017-0008601 A | 1/2017 |
| KR | 10-2017-0027999 A | 3/2017 |
| KR | 10-2017-0100358 A | 9/2017 |
| KR | 10-2018-0034637 A | 4/2018 |
| KR | 10-2018-0085931 A | 7/2018 |
| KR | 10-2019-0002658 A | 1/2019 |
| KR | 10-2019-0014495 A | 2/2019 |
| KR | 10-2019-0057414 A | 5/2019 |
| KR | 20200039030 A | 4/2020 |
| TW | 201547326 A | 12/2015 |
| WO | 00/39964 A1 | 7/2000 |
| WO | 2005/055521 A1 | 6/2005 |
| WO | 2008/027924 A2 | 3/2008 |
| WO | 2008/030976 A2 | 3/2008 |
| WO | 2009/005563 A1 | 1/2009 |
| WO | 2009/067670 A1 | 5/2009 |
| WO | 2009/086599 A1 | 7/2009 |
| WO | 2010/087988 A1 | 8/2010 |
| WO | 2011/027964 A1 | 3/2011 |
| WO | 2012/004288 A1 | 1/2012 |
| WO | 2012/085794 A1 | 6/2012 |
| WO | 2012/104288 A1 | 8/2012 |
| WO | 2013/049346 A1 | 4/2013 |
| WO | 2013/153405 A2 | 10/2013 |
| WO | 2014/030320 A1 | 2/2014 |
| WO | 2014/030540 A1 | 2/2014 |
| WO | 2014/107469 A2 | 7/2014 |
| WO | 2014/128800 A1 | 8/2014 |
| WO | 2014/151089 A1 | 9/2014 |
| WO | 2014/155429 A1 | 10/2014 |
| WO | 2014/200766 A1 | 12/2014 |
| WO | 2014/208057 A1 | 12/2014 |
| WO | 2015/008409 A1 | 1/2015 |
| WO | 2015/076930 A1 | 5/2015 |
| WO | 2015/105763 A1 | 7/2015 |
| WO | 2015/124831 A1 | 8/2015 |
| WO | 2015/134692 A1 | 9/2015 |
| WO | 2015/179031 A1 | 11/2015 |
| WO | 2016/033400 A1 | 3/2016 |
| WO | 2016/052888 A1 | 4/2016 |
| WO | 2016/057117 A1 | 4/2016 |
| WO | 2017/027526 A1 | 2/2017 |
| WO | 2017/058293 A1 | 4/2017 |
| WO | 2017/058442 A1 | 4/2017 |
| WO | 2017/147081 A1 | 8/2017 |
| WO | 2017/205657 A1 | 11/2017 |
| WO | 2017/218143 A1 | 12/2017 |
| WO | 2017/218192 A1 | 12/2017 |
| WO | 2018/144339 A2 | 8/2018 |
| WO | 2018/213401 A1 | 11/2018 |
| WO | 2018/213415 A1 | 11/2018 |
| WO | 2018/232333 A1 | 12/2018 |
| WO | 2019/090653 A1 | 5/2019 |
| WO | 2019/217341 A1 | 11/2019 |
| WO | 2020/243691 A1 | 12/2020 |

OTHER PUBLICATIONS

Final Office Action received for U.S. Appl. No. 17/476,404, dated May 5, 2022, 30 pages.
Office Action received for Danish Patent Application No. PA202170320, dated May 3, 2022, 3 pages.
Applicant-Initiated Interview Summary received for U.S. Appl. No. 17/476,404, dated Mar. 18, 2022, 2 pages.
Corrected Notice of Allowance received for U.S. Appl. No. 16/836,571, dated Mar. 25, 2022, 2 pages.
Notice of Allowance received for Chinese Patent Application No. 202110248576.X, dated Mar. 21, 2022, 2 pages (1 page of English Translation and 1 page of Official Copy).
Notice of Allowance received for Japanese Patent Application No. 2021-563716, dated Mar. 14, 2022, 4 pages (1 page of English Translation and 3 pages of Official Copy).
Notice of Allowance received for U.S. Appl. No. 17/461,103, dated Mar. 17, 2022, 10 pages.
Office Action received for European Patent Application No. 21160991. 2, dated Mar. 24, 2022, 11 pages.
Brief Communication Regarding Oral Proceedings received for European Patent Application No. 19182037.2, dated Apr. 15, 2021, 2 pages.
Invitation to Pay Search Fees received for European Patent Application No. 19728558.8, dated Apr. 20, 2021, 4 pages.
Notice of Allowance received for Korean Patent Application No. 10-2020-7031319, dated Apr. 6, 2021, 5 pages (2 pages of English Translation and 3 pages of Official Copy).
Notice of Allowance received for U.S. Appl. No. 16/702,968, dated Apr. 21, 2021, 20 pages.
Notice of Allowance received for U.S. Appl. No. 17/027,373, dated Oct. 3, 2022, 5 pages.
Office Action received for Chinese Patent Application No. 202110819254.6, dataed Sep. 15, 2022, 13 pages (7 pages of English Translation and 6 pages of Official Copy).
Office Action received for Chinese Patent Application No. 202111652452.4, dated Aug. 29, 2022, 23 pages (12 pages of English Translation and 11 pages of Official Copy).
Corrected Notice of Allowance received for U.S. Appl. No. 16/807,604, dated Jul. 26, 2021, 3 pages.
Extended European Search Report received for European Patent Application No. 21160991.2, dated Jul. 16, 2021, 14 pages.
Intention to Grant received for European Patent Application No. 18197583.0, dated Jul. 23, 2021, 9 pages.
Notice of Allowance received for Chinese Patent Application No. 202010742019.9, dated Jul. 6, 2021, 7 pages (4 pages of English Translation and 3 pages of Official Copy).
Notice of Allowance received for U.S. Appl. No. 16/888,775, dated Jul. 26, 2021, 5 pages.
Office Action received for Japanese Patent Application No. 2021-051415, dated Jul. 19, 2021, 4 pages (2 pages of English Translation and 2 pages of Official Copy).
Brief Communication Regarding Oral Proceedings received for European Patent Application No. 18197583.0, dated Feb. 18, 2021, 2 pages.
Corrected Notice of Allowance received for U.S. Appl. No. 15/910,263, dated Feb. 10, 2021, 3 pages.
Final Office Action received for U.S. Appl. No. 16/723,583, dated Feb. 5, 2021, 15 pages.
Notice of Allowance received for U.S. Appl. No. 15/910,263, dated Feb. 18, 2021, 3 pages.
Office Action received for Chinese Patent Application No. 201811152726.1, dated Jan. 28, 2021, 13 pages (7 pages of English Translation and 6 pages of Official Copy).
Office Action received for Korean Patent Application No. 10-2020-7032488, dated Feb. 9, 2021, 11 pages (5 pages of English Translation and 6 pages of Official Copy).
Corrected Notice of Allowance received for U.S. Appl. No. 16/702,968, dated Jun. 8, 2021, 3 pages.
Corrected Notice of Allowance received for U.S. Appl. No. 16/702,968, dated May 28, 2021, 4 pages.
Corrected Notice of Allowance received for U.S. Appl. No. 16/807,604, dated May 28, 2021, 3 pages.
Notice of Allowance received for U.S. Appl. No. 16/888,775, dated Jun. 3, 2021, 11 pages.
Office Action received for European Patent Application No. 20187610. 9, dated May 21, 2021, 7 pages.
Final Office Action received for U.S. Appl. No. 17/742,273, dated Feb. 15, 2023, 56 pages.
Notice of Allowance received for Japanese Patent Application No. 2022-014389, dated Jan. 27, 2023, 4 pages (1 page of English Translation and 3 pages of Official Copy).

(56) References Cited

OTHER PUBLICATIONS

Notice of Allowance received for Japanese Patent Application No. 2022-125792, dated Jan. 27, 2023, 4 pages (1 page of English Translation and 3 pages of Official Copy).
Notice of Allowance received for Korean Patent Application No. 10-2022-7006175, dated Jan. 12, 2023, 7 pages (2 pages of English Translation and 5 pages of Official Copy).
Office Action received for Korean Patent Application No. 10-2021-7021047, dated Aug. 13, 2021, 5 pages (2 pages of English Translation and 3 pages of Official Copy).
Corrected Notice of Allowance received for U.S. Appl. No. 18/077,905, dated Apr. 10, 2023, 2 pages.
International Preliminary Report on Patentability received for PCT Patent Application No. PCT/US2021/048358, dated Apr. 6, 2023, 15 pages.
Notice of Reasons for Refusal received for Japanese Patent Application No. 2020-047952, dated Apr. 3, 2023, 4 pages (2 pages of English Translation and 2 pages of Official Copy).
Office Action received for Indian Patent Application No. 202215025361, dated Mar. 29, 2023, 6 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.
Applicant-Initiated Interview Summary received for U.S. Appl. No. 16/922,675, dated Sep. 3, 2021, 2 pages.
Applicant-Initiated Interview Summary received for U.S. Appl. No. 17/223,794, dated Sep. 7, 2021, 3 pages.
Decision to Grant received for European Patent Application No. 19182037.2, dated Sep. 16, 2021, 3 pages.
Intention to Grant received for European Patent Application No. 19207753.5, dated Sep. 3, 2021, 8 pages.
Notice of Acceptance received for Australian Patent Application No. 2020257092, dated Aug. 27, 2021, 3 pages.
Notice of Allowance received for U.S. Appl. No. 16/836,571, dated Sep. 8, 2021, 25 pages.
Notice of Allowance received for U.S. Appl. No. 17/031,833, dated Sep. 20, 2021, 6 pages.
Office Action received for Australian Patent Application No. 2020217458, dated Sep. 2, 2021, 6 pages.
Office Action received for Australian Patent Application No. 2020239711, dated Sep. 13, 2021, 5 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Applicant-Initiated Interview Summary received for U.S. Appl. No. 17/752,582, dated Apr. 17, 2023, 3 pages.
Corrected Notice of Allowance received for U.S. Appl. No. 16/922,675, dated Apr. 14, 2023, 6 pages.
Corrected Notice of Allowance received for U.S. Appl. No. 18/077,905, dated Apr. 19, 2023, 2 pages.
Corrected Notice of Allowance received for U.S. Appl. No. 18/077,905, dated Apr. 26, 2023, 3 pages.
Intention to Grant received for European Patent Application No. 18728002.9, dated Apr. 12, 2023, 9 pages.
International Search Report and Written Opinion received for PCT Patent Application No. PCT/US2022/043733, dated Jan. 3, 2023, 12 pages.
Applicant-Initiated Interview Summary received for U.S. Appl. No. 16/803,849, dated Oct. 12, 2021, 6 pages.
Corrected Notice of Allowance received for U.S. Appl. No. 16/807,604, dated Oct. 4, 2021, 5 pages.
Corrected Notice of Allowance received for U.S. Appl. No. 16/836,571, dated Oct. 12, 2021, 4 pages.
International Search Report and Written Opinion received for PCT Patent Application No. PCT/US2021/031760, dated Sep. 16, 2021, 18 pages.
Notice of Allowance received for U.S. Appl. No. 16/922,675, dated Sep. 27, 2021, 10 pages.
Office Action received for Danish Patent Application No. PA202070617, dated Sep. 24, 2021, 4 pages.
Office Action received for Japanese Patent Application No. 2020-047952, dated Aug. 27, 2021, 13 pages (6 pages of English Translation and 7 pages of Official Copy).
Office Action received for Japanese Patent Application No. 2021-026630, dated Aug. 20, 2021, 7 pages (3 pages of English Translation and 4 pages of Official Copy).
Search Report and Opinion received for Danish Patent Application No. PA202170320, dated Oct. 6, 2021, 9 pages.
Applicant-Initiated Interview Summary received for U.S. Appl. No. 17/461,103, dated Jan. 26, 2022, 6 pages.
Intention to Grant received for European Patent Application No. 18197583.0, dated Jan. 17, 2022, 9 pages.
Summons to Attend Oral Proceedings received for European Patent Application No. 19728558.8, dated Jan. 18, 2022, 9 pages.
Summons to Attend Oral Proceedings received for European Patent Application No. 20187610.9, dated Jan. 27, 2022, 2 pages.
Applicant-Initiated Interview Summary received for U.S. Appl. No. 16/830,838, dated Dec. 16, 2022, 2 pages.
Applicant-Initiated Interview Summary received for U.S. Appl. No. 17/476,404, dated Dec. 20, 2022, 2 pages.
Applicant-Initiated Interview Summary received for U.S. Appl. No. 17/728,801, dated Dec. 16, 2022, 4 pages.
Brief Communication Regarding Oral Proceedings received for European Patent Application No. 18728002.9, dated Dec. 7, 2022, 1 page.
Decision to Grant received for European Patent Application No. 20158824.1, dated Dec. 15, 2022, 3 pages.
Office Action received for Australian Patent Application No. 2022200901, dated Dec. 19, 2022, 4 pages.
Office Action received for Australian Patent Application No. 2022201532, dated Dec. 19, 2022, 5 pages.
Summons to Attend Oral Proceedings received for European Patent Application No. 21161005.0, dated Dec. 13, 2022, 9 pages.
Brief Communication Regarding Oral Proceedings received for European Patent Application No. 19728558.8, dated Jul. 5, 2022, 1 page.
Corrected Notice of Allowance received for U.S. Appl. No. 16/803,849, dated Jul. 7, 2022, 3 pages.
Corrected Notice of Allowance received for U.S. Appl. No. 17/027,373, dated Jul. 12, 2022, 2 pages.
Office Action received for Chinese Patent Application No. 202110818370.6, dated Jun. 22, 2022, 7 pages (4 pages of English Translation and 3 pages of Official Copy).
Office Action received for Japanese Patent Application No. 2020-047952, dated Jul. 1, 2022, 8 pages (4 pages of English Translation and 4 pages of Official Copy).
Result of Consultation received for European Patent Application No. 19728558.8, dated Jun. 28, 2022, 4 pages.
Brief Communication Regarding Oral Proceedings received for European Patent Application No. 18728002.9, dated Nov. 28, 2022, 7 pages.
International Preliminary Report on Patentability received for PCT Patent Application No. PCT/US2021/031760, dated Nov. 24, 2022, 11 pages.
International Search Report and Written Opinion received for PCT Patent Application No. PCT/US2022/029282, dated Nov. 9, 2022, 22 pages.
International Search Report and Written Opinion received for PCT Patent Application No. PCT/US2022/030110 dated Nov. 18, 2022, 22 pages.
Invitation to Pay Additional Fees and Partial International Search Report received for PCT Patent Application No. PCT/US2022/029282, dated Sep. 15, 2022, 15 pages.
Invitation to Pay Additional Fees and Partial International Search Report received for PCT Patent Application No. PCT/US2022/030110, dated Sep. 28, 2022, 16 pages.
Invitation to Pay Search Fees received for European Patent Application No. 21728781.2, dated Dec. 2, 2022, 3 pages.

(56) References Cited

OTHER PUBLICATIONS

Non-Final Office Action received for U.S. Appl. No. 17/728,801, dated Dec. 1, 2022, 10 pages.
Non-Final Office Action received for U.S. Appl. No. 17/742,273, dated Dec. 7, 2022, 47 pages.
Notice of Allowance received for U.S. Appl. No. 16/922,675, dated Dec. 8, 2022, 9 pages.
Office Action received for Australian Patent Application No. 2022241590, dated Nov. 18, 2022, 8 pages.
Cohn Emily, "Sonos Just Fixed the Most Annoying Thing About Its iPhone App", online available at https://www.businessinsider.com/sonos-mobile-app-works-on-lock-screen-2016-6, Jun. 27, 2016, 2 pages.
Fingas Jon, "Sonos Puts Speaker Controls on Your iPhone's Lock Screen", online available at https://www.engadget.com/2016-06-21-sonos-ios-lock-screen-controls.html, Jun. 21, 2016, 3 pages.
Kazmucha Allyson, "Sonos Controller App for iPhone and i Pad Review", online available at https://www.imore.com/sonos-controller-app-iphone-and-ipad-review, Mar. 1, 2018, 4 pages.
Notice of Allowance received for Korean Patent Application No. 10-2020-0123805, dated Jun. 19, 2022, 5 pages (2 pages of English Translation and 3 pages of Official Copy).
Notice of Allowance received for U.S. Appl. No. 17/461,103, dated Jun. 20, 2022, 6 pages.
Office Action received for Australian Patent Application No. 2019267527, dated Jun. 15, 2022, 3 pages.
Office Action received for Chinese Patent Application No. 202110819254.6, dated May 16, 2022, 16 pages (8 pages of English Translation and 8 pages of Official Copy).
Office Action received for European Patent Application No. 20158824.1, dated Jun. 13, 2022, 5 pages.
Corrected Notice of Allowance received for U.S. Appl. No. 15/910,263, dated Mar. 17, 2021, 3 pages.
Corrected Notice of Allowance received for U.S. Appl. No. 15/910,263, dated Mar. 18, 2021, 3 pages.
Non-Final Office Action received for U.S. Appl. No. 16/836,571, dated Mar. 25, 2021, 28 pages.
Notice of Allowance received for Chinese Patent Application No. 201811539260.0, dated Mar. 15, 2021, 2 pages (1 page of English Translation and 1 page of Official Copy).
Notice of Allowance received for U.S. Appl. No. 16/584,490, dated Mar. 26, 2021, 13 pages.
Office Action received for Australian Patent Application No. 2021201403, dated Mar. 16, 2021, 3 pages.
Office Action received for Danish Patent Application No. PA202070560, dated Mar. 10, 2021, 7 pages.
Result of Consultation received for European Patent Application No. 19182037.2, dated Mar. 22, 2021, 5 pages.
Advisory Action received for U.S. Appl. No. 14/752,662, dated Oct. 5, 2018, 3 pages.
Advisory Action received for U.S. Appl. No. 16/404,605, dated Apr. 15, 2020, 10 pages.
Applicant Initiated Interview Summary received for U.S. Appl. No. 16/404,605, dated Nov. 13, 2019, 3 pages.
Applicant-Initiated Interview Summary received for U.S. Appl. No. 16/584,743, dated May 1, 2020, 5 pages.
Applicant-Initiated Interview Summary received for U.S. Appl. No. 16/586,002, dated Apr. 28, 2020, 5 pages.
Certificate of Examination received for Australian Patent Application No. 2019100487, dated Jan. 7, 2020, 2 pages.
Certificate of Examination received for Australian Patent Application No. 2020100303, dated Apr. 17, 2020, 2 pages.
Certification of Examination received for Australian Patent Application No. 2017100666, dated Jan. 29, 2018, 2 pages.
Corrected International Search Report and Written Opinion received for PCT Patent Application No. PCT/US2017/035293, dated Dec. 8, 2017, 21 pages.
Corrected Notice of Allowance received for U.S. Appl. No. 15/427,516, dated Apr. 29, 2019, 2 pages.
Corrected Notice of Allowance received for U.S. Appl. No. 15/427,516, dated May 8, 2019, 2 pages.
Corrected Notice of Allowance received for U.S. Appl. No. 16/143,379, dated Dec. 18, 2019, 2 pages.
Corrected Notice of Allowance received for U.S. Appl. No. 16/143,379, dated Feb. 14, 2020, 2 pages.
Corrected Notice of Allowance received for U.S. Appl. No. 16/143,379, dated Mar. 3, 2020, 2 pages.
Corrected Notice of Allowance received for U.S. Appl. No. 16/143,379, dated Mar. 12, 2020, 2 pages.
Corrected Notice of Allowance received for U.S. Appl. No. 16/143,379, dated Aug. 15, 2019, 2 pages.
Corrected Notice of Allowance received for U.S. Appl. No. 16/143,379, dated Nov. 12, 2019, 2 pages.
Corrected Notice of Allowance received for U.S. Appl. No. 16/143,379, dated Oct. 16, 2019, 2 pages.
Decision to Grant received for Danish Patent Application No. PA201670601, dated Jun. 21, 2019, 2 pages.
Decision to Grant received for Danish Patent Application No. PA201670602, dated Nov. 30, 2018, 2 pages.
Decision to Grant received for Danish Patent Application No. PA201670604, dated Aug. 22, 2018, 2 pages.
Decision to Grant received for Danish Patent Application No. PA201670605, dated Nov. 29, 2018, 2 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.
Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for Danish Patent Application No. PA201870293, dated Dec. 3, 2018, 2 pages.
Extended European Search Report (includes Supplementary European Search Report and Search Opinion) received for European Patent Application No. 17813777.4, dated Mar. 25, 2019, 8 pages.
Extended European Search Report received for European Patent Application No. 18197583.0, dated Jun. 4, 2019, 20 pages.
Extended European Search Report received for European Patent Application No. 18197589.7, dated Jan. 7, 2019, 9 pages.
Extended European Search Report received for European Patent Application No. 19182037.2, dated Oct. 31, 2019, 8 pages.
Extended European Search Report received for European Patent Application No. 19207753.5, dated Dec. 18, 2019, 9 pages.
Final Office Action received for U.S. Appl. No. 14/752,662, dated Jun. 21, 2018, 15 pages.
Final Office Action received for U.S. Appl. No. 14/752,662, dated May 20, 2019, 18 pages.
Final Office Action received for U.S. Appl. No. 15/910,263, dated Aug. 28, 2019, 32 pages.
Final Office Action received for U.S. Appl. No. 16/404,605, dated Feb. 10, 2020, 21 pages.
Intention to Grant received for Danish Patent Application No. PA201670601, dated Apr. 10, 2019, 2 pages.
Intention to Grant received for Danish Patent Application No. PA201670602, dated Aug. 1, 2018, 2 pages.
Intention to Grant received for Danish Patent Application No. PA201670604, dated Jun. 14, 2018, 2 Pages.
Intention to Grant received for Danish Patent Application No. PA201670604, dated Mar. 15, 2018, 2 pages.
Intention to Grant received for Danish Patent Application No. PA201670605, dated Aug. 1, 2018, 2 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018,2 pages.
Intention to Grant received for Danish Patent Application No. PA201770401, dated Sep. 17, 2018, 2 pages.
Intention to Grant received for Danish Patent Application No. PA201770403, dated May 7, 2018, 2 pages.

(56) References Cited

OTHER PUBLICATIONS

Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770406, dated Feb. 6, 2020, 3 pages.
Intention to Grant received for Danish Patent Application No. PA201770408, dated Nov. 30, 2018, 3 pages.
Intention to Grant received for Danish Patent Application No. PA201870293, dated Aug. 31, 2018, 2 pages.
International Preliminary Report on Patentability received for PCT Patent Application No. PCT/US2017/035293, dated Dec. 27, 2018, 16 pages.
International Preliminary Report on Patentability received for PCT Patent Application No. PCT/US2018/032904, dated Nov. 28, 2019, 14 pages.
International Preliminary Report on Patentability received for PCT Patent Application No. PCT/US2015/038161, dated Mar. 16, 2017, 9 pages.
International Search Report and Written Opinion received for PCT Patent Application No. PCT/US2017/035293, dated Oct. 10, 2017, 25 pages.
International Search Report and Written Opinion received for PCT Patent Application No. PCT/US2018/032904, dated Oct. 1, 2018, 21 pages.
International Search Report and Written Opinion received for PCT Patent Application No. PCT/US2019/030963, dated Oct. 17, 2019, 21 pages.
Invitation to Pay Addition Fees and Partial International Search Report received for PCT Patent Application No. PCT/US2018/032904, dated Jul. 31, 2018, 18 pages.
Invitation to Pay Addition Fees received for PCT Patent Application No. PCT/US2017/035293, dated Aug. 17, 2017, 3 pages.
Invitation to Pay Additional Fees received for PCT Patent Application No. PCT/US2019/030963, dated Aug. 22, 2019, 12 pages.
Non-Final Office Action received for U.S. Appl. No. 14/752,662, dated Dec. 28, 2018, 16 pages.
Non-Final Office Action received for U.S. Appl. No. 14/752,662, dated Sep. 8, 2017, 16 pages.
Non-Final Office Action received for U.S. Appl. No. 15/427,516, dated Aug. 28, 2018, 11 Pages.
Non-Final Office Action received for U.S. Appl. No. 15/910,263, dated Mar. 4, 2019, 26 pages.
Non-Final Office Action received for U.S. Appl. No. 16/404,605, dated Aug. 1, 2019, 19 Pages.
Non-Final Office Action received for U.S. Appl. No. 16/404,612, dated Feb. 28, 2020, 13 pages.
Non-Final Office Action received for U.S. Appl. No. 16/584,743, dated Feb. 6, 2020, 15 pages.
Non-Final Office Action received for U.S. Appl. No. 16/586,002, dated Feb. 20, 2020, 15 pages.
Non-Final Office Action received for U.S. Appl. No. 16/702,968, dated Apr. 8, 2020, 20 pages.
Non-Final Office Action received for U.S. Appl. No. 16/143,379, dated Mar. 14, 2019, 10 pages.
Notice of Acceptance received for Australian Patent Application No. 2018223051, dated Oct. 30, 2018, 3 Pages.
Notice of Acceptance received for Australian Patent Application No. 2018236872, dated Jul. 9, 2019, 3 pages.
Notice of Allowance received for Australian Patent Application No. 2017286129, dated Dec. 10, 2018, 3 pages.
Notice of Allowance received for Chinese Patent Application No. 201811152097.2, dated Oct. 28, 2019, 6 pages.
Notice of Allowance received for Danish Patent Application No. PA201770408, dated Feb. 8, 2019, 2 pages.
Notice of Allowance received for Korean Patent Application No. 10-2018-7034909, dated Sep. 30, 2019, 4 pages.
Notice of Allowance received for Taiwanese Patent Application No. 104107330, dated Apr. 20, 2020, 5 pages.
Notice of Allowance received for U.S. Appl. No. 14/752,662, dated Oct. 2, 2019, 11 pages.
Notice of Allowance received for U.S. Appl. No. 15/427,516, dated Mar. 4, 2019, 7 pages.
Notice of Allowance received for U.S. Appl. No. 16/143,379, dated Jan. 29, 2020, 5 pages.
Notice of Allowance received for U.S. Appl. No. 16/404,612. dated Aug. 7, 2019, 9 pages.
Notice of Allowance received for U.S. Appl. No. 16/586,002, dated Jun. 9, 2020, 5 pages.
Notice of Allowance received for U.S. Appl. No. 16/143,379, dated Jun. 26, 2019, 5 pages.
Notice of Allowance received for U.S. Appl. No. 16/143,379, dated Sep. 25, 2019, 5 pages.
Office Action received for Australian Patent Application No. 2017100666, dated Jul. 27, 2017, 4 pages.
Office Action received for Australian Patent Application No. 2017286129, dated Oct. 18, 2018, 3 pages.
Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action received for Australian Patent Application No. 2019100487, dated Aug. 16, 2019, 5 pages.
Office Action received for Australian Patent Application No. 2019100523, dated Jan. 23, 2020, 3 pages.
Office Action received for Australian Patent Application No. 2019100523, dated Mar. 2, 2020, 3 pages.
Office Action received for Australian Patent Application No. 2019100523, dated Sep. 2, 2019, 3 pages.
Office Action received for Australian Patent Application No. 2019201853, dated Apr. 23, 2020, 5 pages.
Office Action received for Australian Patent Application No. 2019201853, dated Aug. 16, 2019, 5 pages.
Office Action received for Australian Patent Application No. 2019201853, dated Dec. 9, 2019, 5 pages.
Office Action received for Chinese Patent Application No. 201710493025.3, dated Dec. 6, 2019, 11 pages.
Office Action received for Chinese Patent Application No. 201710493025.3, dated Sep. 19, 2017, 2 pages.
Office Action received for Chinese Patent Application No. 201810730279.7, dated Mar. 4, 2020, 14 pages.
Office Action received for Chinese Patent Application No. 201810730279.7, dated May 7, 2019, 15 pages.
Office Action received for Chinese Patent Application No. 201810730279.7, dated Nov. 5, 2019, 14 pages.
Office Action received for Chinese Patent Application No. 201811151702.4, dated Mar. 4, 2020, 13 pages.
Office Action received for Chinese Patent Application No. 201811151702.4, dated May 7, 2019, 16 pages.
Office Action received for Chinese Patent Application No. 201811151702.4, dated Oct. 9, 2019, 11 pages.
Office Action received for Chinese Patent Application No. 201811152097.2, dated May 7, 2019, 18 pages.
Office Action received for Chinese Patent Application No. 201811152726.1, dated Apr. 22, 2019, 15 pages.
Office Action received for Chinese Patent Application No. 201811152726.1, dated Mar. 18, 2020, 12 pages.
Office Action received for Chinese Patent Application No. 201811152726.1, dated Oct. 24, 2019, 14 pages.
Office Action received for Chinese Patent Application No. 201811539259.8, dated Apr. 3, 2020, 10 pages.
Office Action received for Chinese Patent Application No. 201811539259.8, dated Sep. 18, 2019, 12 pages.
Office Action received for Chinese Patent Application No. 201811539260.0, dated Oct. 8, 2019, 14 pages.
Office Action received for Chinese Patent Application No. 201880001436.9, dated Apr. 28, 2019, 19 pages.

(56) References Cited

OTHER PUBLICATIONS

Office Action received for Chinese Patent Application No. 201880001436.9, dated Nov. 6, 2019, 24 pages.
Office Action Received for Danish Patent Application No. PA201670601, dated Apr. 10, 2018, 3 pages.
Office Action received for Danish Patent Application No. PA201670601, dated Aug. 9, 2018, 2 pages.
Office Action Received for Danish Patent Application No. PA201670601, dated Dec. 11, 2018, 3 pages.
Office Action Received for Danish Patent Application No. PA201670601, dated Feb. 6, 2017, 5 pages.
Office Action Received for Danish Patent Application No. PA201670601, dated Oct. 21, 2016, 9 pages.
Office Action Received for Danish Patent Application No. PA201670601, dated Sep. 26, 2017, 3 pages.
Office Action received for Danish Patent Application No. PA201670602, dated Apr. 16, 2018, 3 pages.
Office Action received for Danish Patent Application No. PA201670602, dated Feb. 9, 2017, 3 pages.
Office Action received for Danish Patent Application No. PA201670602, dated Oct. 25, 2016, 9 pages.
Office Action received for Danish Patent Application No. PA201670602, dated Sep. 26, 2017, 3 pages.
Office Action received for Danish Patent Application No. PA201670603, dated Nov. 1, 2016, 9 pages.
Office Action received for Danish Patent Application No. PA201670604, dated Feb. 19, 2018, 3 pages.
Office Action received for Danish Patent Application No. PA201670604, dated Jun. 9, 2017, 3 pages.
Office Action received for Danish Patent Application No. PA201670604, dated Nov. 8, 2016, 8 pages.
Office Action received for Danish Patent Application No. PA201670605, dated Apr. 9, 2018, 2 pages.
Office Action received for Danish Patent Application No. PA201670605, dated Feb. 19, 2018, 2 pages.
Office Action received for Danish Patent Application No. PA201670605, dated Jun. 13, 2017, 4 pages.
Office Action received for Danish Patent Application No. PA201670605, dated Nov. 14, 2016, 8 pages.
Office Action received for Danish Patent Application No. PA201770392, dated Apr. 17, 2018, 2 pages.
Office Action received for Danish Patent Application No. PA201770392, dated Dec. 8, 2017, 4 pages.
Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 Pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770406, dated Feb. 27, 2018, 7 pages.
Office Action received for Danish Patent Application No. PA201770406, dated Jan. 25, 2019, 8 pages.
Office Action received for Danish Patent Application No. PA201770406, dated Jun. 22, 2017, 11 pages.
Office Action received for Danish Patent Application No. PA201770406, dated Mar. 26, 2019, 3 pages.
Office Action received for Danish Patent Application No. PA201770406, dated Nov. 11, 2019, 4 pages.
Office Action received for Danish Patent Application No. PA201770408, dated Dec. 21, 2017, 6 pages.
Office Action received for Danish Patent Application No. PA201770408, dated Jun. 20, 2017, 9 pages.
Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870293, dated Jul. 17, 2018, 2 pages.
Office Action received for Danish Patent Application No. PA201870293, dated Jun. 19, 2018, 8 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870435, dated Feb. 6, 2020, 3 pages.
Office Action received for Danish Patent Application No. PA201870435, dated May 2, 2019, 3 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for European Patent Application No. 17813777.4, dated Jan. 3, 2020, 5 pages.
Office Action received for European Patent Application No. 18197583.0, dated Feb. 28, 2020, 8 pages.
Office Action received for European Patent Application No. 18197589.7, dated Oct. 1, 2019, 5 pages.
Office Action received for Japanese Patent Application No. 2018-562659, dated Dec. 6, 2019, 7 pages.
Office Action received for Japanese Patent Application No. 2018-562659, dated Jul. 26, 2019, 9 pages.
Office Action received for Korean Patent Application No. 10-2019-7038093, dated Feb. 13, 2020, 11 pages.
Office Action received for Taiwanese Patent Application No. 104107330, dated Sep. 17, 2018, 17 pages.
Office Action received for Taiwanese Patent Application No. 104107330, dated Sep. 18, 2019, 8 pages.
Partial European Search Report received for European Patent Application No. 20158824.1, dated May 8, 2020, 14 pages.
Partial European Search Report received for European Patent Application No. 18197583.0, dated Jan. 14, 2019, 18 pages.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870419, dated Aug. 27, 2018, 7 pages.
Search Report and Opinion received for Danish Patent Application No. PA201870419, dated Sep. 10, 2018, 9 pages.
Search Report and Opinion received for Danish Patent Application No. PA201870435, dated Oct. 26, 2018, 9 pages.
Search Report and Opinion received for Danish Patent Application No. PA201870598, dated Dec. 5, 2018, 8 pages.

(56) References Cited

OTHER PUBLICATIONS

Search Report received for Danish Patent Application No. PA201770404, dated Jun. 20, 2017, 8 Pages.
Search Report received for Danish Patent Application No. PA201770409, dated Jun. 20, 2017, 9 Pages.
SolarWinds Network Configuration Manager Administrator Guide, Available online at:—https://web.archive.org/web/20141031133207/http://www.solarwinds.com/documentation/orionNCM/docs/OrionNCMAdministratorGuide.pdf, Oct. 31, 2014, 466 pages.
Summons to attend Oral proceedings received for European Patent Application No. 18197589.7, dated Apr. 9, 2020, 7 pages.
Supplemental Notice of Allowance received for U.S. Appl. No. 14/752,662, dated Dec. 27, 2019, 2 pages.
Benjamin Jeff, "iOS 10: How to use the new Home app to control HomeKit devices [Video]", Available online at: https://9to5mac.com/2016/09/23/ios-10-how-to-use-new-home-app-control-homekit-devices-video, Sep. 23, 2016, 36 pages.
Call Me, "Samsung R3 højttaler giver dig en lækker 360 graders lydoplevelse—med WiFi og Bluetooth | Call me", 0:24 / 3:22, Available Online at: <https://www.youtube.com/watch?v=4Uv_sOhrlro>, Sep. 22, 2016, 3 pages.
Review: Samsung Radiant R3 Wireless Speakers, Available Online at: <https://www.youtube.com/watch?v=ZBICVE1WdKE>, Jan. 19, 2016, 3 pages.
Google, "Google Home Help, Listen to music", Datasheet [online], Available Online at: <https://web.archive.org/web/20170326051235/https:/support.google.com/googlehome/answer/7030379?hl=en&ref_topic=7030084>, Mar. 26, 2017, 3 pages.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Jarvie, "Alexa plays me music", Available online at: https://www.youtube.com/watch?v=bR2ZC8Sy8YQ, Feb. 23, 2015, 1 page.
International Search Report and Written Opinion received for PCT Patent Application No. PCT/US2015/038161, dated Sep. 4, 2015, 12 pages.
Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.
PartyShare—turn your Xperia into a jukebox, Available at: https://forum.xda-developers.com/crossdevice-dev/sony/app-partyshare-xperia-jukebox-t2877807, Sep. 15, 2014, 5 pages.
Seifert Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.
Smarttricks, "Top 3 Music Player for Android", Available online at: <https://www.youtube.com/watch?v=He7RTn4CL34>, Feb. 22, 2017, 4 pages.
Sonos,"Sonos Controller App for iPad Product Guide", Available online at:—https://www.sonos.com/documents/productguides/en/IPadGuide_EN.pdf, Nov. 2014, 47 pages.
Woolsey Amanda, "Apple Watch Tips—How to Add and Play Music", Available online at: <https://www.youtube.com/watch?v=E0QEuqMaoi8>, Apr. 26, 2015, 3 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Corrected Notice of Allowance received for U.S. Appl. No. 17/031,833, dated Aug. 2, 2021, 3 pages.
Final Office Action received for U.S. Appl. No. 17/026,818, dated Jan. 29, 2021, 21 pages.
Non-Final Office Action received for U.S. Appl. No. 17/026,818, dated Nov. 25, 2020, 20 pages.
Non-Final Office Action received for U.S. Appl. No. 17/116,938, dated Jul. 30, 2021, 19 pages.
Non-Final Office Action received for U.S. Appl. No. 17/223,794, dated Jun. 16, 2021, 32 pages.
Notice of Allowance received for Japanese Patent Application No. 2018-562659, dated Jul. 30, 2021, 4 pages (1 page of English Translation and 3 pages of Official Copy).
Notice of Allowance received for Japanese Patent Application No. 2020-558885, dated Jul. 26, 2021, 4 pages (1 page of English Translation and 3 pages of Official Copy).
Notice of Allowance received for U.S. Appl. No. 17/026,818, dated May 13, 2021, 10 pages.
Office Action received for Australian Patent Application No. 2021204454, dated Aug. 9, 2021, 7 pages.
Search Report and Opinion received for Danish Patent Application No. PA202070617, dated Dec. 23, 2020, 8 pages.
Applicant-Initiated Interview Summary received for U.S. Appl. No. 16/715,928, dated Mar. 15, 2021, 4 pages.
Minutes of the Oral Proceedings received for European Patent Application No. 18197583.0, dated Mar. 9, 2021, 6 pages.
Notice of Acceptance received for Australian Patent Application No. 2019268111, dated Feb. 18, 2021, 3 pages.
Office Action received for Australian Patent Application No. 2020257092, dated Mar. 3, 2021, 7 pages.
Office Action received for Chinese Patent Application No. 202010742019.9, dated Feb. 3, 2021, 17 pages (9 pages of English Translation and 8 pages of Official Copy).
Office Action received for Japanese Patent Application No. 2020-047952, dated Feb. 8, 2021, 6 pages (3 pages of English Translation and 3 pages of Official Copy).
Result of Consultation received for European Patent Application No. 18197583.0, dated Feb. 24, 2021, 3 pages.
Examiner's Pre-Review Report received for Japanese Patent Application No. 2020-047952, dated Dec. 13, 2022, 10 pages (5 pages of English Translation and 5 pages of Official Copy).
Final Office Action received for U.S. Appl. No. 17/116,938, dated Dec. 29, 2022, 42 pages.
Invitation to Pay Search Fees received for European Patent Application No. 20760624.5, dated Jan. 2, 2023, 3 pages.
Minutes of Oral Proceedings received for European Patent Application No. 18728002.9, dated Dec. 22, 2022, 7 pages.
Notice of Acceptance received for Australian Patent Application No. 2022200515, dated Dec. 21, 2022, 3 pages.
Office Action received for Danish Patent Application No. PA202270464, dated Dec. 20, 2022, 3 pages.
Advisory Action received for U.S. Appl. No. 16/583,989, dated Sep. 22, 2020, 5 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Applicant Initiated Interview Summary received for U.S. Appl. No. 16/583,989, dated Aug. 3, 2020, 6 pages.
Applicant Initiated Interview Summary received for U.S. Appl. No. 16/583,989, dated Mar. 25, 2020, 4 pages.
Applicant Initiated Interview Summary received for U.S. Appl. No. 16/584,490, dated Jul. 28, 2020, 4 pages.
Applicant-Initiated Interview Summary received for U.S. Appl. No. 16/584,490, dated Jan. 31, 2020, 4 pages.
Applicant-Initiated Interview Summary received for U.S. Appl. No. 16/922,675, dated Nov. 2, 2020, 3 pages.
Brief Communication Regarding Oral Proceedings received for European Patent Application No. 17813777.4, dated Nov. 23, 2020, 6 pages.
Final Office Action received for U.S. Appl. No. 16/583,989, dated Jul. 10, 2020, 23 pages.
Final Office Action received for U.S. Appl. No. 16/584,490, dated May 1, 2020, 48 pages.
Final Office Action received for U.S. Appl. No. 16/922,675, dated Dec. 3, 2020, 21 pages.
Final Office Action received for U.S. Appl. No. 16/922,675, dated Nov. 30, 2020, 12 pages.
International Search Report and Written Opinion received for PCT Patent Application No. PCT/US2020/035426, dated Sep. 11, 2020, 12 pages.

(56) References Cited

OTHER PUBLICATIONS

International Search Report and Written Opinion received for PCT Patent Application No. PCT/US2020/035446, dated Nov. 10, 2020, 20 pages.
International Search Report and Written Opinion received for PCT Patent Application No. PCT/US2020/035488, dated Nov. 17, 2020, 21 pages.
Invitation to Pay Additional Fees received for PCT Patent Application No. PCT/US2020/035446, dated Sep. 11, 2020, 12 pages.
Invitation to Pay Additional Fees received for PCT Patent Application No. PCT/US2020/035488, dated Sep. 23, 2020, 15 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
NBC, News, "NBC News—YouTube Democratic Debate (full)", Online available at: https://www.youtube.com/watch?v=ti2Nokoq1J4, Jan. 17, 2016, 1 page.
Non-Final Office Action received for U.S. Appl. No. 16/583,989, dated Jan. 24, 2020, 20 pages.
Non-Final Office Action received for U.S. Appl. No. 16/584,490, dated Dec. 10, 2019, 27 pages.
Non-Final Office Action received for U.S. Appl. No. 16/723,583, dated Aug. 13, 2020, 13 pages.
Non-Final Office Action received for U.S. Appl. No. 16/922,675, dated Aug. 13, 2020, 17 pages.
Non-Final Office Action received for U.S. Appl. No. 17/031,833, dated Dec. 7, 2020, 13 pages.
Notice of Allowance received for U.S. Appl. No. 16/584,490, dated Aug. 27, 2020, 13 pages.
Office Action received for Australian Patent Application No. 2020257092, dated Nov. 30, 2020, 6 pages.
Result of Consultation received for European Patent Application No. 18197589.7, dated Dec. 1, 2020, 9 pages.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Summons to Attend Oral Proceedings received for European Patent Application No. 19182037.2, dated Nov. 24, 2020, 12 pages.
Supplemental Notice of Allowance received for U.S. Appl. No. 16/584,743, dated Nov. 25, 2020, 2 pages.
Applicant-Initiated Interview Summary received for U.S. Appl. No. 16/830,838, dated May 24, 2021, 3 pages.
Applicant-Initiated Interview Summary received for U.S. Appl. No. 17/031,833, dated May 24, 2021, 6 pages.
Corrected Notice of Allowance received for U.S. Appl. No. 16/702,968, dated May 26, 2021, 4 pages.
Non-Final Office Action received for U.S. Appl. No. 16/803,849, dated May 14, 2021, 34 pages.
Notice of Allowance received for Chinese Patent Application No. 201710493025.3, dated May 7, 2021, 6 pages (3 pages of English Translation and 3 pages of Official Copy).
Office Action received for Chinese Patent Application No. 201911128105.4, dated Apr. 8, 2021, 10 pages (5 pages of English Translation and 5 pages of Official Copy).
Office Action received for European Patent Application No. 19207753.5, dated May 10, 2021, 4 pages.
Office Action received for European Patent Application No. 20158824.1, dated May 18, 2021, 10 pages.
Androidcentral, "How Do I Respond to Group Messages from Notification Bar?", Available online at: https://forums.androidcentral.com/ask-question/952030-how-do-i-respond-group-messages-notification-bar.html, Mar. 25, 2019, 3 pages.
Corrected Notice of Allowance received for U.S. Appl. No. 16/702,968, dated Jun. 16, 2021, 4 pages.
Decision to Grant received for European Patent Application No. 18197589.7, dated Jun. 10, 2021, 2 pages.
Extended Search Report received for European Patent Application No. 21161005.0, dated Jun. 14, 2021, 12 pages.
Office Action received for Australian Patent Application No. 2021100721, dated Jun. 4, 2021, 7 pages.
Office Action received for Chinese Patent Application No. 202011336156.9, dated May 20, 2021, 13 pages (7 pages of English Translation and 6 pages of Official Copy).
Office Action received for Japanese Patent Application No. 2020-560927, dated Jun. 10, 2021, 5 pages (2 pages of English Translation and 3 pages of Official Copy).
Rossignol Joe, "iOS 10 Concept Simplifies Lock Screen with Collapsed Notifications", Available online at: https://www.macrumors.com/2016/06/16/ios-10-collapsed-notifications-concept/, Jun. 16, 2016, 10 pages.
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Corrected Notice of Allowance received for U.S. Appl. No. 16/836,571, dated Nov. 18, 2021, 3 pages.
Extended European Search Report received for European Patent Application No. 21197457.1, dated Nov. 15, 2021, 8 pages.
Intention to Grant received for Danish Patent Application No. PA202070617, dated Nov. 15, 2021, 2 pages.
Non-Final received for U.S. Appl. No. 17/461,103, dated Nov. 22, 2021, 15 pages.
Petternitter, "User Restricted Collaborative Playlists—The Spotify Community", Downloaded from: https://community.spotify.com/t5/Archived-Ideas/User-restricted-collaborative-playlists/idi-p/70721, May 28, 2012, 4 pages.
Applicant-Initiated Interview Summary received for U.S. Appl. No. 17/116,938, dated Dec. 13, 2021, 3 pages.
Corrected Notice of Allowance received for U.S. Appl. No. 16/836,571, dated Dec. 6, 2021, 5 pages.
Final Office Action received for U.S. Appl. No. 16/830,838, dated Dec. 9, 2021, 16 pages.
International Preliminary Report on Patentability received for PCT Patent Application No. PCT/US2020/024390, dated Dec. 9, 2021, 20 pages.
International Preliminary Report on Patentability received for PCT Patent Application No. PCT/US2020/035426, dated Dec. 9, 2021, 10 pages.
International Preliminary Report on Patentability received for PCT Patent Application No. PCT/US2020/035446, dated Dec. 9, 2021, 14 pages.
International Preliminary Report on Patentability received for PCT Patent Application No. PCT/US2020/035488, dated Dec. 9, 2021, 16 pages.
Notice of Allowance received for Chinese Patent Application No. 202010125114.4, dated Nov. 24, 2021, 2 pages (1 page of English Translation and 1 page of Official Copy).
Notice of Allowance received for Korean Patent Application No. 10-2021-7021047, dated Dec. 6, 2021, 3 pages (1 page of English Translation and 2 pages of Official Copy).
Notice of Allowance received for Korean Patent Application No. 10-2021-7035472, dated Nov. 23, 2021, 4 pages (2 pages of English Translation and 2 pages of Official Copy).
Summons to Attend Oral Proceedings received for European Patent Application 20158824.1, dated Dec. 7, 2021, 6 pages.
Applicant-Initiated Interview Summary received for U.S. Appl. No. 16/803,849, dated Feb. 28, 2022, 9 pages.
Computeradv, "Sonos App Navigation & Menu on iPhone", Available online at: https://www.youtube.com/watch?v=Jhz9XvWQ204, Aug. 4, 2015, 1 page.

(56) References Cited

OTHER PUBLICATIONS

Corrected Notice of Allowance received for U.S. Appl. No. 16/922,675, dated Mar. 4, 2022, 6 pages.
Final Office Action received for U.S. Appl. No. 17/116,938, dated Mar. 1, 2022, 27 pages.
Notice of Acceptance received for Australian Patent Application No. 2021204454, dated Feb. 25, 2022, 3 pages.
Office Action received for Australian Patent Application No. 2019267527, dated Mar. 3, 2022, 3 pages.
Office Action received for European Patent Application No. 20719301.2, dated Feb. 21, 2022, 9 pages.
Corrected Notice of Allowance received for U.S. Appl. No. 16/922,675, dated Jan. 9, 2023, 3 pages.
Extended European Search Report received for European Patent Application No. 22195584.2, dated Jan. 5, 2023, 13 pages.
Extended European Search Report received for European Patent Application No. 22196865.4, dated Jan. 13, 2023, 7 pages.
Extended European Search Report received for European Patent Application No. 22201007.6, dated Jan. 12, 2023, 7 pages.
Notice of Allowance received for Chinese Patent Application No. 202110819254.6, dated Dec. 27, 2022, 4 pages (1 page of English Translation and 3 pages of Official Copy).
Notice of Allowance received for Korean Patent Application No. 10-2021-7029861, dated Jan. 4, 2023, 7 pages (2 pages of English Translation & 5 pages of Official Copy).
Office Action received for Korean Patent Application No. 10-2022-7001521, dated Dec. 26, 2022, 13 pages (6 pages of English Translation and 7 pages of Official Copy).
Applicant-Initiated Interview Summary received for U.S. Appl. No. 15/910,263, dated Nov. 18, 2020, 6 pages.
Extended European Search Report received for European Patent Application No. 20187610.9, dated Nov. 16, 2020, 7 pages.
International Preliminary Report on Patentability received for PCT Patent Application No. PCT/US2019/030963, dated Nov. 19, 2020, 12 pages.
Notice of Allowance received for Chinese Patent Application No. 201810730279.7, dated Nov. 5, 2020, 2 pages (1 page of English translation and 1 page of Official Copy).
Notice of Allowance received for U.S. Appl. No. 16/584,743, dated Nov. 16, 2020, 7 pages.
Office Action received for Chinese Patent Application No. 201811152726.1, dated Oct. 29, 2020, 12 pages (6 pages of English Translation and 6 pages of Official Copy).
Office Action received for Chinese Patent Application No. 201811539260.0, dated Nov. 4, 2020, 9 pages (5 pages of English Translation and 4 pages of Official Copy).
Office Action received for European Patent Application No. 19207753.5, dated Nov. 12, 2020, 5 pages.
Applicant Initiated Interview Summary received for U.S. Appl. No. 16/817,328, dated Dec. 21, 2021, 3 pages.
Certificate of Examination received for Australian Patent Application No. 2021100721, dated Dec. 16, 2021, 2 pages.
Notice of Acceptance received for Australian Patent Application No. 2020239711, dated Dec. 16, 2021, 3 pages.
Notice of Allowance received for U.S. Appl. No. 16/715,928, dated Dec. 16, 2021, 13 pages.
Office Action received for Australian Patent Application No. 2019267527, dated Dec. 2, 2021, 4 pages.
Office Action received for Australian Patent Application No. 2020282362, dated Nov. 25, 2021, 3 pages.
Office Action received for Indian Patent Application No. 202014041529, dated Dec. 6, 2021, 6 pages.
Office Action received for Japanese Patent Application No. 2020-159840, dated Dec. 10, 2021, 13 pages (7 pages of English Translation and 6 pages of Official Copy).
Office Action received for Japanese Patent Application No. 2020-560927, dated Dec. 1, 2021, 3 pages (1 page of English Translation and 2 pages of Official Copy).
Summons to Attend Oral Proceedings received for European Patent Application No. 20187610.9, dated Dec. 16, 2021, 12 pages.
Applicant-Initiated Interview Summary received for U.S. Appl. No. 17/116,938, dated Jun. 14, 2022, 2 pages.
Brief Communication Regarding Oral Proceedings received for European Patent Application No. 20158824.1, dated May 30, 2022, 1 page.
Brief Communication Regarding Oral Proceedings received for European Patent Application No. 20187610.9, dated May 31, 2022, 1 page.
Corrected Notice of Allowance received for U.S. Appl. No. 16/803,849, dated Jun. 8, 2022, 3 pages.
Decision to Grant received for European Patent Application No. 19207753.5, dated Jun. 2, 2022, 3 pages.
D-Link, "D-Link Wi-Fi app—Complete Wi-Fi Management in the Palm of Your Hand", Online Available at: https://www.youtube.com/watch?v=EA8L7ZHxsbg, Apr. 12, 2019, 3 pages.
D-Link USA, "How to Control Your Network with mydlink Lite", Online Available at: https://www.youtube.com/watch?v=2DWct_P3o7Y, Sep. 6, 2013, 3 pages.
Minutes of the Oral Proceedings received for European Patent Application No. 20187610.9, dated Jun. 7, 2022, 6 pages.
Non-Final Office Action received for U.S. Appl. No. 16/830,838, dated Jun. 9, 2022, 17 pages.
Non-Final Office Action received for U.S. Appl. No. 16/922,675, dated Jun. 8, 2022, 21 pages.
Notice of Allowance received for Japanese Patent Application No. 2020-560927, dated May 30, 2022, 3 pages (1 page of English Translation and 2 pages of Official Copy).
Notice of Allowance received for U.S. Appl. No. 17/027,373, dated Jun. 3, 2022, 8 pages.
Office Action received for Korean Patent Application No. 10-2022-7006175, dated May 27, 2022, 7 pages (3 pages of English Translation and 4 pages of Official Copy).
Result of Consultation received for European Patent Application No. 20187610.9, dated Jun. 1, 2022, 3 pages.
Reviewdork, "Linksys Smart Wifi App Linksys Wireless Router Setup and Tutorial (Android or Iphone)", Online Available at: https://www.youtube.com/watch?v=UjJUq1g1738, Feb. 13, 2017, 3 pages.
Summons to Attend Oral Proceedings received for European Patent Application No. 18728002.9, dated Jun. 3, 2022, 15 pages.
Corrected Notice of Allowance received for U.S. Appl. No. 18/077,905, dated May 4, 2023, 2 pages.
Decision to Grant received for Danish Patent Application No. PA202270464, dated May 9, 2023, 1 page.
Final Office Action received for U.S. Appl. No. 17/747,804, dated Apr. 28, 2023, 17 pages.
Office Action received for Japanese Patent Application No. 2022-016138, dated Apr. 24, 2023, 9 pages (5 pages of English Translation and 4 pages of Official Copy).
Office Action received for Korean Patent Application No. 10-2022-7001332, dated Apr. 20, 2023, 8 pages (4 pages of English Translation and 4 pages of Official Copy).
Beingtech Savvy, "A Simple Timer App for Android", Online available at: https://www.beingtechsawy.com/simple-minimal-timer-app-for-android/8542/, Mar. 8, 2013, p. 1-2.
International Search Report and Written Opinion received for PCT Patent Application No. PCT/US2020/024390, dated Oct. 23, 2020, 26 pages.
Non-Final Office Action received for U.S. Appl. No. 16/715,928, dated Nov. 2, 2020, 21 pages.
Office Action received for Australian Patent Application No. 2019268111, dated Oct. 27, 2020, 7 pages.
Phandroid, "Best Halo Themed Android Apps: Timer by Opoloo", https://www.youtube.com/watch?v=yVUJrGVDBvY/, Aug. 23, 2012, p. 1-9.
Time Timer, "Time Timer for iPad", Online available at: https://www.youtube.com/watch?v=IXbDCuHvdJ8/>, Dec. 10, 2012, p. 1-12.
Decision to Refuse received for European Patent Application No. 20187610.9, dated Jul. 19, 2022, 13 pages.
Notice of Allowance received for Japanese Patent Application No. 2020-159840, dated Jul. 8, 2022, 4 pages (1 page of English Translation and 3 pages of Official Copy).

(56) References Cited

OTHER PUBLICATIONS

Notice of Allowance received for Japanese Patent Application No. 2022-079682, dated Jul. 15, 2022, 4 pages (1 page of English Translation and 3 pages of Official Copy).
Applicant-Initiated Interview Summary received for U.S. Appl. No. 17/742,273, dated Mar. 30, 2023, 5 pages.
Applicant-Initiated Interview Summary received for U.S. Appl. No. 17/747,804, dated Mar. 17, 2023, 4 pages.
Non-Final Office Action received for U.S. Appl. No. 16/830,838, dated Mar. 30, 2023, 16 pages.
Non-Final Office Action received for U.S. Appl. No. 17/476,404, dated Mar. 30, 2023, 29 pages.
Non-Final Office Action received for U.S. Appl. No. 17/835,110, dated Apr. 3, 2023, 28 pages.
Non-Final Office Action received for U.S. Appl. No. 18/077,971, dated Apr. 3, 2023, 24 pages.
Notice of Acceptance received for Australian Patent Application No. 2021261941, dated Mar. 15, 2023, 3 pages.
Notice of Allowance received for U.S. Appl. No. 16/922,675, dated Mar. 22, 2023, 8 pages.
Notice of Allowance received for U.S. Appl. No. 18/077,905, dated Mar. 24, 2023, 18 pages.
Office Action received for Australian Patent Application No. 2022241590, dated Mar. 17, 2023, 5 pages.
Office Action received for Chinese Patent Application No. 201811539259.8, dated Mar. 13, 2023, 16 pages (8 pages of English Translation and 8 pages of Official Copy).
Office Action received for Indian Patent Application No. 202215025360, dated Mar. 29, 2023, 6 pages.
Office Action received for Indian Patent Application No. 202215025363, dated Mar. 29, 2023, 6 pages.
Office Action received for Indian Patent Application No. 202215025364, dated Mar. 29, 2023, 6 pages.
Applicant-Initiated Interview Summary received for U.S. Appl. No. 17/116,938, dated Oct. 13, 2022, 3 pages.
Applicant-Initiated Interview Summary received for U.S. Appl. No. 17/314,948, dated Oct. 21, 2022, 6 pages.
Corrected Notice of Allowance received for U.S. Appl. No. 17/027,373, dated Oct. 26, 2022, 2 pages.
Final Office Action received for U.S. Appl. No. 16/830,838, dated Oct. 14, 2022, 16 pages.
Notice of Allowance received for Chinese Patent Application No. 202011450203.2, dated Sep. 30, 2022, 4 pages (1 page of English Translation and 3 pages of Official Copy).
Notice of Allowance received for Korean Patent Application No. 10-2022-0091730, dated Oct. 4, 2022, 5 pages (2 pages of English Translation and 3 pages of official copy).
Notice of Allowance received for U.S. Appl. No. 16/888,775, dated Oct. 19, 2022, 6 pages.
Summons to Attend Oral Proceedings received for European Patent Application No. 21160991.2, dated Oct. 19, 2022, 10 pages.
Intention to Grant received for European Patent Application No. 20158824.1, dated Aug. 11, 2022, 10 pages.
Applicant-Initiated Interview Summary received for U.S. Appl. No. 17/476,404, dated Jul. 27, 2022, 6 pages.
Corrected Notice of Allowance received for U.S. Appl. No. 17/461,103, dated Aug. 3, 2022, 2 pages.
Intention to Grant received for Danish Patent Application No. PA202170320, dated Jul. 27, 2022, 2 pages.
Non-Final Office Action received for U.S. Appl. No. 17/116,938, dated Aug. 1, 2022, 15 pages.
Non-Final Office Action received for U.S. Appl. No. 17/314,948, dated Aug. 1, 2022, 33 pages.
Notice of Allowance received for U.S. Appl. No. 17/027,373, dated Aug. 2, 2022, 2 pages.
Office Action received for Australian Patent Application No. 2020217458, dated Aug. 2, 2022, 4 pages.
Farmboyreef, "Apple watch controlling your tv", Available online at: https://www.youtube.com/watch?v=xaJPG0Wm3Tg, Jun. 23, 2015, 3 pages.
Gil, Lory, "How to control Apple TV with your Apple Watch", Available online at: https://www.imore.com/how-control-your-apple-tv-remote-app%ADapple-watch], Jun. 6, 2016, 24 pages.
Hobbyistsoftwareltd, "VLC Remote", Available online at: https://watchaware.com/watch-apps/297244048, 2016, 7 pages.
Klein, Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Nikolov, Anton, "Design principle: Consistency", Available online at: https://uxdesign.cc/design-principle-consistency-6b0cf7e7339f, Apr. 8, 2017, 9 pages.
Ojeda-Zapata, Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Sgt.Gizm0s, "Pairing Your Apple Watch with Your AppleTV", Available online at: https://www.youtube.com/watch?v=C4t8YFSJ-UY, Apr. 27, 2015, 3 pages.
Singh, Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Whitney, Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.
Corrected Notice of Allowance received for U.S. Appl. No. 16/807,604, dated Oct. 14, 2021, 3 pages.
Corrected Notice of Allowance received for U.S. Appl. No. 16/807,604, dated Oct. 22, 2021, 3 pages.
Decision to Grant received for Danish Patent Application No. PA202070560, dated Oct. 21, 2021, 2 pages.
Notice of Allowance received for Korean Patent Application No. 10-2021-7022610, dated Oct. 13, 2021, 3 pages (1 page of English Translation and 2 pages of Official Copy).
Office Action received for Australian Patent Application No. 2021100721, dated Oct. 18, 2021, 4 pages.
Office Action received for Chinese Patent Application No. 202011450203.2, dated Sep. 1, 2021, 12 pages (6 pages of English Translation and 6 pages of Official Copy).
Office Action received for Chinese Patent Application No. 202110248576.X, dated Sep. 15, 2021, 28 pages (16 pages of English Translation and 12 pages of Official Copy).
"Customize Notifications and Content on Your Galaxy Phone's Lock Screen", Online Available at: https://www.samsung.com/us/support/answer/ANS00062636, Oct. 4, 2017, 5 pages.
Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Intention to Grant received for Danish Patent Application No. PA202070560, dated Apr. 26, 2021, 2 pages.
Intention to Grant received for European Patent Application No. 19182037.2, dated May 4, 2021, 9 pages.
Non-Final Office Action received for U.S. Appl. No. 16/922,675, dated May 4, 2021, 23 pages.
Notice of Allowance received for Korean Patent Application No. 10-2020-7031700, dated Apr. 21, 2021, 4 pages (2 pages of English Translation and 2 pages of Official Copy).
Notice of Allowance received for U.S. Appl. No. 16/807,604, dated Apr. 30, 2021, 25 pages.
Office Action received for Chinese Patent Application No. 201811152726.1, dated Apr. 28, 2021, 14 pages (3 pages of English Translation and 11 pages of Official Copy).
"Smart Home App—What is the Widget", Online Available at: https://support.vivint.com/s/article/Vivint-Smart-Home-App-What-is-the-Widget, Jan. 26, 2019, 4 pages.
Stroud Forrest, "Screen Lock Meaning & Definition", Online Available at: https://www.webopedia.com/definitions/screen-lock, Jan. 30, 2014, 3 pages.

(56) References Cited

OTHER PUBLICATIONS

Applicant-Initiated Interview Summary received for U.S. Appl. No. 16/922,675, dated Nov. 15, 2022, 2 pages.
Decision to Grant received for Danish Patent Application No. PA202170320, dated Nov. 10, 2022, 2 pages.
Extended European Search Report received for European Patent Application No. 22191264.5, dated Nov. 11, 2022, 8 pages.
Office Action received for Korean Patent Application No. 10-2021-7029861, dated Nov. 1, 2022, 7 pages (3 pages of English Translation and 4 pages of Official Copy).
Decision to Grant received for European Patent Application No. 18197583.0, dated Feb. 3, 2022, 3 pages.
Intention to Grant received for European Patent Application No. 19207753.5, dated Jan. 28, 2022, 8 pages.
Non-Final Office Action received for U.S. Appl. No. 17/476,404, dated Feb. 8, 2022, 26 pages.
Non-Final Office Action received for U.S. Appl. No. 17/027,373, dated Feb. 2, 2022, 17 pages.
Notice of Allowance received for U.S. Appl. No. 16/817,328, dated Feb. 16, 2022, 9 pages.
Notice of Allowance received for U.S. Appl. No. 16/836,571, dated Feb. 14, 2022, 31 pages.
Notice of Allowance received for U.S. Appl. No. 16/922,675, dated Feb. 10, 2022, 8 pages.
Office Action received for Korean Patent Application No. 10-2021-7029861, dated Jan. 25, 2022, 11 pages (5 pages of English Translation and 6 pages of Official Copy).
Final Office Action received for U.S. Appl. No. 17/314,948, dated Mar. 7, 2023, 31 pages.
Intention to Grant received for Danish Patent Application No. PA202270464, dated Feb. 20, 2023, 2 pages.
Non-Final Office Action received for U.S. Appl. No. 17/747,804, dated Mar. 1, 2023, 14 pages.
Non-Final Office Action received for U.S. Appl. No. 17/752,582, dated Mar. 6, 2023, 17 pages.
Non-Final Office Action received for U.S. Appl. No. 17/867,317, dated Feb. 28, 2023, 18 pages.
Notice of Acceptance received for Australian Patent Application No. 2022200901, dated Mar. 9, 2023, 3 pages.
Notice of Allowance received for U.S. Appl. No. 16/888,775, dated Feb. 21, 2023, 5 pages.
Notice of Allowance received for U.S. Appl. No. 17/728,801, dated Feb. 28, 2023, 10 pages.
Office Action received for Chinese Patent Application No. 202111652452.4, dated Feb. 11, 2023, 28 pages (13 pages of English Translation and 15 pages of Official Copy).
Office Action received for European Patent Application No. 20760624.5, dated Mar. 7, 2023, 13 pages.
Office Action received for European Patent Application No. 21728781.2, dated Mar. 1, 2023, 13 pages.
Supplemental Notice of Allowance received for U.S. Appl. No. 16/888,775, dated Mar. 1, 2023, 2 pages.
Philips Support Website, "Howto switch to preferred audio language in Philips TV from a broadcast with multiple languages audio stream?", Available Online at: https://www.usa.philips.com/c-f/XC000010105/how-to-switch-to-preferred-audio-language-in-philips-tv-from-a-broadcast-with-multiple-languages-audio-stream, Dec. 29, 2016, 5 pages.
Office Action received for Australian Patent Application No. 2021261941, dated Nov. 3, 2022, 3 pages.
Office Action received for Australian Patent Application No. 2022200515, dated Nov. 2, 2022, 2 pages.
Office Action received for Chinese Patent Application No. 202110235995.X, dated Sep. 30, 2022, 13 pages (7 pages of English Translation and 6 pages of Official Copy).
Office Action received for Danish Patent Application No. PA202270464, dated Oct. 25, 2022, 9 pages.
Applicant-Initiated Interview Summary received for U.S. Appl. No. 16/723,583, dated Dec. 28, 2020, 6 pages.
Applicant-Initiated Interview Summary received for U.S. Appl. No. 16/803,849, dated Dec. 21, 2020, 5 pages.
Applicant-Initiated Interview Summary received for U.S. Appl. No. 16/807,604, dated Dec. 21, 2020, 7 pages.
Applicant-Initiated Interview Summary received for U.S. Appl. No. 16/922,675, dated Dec. 16, 2020, 3 pages.
Applicant-Initiated Interview Summary received for U.S. Appl. No. 17/031,833, dated Dec. 21, 2020, 5 pages.
Corrected Notice of Allowance received for U.S. Appl. No. 16/404,605, dated Dec. 23, 2020, 3 pages.
Corrected Notice of Allowance received for U.S. Appl. No. 16/584,743, dated Dec. 30, 2020, 3 pages.
Invitation to Pay Search Fees received for European Patent Application No. 20719301.2, dated Dec. 17, 2020, 5 pages.
Invitation to Pay Search Fees received for European Patent Application No. 20719301.2, dated Dec. 22, 2020, 5 pages.
Notice of Allowance received for U.S. Appl. No. 16/583,989, dated Dec. 24, 2020, 7 pages.
Office Action received for Danish Patent Application No. PA202070560, dated Dec. 11, 2020, 7 pages.
Office Action received for European Patent Application No. 18728002.9, dated Dec. 14, 2020, 15 pages.
Office Action received for Korean Patent Application No. 10-2020-7031319, dated Dec. 8, 2020, 14 pages (6 pages of English Translation and 8 pages of Official Copy).
Office Action received for Korean Patent Application No. 10-2020-7031700, dated Dec. 15, 2020, 6 pages (2 pages of English Translation and 4 pages of official Copy).
Result of Consultation received for European Patent Application No. 18197589.7, dated Dec. 17, 2020, 6 pages.
Decision to Grant received for Japanese Patent Application No. 2021-051415, dated Jan. 6, 2022, 3 pages (1 page of English Translation and 2 pages of Official Copy).
Notice of Acceptance received for Australian Patent Application No. 2020282362, dated Jan. 4, 2022, 3 pages.
Notice of Allowance received for Chinese Patent Application No. 202011336156.9, dated Jan. 6, 2022, 3 pages (2 pages of English Translation and 1 pages of Official Copy).
Notice of Allowance received for Japanese Patent Application No. 2021-026630, dated Jan. 7, 2022, 4 pages (1 page of English Translation and 3 pages of Official Copy).
Notice of Allowance received for U.S. Appl. No. 16/888,775, dated Jan. 12, 2022, 5 pages.
Applicant-Initiated Interview Summary received for U.S. Appl. No. 16/830,838, dated Apr. 6, 2022, 2 pages.
Applicant-Initiated Interview Summary received for U.S. Appl. No. 17/168,069, dated Nov. 17, 2021, 2 pages.
Corrected Notice of Allowance received for U.S. Appl. No. 17/168,069, dated Feb. 9, 2022, 2 pages.
Examiner-Initiated Interview Summary received for U.S. Appl. No. 17/027,373, dated Mar. 31, 2022, 4 pages.
International Search Report and Written Opinion received for PCT Patent Application No. PCT/US2021/048358, dated Feb. 24, 2022, 21 pages.
Invitation to Pay Additional Fees received for PCT Patent Application No. PCT/US2021/048358, dated Dec. 23, 2021, 14 pages.
Non-Final Office Action received for U.S. Appl. No. 17/168,069, dated Jul. 21, 2021, 17 pages.
Notice of Allowance received for U.S. Appl. No. 17/168,069, dated Jan. 19, 2022, 12 pages.
Notice of Allowance received for U.S. Appl. No. 17/168,069, dated Mar. 22, 2022, 5 pages.
Office Action received for Australian Patent Application No. 2021203669, dated Apr. 5, 2022, 3 pages.
Office Action received for Chinese Patent Application No. 202110818370.6, dated Mar. 2, 2022, 13 pages (7 pages of English Translation and 6 pages of Official Copy).
Office Action received for Indian Patent Application No. 202118046028, dated Apr. 6, 2022, 6 pages.
Office Action received for Japanese Patent Application No. 2020-159840, dated Mar. 28, 2022, 6 pages (3 pages of English Translation and 3 pages of Official Copy).

(56) References Cited

OTHER PUBLICATIONS

Supplemental Notice of Allowance received for U.S. Appl. No. 17/168,069, dated Feb. 2, 2022, 2 pages.
Non-Final Office Action received for U.S. Appl. No. 16/830,838, dated Apr. 1, 2021, 13 pages.
Notice of Allowance received for U.S. Appl. No. 16/583,989, dated Apr. 1, 2021, 5 pages.
Office Action received for Chinese Patent Application No. 202010125114.4, dated Mar. 1, 2021, 15 pages (9 pages of English Translation and 6 pages of Official Copy).
Office Action received for Japanese Patent Application No. 2018-562659, dated Mar. 12, 2021, 79 pages (34 pages of English Translation and 45 pages of Official Copy).
Supplemental Notice of Allowance received for U.S. Appl. No. 16/584,490, dated Apr. 13, 2021, 2 pages.
Applicant Initiated Interview Summary received for U.S. Appl. No. 16/702,968, dated Jul. 1, 2020, 5 pages.
Applicant-Initiated Interview Summary received for U.S. Appl. No. 16/702,968, dated Sep. 28, 2020, 6 pages.
Applicant-Initiated Interview Summary received for U.S. Appl. No. 16/803,849, dated Aug. 21, 2020, 5 pages.
Applicant-Initiated Interview Summary received for U.S. Appl. No. 16/807,604, dated Jul. 24, 2020, 5 pages.
Crutnacker, "Amazon Echo Tips and Tricks: Playing Music Demonstration", Available Online at: https://www.youtube.com/watch?v=W_bqq2ynUII, Nov. 4, 2015, 1 page.
Decision to Grant received for Danish Patent Application No. PA201770406, dated May 15, 2020, 2 pages.
Decision to Grant received for Danish Patent Application No. PA201870435, dated Oct. 20, 2020, 2 pages.
Extended European Search Report received for European Patent Application No. 20158824.1, dated Aug. 10, 2020, 13 pages.
Final Office Action received for U.S. Appl. No. 16/702,968, dated Jul. 27, 2020, 21 pages.
Final Office Action received for U.S. Appl. No. 16/803,849, dated Sep. 24, 2020, 29 pages.
Final Office Action received for U.S. Appl. No. 16/807,604, dated Aug. 19, 2020, 35 pages.
IDB, "HomeCam is the Best Way to View Multiple HomeKit Cameras on iPhone & Apple TV", Available online at: https://www.youtube.com/watch?v=6x2oCHgSVUU, Feb. 20, 2018, 3 pages.
Intention to Grant received for Danish Patent Application No. PA201870435, dated Jul. 1, 2020, 2 pages.
International Search Report and written Opinion received for PCT Patent Application No. PCT/US2020/024390, dated Aug. 17, 2020, 22 pages.
Invitation to Pay Additional Fees received for PCT Patent Application No. PCT/US2020/024390, dated Jun. 26, 2020, 15 pages.
Invitation to Pay Search Fees received for European Patent Application No. 18728002.9, dated Sep. 2, 2020, 8 pages.
Non-Final Office Action received for U.S. Appl. No. 15/910,263, dated Jun. 15, 2020, 38 pages.
Non-Final Office Action received for U.S. Appl. No. 16/404,605, dated Jun. 24, 2020, 18 pages.
Non-Final Office Action received for U.S. Appl. No. 16/803,849, dated Jul. 13, 2020, 23 pages.
Non-Final Office Action received for U.S. Appl. No. 16/807,604, dated Jun. 2, 2020, 28 pages.
Notice of Allowance received for Chinese Patent Application No. 201811151702.4, dated Jul. 6, 2020, 6 pages (3 pages of English Translation and 3 pages of Official Copy).
Notice of Allowance received for Chinese Patent Application No. 201880001436.9, dated May 8, 2020, 3 pages (2 pages of English Translation and 1 page of Official Copy).
Notice of Allowance received for Korean Patent Application No. 10-2019-7038093, dated Aug. 10, 2020, 5 pages (2 pages of English Translation and 3 pages of Official Copy).
Notice of Allowance received for U.S. Appl. No. 16/404,605, dated Sep. 18, 2020, 5 pages.
Notice of Allowance received for U.S. Appl. No. 16/404,612, dated Jul. 13, 2020, 6 pages.
Notice of Allowance received for U.S. Appl. No. 16/584,743, dated Aug. 7, 2020, 8 pages.
Office Action received for Australian Patent Application No. 2019201853, dated Aug. 10, 2020, 4 pages.
Office Action received for Australian Patent Application No. 2020100886, dated Aug. 5, 2020, 6 pages.
Office Action received for Chinese Patent Application No. 201710493025.3, dated Jul. 10, 2020, 17 pages (9 pages of English Translation and 8 pages of Official Copy).
Office Action received for Chinese Patent Application No. 201810730279.7, dated Jul. 6, 2020, 7 pages (4 pages of English Translation and 3 pages of Official Copy).
Office Action received for Chinese Patent Application No. 201811539259.8, dated Sep. 3, 2020, 10 pages (6 pages of English Translation and 4 pages of Official Copy).
Office Action received for Chinese Patent Application No. 201811539260.0, dated Jun. 3, 2020, 8 pages (5 pages of English Translation and 3 pages of Official Copy).
Office Action received for Chinese Patent Application No. 201911128105.4, dated Jul. 3, 2020, 18 pages (9 pages of English Translation and 9 pages of Official Copy).
Office Action received for Chinese Patent Application No. 202010125114.4, dated Aug. 21, 2020, 16 pages (8 pages of English Translation and 8 pages of Official Copy).
Office Action received for Danish Patent Application No. PA201870435, dated May 25, 2020, 3 pages.
Office Action received for European Patent Application No. 19182037.2, dated Jun. 16, 2020, 6 pages.
Office Action received for Japanese Patent Application No. 2018-562659, dated May 28, 2020, 5 pages (3 pages of English Translation and 2 pages of Official Copy).
Summons to Attend Oral Proceedings received for European Patent Application No. 17813777.4, dated Jun. 18, 2020, 8 pages.
Summons to Attend Oral Proceedings received for European Patent Application No. 18197583.0, dated Aug. 14, 2020, 12 pages.
Certificate of Examination received for Australian Patent Application No. 2020100886, dated Dec. 22, 2020, 2 pages.
Final Office Action received for U.S. Appl. No. 17/031,833, dated Jan. 26, 2021, 17 pages.
Intention to Grant received for European Patent Application No. 18197589.7, dated Jan. 21, 2021, 8 pages.
Notice of Allowance received for U.S. Appl. No. 15/910,263, dated Jan. 22, 2021, 33 pages.
Notice of Allowance received for U.S. Appl. No. 16/922,675, dated Jan. 21, 2021, 7 pages.
Office Action received for Chinese Patent Application No. 201710493025.3, dated Jan. 6, 2021, 17 pages (8 pages of English Translation and 9 pages of Official Copy).
Office Action received for Chinese Patent Application No. 201911128105.4, dated Jan. 4, 2021, 14 pages (7 pages of English Translation and 7 pages of Official Copy).
Office Action received for European Patent Application No. 20719301.2, dated Jan. 28, 2021, 15 pages.
Corrected Notice of Allowance received for U.S. Appl. No. 17/461,103, dated Apr. 14, 2022, 2 pages.
Notice of Allowance received for U.S. Appl. No. 16/817,328, dated Apr. 18, 2022, 8 pages.
Office Action received for Chinese Patent Application No. 202110235995.X, dated Mar. 22, 2022, 17 pages (9 pages of English Translation and 8 pages of Official Copy).
Office Action received for European Patent Application No. 21161005.0, dated Apr. 22, 2022, 11 pages.
Supplemental Notice of Allowance received for U.S. Appl. No. 17/168,069, dated Apr. 20, 2022, 2 pages.
Applicant-Initiated Interview Summary received for U.S. Appl. No. 16/715,928, dated Nov. 1, 2021, 5 pages.
Corrected Notice of Allowance received for U.S. Appl. No. 16/836,571, dated Nov. 4, 2021, 4 pages.
Final Office Action received for U.S. Appl. No. 16/803,849, dated Nov. 2, 2021, 37 pages.

(56) References Cited

OTHER PUBLICATIONS

Non-Final Office Action received for U.S. Appl. No. 16/817,328, dated Oct. 29, 2021, 9 pages.
Notice of Acceptance received for Australian Patent Application No. 2021201403, dated Oct. 22, 2021, 3 pages.
Applicant-Initiated Interview Summary received for U.S. Appl. No. 16/830,838, dated Sep. 21, 2022, 2 pages.
Non-Final Office Action received for U.S. Appl. No. 17/476,404, dated Sep. 14, 2022, 31 pages.
Notice of Acceptance received for Australian Patent Application No. 2020217458, dated Sep. 7, 2022, 3 pages.
Notice of Allowance received for Chinese Patent Application No. 202110818370.6, dated Sep. 2, 2022, 7 pages (4 pages of English Translation and 3 pages of Official Copy).
Office Action received for European Patent Application No. 21197457.1, dated Sep. 2, 2022, 8 pages.
Applicant-Initiated Interview Summary received for U.S. Appl. No. 16/836,571, dated Jul. 7, 2021, 6 pages.
Corrected Notice of Allowance received for U.S. Appl. No. 16/702,968, dated Jun. 28, 2021, 4 pages.
Corrected Notice of Allowance received for U.S. Appl. No. 16/807,604, dated Jun. 28, 2021, 3 pages.
Final Office Action received for U.S. Appl. No. 16/715,928, dated Jun. 29, 2021, 26 pages.
Notice of Allowance received for Korean Patent Application No. 10-2020-7032488, dated Jun. 16, 2021, 4 pages (1 page of English Translation and 3 pages of Official Copy).
Notice of Allowance received for U.S. Appl. No. 17/031,833, dated Jun. 25, 2021, 15 pages.
Office Action received for Australian Patent Application No. 2019267527, dated Jun. 24, 2021, 8 pages.
Office Action received for Chinese Patent Application No. 202010125114.4, dated Jun. 7, 2021, 7 pages (4 pages of English Translation and 3 pages of Official Copy).
Office Action received for European Patent Application No. 19728558.8, dated Jun. 21, 2021, 9 pages.
Applicant-Initiated Interview Summary received for U.S. Appl. No. 17/742,273, dated Jan. 18, 2023, 4 pages.
Corrected Notice of Allowance received for U.S. Appl. No. 16/922,675, dated Jan. 20, 2023, 3 pages.
Office Action received for European Patent Application No. 20719301.2, dated Jan. 24, 2023, 9 pages.
Notice of Acceptance received for Australian Patent Application No. 2021203669, dated May 25, 2022, 3 pages.
Notice of Acceptance received for Australian Patent Application No. 2022202458, dated May 6, 2022, 3 pages.
Notice of Allowance received for U.S. Appl. No. 16/803,849, dated May 17, 2022, 12 pages.
Office Action received for Australian Patent Application No. 2020217458, dated May 10, 2022, 3 pages.
Office Action received for Chinese Patent Application No. 202011450203.2, dated Apr. 20, 2022, 9 pages (5 pages of English Translation and 4 pages of Official Copy).
Result of Consultation received for European Patent Application No. 20158824.1, dated May 17, 2022, 7 pages.
Office Action received for Korean Patent Application No. 10-2022-7001521, dated Jun. 21, 2023, 10 pages (5 page of English Translation and 5 pages of Official Copy).

\* cited by examiner

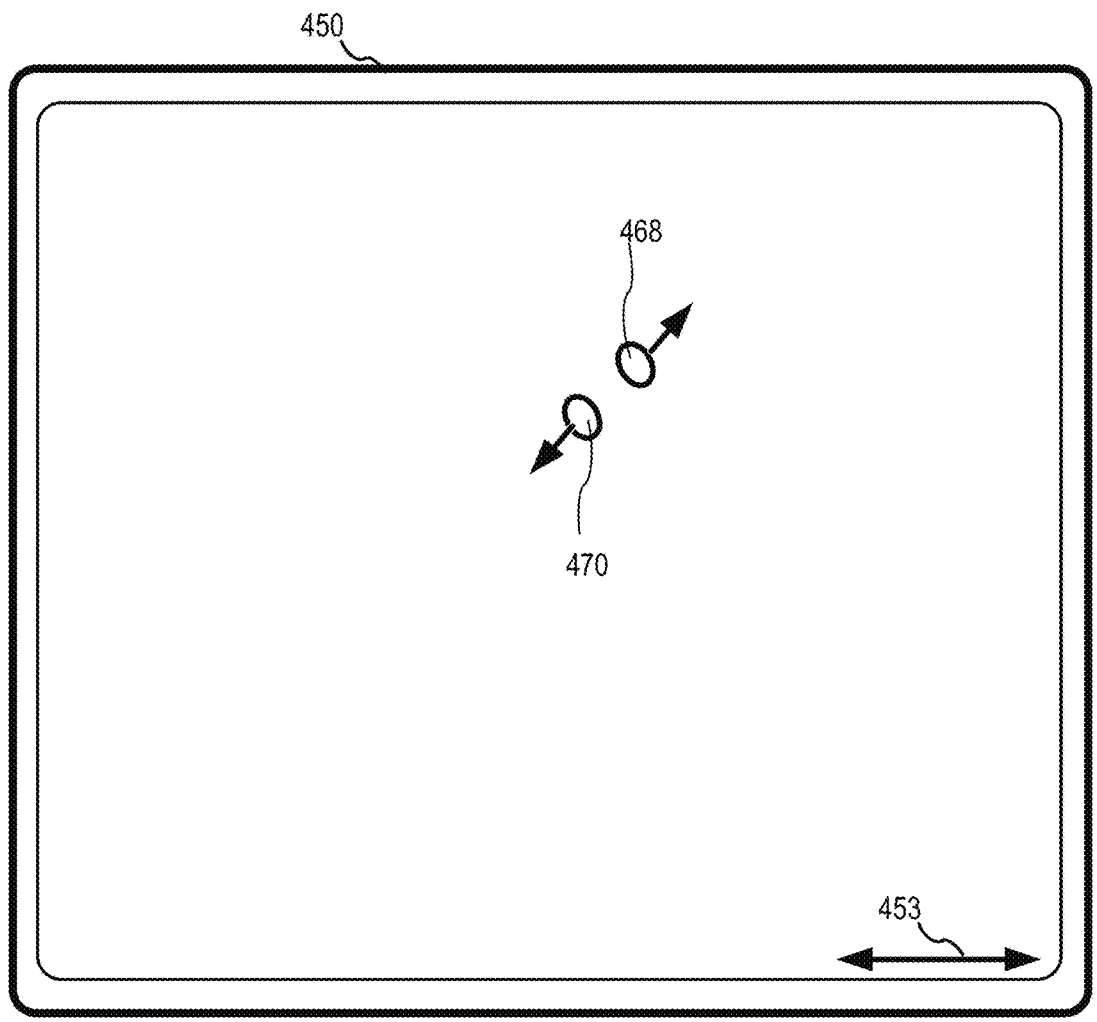
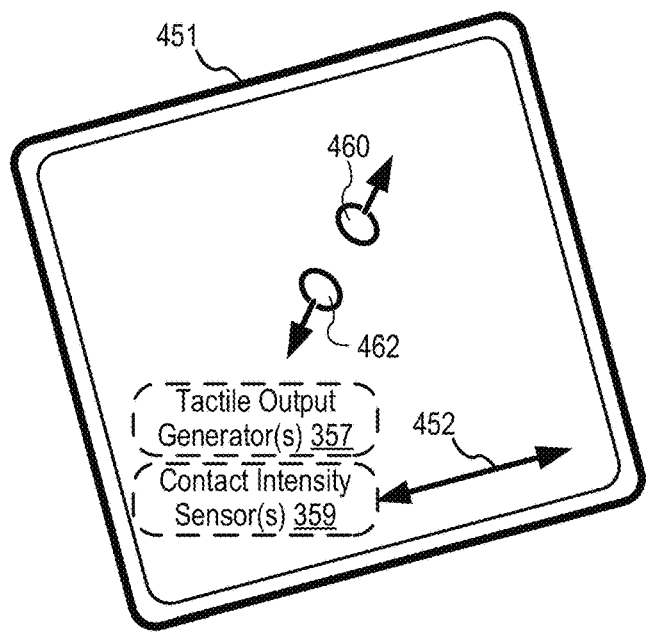
*FIG. 4B*

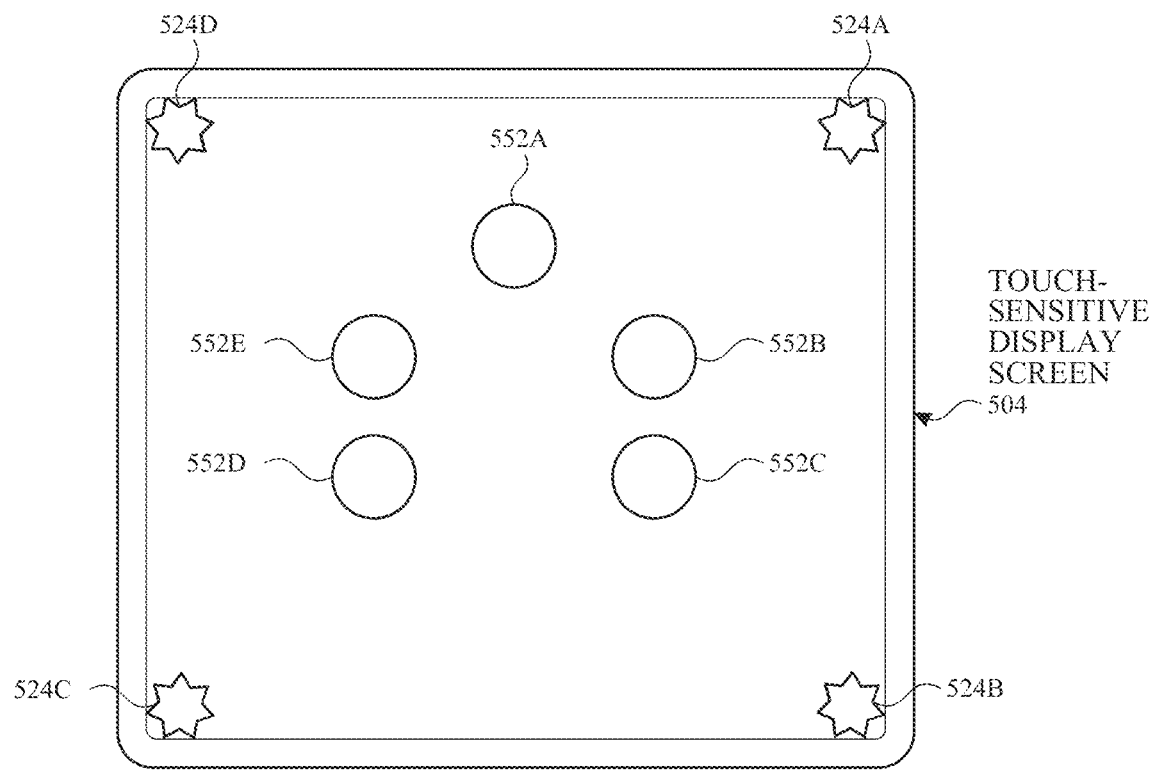
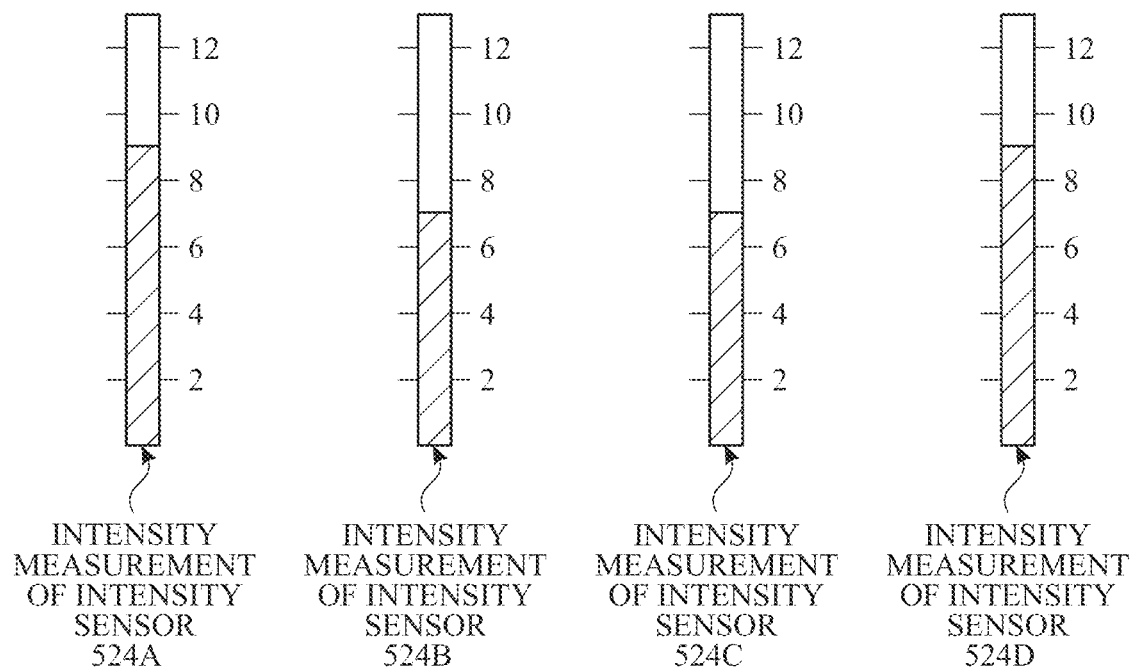
FIG. 5C

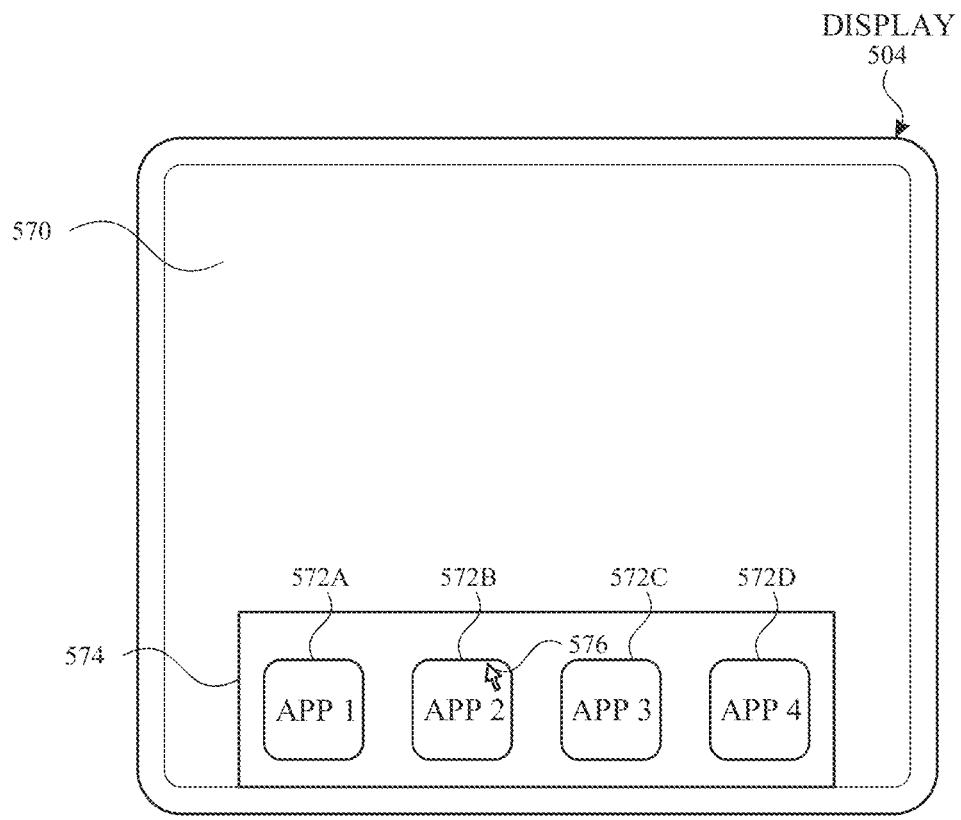
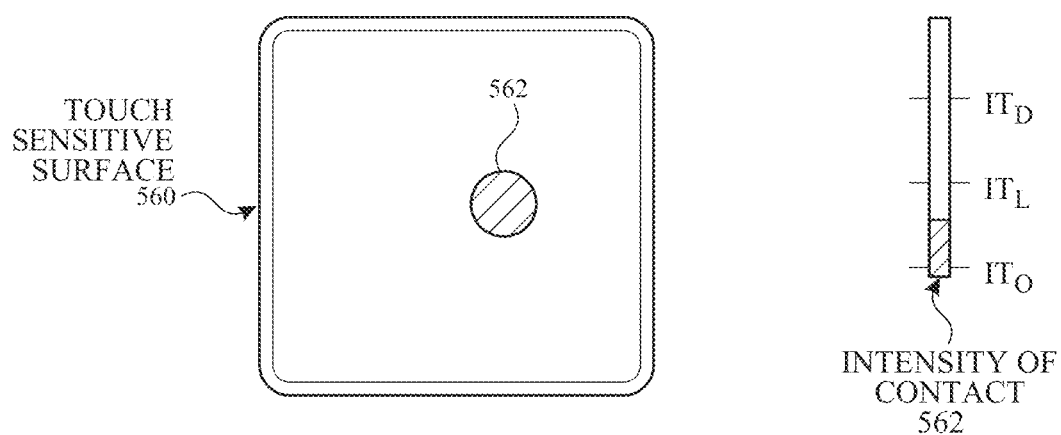
FIG. 5E

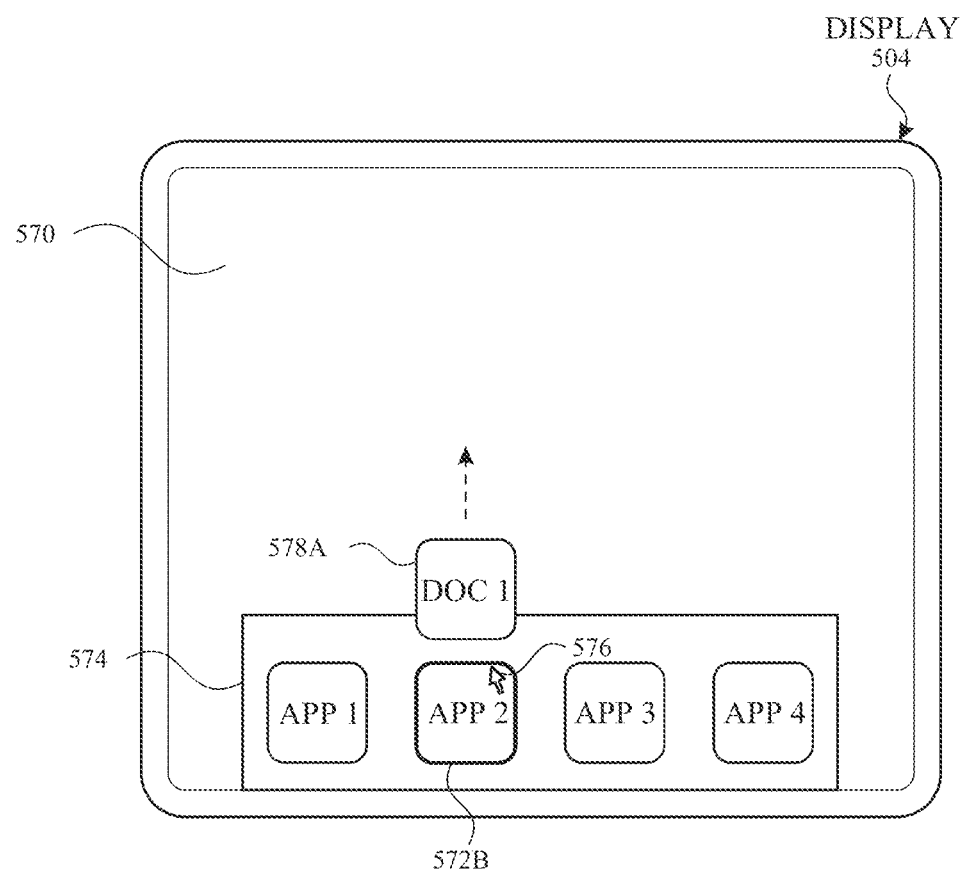
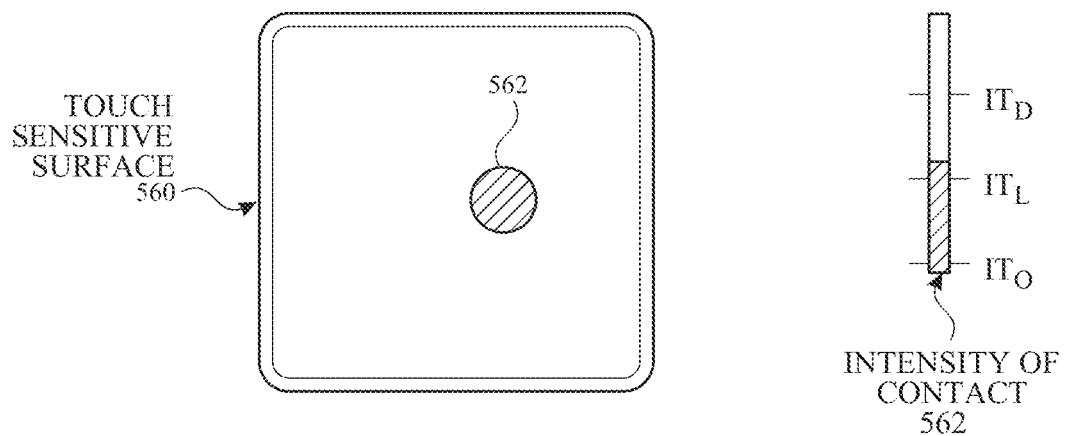
FIG. 5F

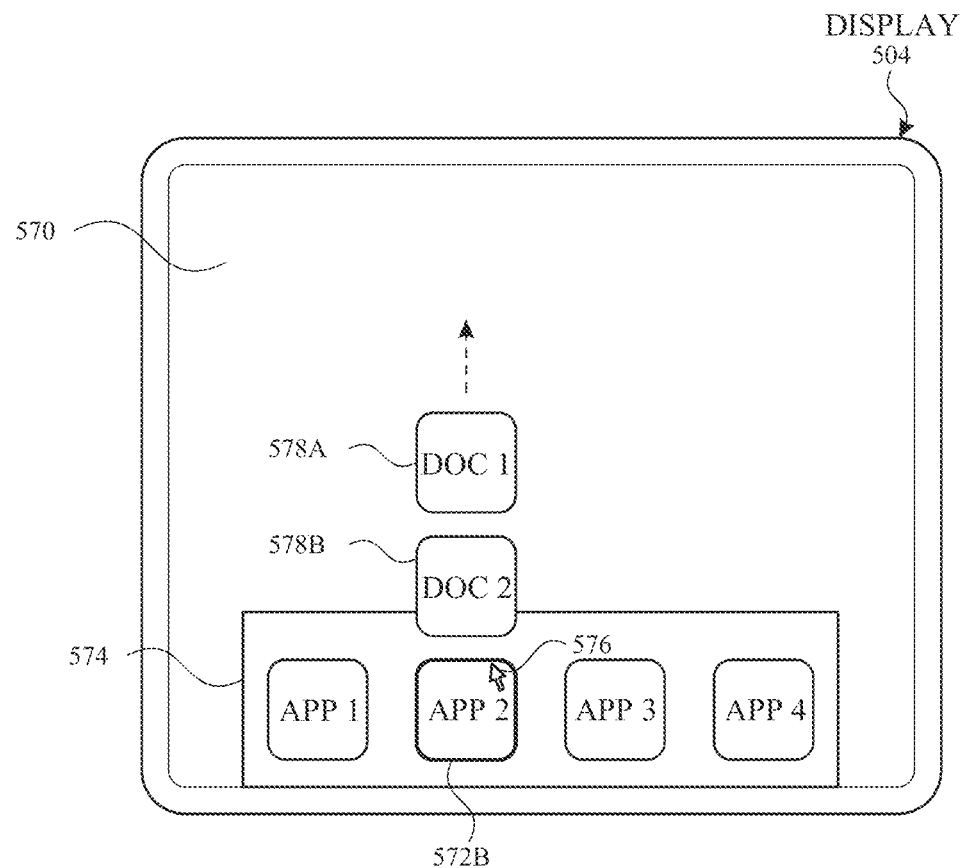
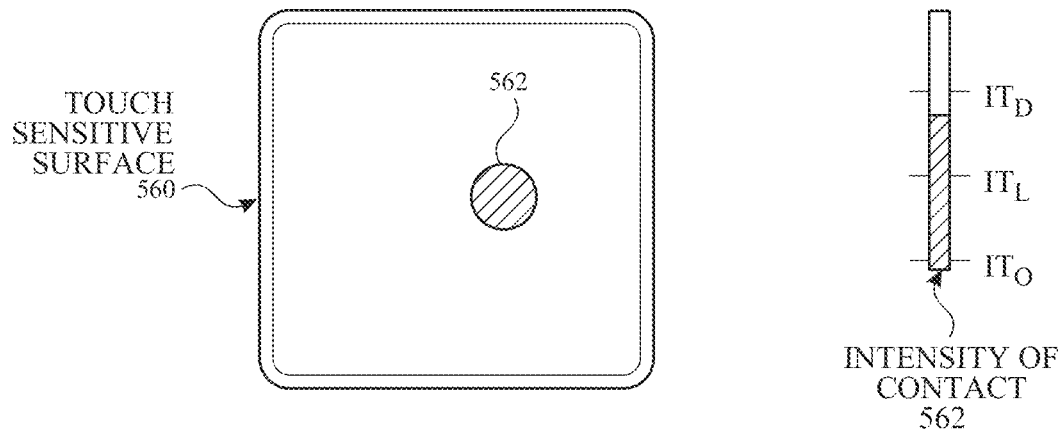
FIG. 5G

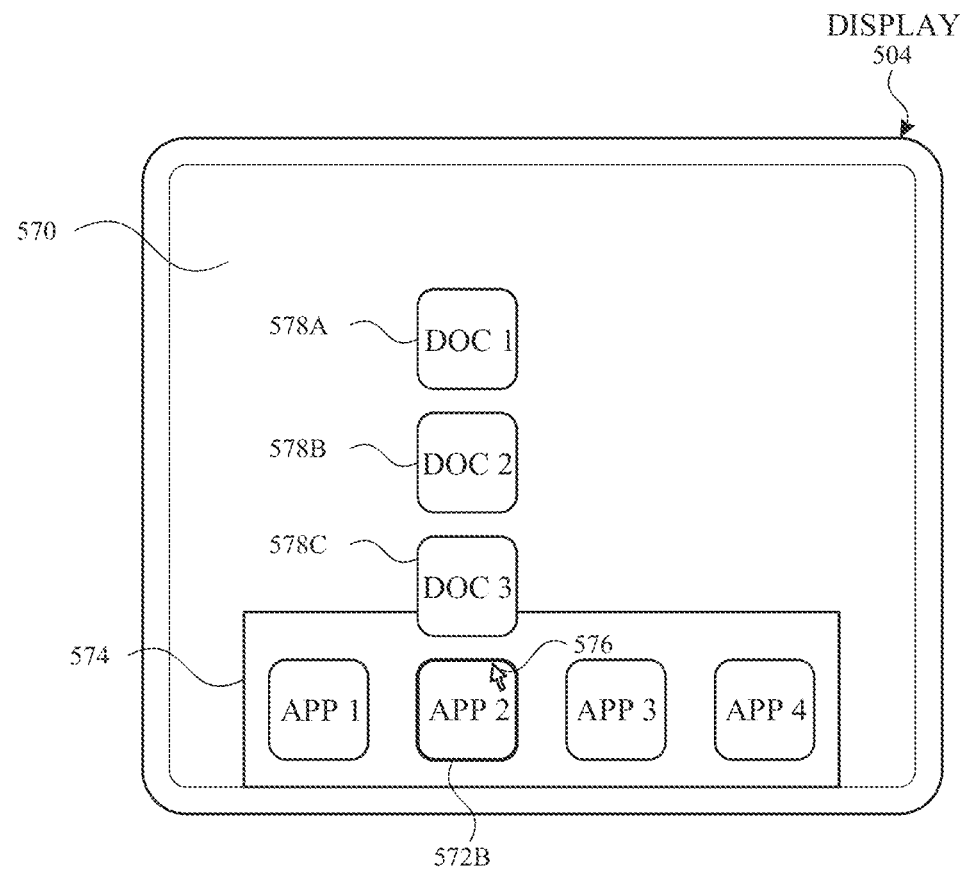
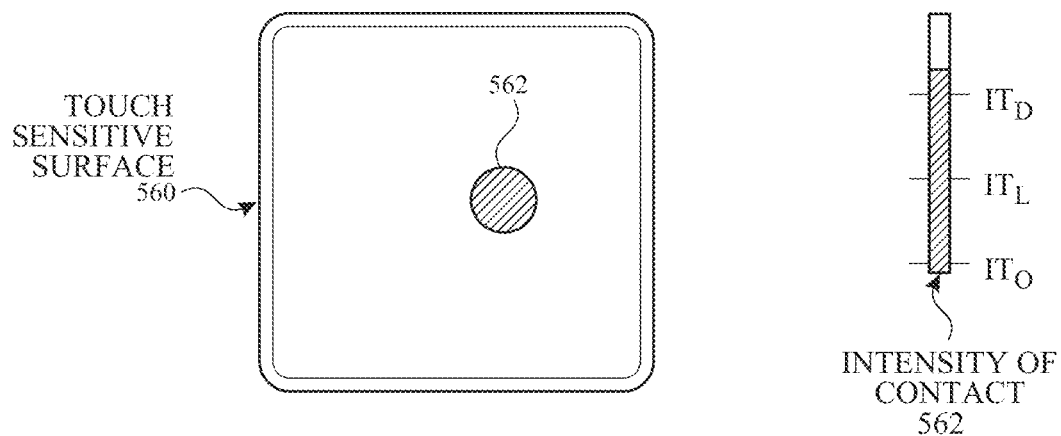
*FIG. 5H*

700

702
Display, on the display device, a user interface including a first accessory affordance associated with a first controllable external device.

704
The first controllable external device is associated with the first function and the second function.

706
Detect a first input corresponding to selection of the first accessory affordance.

708
The first accessory affordance has a first appearance prior to detecting the first input.

710
In response to detecting the first input:

712
In response to detecting the first input and in conjunction with transmitting the command to the first controllable external device to perform the first function, update the first accessory affordance to a second appearance that is based on the first function.

710
In response to detecting the first input:

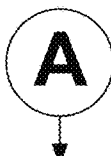

714
In accordance with a determination that a set of command transmission criteria are met, transmit, via the communication device, a command to the first controllable external device to perform a first function.

716
The set of command transmission criteria includes a first criterion that is satisfied when the first function associated with the first controllable external device is a primary function of the first controllable external device.

718
Transmit, via the communication device, a command to the first controllable external device to perform the first function without transmitting, via the communication device, a command to the first external device to perform the second function.

720
In accordance with a determination that the set of command transmission criteria are not met, display, on the display device, a first accessory interface that includes:

722
A first control affordance that, when selected, transmits a command to the controllable external device to perform the first function and second control affordance that, when selected, transmits a command to the first controllable external device to perform a second function that is different than the first function.

902
Display, on the display device, a user interface including a first accessory affordance associated with a first controllable external device.

904
The first accessory interface includes a first total number of control affordances, wherein all of the first total number of control affordances are included in the first region and none of the first total number of control affordances are included in the second region.

906
Detect a first input corresponding to selection of the first accessory affordance.

908
In response to detecting the first input, display, on the display device, a first region of the first accessory interface that includes a first control affordance that, when selected, controls a first function of the first controllable external device, without displaying a second region of the first accessory interface.

910
In accordance with a determination that the first controllable external device is associated with less than a predetermined number of sensors, the first region includes a set of control affordances corresponding to the sensors of the first controllable device at a first location in the first region.

912
In accordance with a determination that the first controllable external device is associated with the predetermined number or more sensors, the first region includes a set of control affordances corresponding to the sensors of the first controllable device at a second location in the first region that is different than the first location.

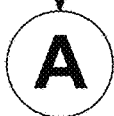

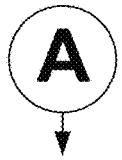

914
While displaying, on the display device, the first region of the first accessory interface, detect a second input.

916
In response to detecting the second input:

918
In accordance with a determination that the second input causes a portion of the second region to be displayed that exceeds a threshold amount:

920
Update display of the first accessory interface to display the second region at a top portion of the first accessory interface while ceasing display of the first region, wherein the second region includes one or more settings of the first controllable external device.

922
Output haptic and audio feedback.

924
In accordance with a determination that the second input does not cause a portion of the second region to be displayed that exceeds the threshold amount, update display of the first accessory interface based on the second input to a second control affordance in the first region of the first accessory interface without displaying the second region of the first accessory interface.

1102
While the electronic device is not configured to control a first controllable external device, detect a first set of one or more inputs corresponding to a request to configure the electronic device to control the first controllable external device.

1104
In response to detecting the first set of one or inputs, initiate a process to configure the electronic device to control the first controllable external device, wherein the process includes:

1106
Receive information corresponding to the first controllable external device.

1108
In accordance with a determination, based on the received information, that the first controllable external device is associated with a plurality of controllable functions associated with a plurality of subcomponents of the first controllable external device, display, on the display device, a first accessory affordance corresponding to a group including the first controllable external device and the plurality of subcomponents.

1110
In accordance with a determination, based on the received information, that the first controllable external device is not associated with the plurality of subcomponents, display, on the display device, a second accessory affordance corresponding to the first controllable external device.

1112
While displaying, on the display device, the first accessory affordance or the second accessory affordance, detect a second input.

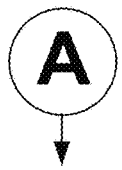

1114
In response to detecting the second input:

1116
In accordance with a determination that the second input corresponds to a selection of the first accessory affordance, display, on the display device, a first accessory interface including a plurality of control affordances corresponding to the first controllable external device and the plurality of subcomponents and a control reconfiguration affordance that, when selected, initiates a process to remove at least a first control affordance of the plurality of control affordances from the first accessory interface concurrently display, on the display device.

1118
In accordance with a determination that the second input corresponds to a selection of the second accessory affordance, display, on the display device, a second accessory interface including controls for the first controllable external device without displaying the control reconfiguration affordance.

1302
Display, on the display device, a temperature mode creation user interface including a first set of controls for creating a temperature mode for an external thermostat device controllable by the electronic device.

1304
While displaying, on the display device, the temperature mode creation user interface, detect a first set of one or more inputs.

1306
In response to the first set of one or more inputs:

1308
Select a temperature range that includes a minimum temperature and a maximum temperature, different than the minimum temperature range.

1310
Display, in the temperature mode creation user interface, a graphical indication of the selected temperature range, including:

1312
In accordance with a first portion of the selected temperature range being within a first predetermined temperature range, display a first portion of the graphical indication in a first color that corresponds to the first predetermined temperature range.

1314
In accordance with the first portion of the selected temperature range being within a second predetermined temperature range, displaying the first portion of the graphical indication in a second color, different from the first color, that corresponds to the second predetermined temperature range.

1316
Associate the temperature range with a first temperature mode.

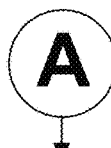

1318
After associating the temperature range with a first temperature mode, display, on the display device, a temperature scheduling user interface including a second set of controls for creating a scheduled operation of the external thermostat device.

1320
While displaying, on the display device, the temperature scheduling user interface, detect a second set of one or more inputs.

1322
In response to detecting the second set of one or more inputs:

1324
The second set of one or more inputs includes an input corresponding to a selection of the first temperature mode from among a plurality of available temperature modes.

1326
Select a first criteria for activation of a first scheduled operation.

1328
Associate the first temperature mode with the first scheduled operation.

1502
Display, via the display device, a first accessory affordance corresponding to a first controllable external device.

1504
Detect one or more inputs to add the first controllable external device to a first set of controllable external devices.

1506
In response to detecting the one or more inputs to add the first controllable external device to the first set of controllable external devices:

1508
Update the first set of controllable external devices to include the first controllable external device.

1510
In accordance with a determination that the first controllable external device is of a first type, concurrently display: a second accessory affordance corresponding to the first controllable external device and a configuration affordance that, when selected, initiates a process for configuring audio settings for the first controllable external device.

1512
In accordance with a determination that the first controllable external device is not of the first type, display the second accessory affordance corresponding to the first controllable external device without the configuration affordance that, when selected, initiates a process for configuring audio settings for the first controllable external device.

1702
Concurrently display, via the display device, a set of one or more playback controls for performing a playback function on a media item and an alarm configuration affordance.

1704
Detect a user input.

1706
In response to detecting the user input:

1708
In accordance with a determination that the detected user input corresponds to selection of a playback control of the set of one or more playback controls, initiate a process for performing a playback function at a controllable external device based on the selected playback control.

1710
In accordance with a determination that the detected user input corresponds to selection of the alarm configuration affordance, replace the concurrent display of the set of one or more playback controls and the alarm configuration affordance with a set of time affordances for setting a time for a first alarm.

1902
Receive a request to play a first type of audio media item, where the request identifies the first type of audio media item and does not identify a particular audio media item of the first type.

1904
In response to receiving the request to play the first type of audio media item:

1906
Play a first audio media item of the first type of audio media item.

1908
Display an affordance that, when selected, plays a second audio media item of the first type of audio media item, where the second audio media item of the first type of audio media item is different from the first audio media item of the first type of audio media item.

1910
Concurrently with playing the first audio media item of the first type of audio media item, display a graphical object that identifies the first audio media item.

*FIG. 19*

USER INTERFACES FOR MANAGING CONTROLLABLE EXTERNAL DEVICES

CROSS-REFERENCE TO RELATED APPLICATIONS

This application is a continuation of U.S. patent application Ser. No. 16/586,002, entitled "USER INTERFACES FOR MANAGING CONTROLLABLE EXTERNAL DEVICES", filed Sep. 27, 2019, which claims priority to U.S. Provisional Application Ser. No. 62/855,895, entitled "USER INTERFACES FOR MANAGING CONTROLLABLE EXTERNAL DEVICES", filed on May 31, 2019, the contents of each of which are hereby incorporated by reference in their entirety.

FIELD

The present disclosure relates generally to computer user interfaces, and more specifically to techniques for managing controllable external devices.

BACKGROUND

Controllable (e.g., remotely controllable) electronic devices, including WiFi-enabled lights, power outlets, thermostats, and home appliances provide users with a combination of functionality and convenience. Controllable electronic devices can be managed using computer interfaces.

BRIEF SUMMARY

Some techniques for managing controllable external devices using electronic devices, however, are generally cumbersome and inefficient. For example, some existing techniques use a complex and time-consuming user interface, which may include multiple key presses, keystrokes, and/or touch inputs. As another example, some existing techniques fail to accommodate a wide range of functionality or sufficient feedback as to the state and functions of diverse controllable devices. As a consequence, existing techniques require more time than necessary to manage controllable external devices, wasting user time and device energy. This latter consideration is particularly important in battery-operated devices.

Accordingly, the present technique provides electronic devices with faster, more efficient methods and interfaces for managing controllable external devices. Such methods and interfaces optionally complement or replace other methods for managing controllable external devices. Such methods and interfaces reduce the cognitive burden on a user and produce a more efficient human-machine interface. For battery-operated computing devices, such methods and interfaces conserve power and increase the time between battery charges. In some embodiments, having a user interface for managing controllable external devices instead of having a different application for managing each controllable external device simplifies the user experience and therefore reduces unnecessary/extraneous/repetitive received inputs needed to manage controllable external devices.

In accordance with some embodiments, a method is described. The method comprises: at an electronic device with a display device and a communication device: displaying, on the display device, a user interface including a first accessory affordance associated with a first controllable external device; detecting a first input corresponding to selection of the first accessory affordance; in response to detecting the first input: in accordance with a determination that a set of command transmission criteria are met, transmitting, via the communication device, a command to the first controllable external device to perform a first function; and in accordance with a determination that the set of command transmission criteria are not met, displaying, on the display device, a first accessory interface that includes: a first control affordance that, when selected, transmits a command to the first controllable external device to perform the first function; and a second control affordance that, when selected, transmits a command to the first controllable external device to perform a second function that is different than the first function.

In accordance with some embodiments, a non-transitory computer-readable storage medium is described. The non-transitory computer-readable storage medium stores one or more programs configured to be executed by one or more processors of an electronic device with a display device and a communication device, the one or more programs including instructions for: displaying, on the display device, a user interface including a first accessory affordance associated with a first controllable external device; detecting a first input corresponding to selection of the first accessory affordance; in response to detecting the first input: in accordance with a determination that a set of command transmission criteria are met, transmitting, via the communication device, a command to the first controllable external device to perform a first function; and in accordance with a determination that the set of command transmission criteria are not met, displaying, on the display device, a first accessory interface that includes: a first control affordance that, when selected, transmits a command to the first controllable external device to perform the first function; and a second control affordance that, when selected, transmits a command to the first controllable external device to perform a second function that is different than the first function.

In accordance with some embodiments, a transitory computer-readable storage medium is described. The transitory computer-readable storage medium stores one or more programs configured to be executed by one or more processors of an electronic device with a display device and a communication device, the one or more programs including instructions for: displaying, on the display device, a user interface including a first accessory affordance associated with a first controllable external device; detecting a first input corresponding to selection of the first accessory affordance; in response to detecting the first input: in accordance with a determination that a set of command transmission criteria are met, transmitting, via the communication device, a command to the first controllable external device to perform a first function; and in accordance with a determination that the set of command transmission criteria are not met, displaying, on the display device, a first accessory interface that includes: a first control affordance that, when selected, transmits a command to the first controllable external device to perform the first function; and a second control affordance that, when selected, transmits a command to the first controllable external device to perform a second function that is different than the first function.

In accordance with some embodiments, an electronic device is described. The electronic device comprises: a display device and a communication device; one or more processors; and memory storing one or more programs configured to be executed by the one or more processors, the one or more programs including instructions for: displaying a video media user interface including: displaying, on the display device, a user interface including a first accessory affordance associated with a first controllable external device; detecting a first input corresponding to selection of the first accessory affordance; in response to detecting the first input: in accordance with a determination that a set of command transmission criteria are met, transmitting, via the communication device, a command to the first controllable external device to perform a first function; and in accordance with a determination that the set of command transmission criteria are not met, displaying, on the display device, a first accessory interface that includes: a first control affordance that, when selected, transmits a command to the first controllable external device to perform the first function; and a second control affordance that, when selected, transmits a command to the first controllable external device to perform a second function that is different than the first function.

In accordance with some embodiments, an electronic device is described. The electronic device comprises: a display device and a communication device; means for displaying, on the display device, a user interface including a first accessory affordance associated with a first controllable external device; means for detecting a first input corresponding to selection of the first accessory affordance; means responsive to detecting the first input for: in accordance with a determination that a set of command transmission criteria are met, transmitting, via the communication device, a command to the first controllable external device to perform a first function; and in accordance with a determination that the set of command transmission criteria are not met, displaying, on the display device, a first accessory interface that includes: a first control affordance that, when selected, transmits a command to the first controllable external device to perform the first function; and a second control affordance that, when selected, transmits a command to the first controllable external device to perform a second function that is different than the first function.

In accordance with some embodiments, a method is described. The method comprises: at an electronic device with a display device: displaying, on the display device, a user interface including a first accessory affordance associated with a first controllable external device; detecting a first input corresponding to selection of the first accessory affordance; in response to detecting the first input, displaying, on the display device, a first region of the first accessory interface that includes a first control affordance that, when selected, controls a first function of the first controllable external device, without displaying a second region of the first accessory interface; while displaying, on the display device, the first region of the first accessory interface, detecting a second input; and in response to detecting the second input: in accordance with a determination that the second input causes a portion of the second region to be displayed that exceeds a threshold amount, updating display of the user interface to display the second region at a top portion of the first accessory interface while ceasing display of the first region, wherein the second region includes one or more settings of the first controllable external device; and in accordance with a determination that the second input does not cause a portion of the second region to be displayed that exceeds the threshold amount, updating display of the first accessory interface based on the second input to a second control affordance in the first region of the first accessory interface without displaying the second region of the first accessory interface.

In accordance with some embodiments, a non-transitory computer-readable storage medium is described. The non-transitory computer-readable storage medium stores one or more programs configured to be executed by one or more processors of an electronic device with a display device, the one or more programs including instructions for: displaying, on the display device, a user interface including a first accessory affordance associated with a first controllable external device; detecting a first input corresponding to selection of the first accessory affordance; in response to detecting the first input, displaying, on the display device, a first region of the first accessory interface that includes a first control affordance that, when selected, controls a first function of the first controllable external device, without displaying a second region of the first accessory interface; while displaying, on the display device, the first region of the first accessory interface, detecting a second input; and in response to detecting the second input: in accordance with a determination that the second input causes a portion of the second region to be displayed that exceeds a threshold amount, updating display of the user interface to display the second region at a top portion of the first accessory interface while ceasing display of the first region, wherein the second region includes one or more settings of the first controllable external device; and in accordance with a determination that the second input does not cause a portion of the second region to be displayed that exceeds the threshold amount, updating display of the first accessory interface based on the second input to a second control affordance in the first region of the first accessory interface without displaying the second region of the first accessory interface.

In accordance with some embodiments, a transitory computer-readable storage medium is described. The transitory computer-readable storage medium stores one or more programs configured to be executed by one or more processors of an electronic device with a display device, the one or more programs including instructions for: displaying, on the display device, a user interface including a first accessory affordance associated with a first controllable external device; detecting a first input corresponding to selection of the first accessory affordance; in response to detecting the first input, displaying, on the display device, a first region of the first accessory interface that includes a first control affordance that, when selected, controls a first function of the first controllable external device, without displaying a second region of the first accessory interface; while displaying, on the display device, the first region of the first accessory interface, detecting a second input; and in response to detecting the second input: in accordance with a determination that the second input causes a portion of the second region to be displayed that exceeds a threshold amount, updating display of the user interface to display the second region at a top portion of the first accessory interface while ceasing display of the first region, wherein the second region includes one or more settings of the first controllable external device; and in accordance with a determination that the second input does not cause a portion of the second region to be displayed that exceeds the threshold amount, updating display of the first accessory interface based on the second input to a second control affordance in the first region of the first accessory interface without displaying the second region of the first accessory interface.

In accordance with some embodiments, an electronic device is described. The electronic device comprises: a display device; one or more processors; and memory storing one or more programs configured to be executed by the one or more processors, the one or more programs including instructions for: displaying a video media user interface including: displaying, on the display device, a user interface including a first accessory affordance associated with a first controllable external device; detecting a first input corresponding to selection of the first accessory affordance; in response to detecting the first input, displaying, on the display device, a first region of the first accessory interface that includes a first control affordance that, when selected, controls a first function of the first controllable external device, without displaying a second region of the first accessory interface; while displaying, on the display device, the first region of the first accessory interface, detecting a second input; and in response to detecting the second input: in accordance with a determination that the second input causes a portion of the second region to be displayed that exceeds a threshold amount, updating display of the user interface to display the second region at a top portion of the first accessory interface while ceasing display of the first region, wherein the second region includes one or more settings of the first controllable external device; and in accordance with a determination that the second input does not cause a portion of the second region to be displayed that exceeds the threshold amount, updating display of the first accessory interface based on the second input to a second control affordance in the first region of the first accessory interface without displaying the second region of the first accessory interface.

In accordance with some embodiments, an electronic device is described. The electronic device comprises: a display device; means for displaying, on the display device, a user interface including a first accessory affordance associated with a first controllable external device; means for detecting a first input corresponding to selection of the first accessory affordance; means responsive to detecting the first input, for displaying, on the display device, a first region of the first accessory interface that includes a first control affordance that, when selected, controls a first function of the first controllable external device, without displaying a second region of the first accessory interface; means for, while displaying, on the display device, the first region of the first accessory interface, means for detecting a second input; and means, responsive to detecting the second input, for: in accordance with a determination that the second input causes a portion of the second region to be displayed that exceeds a threshold amount, updating display of the user interface to display the second region at a top portion of the first accessory interface while ceasing display of the first region, wherein the second region includes one or more settings of the first controllable external device; and in accordance with a determination that the second input does not cause a portion of the second region to be displayed that exceeds the threshold amount, updating display of the first accessory interface based on the second input to a second control affordance in the first region of the first accessory interface without displaying the second region of the first accessory interface.

In accordance with some embodiments, a method is described. The method comprises: at an electronic device with a display device: while the electronic device is not configured to control a first controllable external device, detecting a first set of one or more inputs corresponding to a request to configure the electronic device to control the first controllable external device; in response to detecting the first set of one or inputs, initiating a process to configure the electronic device to control the first controllable external device, wherein the process includes: receiving information corresponding to the first controllable external device; in accordance with a determination, based on the received information, that the first controllable external device is associated with a plurality of controllable functions associated with a plurality of subcomponents of the first controllable external device, displaying, on the display device, a first accessory affordance corresponding to a group including the first controllable external device and the plurality of subcomponents; and in accordance with a determination, based on the received information, that the first controllable external device is not associated with the plurality of subcomponents, displaying, on the display device, a second accessory affordance corresponding to the first controllable external device; while displaying, on the display device, the first accessory affordance or the second accessory affordance, detecting a second input; and in response to detecting the second input: in accordance with a determination that the second input corresponds to a selection of the first accessory affordance, displaying, on the display device, a first accessory interface including a plurality of control affordances corresponding to the first controllable external device and the plurality of subcomponents and a control reconfiguration affordance that, when selected, initiates a process to remove at least a first control affordance of the plurality of control affordances from the first accessory interface; and in accordance with a determination that the second input corresponds to a selection of the second accessory affordance, displaying, on the display device, a second accessory interface including controls for the first controllable external device without displaying the control reconfiguration affordance.

In accordance with some embodiments, a non-transitory computer-readable storage medium is described. The non-transitory computer-readable storage medium stores one or more programs configured to be executed by one or more processors of an electronic device with a display device, the one or more programs including instructions for: while the electronic device is not configured to control a first controllable external device, detecting a first set of one or more inputs corresponding to a request to configure the electronic device to control the first controllable external device; in response to detecting the first set of one or inputs, initiating a process to configure the electronic device to control the first controllable external device, wherein the process includes: receiving information corresponding to the first controllable external device; in accordance with a determination, based on the received information, that the first controllable external device is associated with a plurality of controllable functions associated with a plurality of subcomponents of the first controllable external device, displaying, on the display device, a first accessory affordance corresponding to a group including the first controllable external device and the plurality of subcomponents; and in accordance with a determination, based on the received information, that the first controllable external device is not associated with the plurality of subcomponents, displaying, on the display device, a second accessory affordance corresponding to the first controllable external device; while displaying, on the display device, the first accessory affordance or the second accessory affordance, detecting a second input; and in response to detecting the second input: in accordance with a determination that the second input corresponds to a selection of the first accessory affordance, displaying, on the display device, a first accessory interface including a plurality of control affordances corresponding to the first controllable external device and the plurality of subcomponents and a control reconfiguration affordance that, when selected, initiates a process to remove at least a first control affordance of the plurality of control affordances from the first accessory interface; and in accordance with a determination that the second input corresponds to a selection of the second accessory affordance, displaying, on the display device, a second accessory interface including controls for the first controllable external device without displaying the control reconfiguration affordance.

In accordance with some embodiments, a transitory computer-readable storage medium is described. The transitory computer-readable storage medium stores one or more programs configured to be executed by one or more processors of an electronic device with a display device, the one or more programs including instructions for: while the electronic device is not configured to control a first controllable external device, detecting a first set of one or more inputs corresponding to a request to configure the electronic device to control the first controllable external device; in response to detecting the first set of one or inputs, initiating a process to configure the electronic device to control the first controllable external device, wherein the process includes: receiving information corresponding to the first controllable external device; in accordance with a determination, based on the received information, that the first controllable external device is associated with a plurality of controllable functions associated with a plurality of subcomponents of the first controllable external device, displaying, on the display device, a first accessory affordance corresponding to a group including the first controllable external device and the plurality of subcomponents; and in accordance with a determination, based on the received information, that the first controllable external device is not associated with the plurality of subcomponents, displaying, on the display device, a second accessory affordance corresponding to the first controllable external device; while displaying, on the display device, the first accessory affordance or the second accessory affordance, detecting a second input; and in response to detecting the second input: in accordance with a determination that the second input corresponds to a selection of the first accessory affordance, displaying, on the display device, a first accessory interface including a plurality of control affordances corresponding to the first controllable external device and the plurality of subcomponents and a control reconfiguration affordance that, when selected, initiates a process to remove at least a first control affordance of the plurality of control affordances from the first accessory interface; and in accordance with a determination that the second input corresponds to a selection of the second accessory affordance, displaying, on the display device, a second accessory interface including controls for the first controllable external device without displaying the control reconfiguration affordance.

In accordance with some embodiments, an electronic device is described. The electronic device comprises: a display device; one or more processors; and memory storing one or more programs configured to be executed by the one or more processors, the one or more programs including instructions for: displaying a video media user interface including: while the electronic device is not configured to control a first controllable external device, detecting a first set of one or more inputs corresponding to a request to configure the electronic device to control the first controllable external device; in response to detecting the first set of one or inputs, initiating a process to configure the electronic device to control the first controllable external device, wherein the process includes: receiving information corresponding to the first controllable external device; in accordance with a determination, based on the received information, that the first controllable external device is associated with a plurality of controllable functions associated with a plurality of subcomponents of the first controllable external device, displaying, on the display device, a first accessory affordance corresponding to a group including the first controllable external device and the plurality of subcomponents; and in accordance with a determination, based on the received information, that the first controllable external device is not associated with the plurality of subcomponents, displaying, on the display device, a second accessory affordance corresponding to the first controllable external device; while displaying, on the display device, the first accessory affordance or the second accessory affordance, detecting a second input; and in response to detecting the second input: in accordance with a determination that the second input corresponds to a selection of the first accessory affordance, displaying, on the display device, a first accessory interface including a plurality of control affordances corresponding to the first controllable external device and the plurality of subcomponents and a control reconfiguration affordance that, when selected, initiates a process to remove at least a first control affordance of the plurality of control affordances from the first accessory interface; and in accordance with a determination that the second input corresponds to a selection of the second accessory affordance, displaying, on the display device, a second accessory interface including controls for the first controllable external device without displaying the control reconfiguration affordance.

In accordance with some embodiments, an electronic device is described. The electronic device comprises: a display device; means for, while the electronic device is not configured to control a first controllable external device, detecting a first set of one or more inputs corresponding to a request to configure the electronic device to control the first controllable external device; means, responsive to detecting the first set of one or inputs, for initiating a process to configure the electronic device to control the first controllable external device, wherein the process includes: receiving information corresponding to the first controllable external device; in accordance with a determination, based on the received information, that the first controllable external device is associated with a plurality of controllable functions associated with a plurality of subcomponents of the first controllable external device, displaying, on the display device, a first accessory affordance corresponding to a group including the first controllable external device and the plurality of subcomponents; and in accordance with a determination, based on the received information, that the first controllable external device is not associated with the plurality of subcomponents, displaying, on the display device, a second accessory affordance corresponding to the first controllable external device; means for, while displaying, on the display device, the first accessory affordance or the second accessory affordance, detecting a second input; and means, responsive to detecting the second input: in accordance with a determination that the second input corresponds to a selection of the first accessory affordance, displaying, on the display device, a first accessory interface including a plurality of control affordances corresponding to the first controllable external device and the plurality of subcomponents and a control reconfiguration affordance that, when selected, initiates a process to remove at least a first control affordance of the plurality of control affordances from the first accessory interface; and in accordance with a determination that the second input corresponds to a selection of the second accessory affordance, displaying, on the display device, a second accessory interface including controls for the first controllable external device without displaying the control reconfiguration affordance.

In accordance with some embodiments, a method is described. The method comprises: at an electronic device with a display device: displaying, on the display device, a temperature mode creation user interface including a first set of controls for creating a temperature mode for an external thermostat device controllable by the electronic device; while displaying, on the display device, the temperature mode creation user interface, detecting a first set of one or more inputs; in response to the first set of one or more inputs: selecting a temperature range that includes a minimum temperature and a maximum temperature, different than the minimum temperature range; and associating the temperature range with a first temperature mode; after associating the temperature range with a first temperature mode, displaying, on the display device, a temperature scheduling user interface including a second set of controls for creating a scheduled operation of the external thermostat device; while displaying, on the display device, the temperature scheduling user interface, detecting a second set of one or more inputs; and in response to detecting the second set of one or more inputs: selecting a first criteria for activation of a first scheduled operation; and associating the first temperature mode with the first scheduled operation.

In accordance with some embodiments, a non-transitory computer-readable storage medium is described. The non-transitory computer-readable storage medium stores one or more programs configured to be executed by one or more processors of an electronic device with a display device, the one or more programs including instructions for: displaying, on the display device, a temperature mode creation user interface including a first set of controls for creating a temperature mode for an external thermostat device controllable by the electronic device; while displaying, on the display device, the temperature mode creation user interface, detecting a first set of one or more inputs; in response to the first set of one or more inputs: selecting a temperature range that includes a minimum temperature and a maximum temperature, different than the minimum temperature range; and associating the temperature range with a first temperature mode; after associating the temperature range with a first temperature mode, displaying, on the display device, a temperature scheduling user interface including a second set of controls for creating a scheduled operation of the external thermostat device; while displaying, on the display device, the temperature scheduling user interface, detecting a second set of one or more inputs; and in response to detecting the second set of one or more inputs: selecting a first criteria for activation of a first scheduled operation; and associating the first temperature mode with the first scheduled operation.

In accordance with some embodiments, a transitory computer-readable storage medium is described. The transitory computer-readable storage medium stores one or more programs configured to be executed by one or more processors of an electronic device with a display device, the one or more programs including instructions for: displaying, on the display device, a temperature mode creation user interface including a first set of controls for creating a temperature mode for an external thermostat device controllable by the electronic device; while displaying, on the display device, the temperature mode creation user interface, detecting a first set of one or more inputs; in response to the first set of one or more inputs: selecting a temperature range that includes a minimum temperature and a maximum temperature, different than the minimum temperature range; and associating the temperature range with a first temperature mode; after associating the temperature range with a first temperature mode, displaying, on the display device, a temperature scheduling user interface including a second set of controls for creating a scheduled operation of the external thermostat device; while displaying, on the display device, the temperature scheduling user interface, detecting a second set of one or more inputs; and in response to detecting the second set of one or more inputs: selecting a first criteria for activation of a first scheduled operation; and associating the first temperature mode with the first scheduled operation.

In accordance with some embodiments, an electronic device is described. The electronic device comprises: a display device; one or more processors; and memory storing one or more programs configured to be executed by the one or more processors, the one or more programs including instructions for: displaying a video media user interface including: displaying, on the display device, a temperature mode creation user interface including a first set of controls for creating a temperature mode for an external thermostat device controllable by the electronic device; while displaying, on the display device, the temperature mode creation user interface, detecting a first set of one or more inputs; in response to the first set of one or more inputs: selecting a temperature range that includes a minimum temperature and a maximum temperature, different than the minimum temperature range; and associating the temperature range with a first temperature mode; after associating the temperature range with a first temperature mode, displaying, on the display device, a temperature scheduling user interface including a second set of controls for creating a scheduled operation of the external thermostat device; while displaying, on the display device, the temperature scheduling user interface, detecting a second set of one or more inputs; and in response to detecting the second set of one or more inputs: selecting a first criteria for activation of a first scheduled operation; and associating the first temperature mode with the first scheduled operation.

In accordance with some embodiments, an electronic device is described. The electronic device comprises: a display device; means for displaying, on the display device, a temperature mode creation user interface including a first set of controls for creating a temperature mode for an external thermostat device controllable by the electronic device; means for, while displaying, on the display device, the temperature mode creation user interface, detecting a first set of one or more inputs; means, responsive to the first set of one or more inputs: selecting a temperature range that includes a minimum temperature and a maximum temperature, different than the minimum temperature range; and associating the temperature range with a first temperature mode; means for, after associating the temperature range with a first temperature mode, displaying, on the display device, a temperature scheduling user interface including a second set of controls for creating a scheduled operation of the external thermostat device; means for, while displaying, on the display device, the temperature scheduling user interface, detecting a second set of one or more inputs; and means, responsive to detecting the second set of one or more inputs: selecting a first criteria for activation of a first scheduled operation; and associating the first temperature mode with the first scheduled operation.

In accordance with some embodiments, a method is described. The method comprises: at an electronic device with a display device: displaying, via the display device, a first accessory affordance corresponding to a first controllable external device; detecting one or more inputs to add the first controllable external device to a first set of controllable external devices; in response to detecting the one or more inputs to add the first controllable external device to the first set of controllable external devices: updating the first set of controllable external devices to include the first controllable external device; in accordance with a determination that the first controllable external device is of a first type, concurrently displaying: a second accessory affordance corresponding to the first controllable external device, and a configuration affordance that, when selected, initiates a process for configuring audio settings for the first controllable external device; and in accordance with a determination that the first controllable external device is not of the first type, displaying the second accessory affordance corresponding to the first controllable external device without the configuration affordance that, when selected, initiates a process for configuring audio settings for the first controllable external device.

In accordance with some embodiments, a non-transitory computer-readable storage medium is described. The non-transitory computer-readable storage medium stores one or more programs configured to be executed by one or more processors of an electronic device with a display device, the one or more programs including instructions for: displaying, via the display device, a first accessory affordance corresponding to a first controllable external device; detecting one or more inputs to add the first controllable external device to a first set of controllable external devices; in response to detecting the one or more inputs to add the first controllable external device to the first set of controllable external devices: updating the first set of controllable external devices to include the first controllable external device; in accordance with a determination that the first controllable external device is of a first type, concurrently displaying: a second accessory affordance corresponding to the first controllable external device, and a configuration affordance that, when selected, initiates a process for configuring audio settings for the first controllable external device; and in accordance with a determination that the first controllable external device is not of the first type, displaying the second accessory affordance corresponding to the first controllable external device without the configuration affordance that, when selected, initiates a process for configuring audio settings for the first controllable external device.

In accordance with some embodiments, a transitory computer-readable storage medium is described. The transitory computer-readable storage medium stores one or more programs configured to be executed by one or more processors of an electronic device with a display device, the one or more programs including instructions for: displaying, via the display device, a first accessory affordance corresponding to a first controllable external device; detecting one or more inputs to add the first controllable external device to a first set of controllable external devices; in response to detecting the one or more inputs to add the first controllable external device to the first set of controllable external devices: updating the first set of controllable external devices to include the first controllable external device; in accordance with a determination that the first controllable external device is of a first type, concurrently displaying: a second accessory affordance corresponding to the first controllable external device, and a configuration affordance that, when selected, initiates a process for configuring audio settings for the first controllable external device; and in accordance with a determination that the first controllable external device is not of the first type, displaying the second accessory affordance corresponding to the first controllable external device without the configuration affordance that, when selected, initiates a process for configuring audio settings for the first controllable external device.

In accordance with some embodiments, an electronic device is described. The electronic device comprises: a display device; one or more processors; and memory storing one or more programs configured to be executed by the one or more processors, the one or more programs including instructions for: displaying, via the display device, a first accessory affordance corresponding to a first controllable external device; detecting one or more inputs to add the first controllable external device to a first set of controllable external devices; in response to detecting the one or more inputs to add the first controllable external device to the first set of controllable external devices: updating the first set of controllable external devices to include the first controllable external device; in accordance with a determination that the first controllable external device is of a first type, concurrently displaying: a second accessory affordance corresponding to the first controllable external device, and a configuration affordance that, when selected, initiates a process for configuring audio settings for the first controllable external device; and in accordance with a determination that the first controllable external device is not of the first type, displaying the second accessory affordance corresponding to the first controllable external device without the configuration affordance that, when selected, initiates a process for configuring audio settings for the first controllable external device.

In accordance with some embodiments, an electronic device is described. The electronic device comprises: a display device; means for displaying, via the display device, a first accessory affordance corresponding to a first controllable external device; means for detecting one or more inputs to add the first controllable external device to a first set of controllable external devices; means responsive to detecting the one or more inputs to add the first controllable external device to the first set of controllable external devices for: updating the first set of controllable external devices to include the first controllable external device; in accordance with a determination that the first controllable external device is of a first type, concurrently displaying: a second accessory affordance corresponding to the first controllable external device, and a configuration affordance that, when selected, initiates a process for configuring audio settings for the first controllable external device; and in accordance with a determination that the first controllable external device is not of the first type, displaying the second accessory affordance corresponding to the first controllable external device without the configuration affordance that, when selected, initiates a process for configuring audio settings for the first controllable external device.

In accordance with some embodiments, a method is described. The method comprises: at an electronic device with a display device: concurrently displaying, via the display device, a set of one or more playback controls for performing a playback function on a media item and an alarm configuration affordance; detecting a user input; and in response to detecting the user input; in accordance with a determination that the detected user input corresponds to selection of a playback control of the set of one or more playback controls, initiating a process for performing a playback function at a controllable external device based on the selected playback control; and in accordance with a determination that the detected user input corresponds to selection of the alarm configuration affordance, replacing the concurrent display of the set of one or more playback controls and the alarm configuration affordance with a set of time affordances for setting a time for a first alarm.

In accordance with some embodiments, a non-transitory computer-readable storage medium is described. The non-transitory computer-readable storage medium stores one or more programs configured to be executed by one or more processors of an electronic device with a display device, the one or more programs including instructions for: concurrently displaying, via the display device, a set of one or more playback controls for performing a playback function on a media item and an alarm configuration affordance; detecting a user input; and in response to detecting the user input; in accordance with a determination that the detected user input corresponds to selection of a playback control of the set of one or more playback controls, initiating a process for performing a playback function at a controllable external device based on the selected playback control; and in accordance with a determination that the detected user input corresponds to selection of the alarm configuration affordance, replacing the concurrent display of the set of one or more playback controls and the alarm configuration affordance with a set of time affordances for setting a time for a first alarm.

In accordance with some embodiments, a transitory computer-readable storage medium is described. The transitory computer-readable storage medium stores one or more programs configured to be executed by one or more processors of an electronic device with a display device, the one or more programs including instructions for: concurrently displaying, via the display device, a set of one or more playback controls for performing a playback function on a media item and an alarm configuration affordance; detecting a user input; and in response to detecting the user input; in accordance with a determination that the detected user input corresponds to selection of a playback control of the set of one or more playback controls, initiating a process for performing a playback function at a controllable external device based on the selected playback control; and in accordance with a determination that the detected user input corresponds to selection of the alarm configuration affordance, replacing the concurrent display of the set of one or more playback controls and the alarm configuration affordance with a set of time affordances for setting a time for a first alarm.

In accordance with some embodiments, an electronic device is described. The electronic device comprises: a display device; one or more processors; and memory storing one or more programs configured to be executed by the one or more processors, the one or more programs including instructions for: concurrently displaying, via the display device, a set of one or more playback controls for performing a playback function on a media item and an alarm configuration affordance; detecting a user input; and in response to detecting the user input; in accordance with a determination that the detected user input corresponds to selection of a playback control of the set of one or more playback controls, initiating a process for performing a playback function at a controllable external device based on the selected playback control; and in accordance with a determination that the detected user input corresponds to selection of the alarm configuration affordance, replacing the concurrent display of the set of one or more playback controls and the alarm configuration affordance with a set of time affordances for setting a time for a first alarm.

In accordance with some embodiments, an electronic device is described. The electronic device comprises: a display device; means for concurrently displaying, via the display device, a set of one or more playback controls for performing a playback function on a media item and an alarm configuration affordance; means for detecting a user input; and means, responsive to detecting the user input for; in accordance with a determination that the detected user input corresponds to selection of a playback control of the set of one or more playback controls, initiating a process for performing a playback function at a controllable external device based on the selected playback control; and in accordance with a determination that the detected user input corresponds to selection of the alarm configuration affordance, replacing the concurrent display of the set of one or more playback controls and the alarm configuration affordance with a set of time affordances for setting a time for a first alarm.

In accordance with some embodiments, a method is described. The method, performed at an electronic device with a display, comprises: receiving a request to play a first type of audio media item, where the request identifies the first type of audio media item and does not identify a particular audio media item of the first type; and in response to receiving the request to play the first type of audio media item: playing a first audio media item of the first type of audio media item; and displaying an affordance that, when selected, plays a second audio media item of the first type of audio media item, where the second audio media item of the first type of audio media item is different from the first audio media item of the first type of audio media item.

In accordance with some embodiments, a non-transitory computer-readable storage medium is described. The non-transitory computer-readable storage medium stores one or more programs configured to be executed by one or more processors of an electronic device with a display device, the one or more programs including instructions for: receiving a request to play a first type of audio media item, where the request identifies the first type of audio media item and does not identify a particular audio media item of the first type; and in response to receiving the request to play the first type of audio media item: playing a first audio media item of the first type of audio media item; and displaying an affordance that, when selected, plays a second audio media item of the first type of audio media item, where the second audio media item of the first type of audio media item is different from the first audio media item of the first type of audio media item.

In accordance with some embodiments, a transitory computer-readable storage medium is described. The transitory computer-readable storage medium stores one or more programs configured to be executed by one or more processors of an electronic device with a display device, the one or more programs including instructions for: receiving a request to play a first type of audio media item, where the request identifies the first type of audio media item and does not identify a particular audio media item of the first type; and in response to receiving the request to play the first type of audio media item: playing a first audio media item of the first type of audio media item; and displaying an affordance that, when selected, plays a second audio media item of the first type of audio media item, where the second audio media item of the first type of audio media item is different from the first audio media item of the first type of audio media item.

In accordance with some embodiments, an electronic device is described. The electronic device comprises: a display device; one or more processors; and memory storing one or more programs configured to be executed by the one or more processors, the one or more programs including instructions for: receiving a request to play a first type of audio media item, where the request identifies the first type of audio media item and does not identify a particular audio media item of the first type; and in response to receiving the request to play the first type of audio media item: playing a first audio media item of the first type of audio media item; and displaying an affordance that, when selected, plays a second audio media item of the first type of audio media item, where the second audio media item of the first type of audio media item is different from the first audio media item of the first type of audio media item. Other embodiments of this aspect include corresponding computer systems, apparatus, and computer programs recorded on one or more computer storage devices, each configured to perform the actions of the methods.

In accordance with some embodiments, an electronic device is described. The electronic device comprises: a display device; means for receiving a request to play a first type of audio media item, where the request identifies the first type of audio media item and does not identify a particular audio media item of the first type; and means, responsive to receiving the request to play the first type of audio media item, for: playing a first audio media item of the first type of audio media item; and displaying an affordance that, when selected, plays a second audio media item of the first type of audio media item, where the second audio media item of the first type of audio media item is different from the first audio media item of the first type of audio media item.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing and controlling external devices from the electronic device, thereby increasing the effectiveness, efficiency, and user satisfaction with such devices. Such methods and interfaces can complement or replace other methods for managing and controlling external devices from the electronic device.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 5I illustrates an electronic device in accordance with some embodiments.

FIGS. 7A-7B are a flow diagram illustrating methods of managing controllable external devices in accordance with some embodiments.

FIGS. 9A-9B are a flow diagram illustrating methods of managing controllable external devices in accordance with some embodiments FIGS. 10A-10AC illustrate exemplary user interfaces for managing grouped controllable external devices in accordance with some embodiments.

FIGS. 11A-11B are a flow diagram illustrating methods of managing grouped controllable external devices in accordance with some embodiments

FIGS. 13A-13B are a flow diagram illustrating methods of managing a thermostat in accordance with some embodiments.

FIG. 15 is a flow diagram illustrating methods of managing a group of controllable external devices including a speaker in accordance with some embodiments.

FIG. 17 is a flow diagram illustrating methods of managing a speaker in accordance with some embodiments

FIG. 19 is a flow diagram illustrating methods of using an electronic device to play sounds of a particular type, in accordance with some embodiments

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing controllable external devices. In some embodiments, an electronic device provides access to designated (e.g., favorite) controllable devices on a home screen for managing a system of controllable devices. In some embodiments, a user can coarsely control a device by toggling the state between two states (e.g., ON/OFF) using input with one type of characteristic (e.g., a tap) and obtain more detailed control of the device using input with a different characteristic (e.g., a long press). In some embodiments, a user-defined collection of devices (e.g., scenes) is controlled in response to user-defined conditions. Various other techniques are also described. Such techniques can reduce the cognitive burden on a user who manages controllable external devices, thereby enhancing productivity. Further, such techniques can reduce processor and battery power otherwise wasted on redundant user inputs.

Below, FIGS. 1A-1C, 2, 3, 4A-4B, and 5A-5I provide a description of exemplary devices for performing the techniques for managing controllable external devices.

Figure 6A:
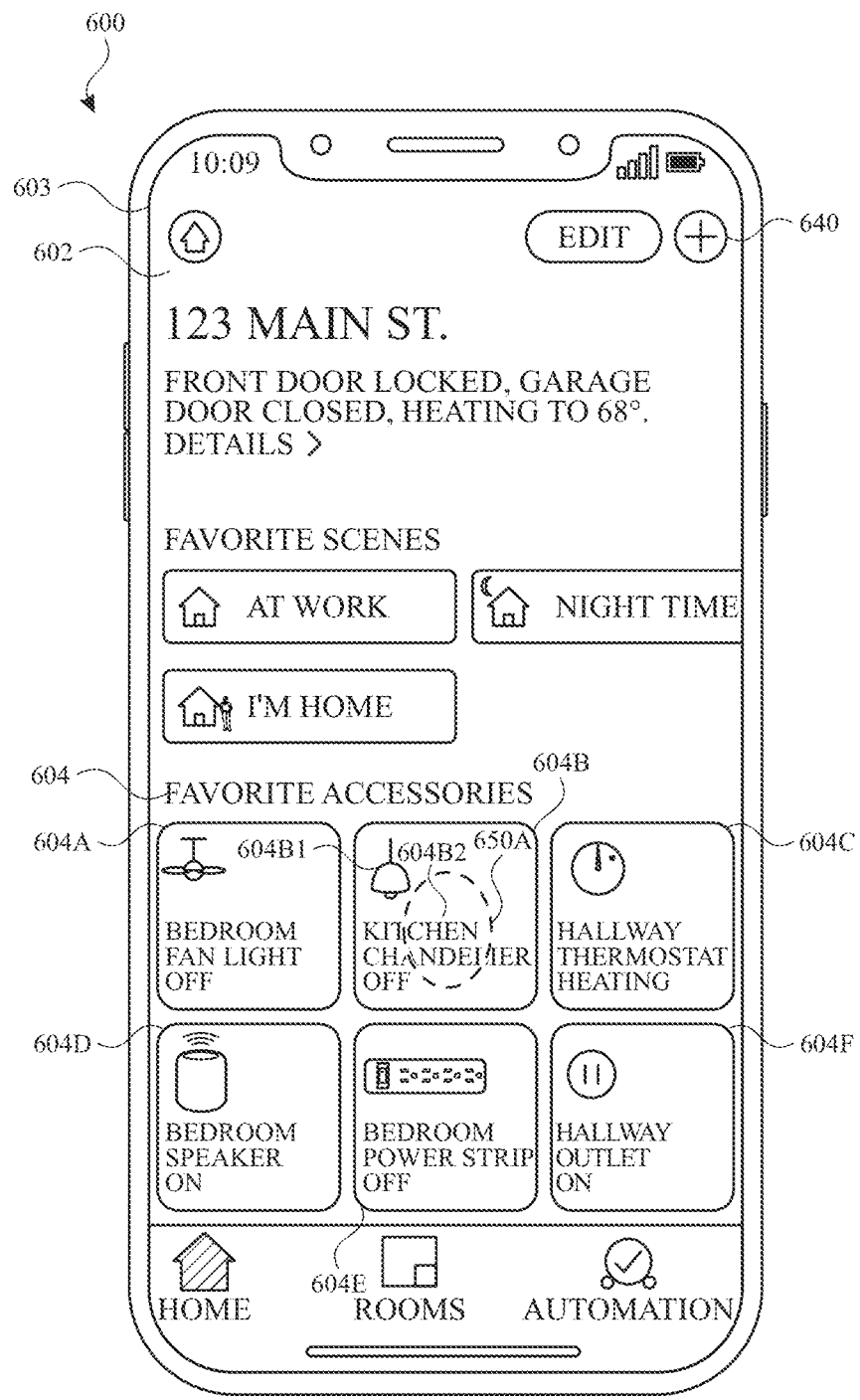
FIGS. 6A-6R illustrate exemplary user interfaces for managing controllable external devices in accordance with some embodiments.
Figure 6B:
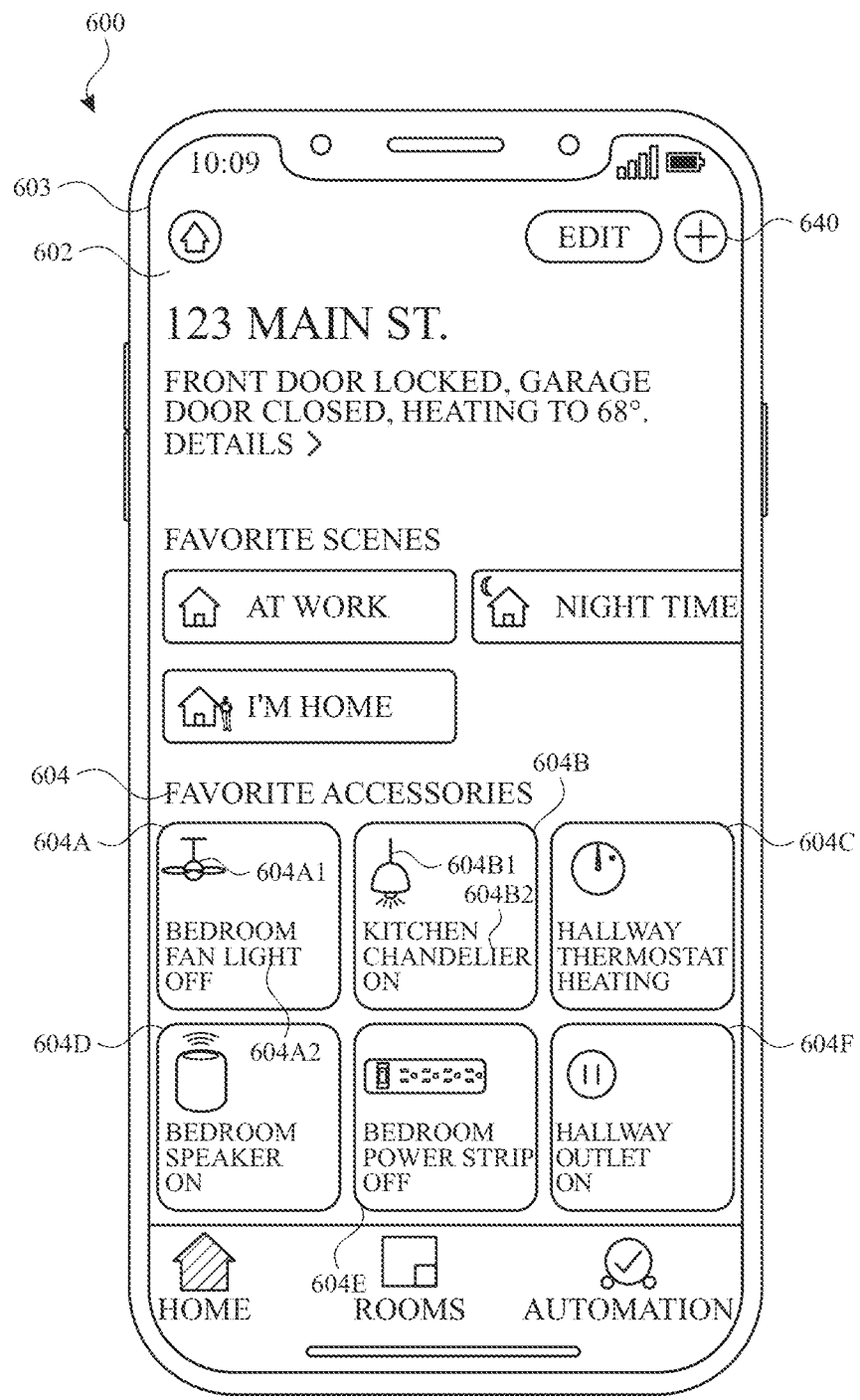
Figure 6C:
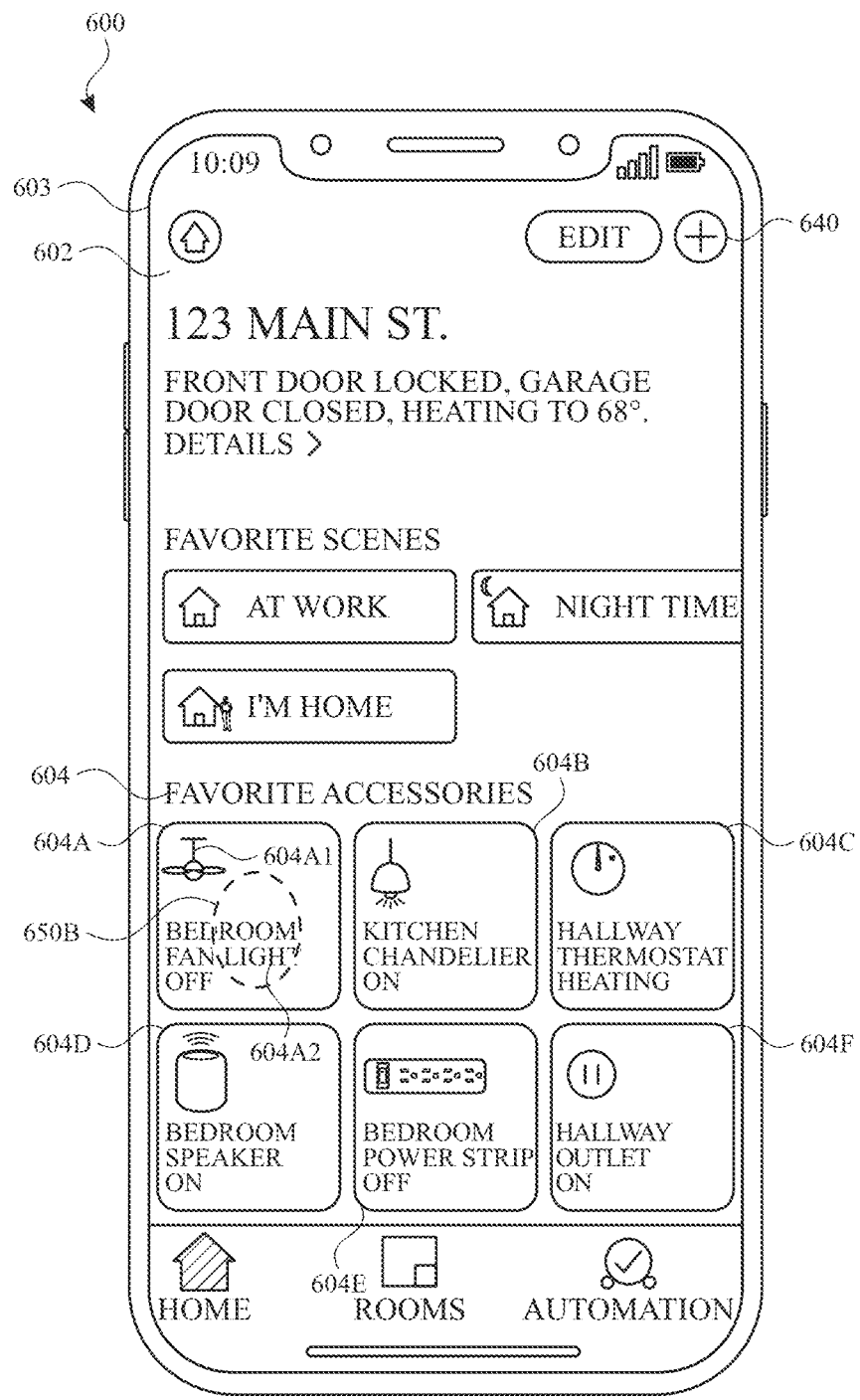
Figure 6D:
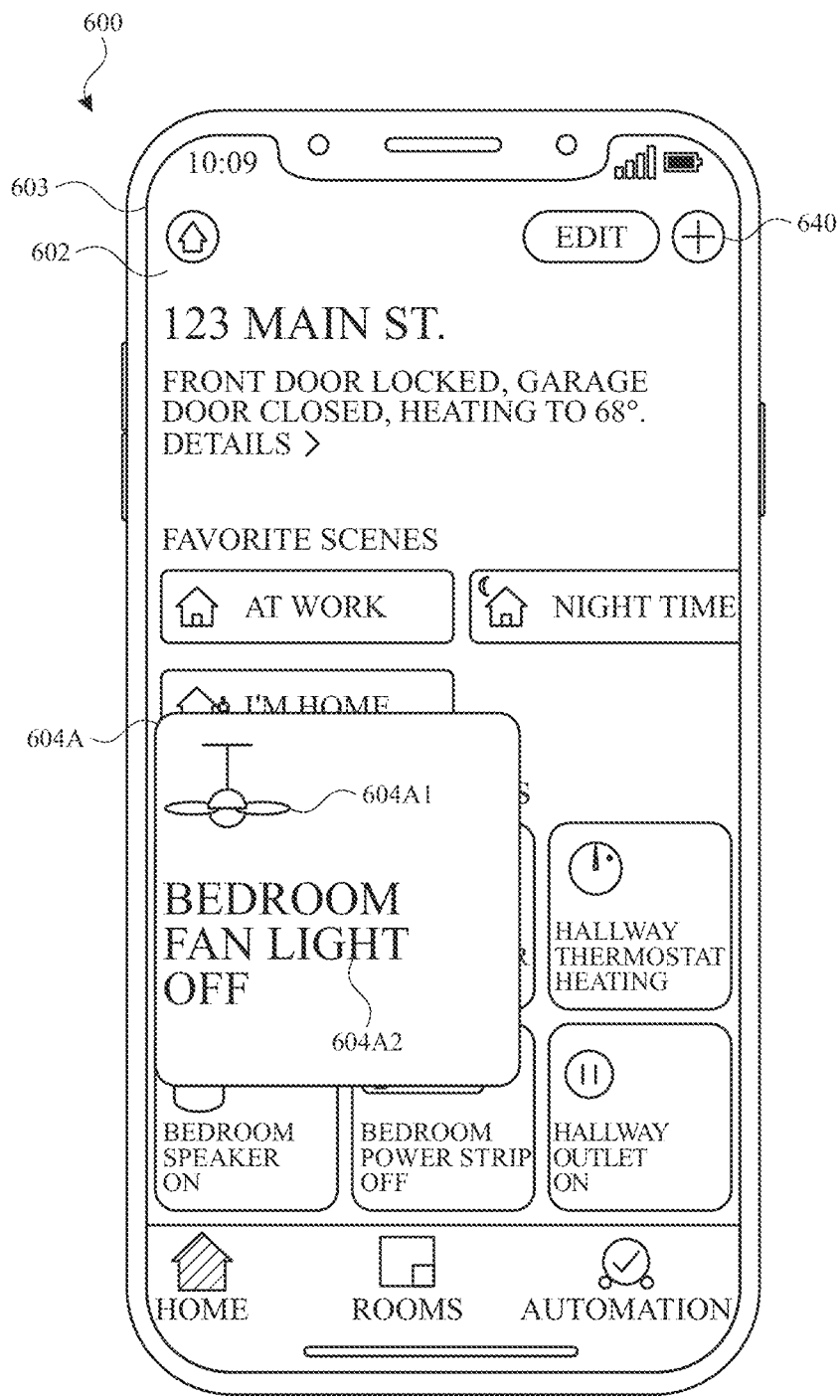
Figure 6E:
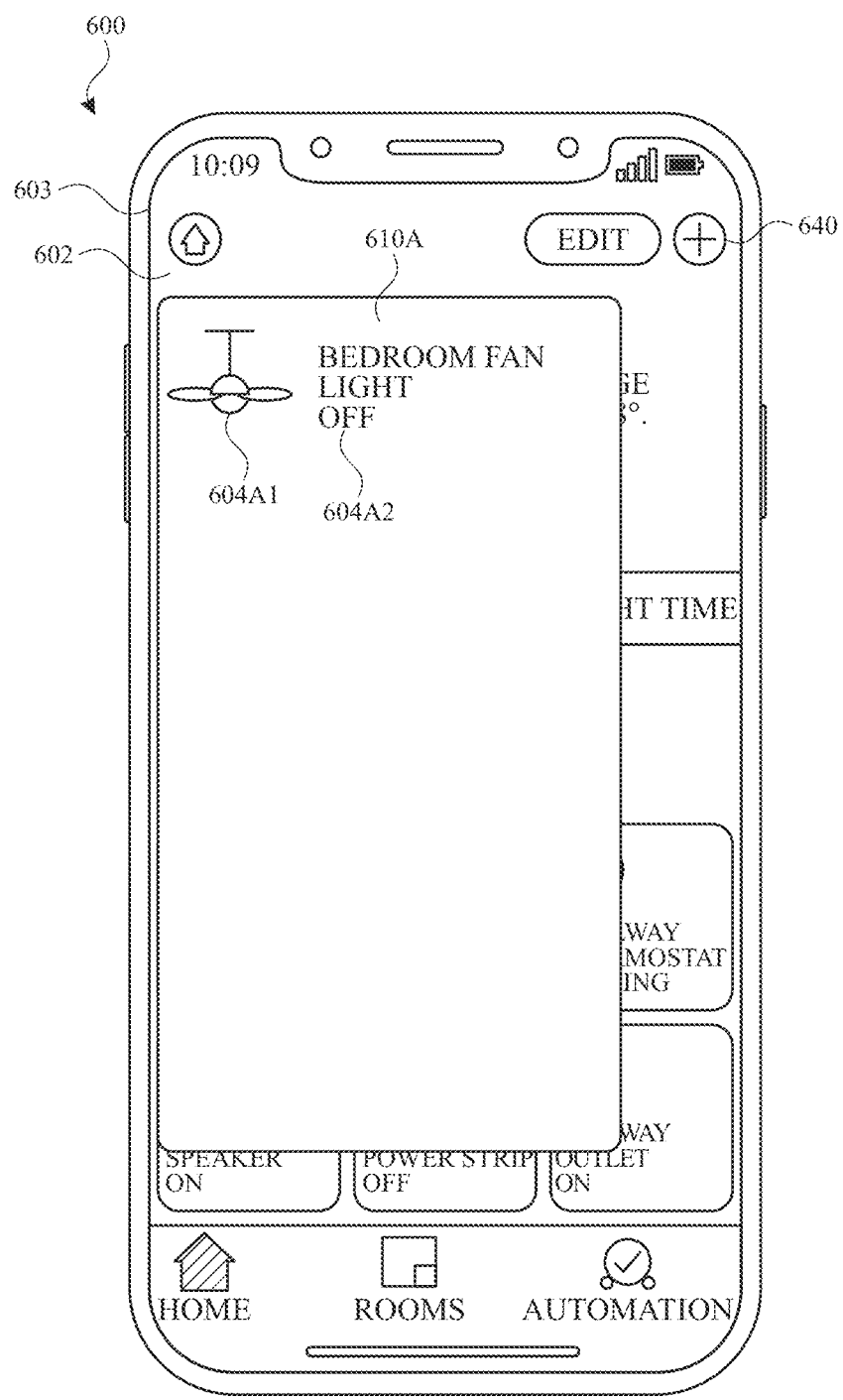
Figure 6F:
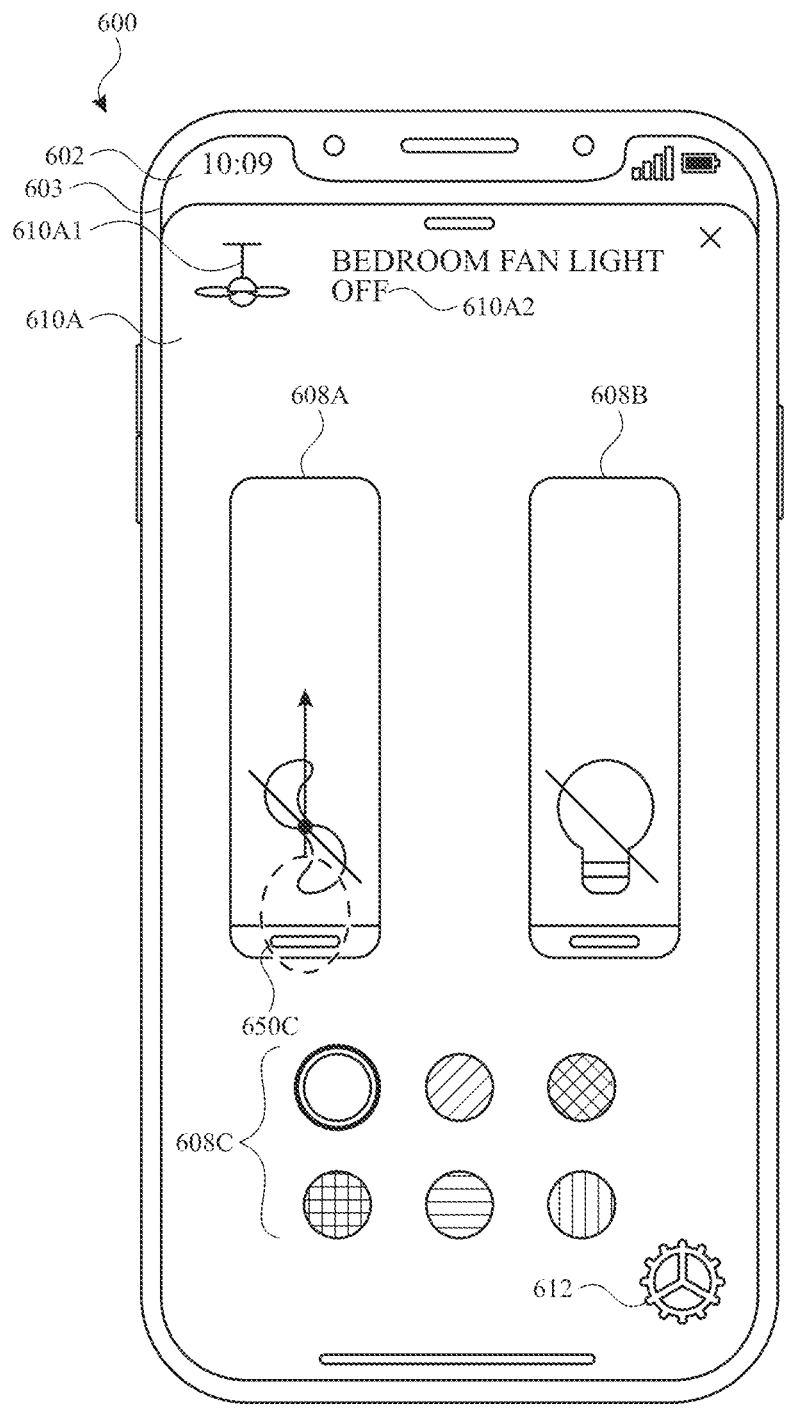
Figure 6G:
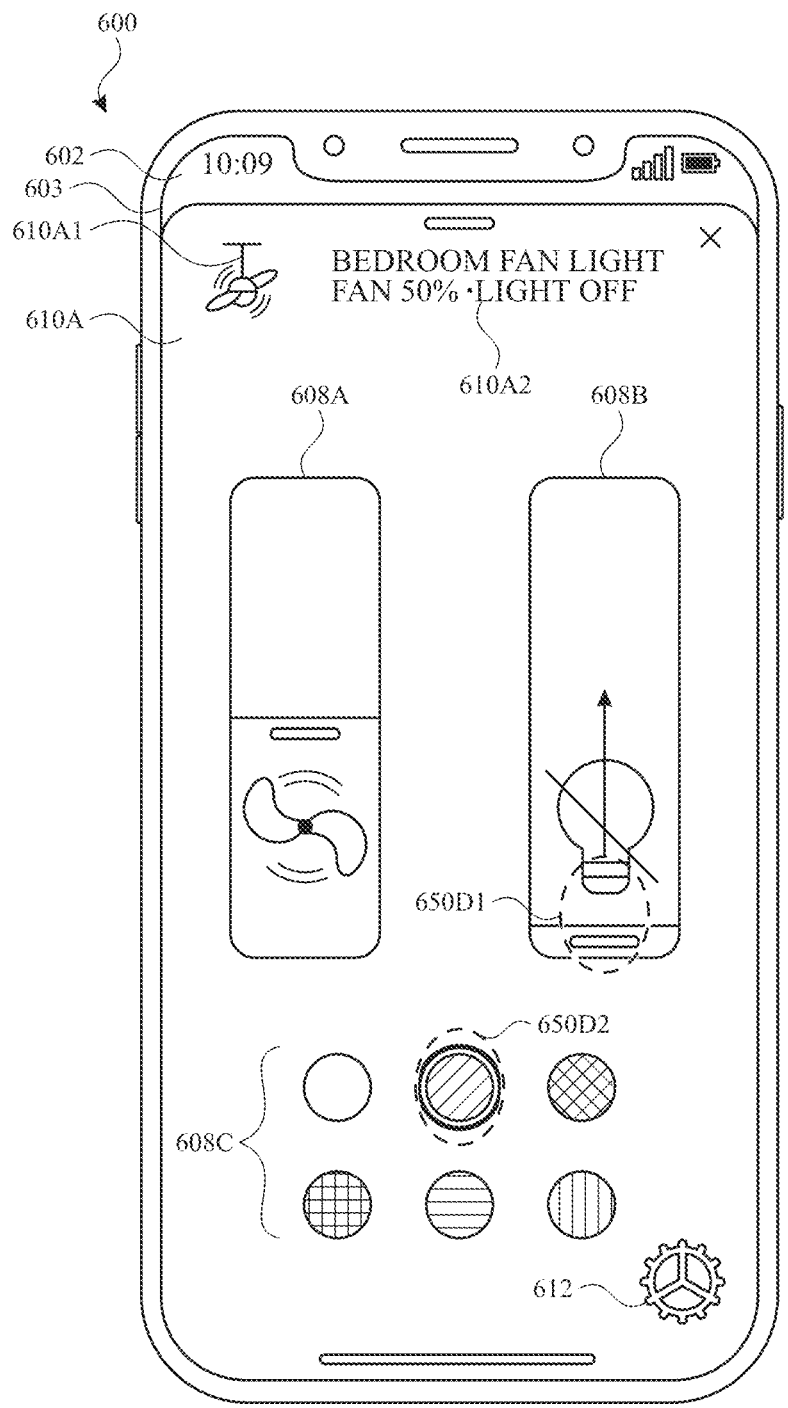
Figure 6H:
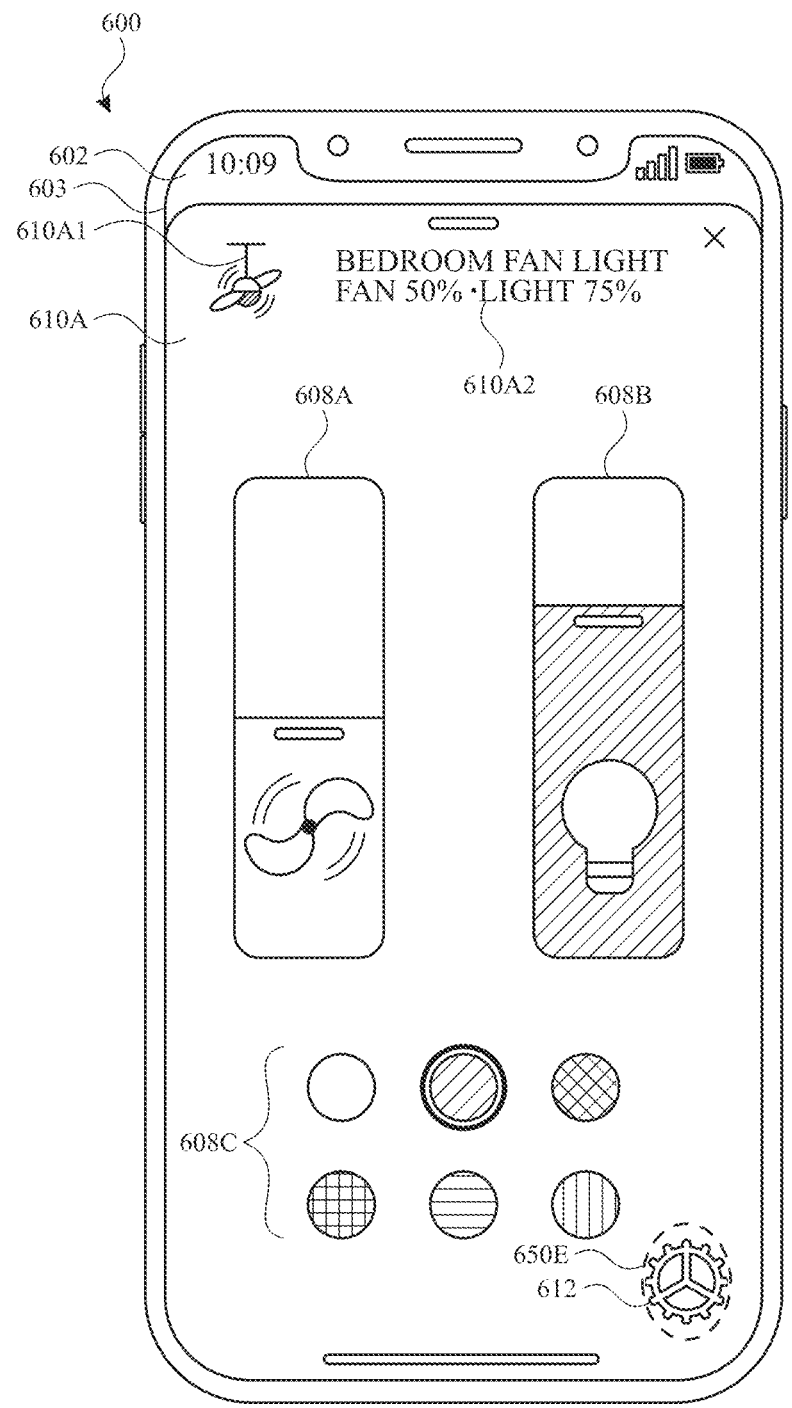
Figure 6I:
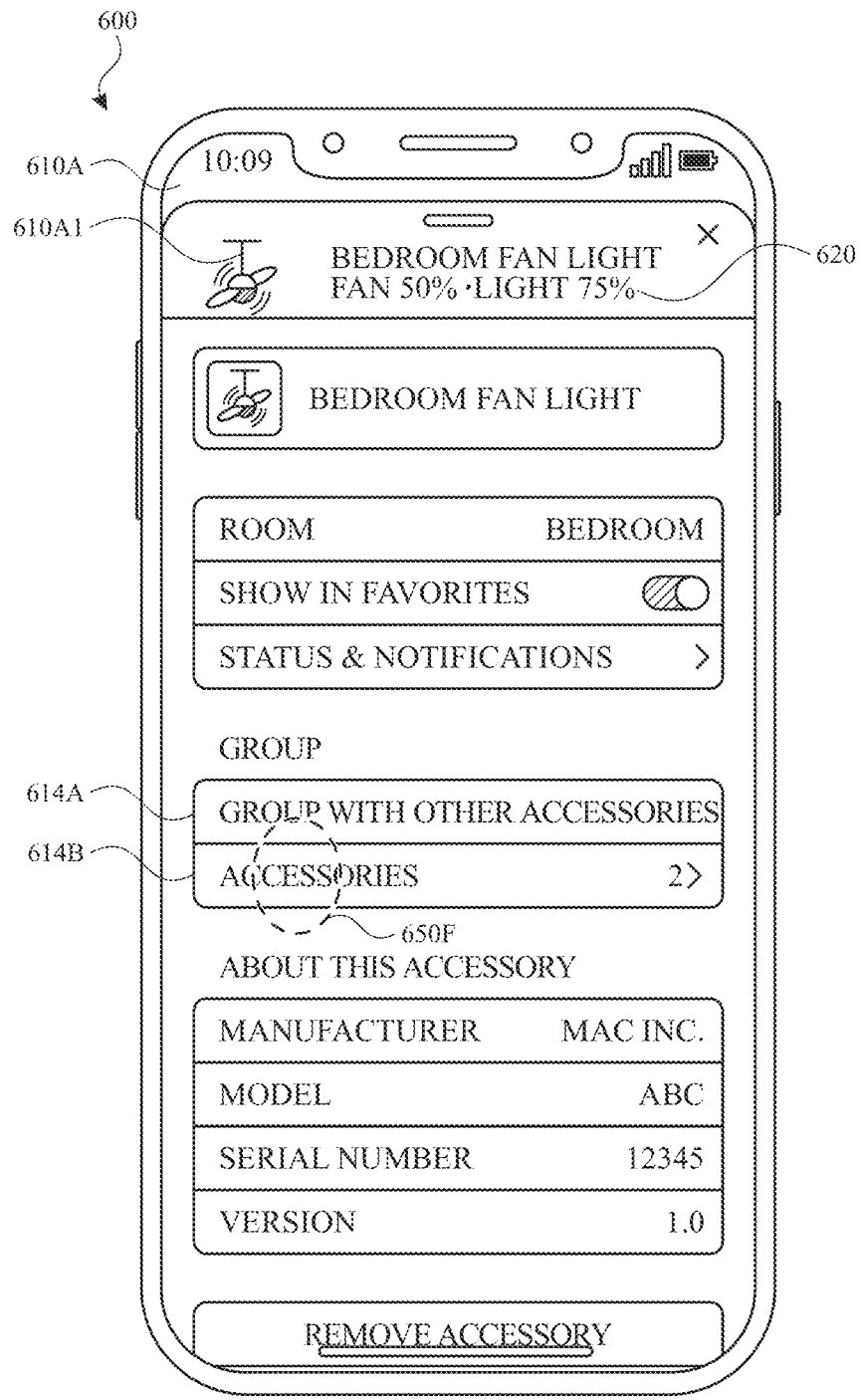
Figure 6J:
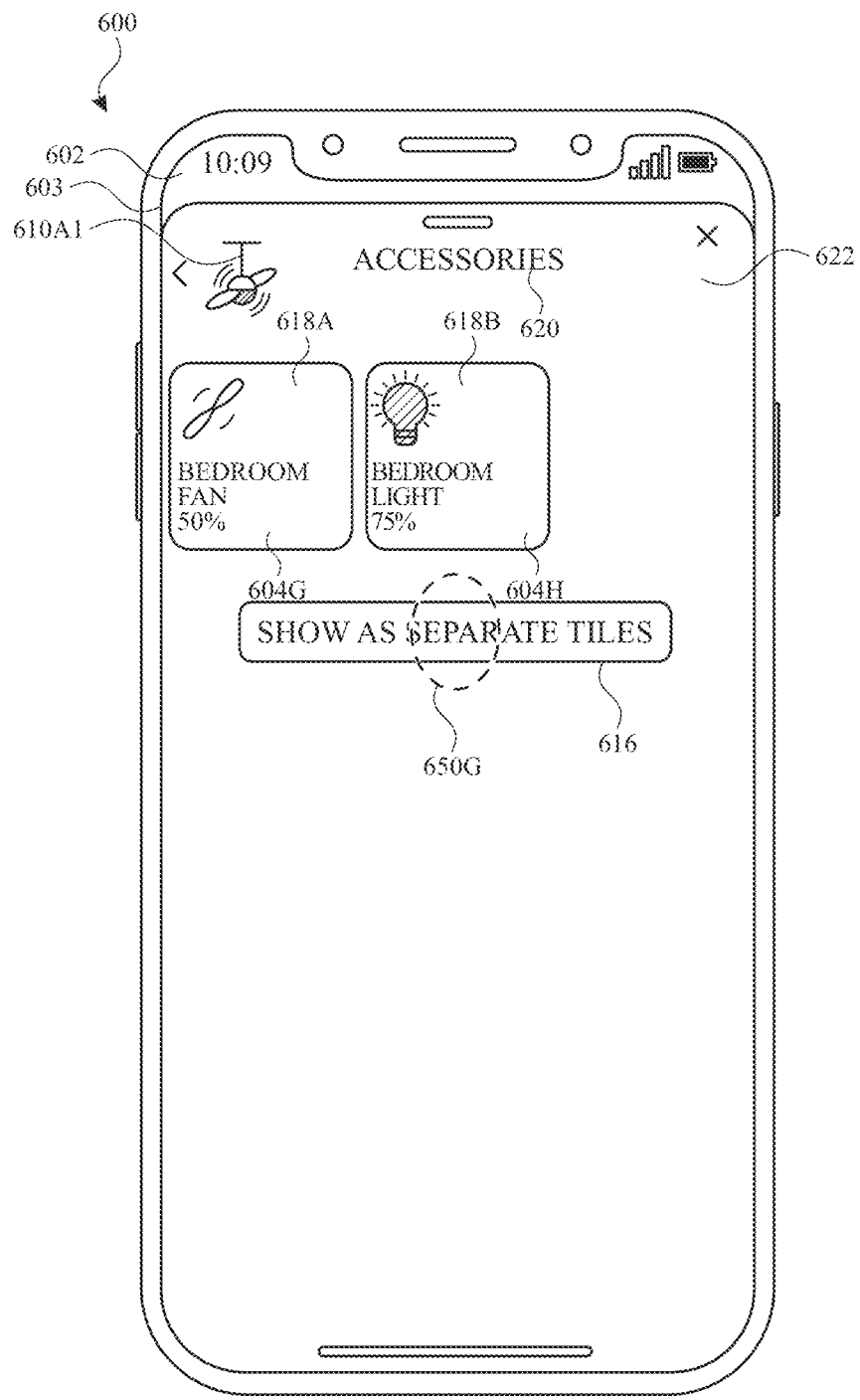
Figure 6K:
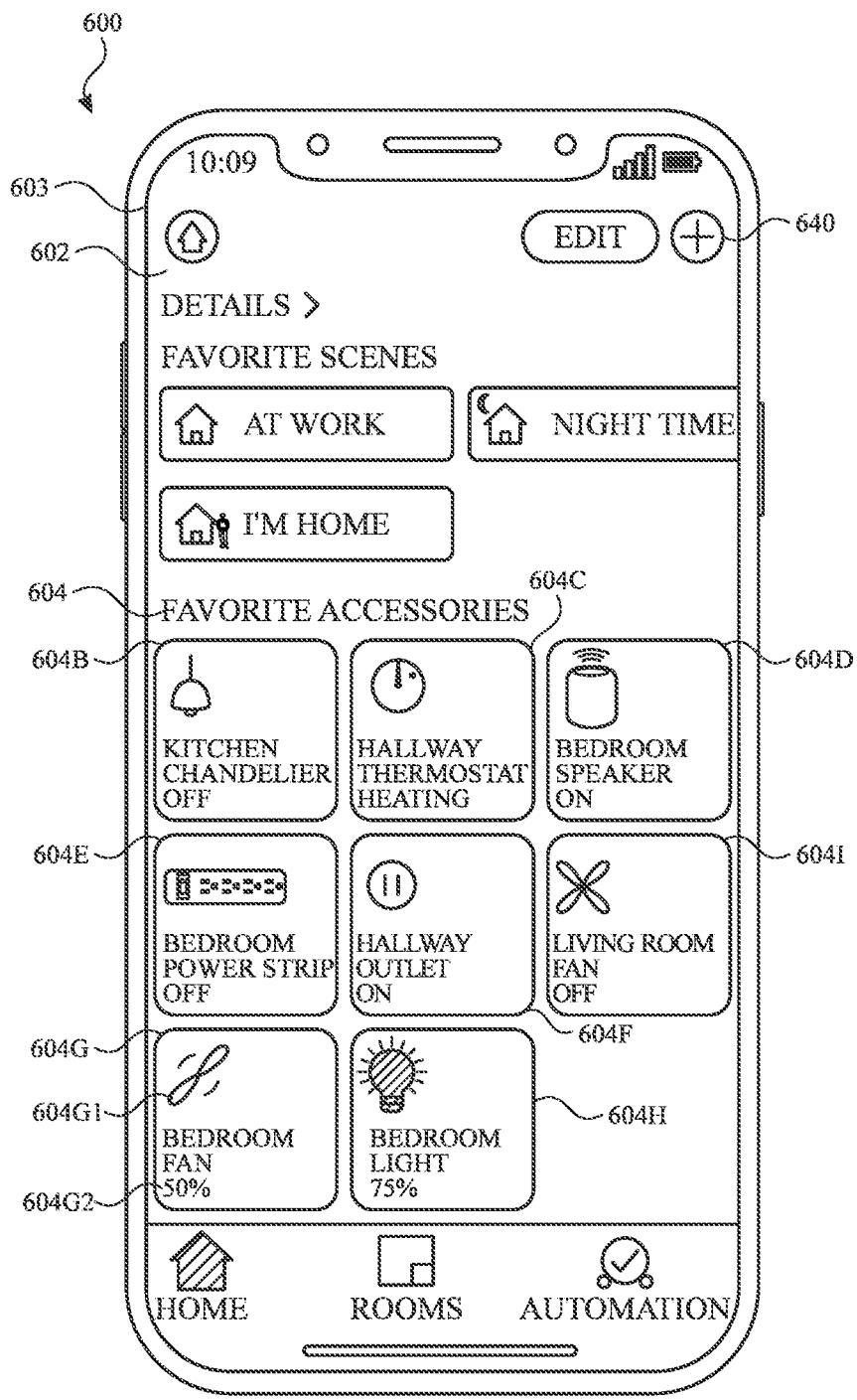
Figure 6L:
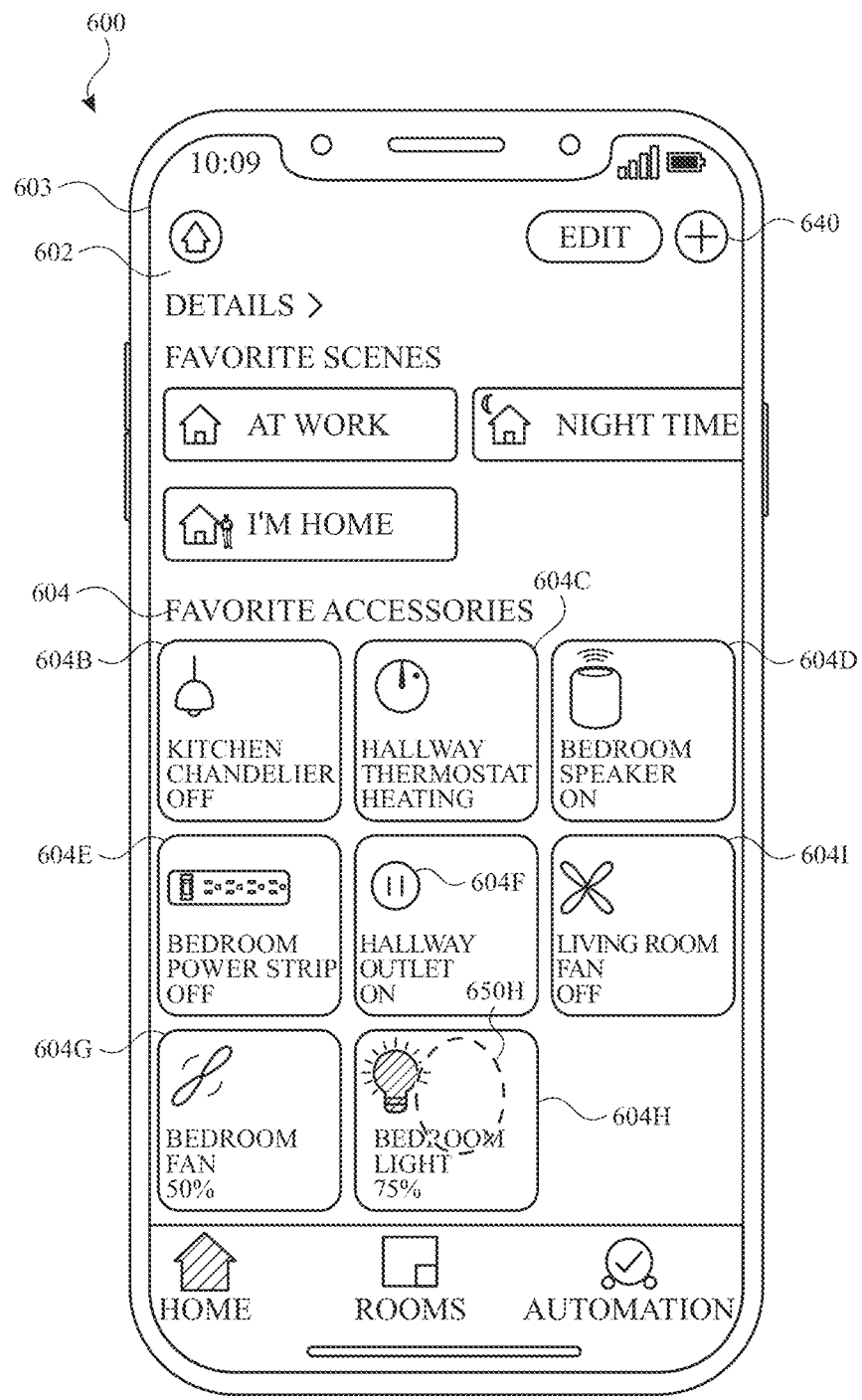
Figure 6M:
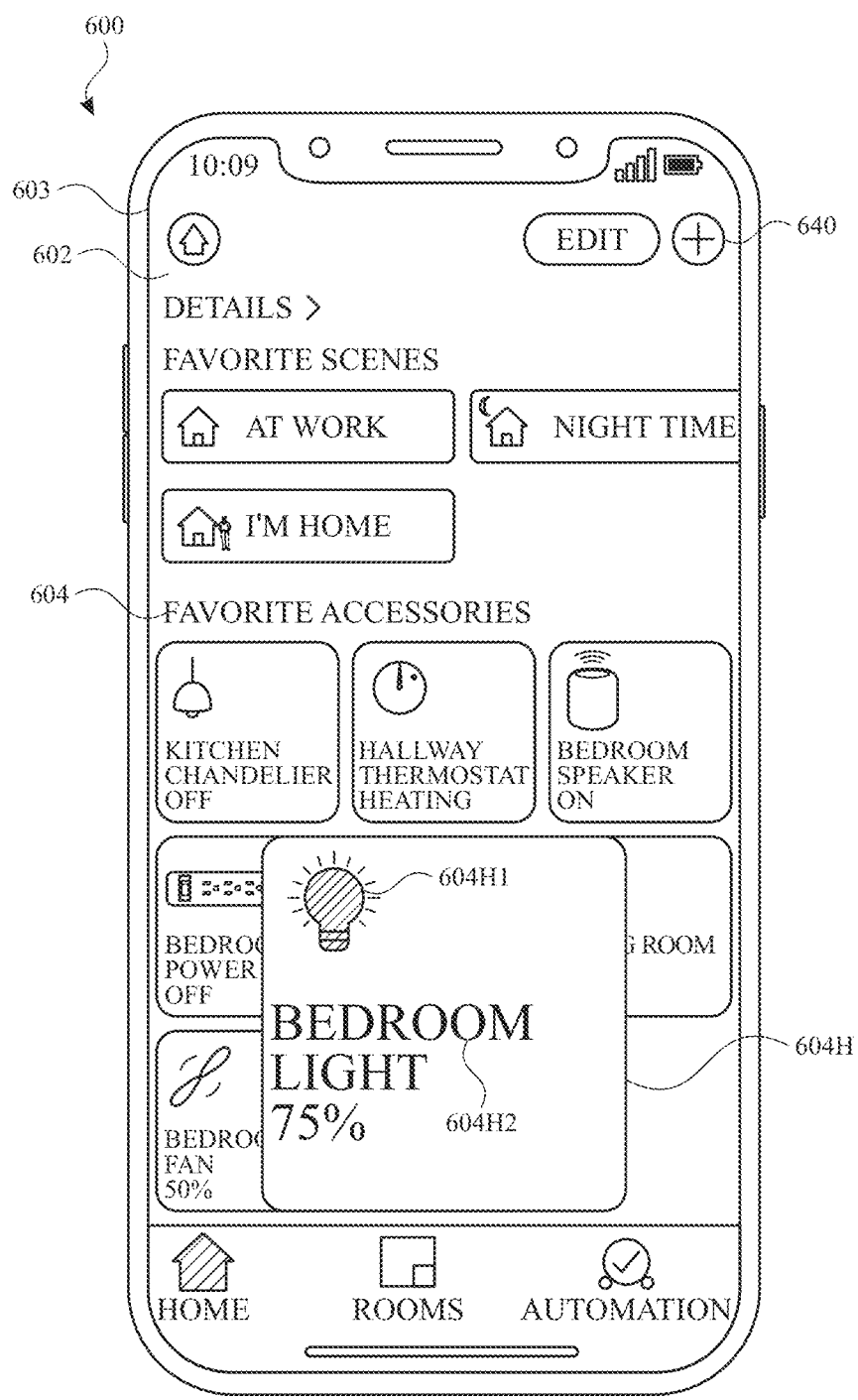
Figure 6N:
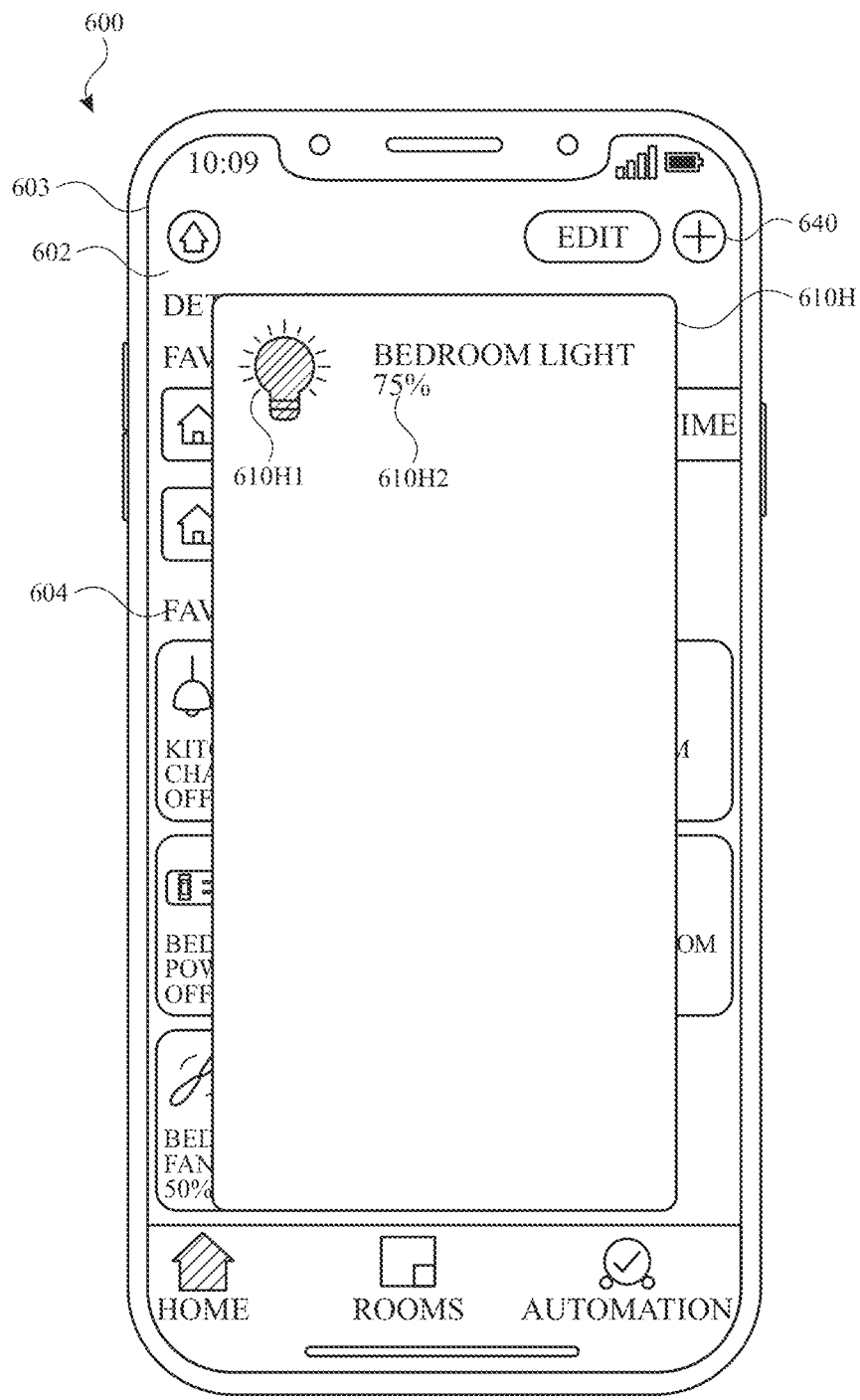
Figure 6O:
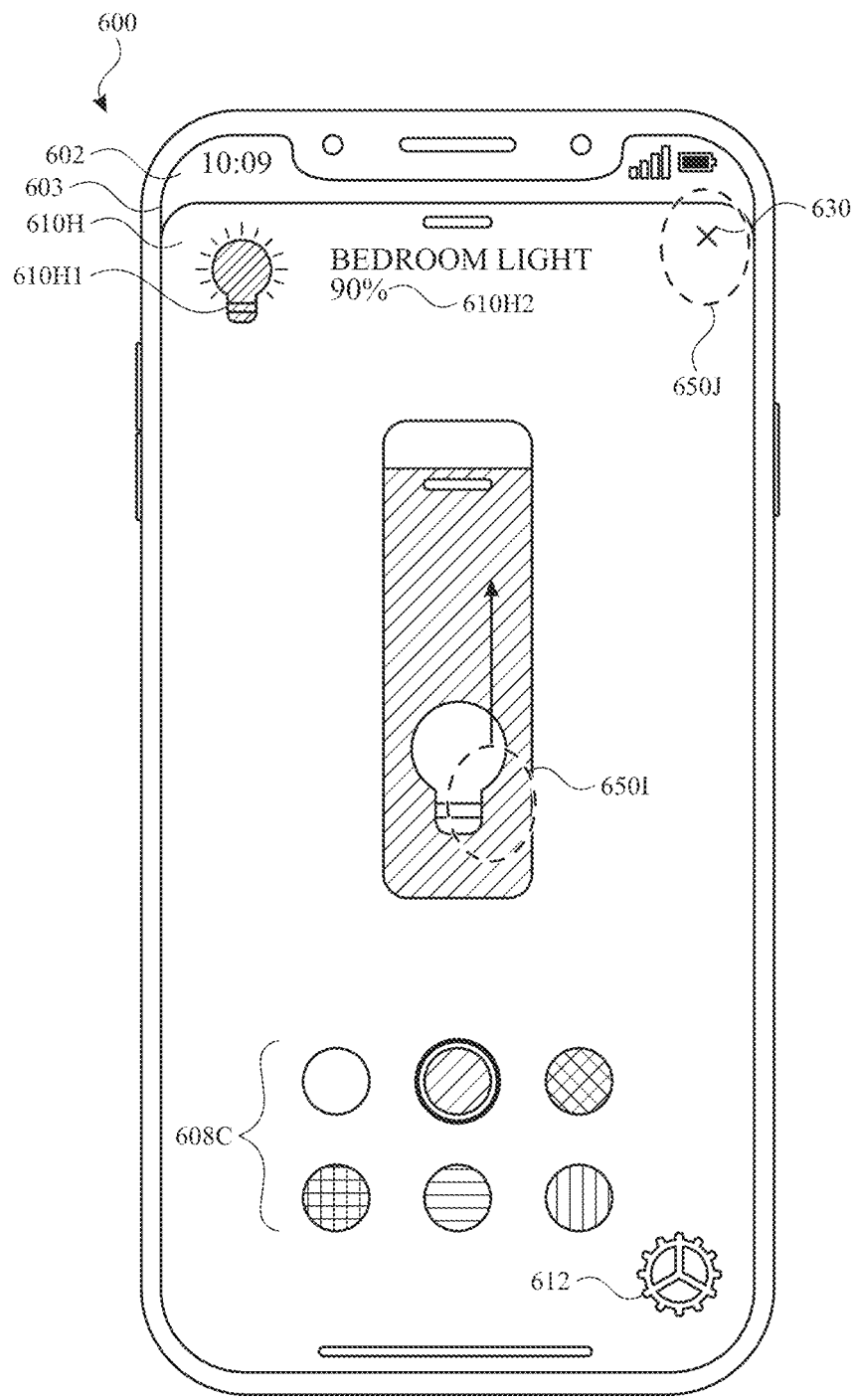
Figure 6P:
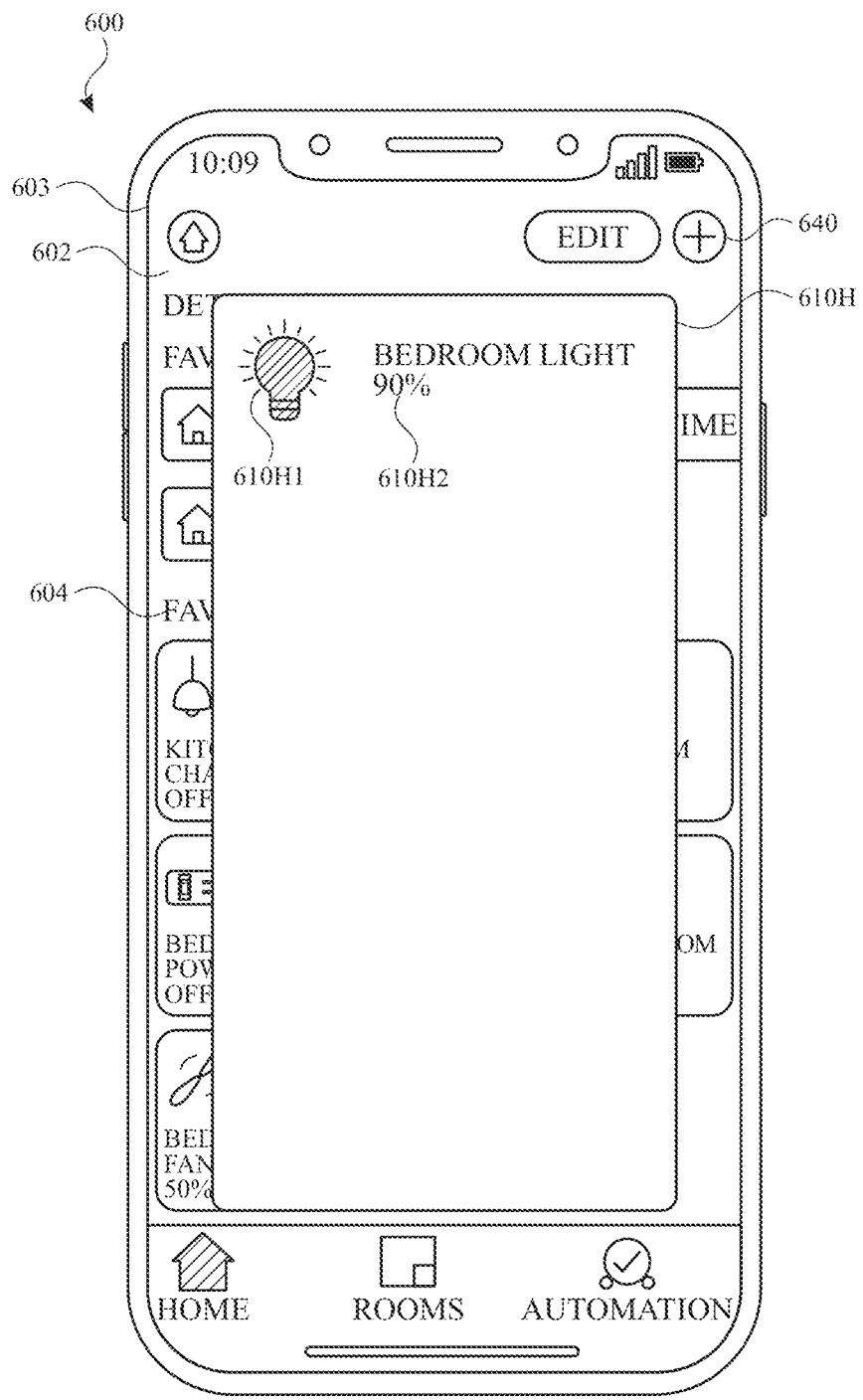
Figure 6Q:
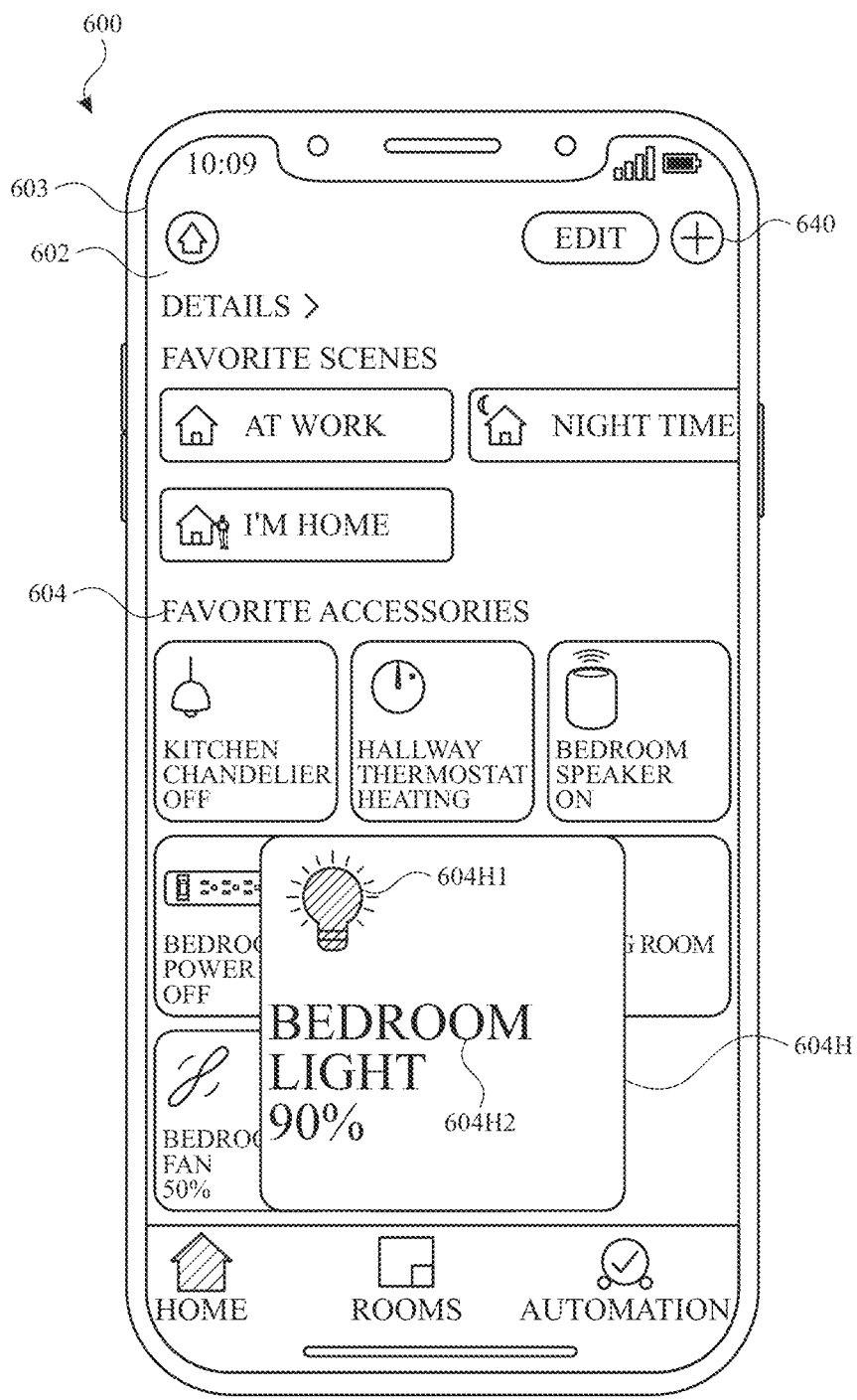
Figure 6R:
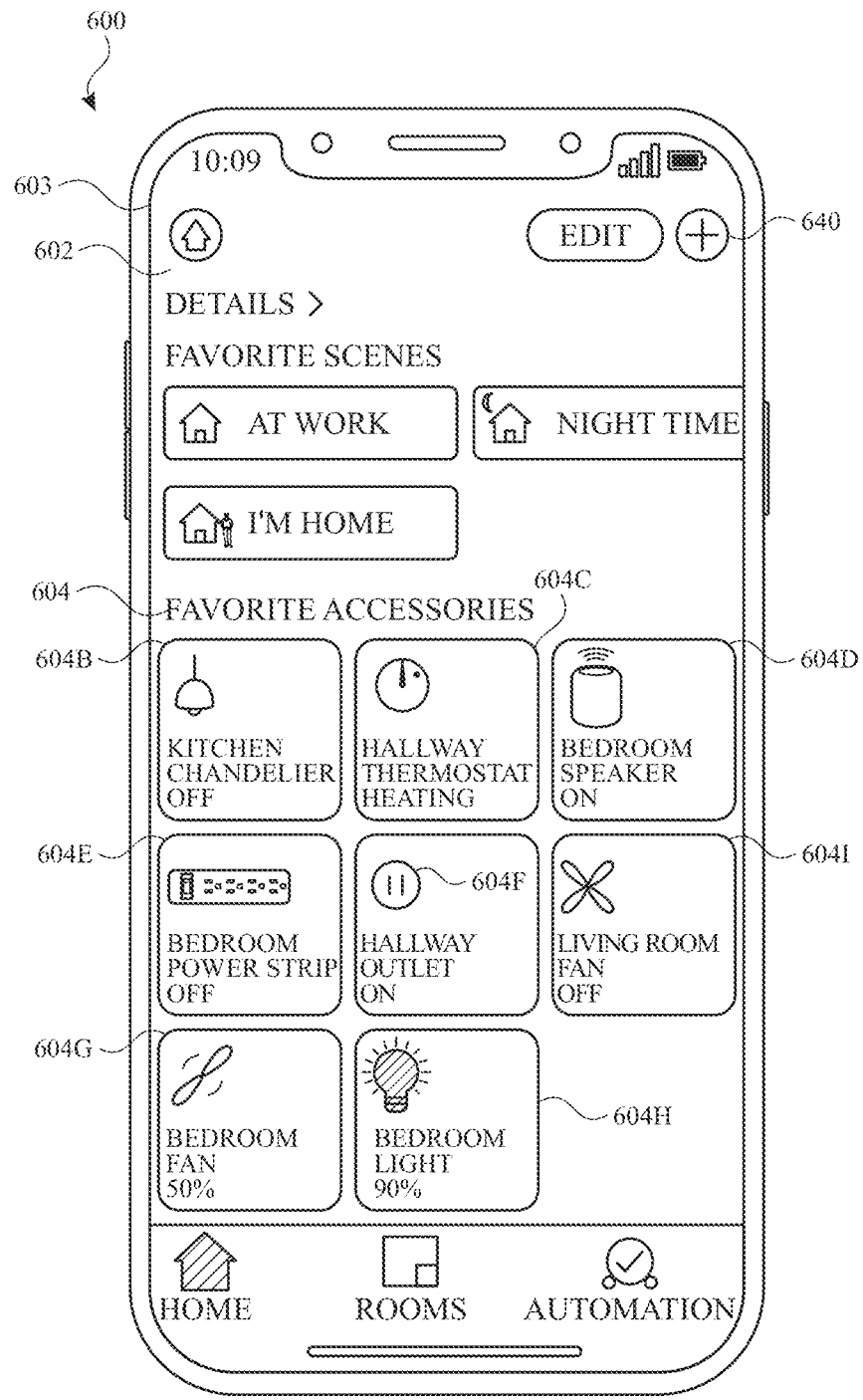

FIGS. 6A-6R and 8A-8J illustrate exemplary user interfaces for managing controllable external devices. FIGS. 7A-7B and 9A-9B are a flow diagrams illustrating methods of managing controllable external devices in accordance with some embodiments. The user interfaces in FIGS. 6A-6R are used to illustrate the processes described below, including the processes in FIGS. 7A-7B. The user interfaces in FIGS. 8A-8J are used to illustrate the processes described below, including the processes in FIGS. 9A-9B.

Figure 10A:
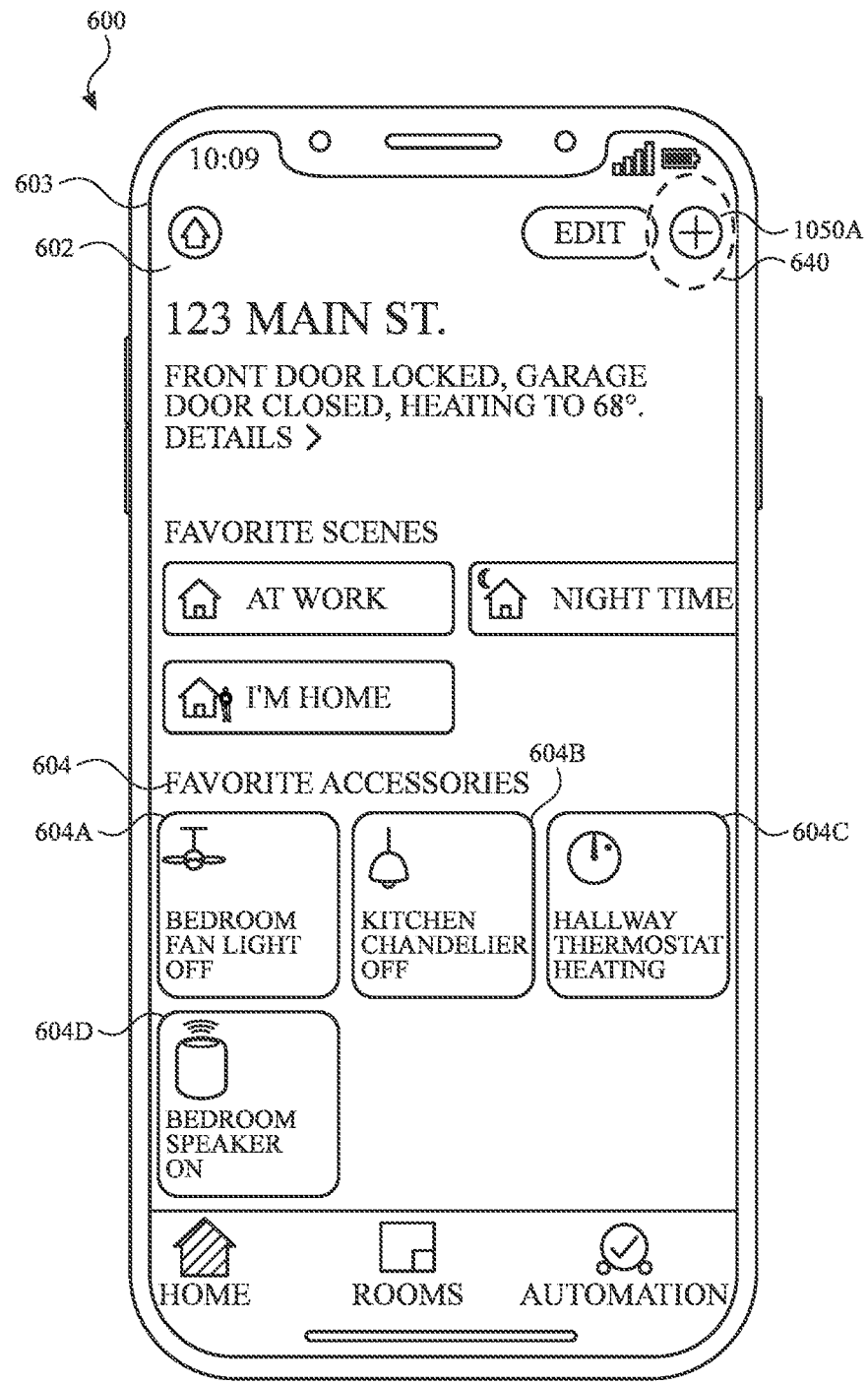

FIGS. 10A-10AC illustrate exemplary user interfaces for managing grouped controllable external devices. FIGS. 11A-11B is a flow diagram illustrating methods of managing grouped controllable external devices in accordance with some embodiments. The user interfaces in FIGS. 8A-8D are used to illustrate the processes described below, including the processes in FIGS. 11A-11B.

Figure 12A:
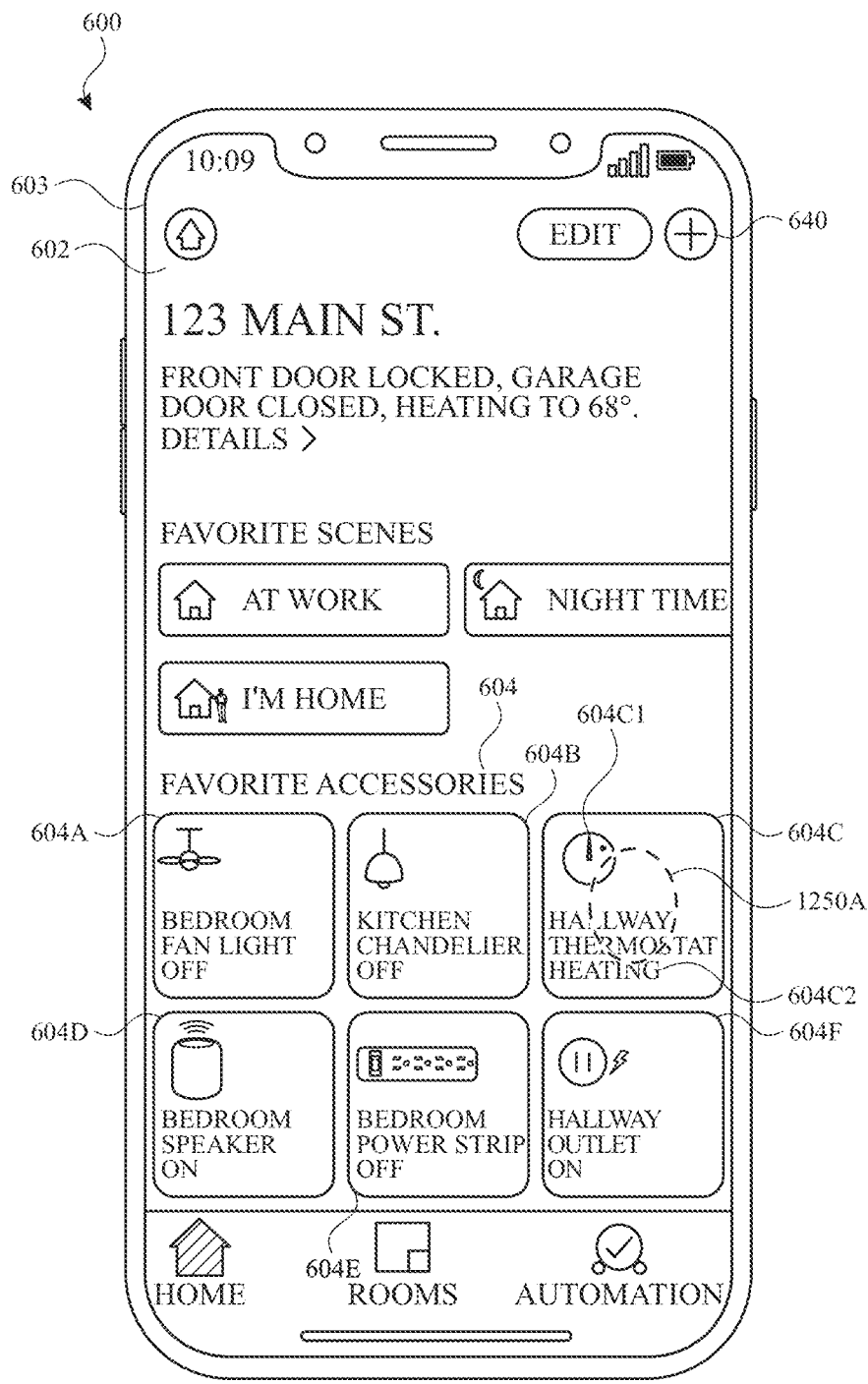
FIGS. 12A-12Q illustrate exemplary user interfaces for managing a thermostat in accordance with some embodiments.
Figure 12B:
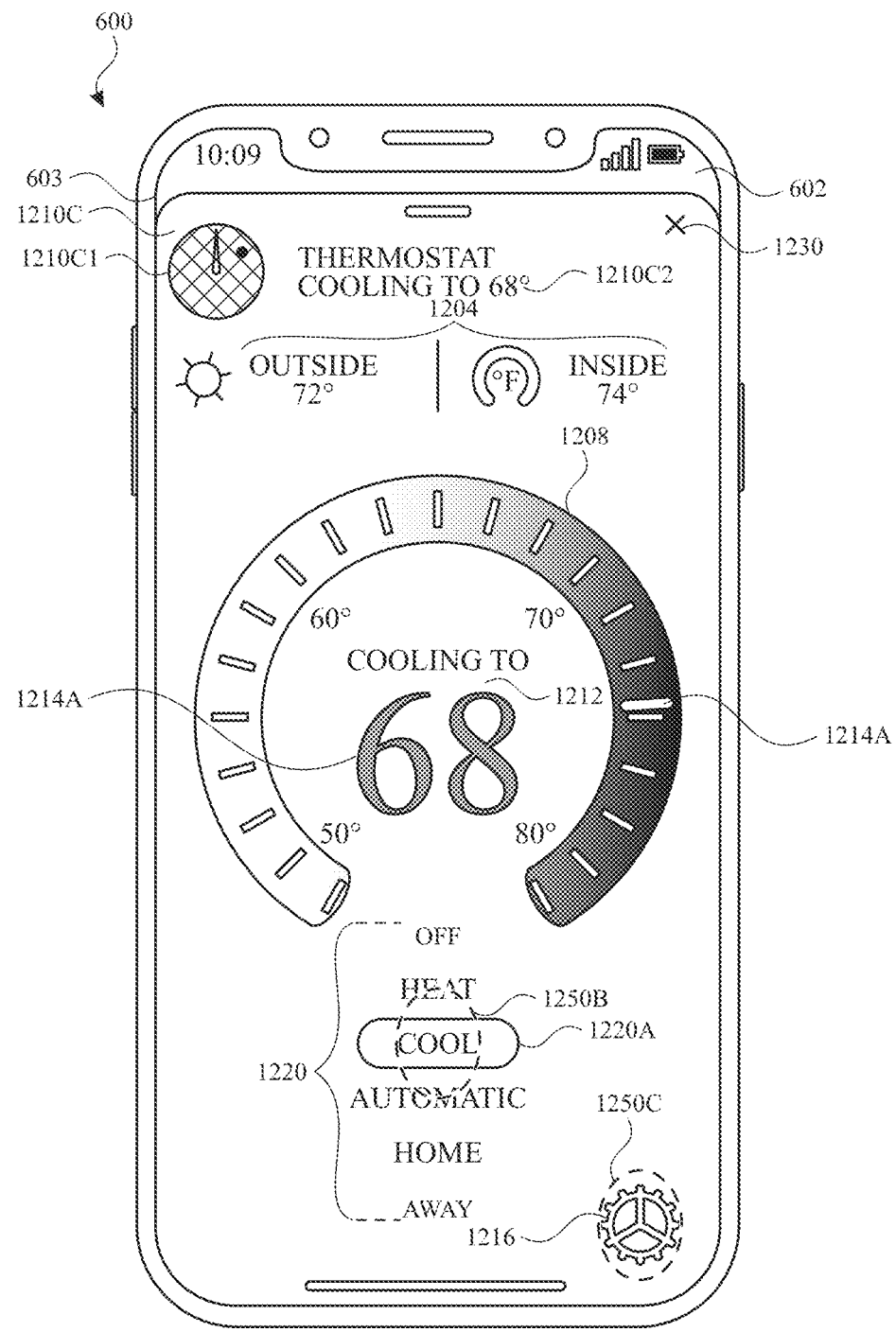
Figure 12C:
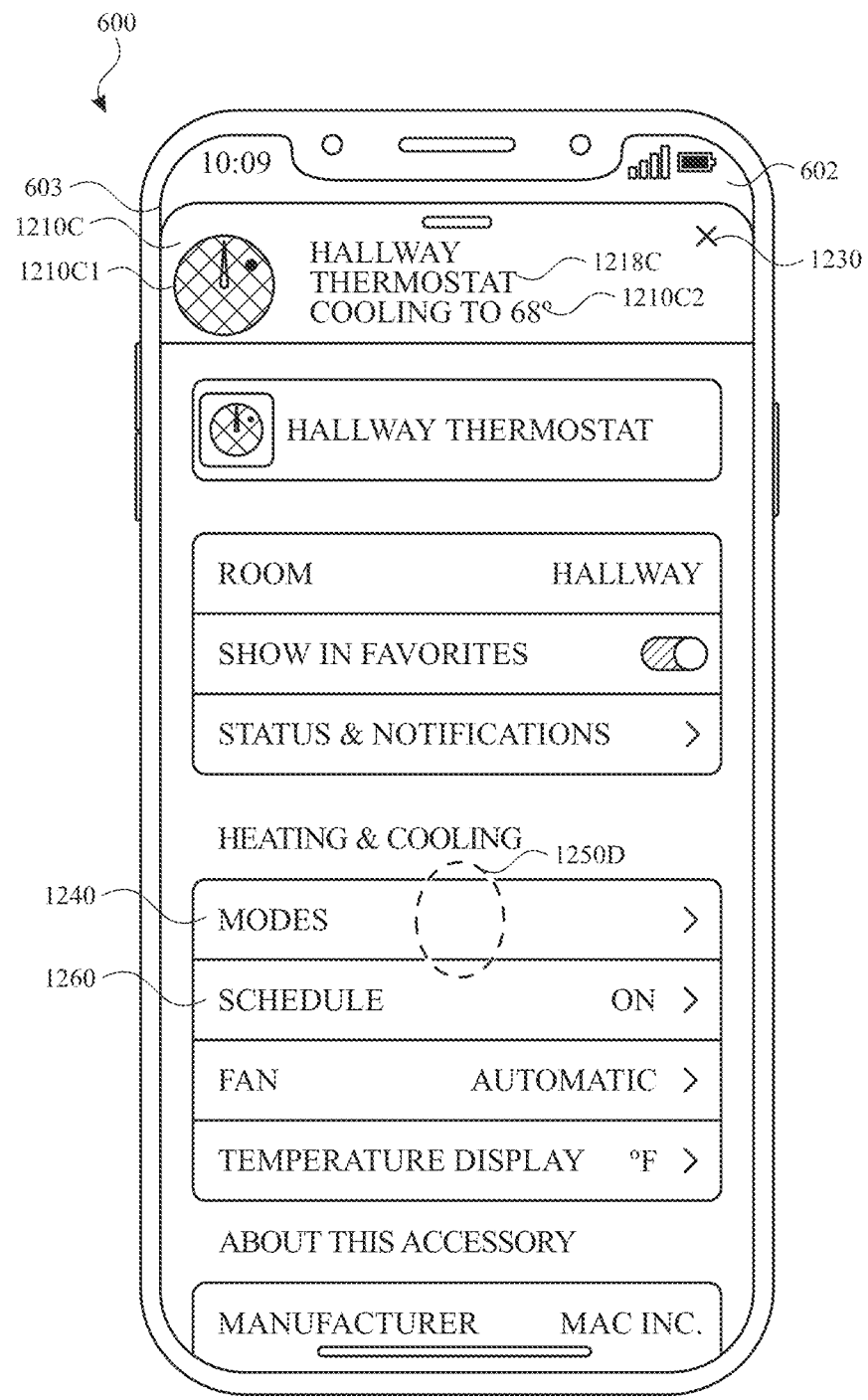
Figure 12D:
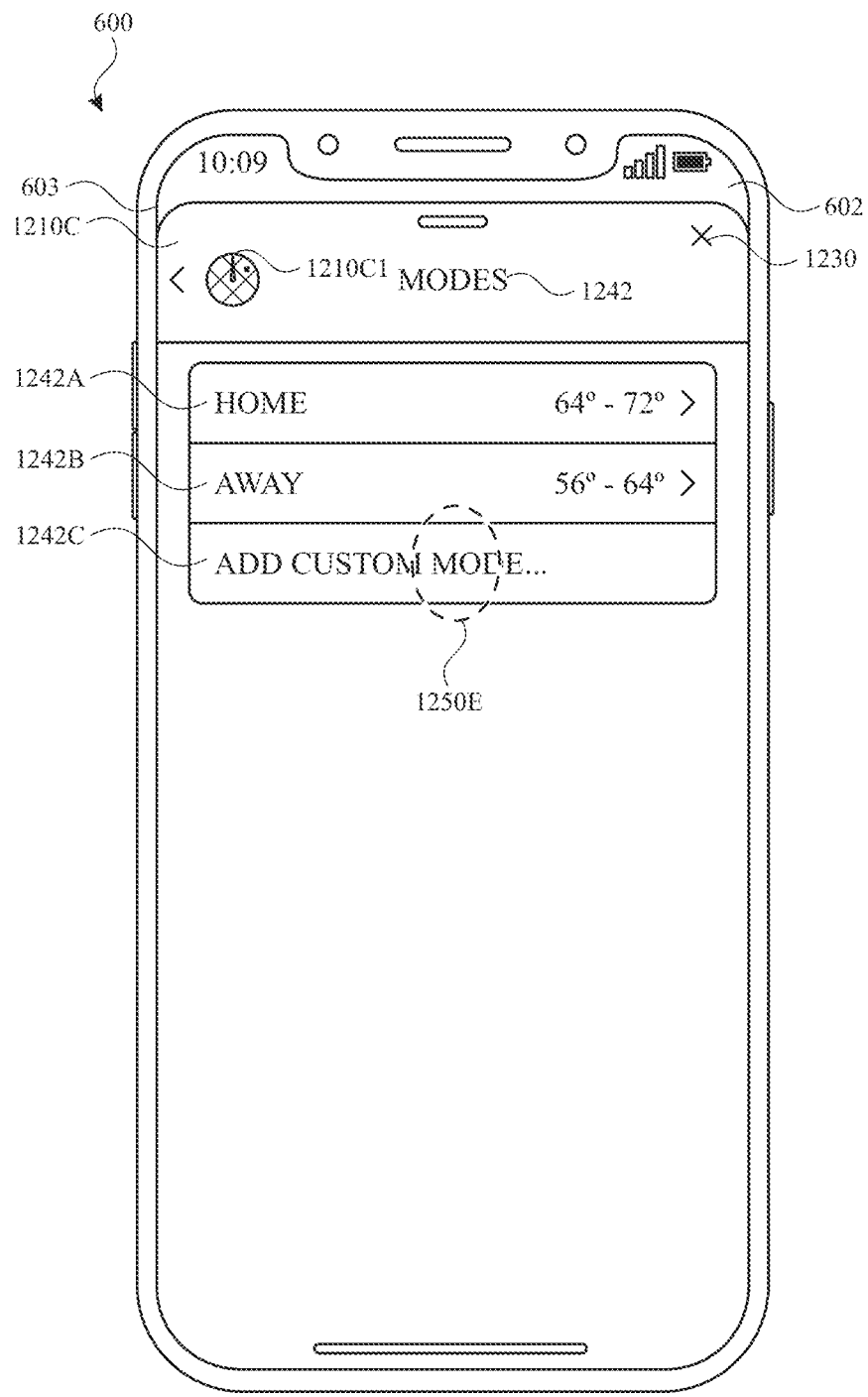
Figure 12E:
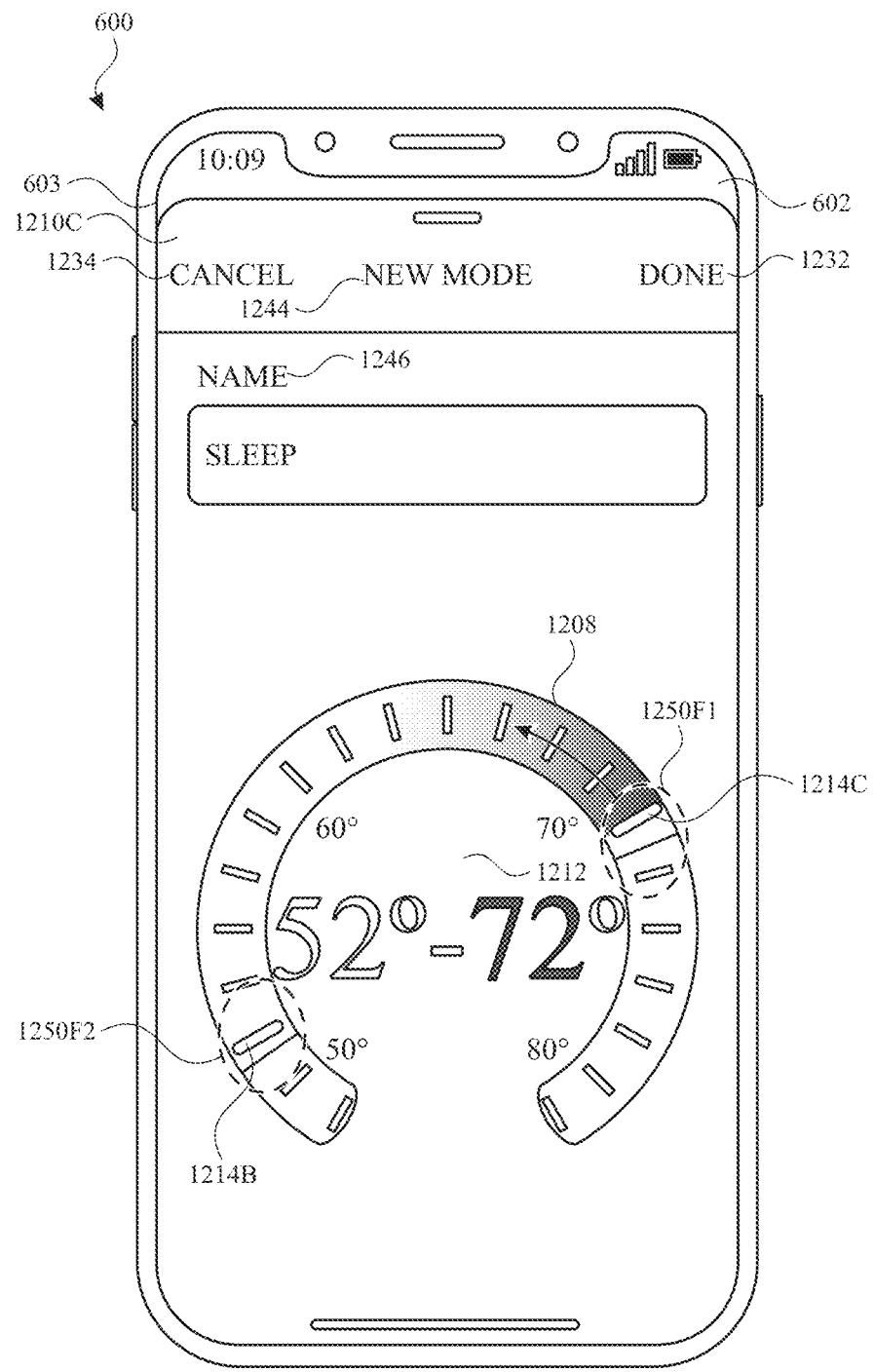
Figure 12F:
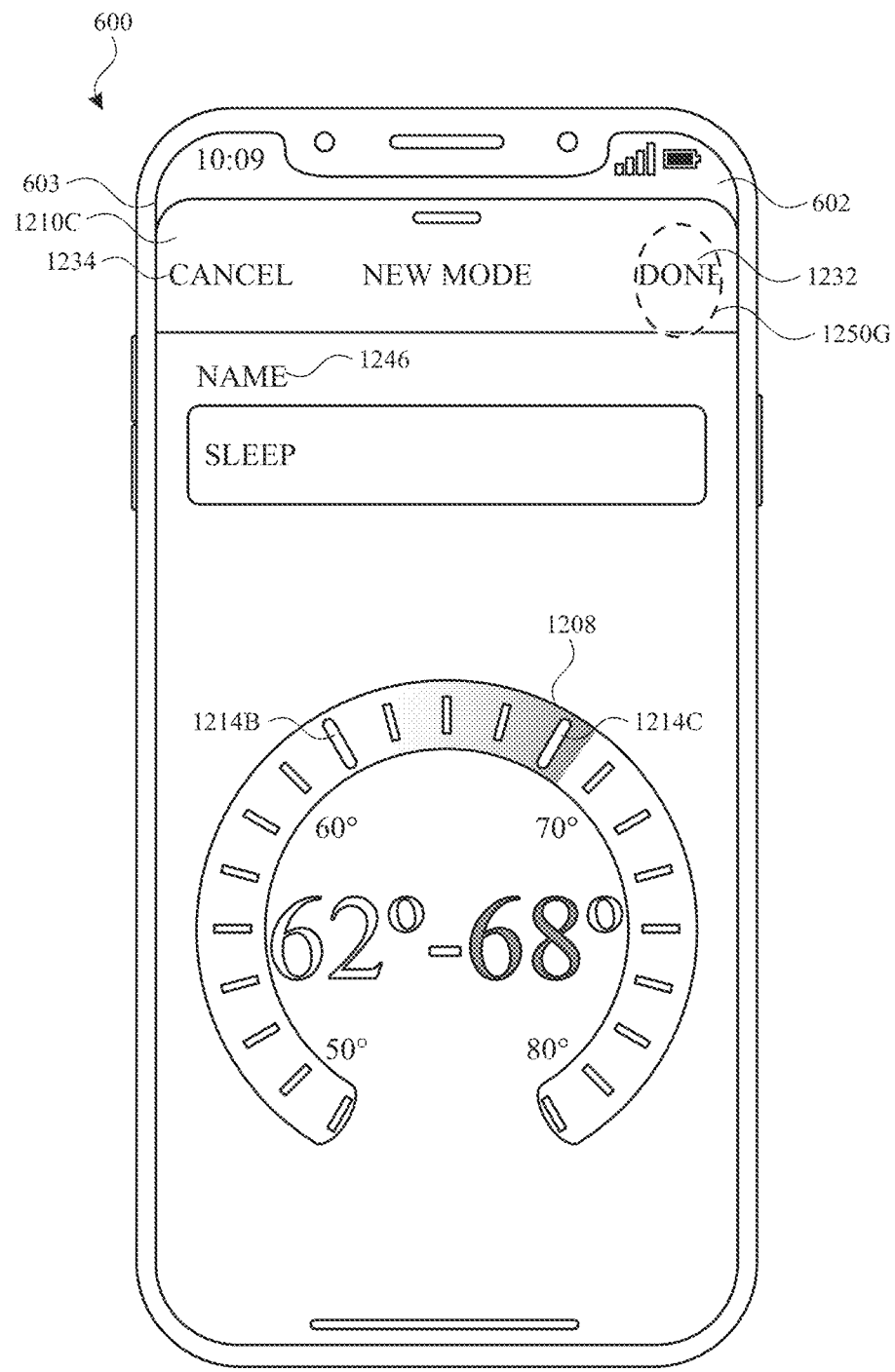
Figure 12G:
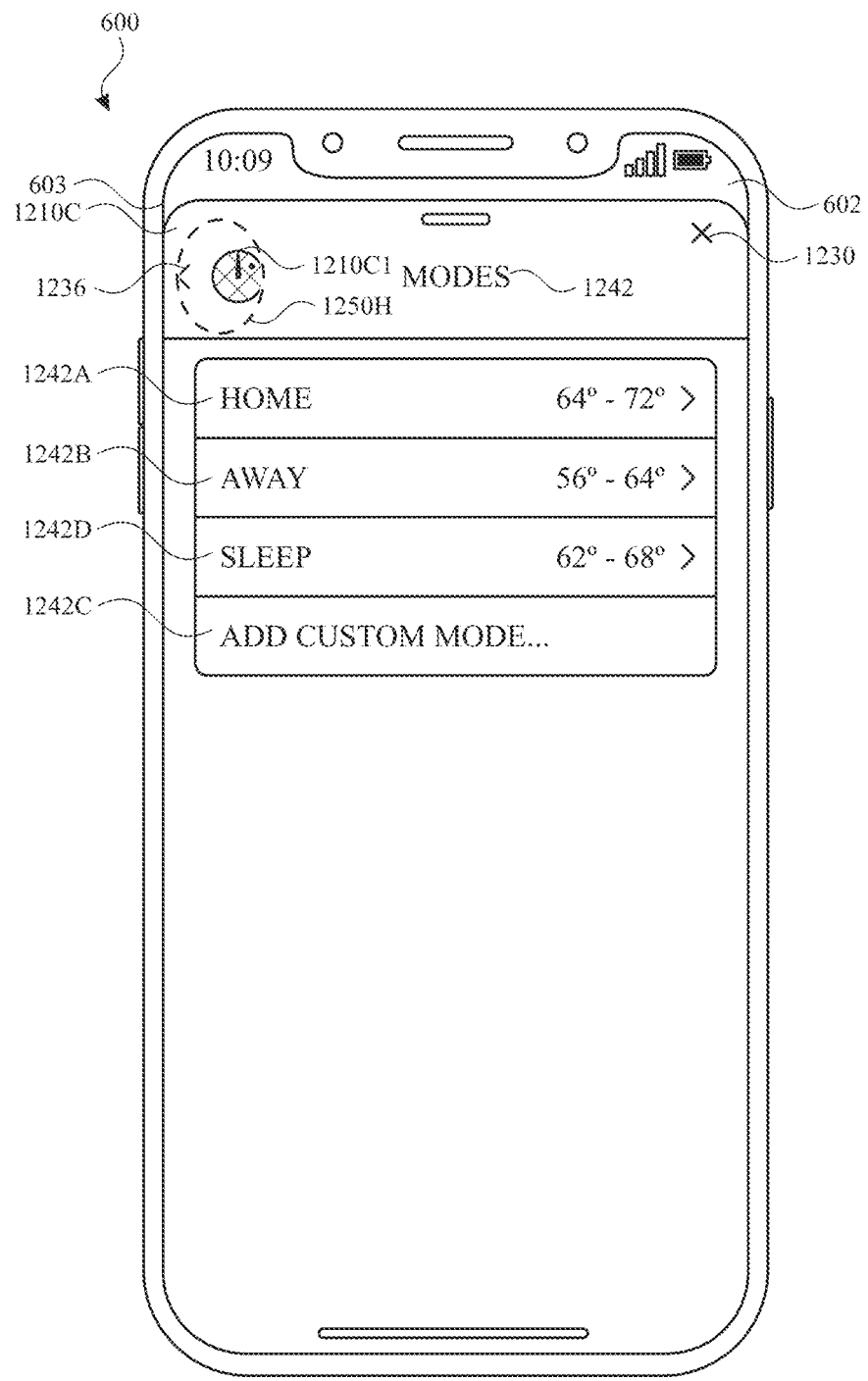
Figure 12H:
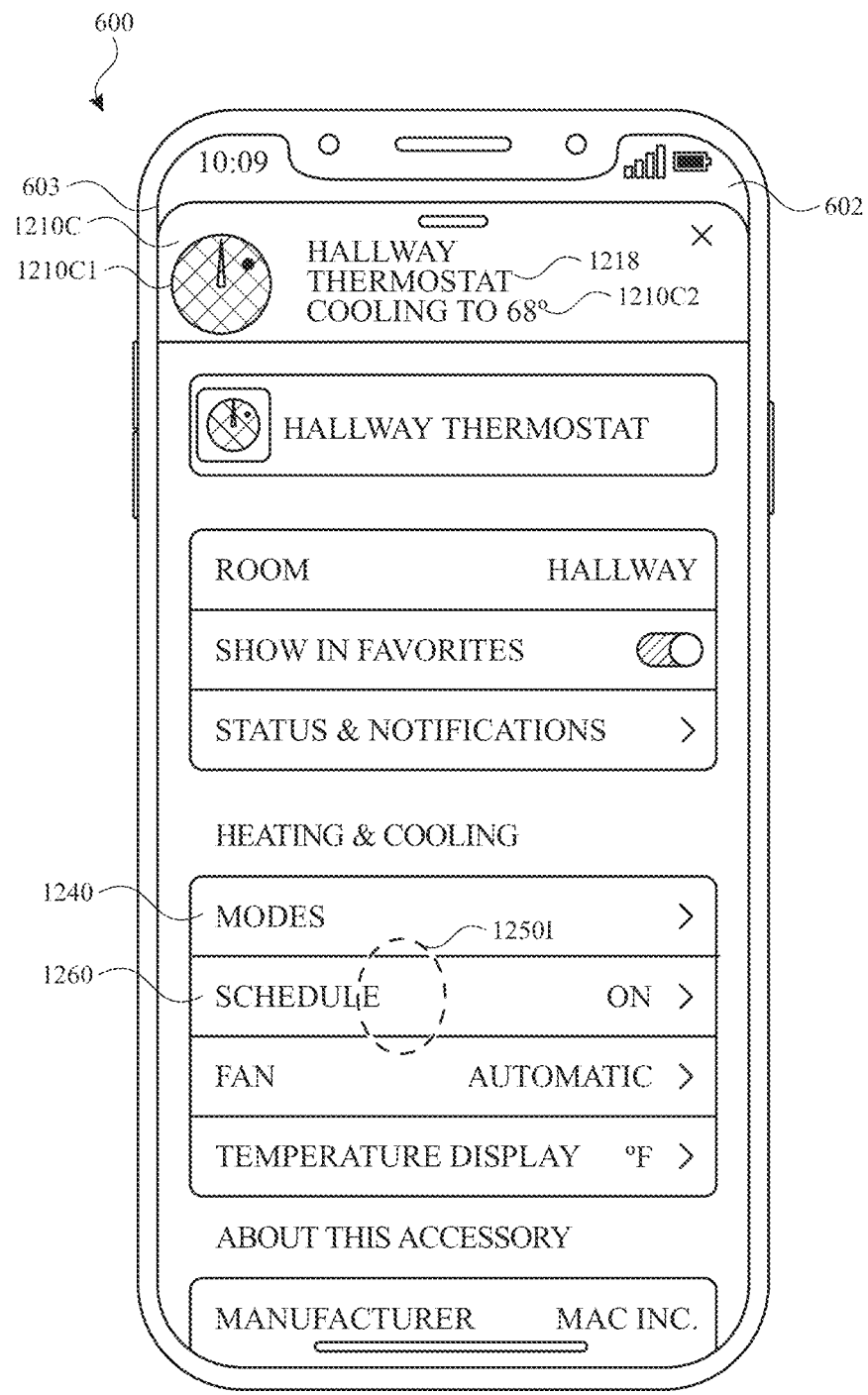
Figure 12I:
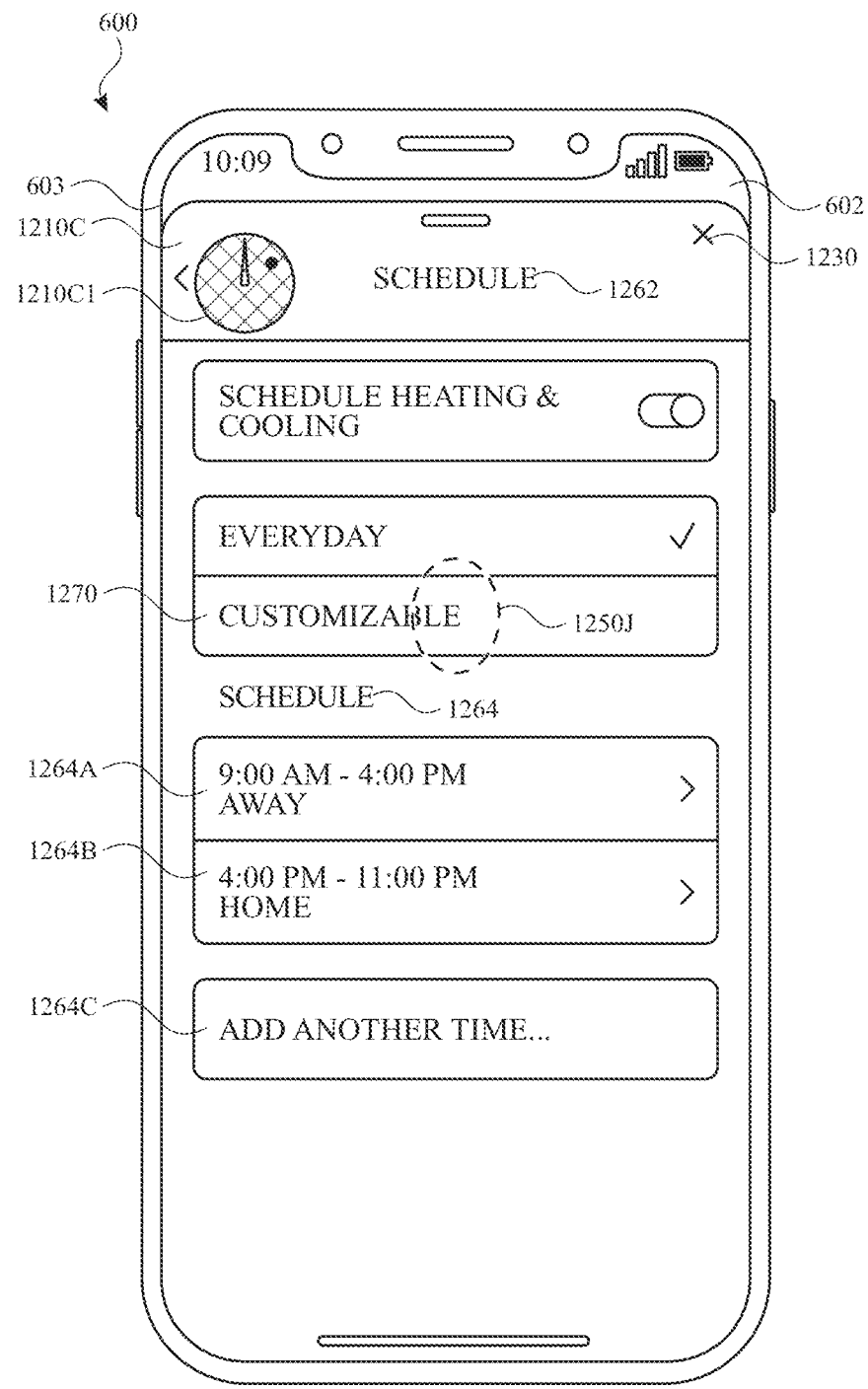
Figure 12J:
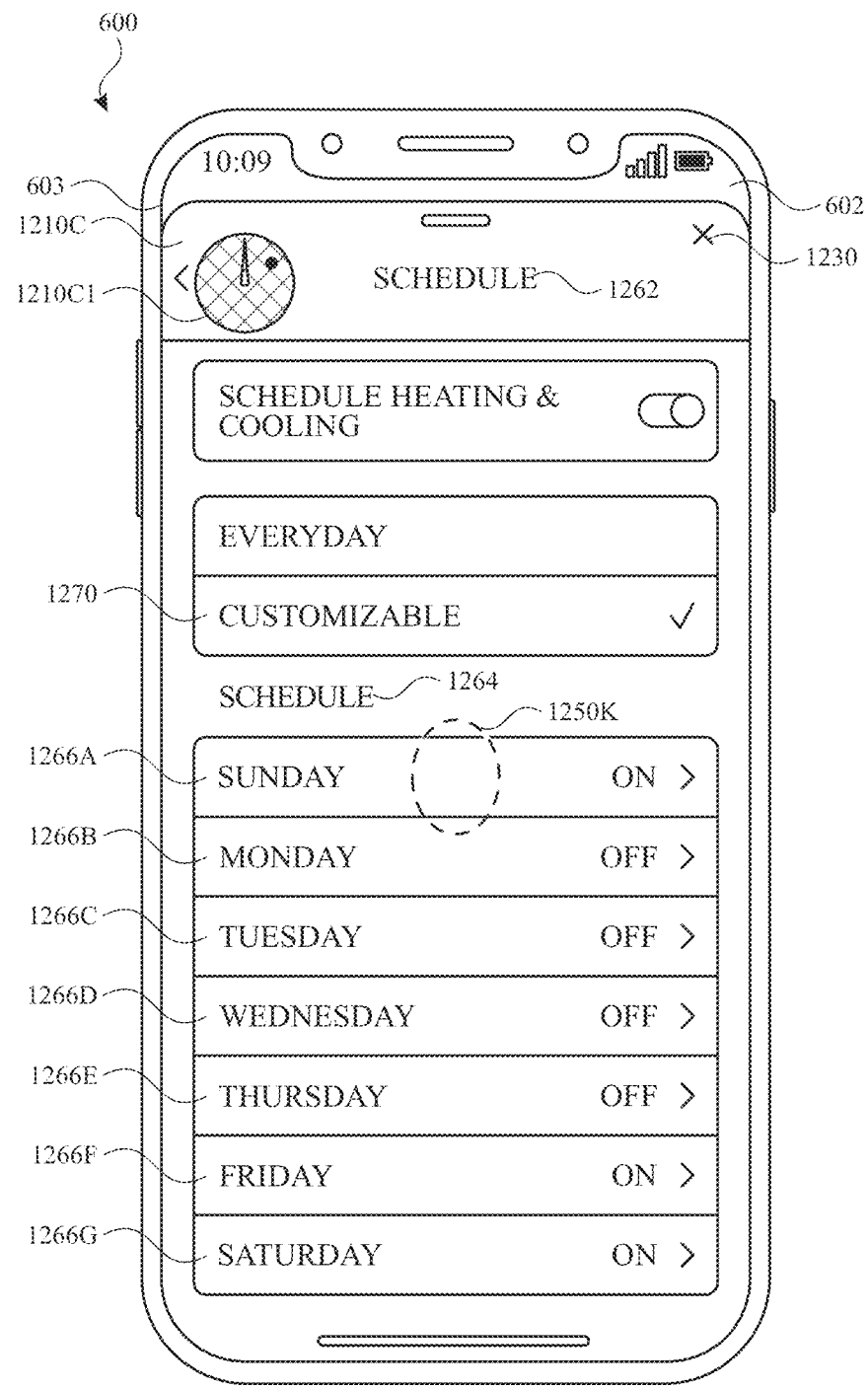
Figure 12K:
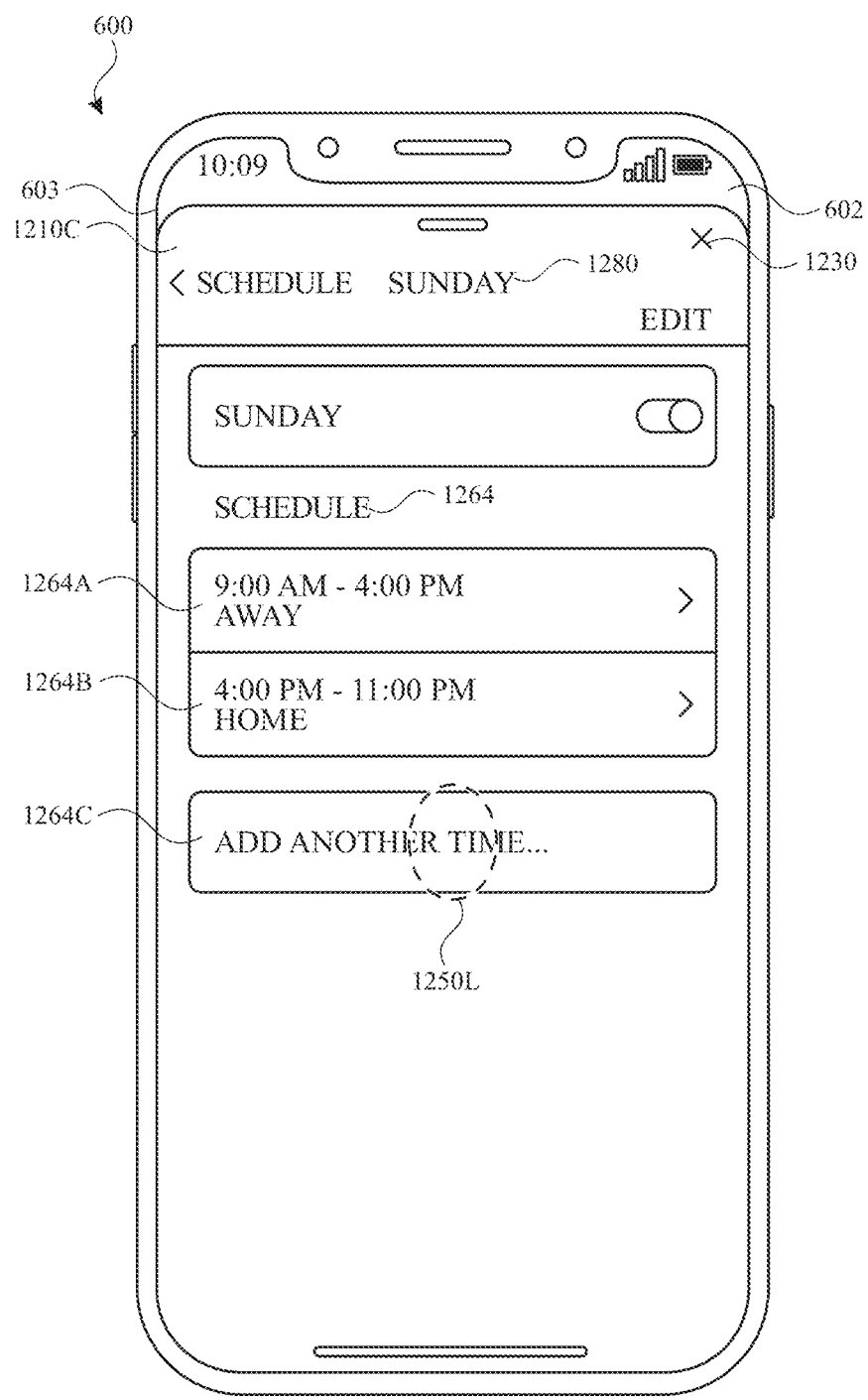
Figure 12L:
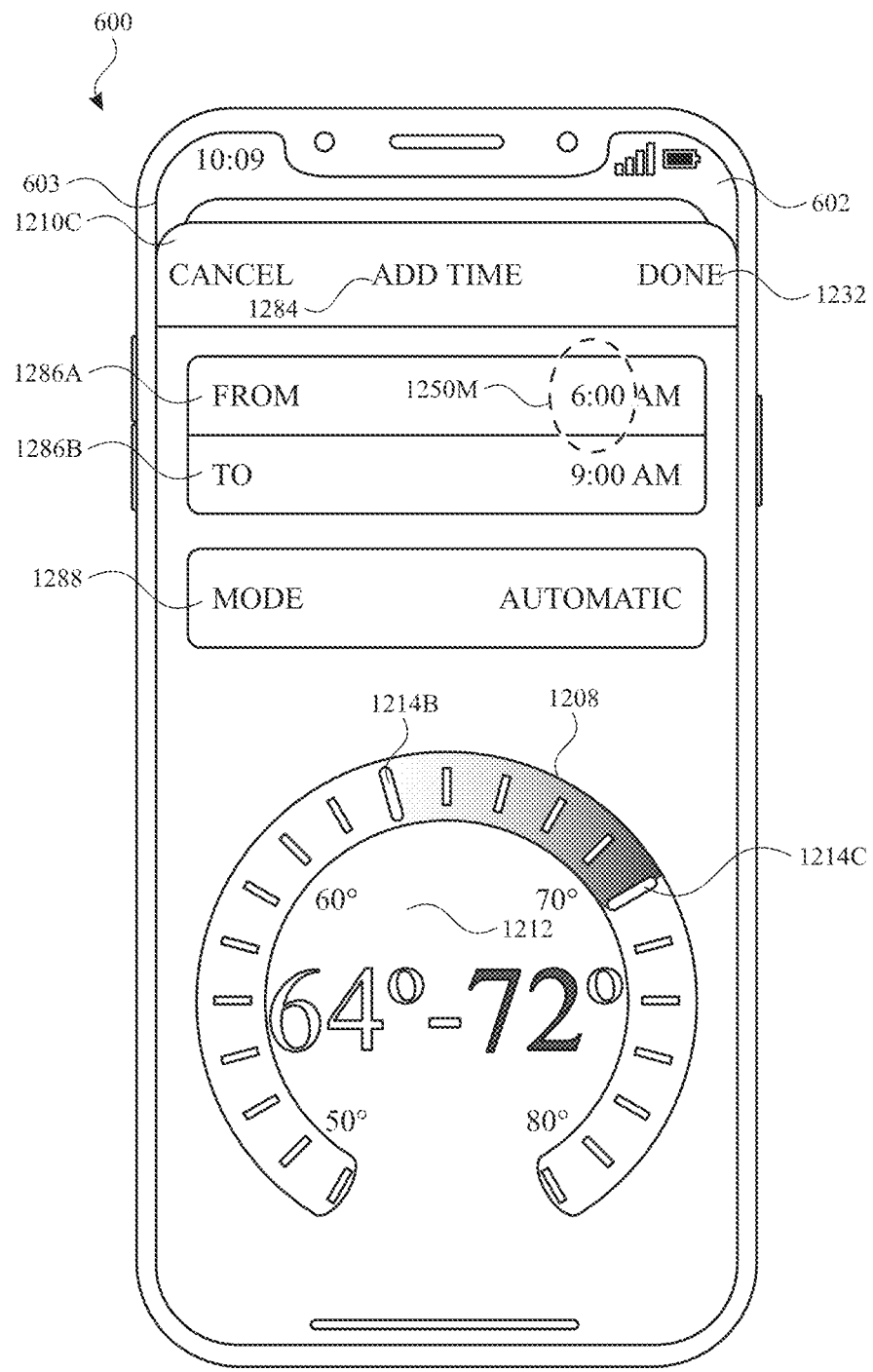
Figure 12M:
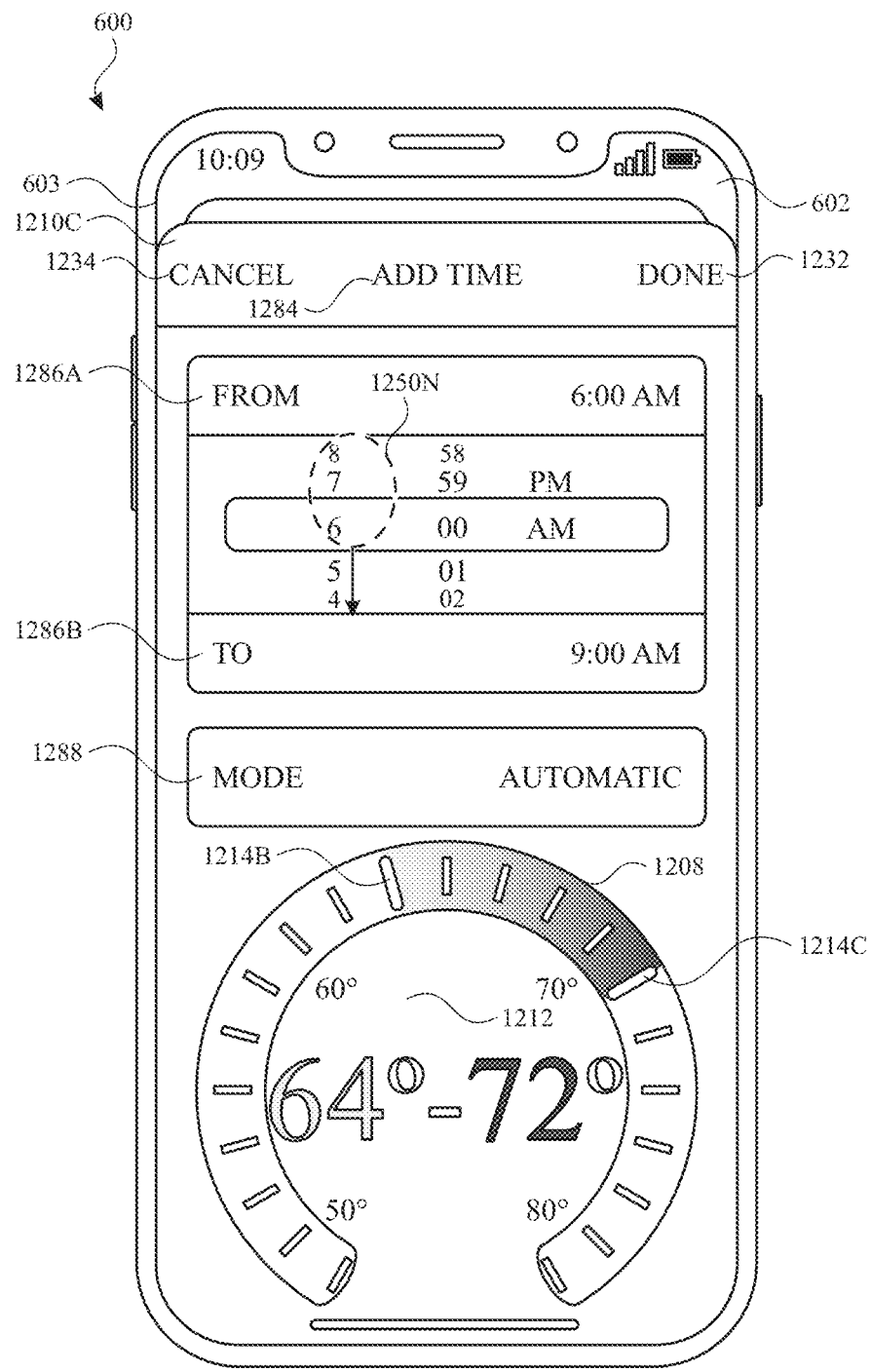
Figure 12N:
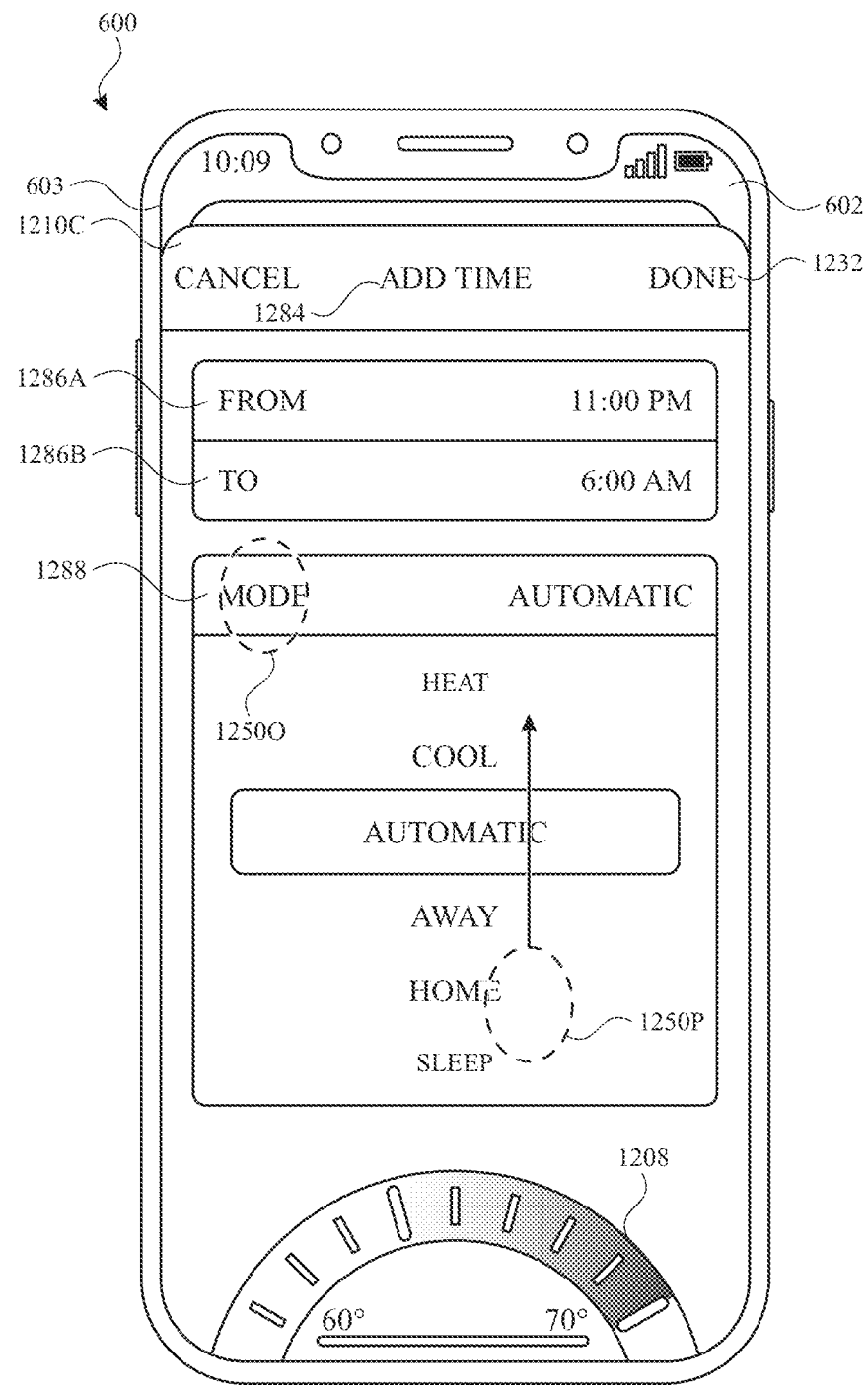
Figure 12O:
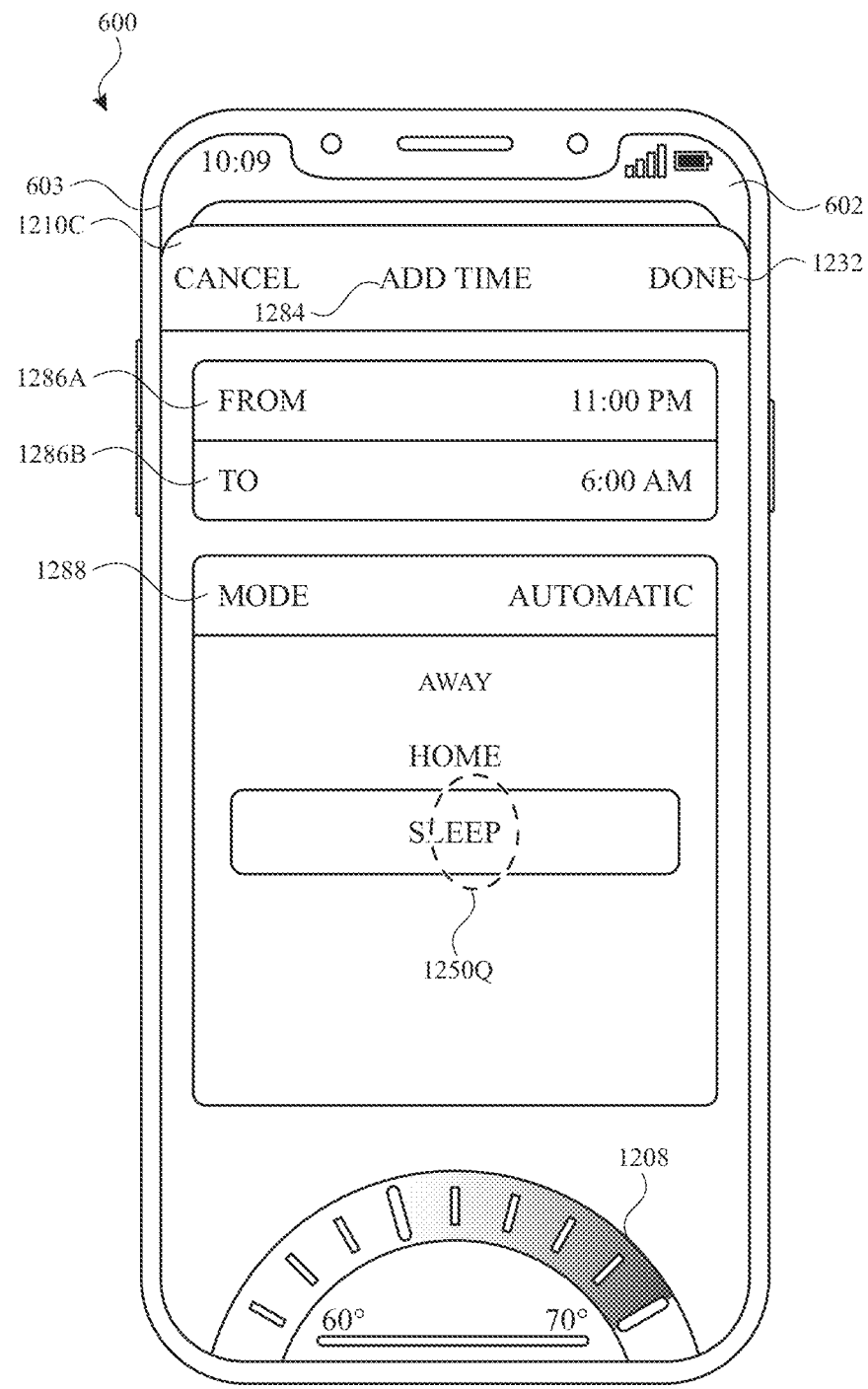
Figure 12P:
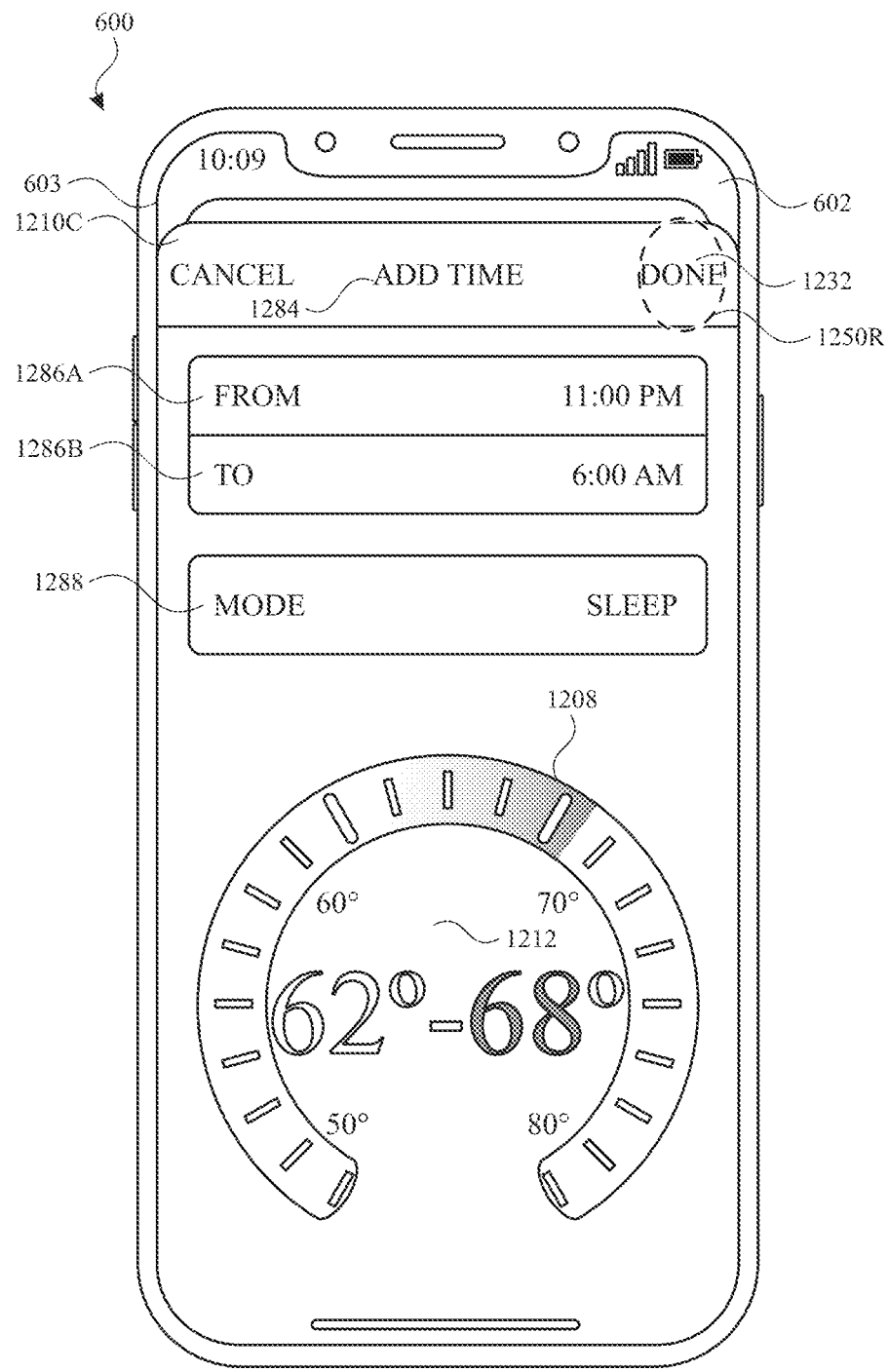
Figure 12Q:
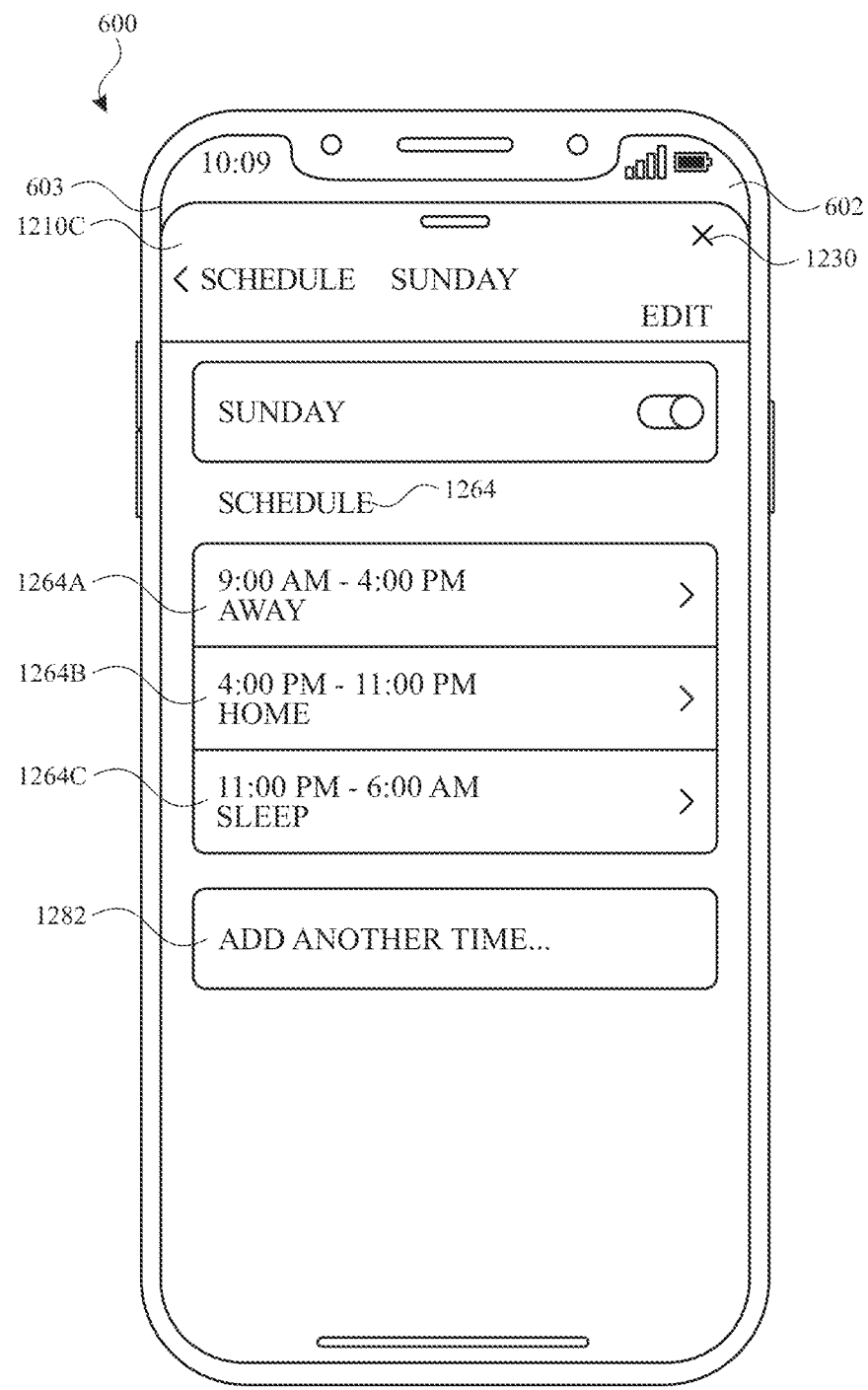

FIGS. 12A-12Q illustrate exemplary user interfaces for managing a thermostat. FIGS. 13A-13B is a flow diagram illustrating methods of managing a thermostat in accordance with some embodiments. The user interfaces in FIGS. 12A-12Q are used to illustrate the processes described below, including the processes in FIGS. 13A-13B.

Figure 14A:
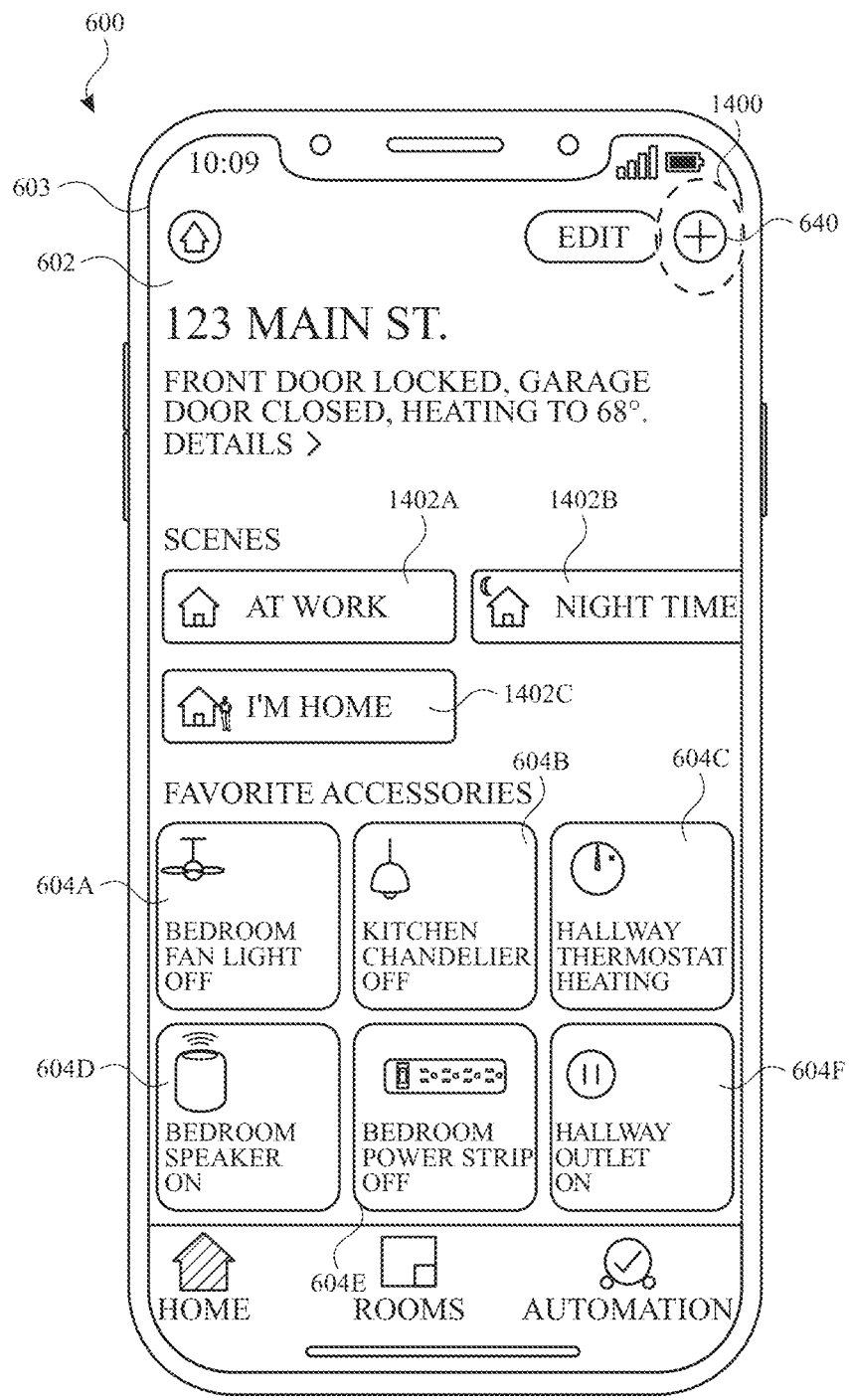
FIGS. 14A-14T illustrates exemplary user interfaces for managing a group of controllable external devices including a speaker in accordance with some embodiments.
Figure 14B:
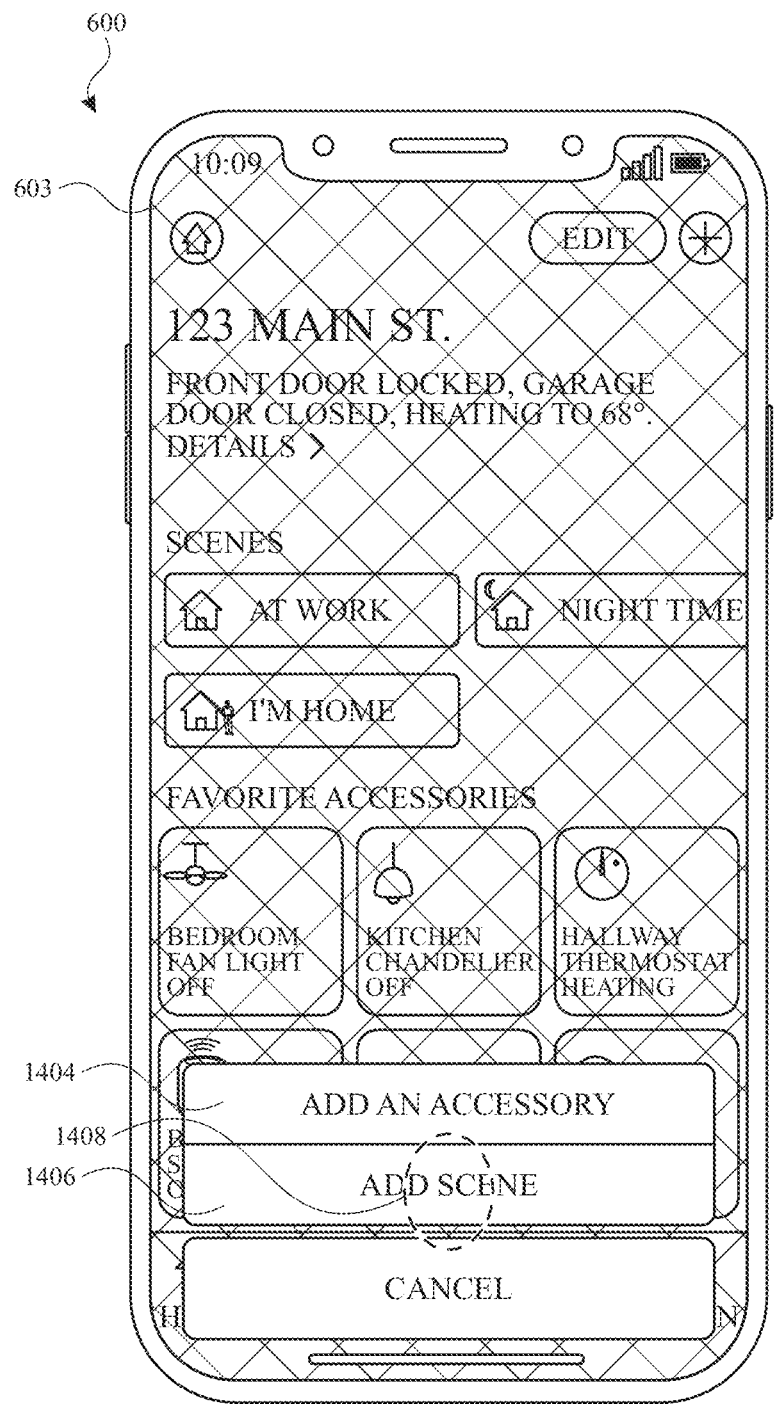
Figure 14C:
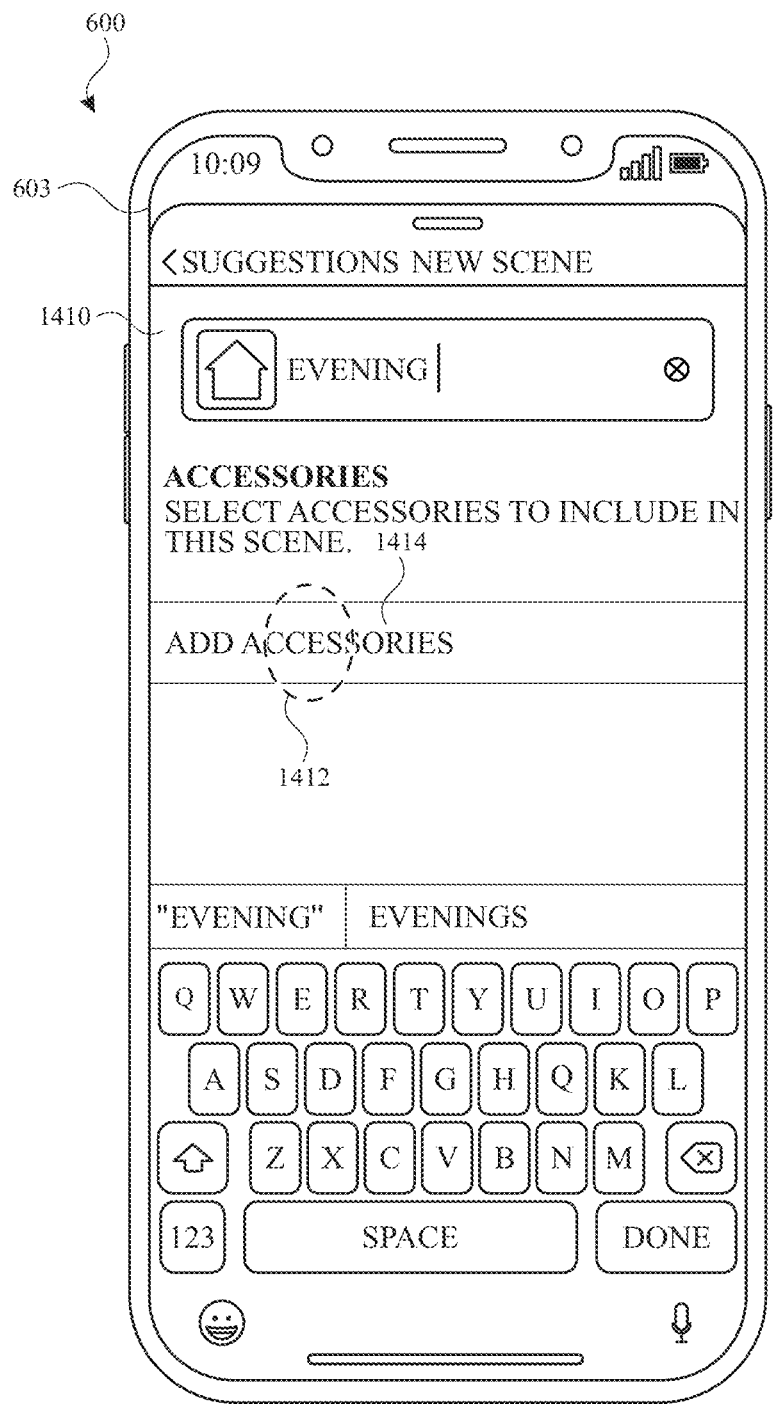
Figure 14D:
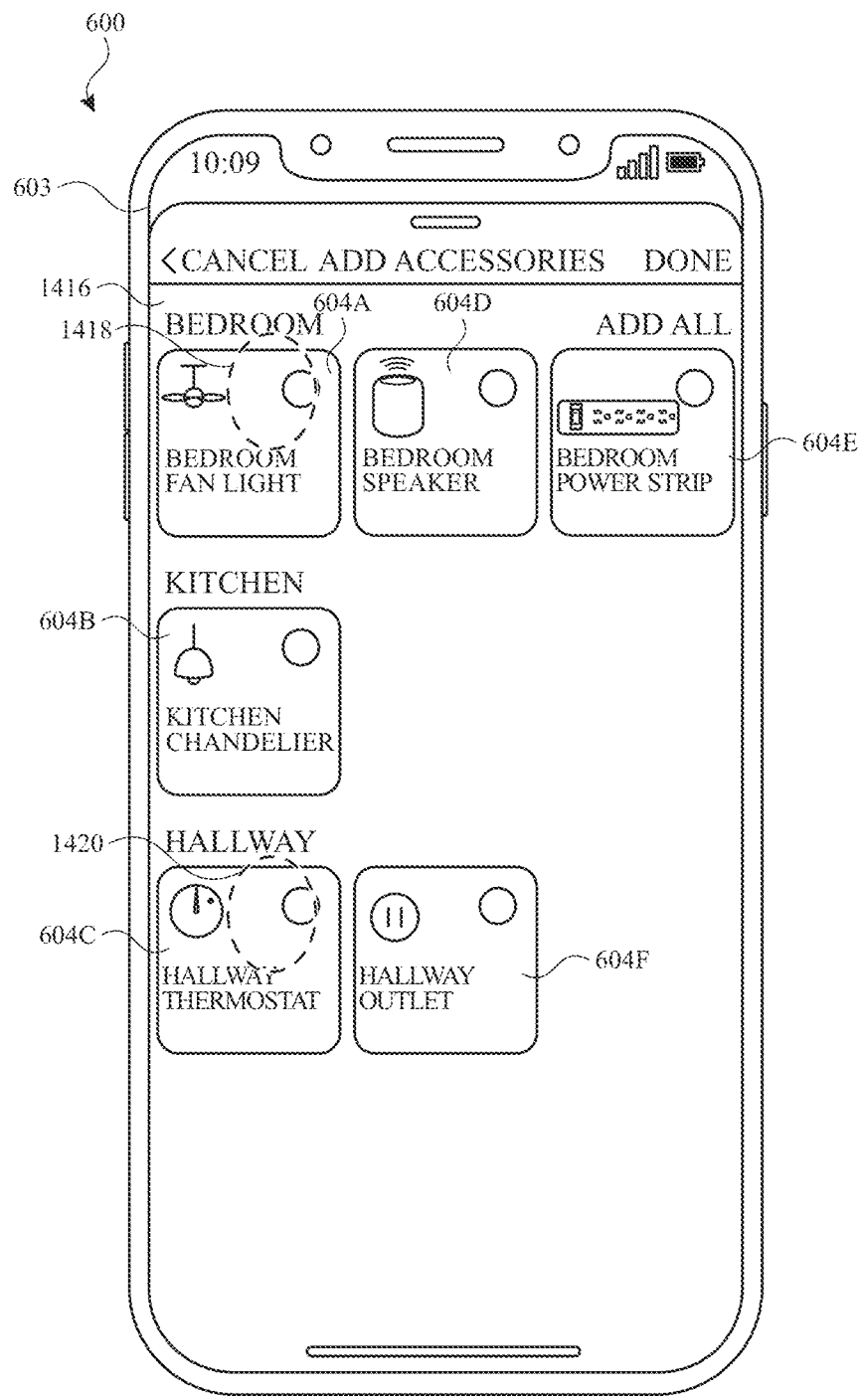
Figure 14E:
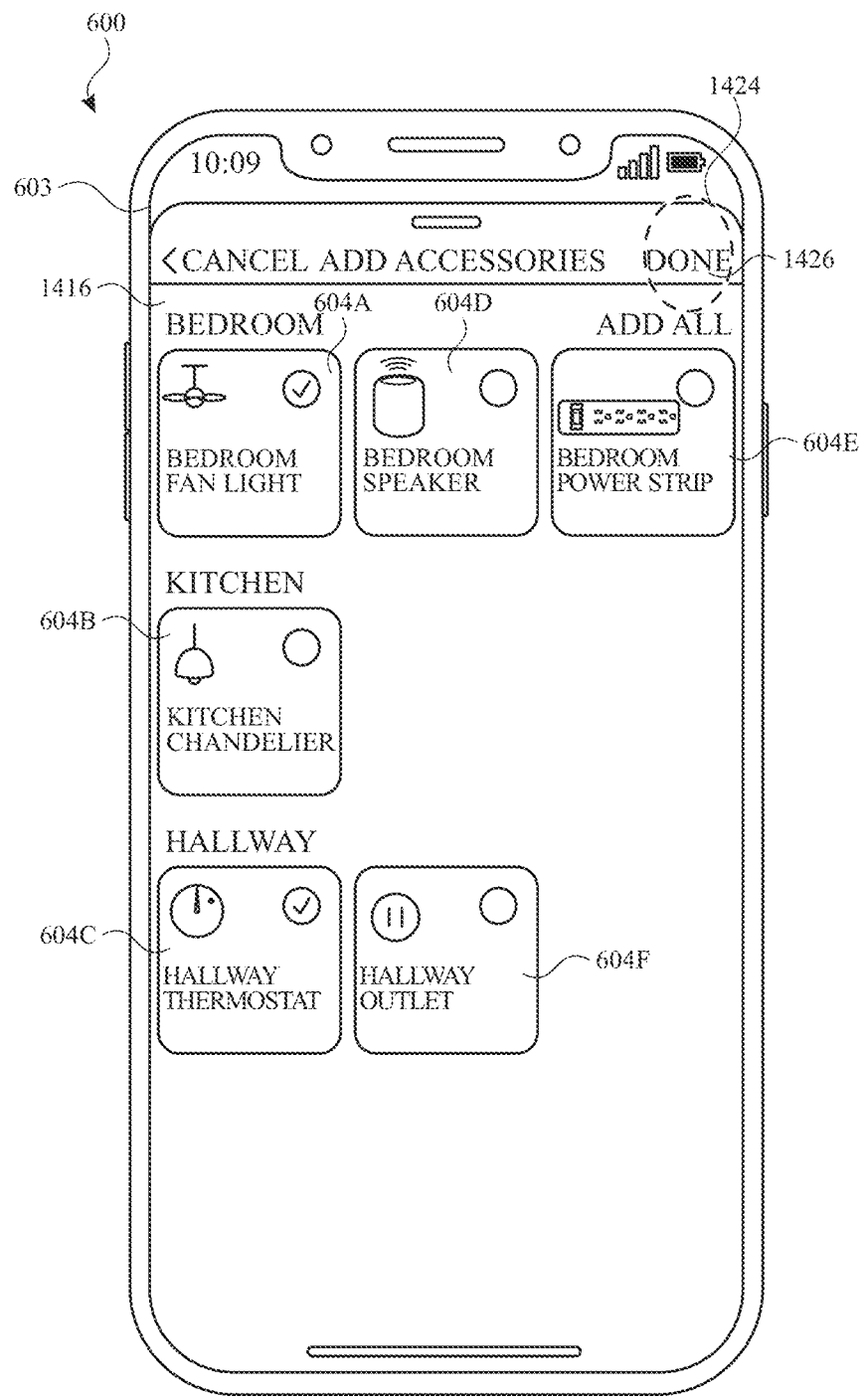
Figure 14F:
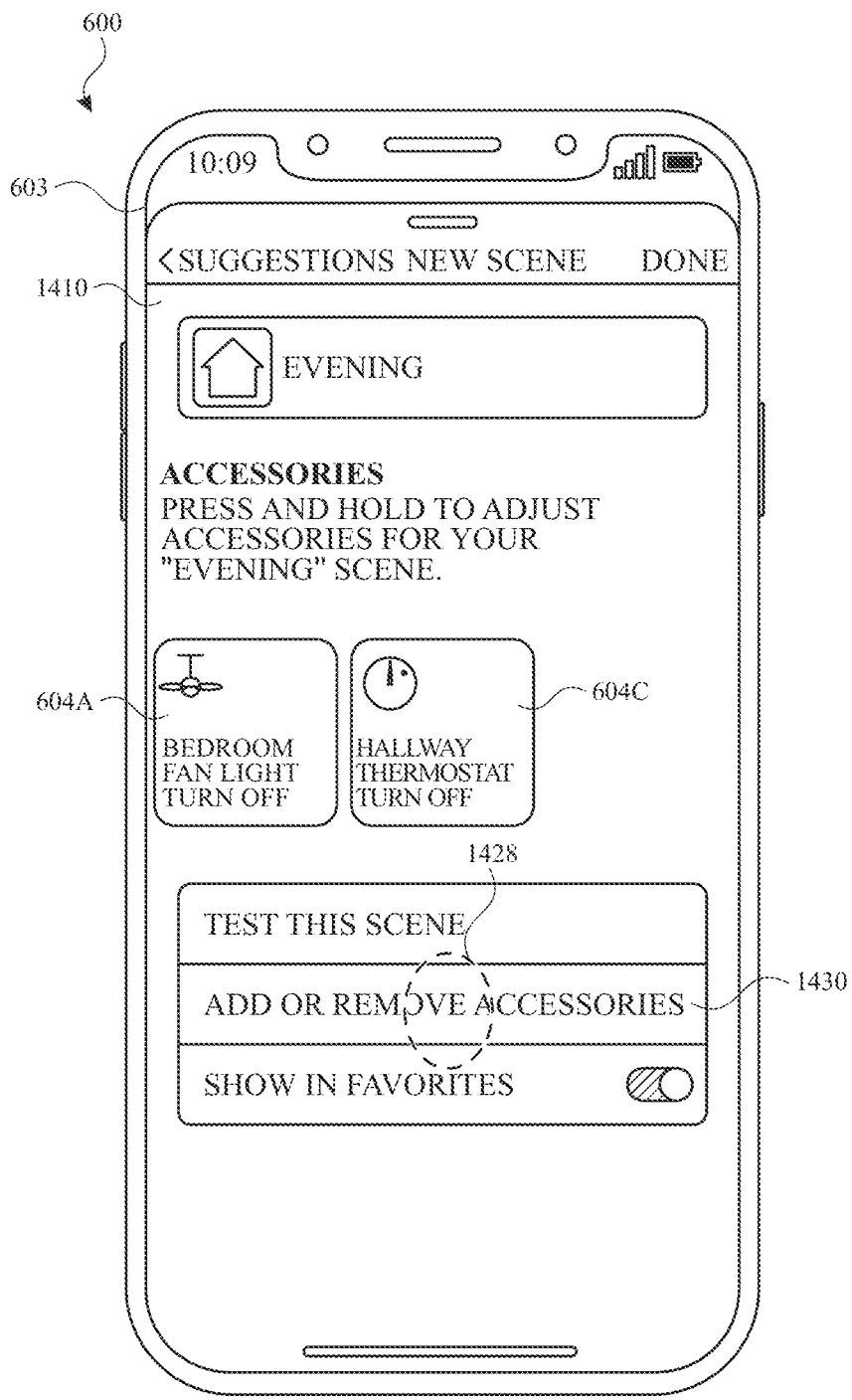
Figure 14G:
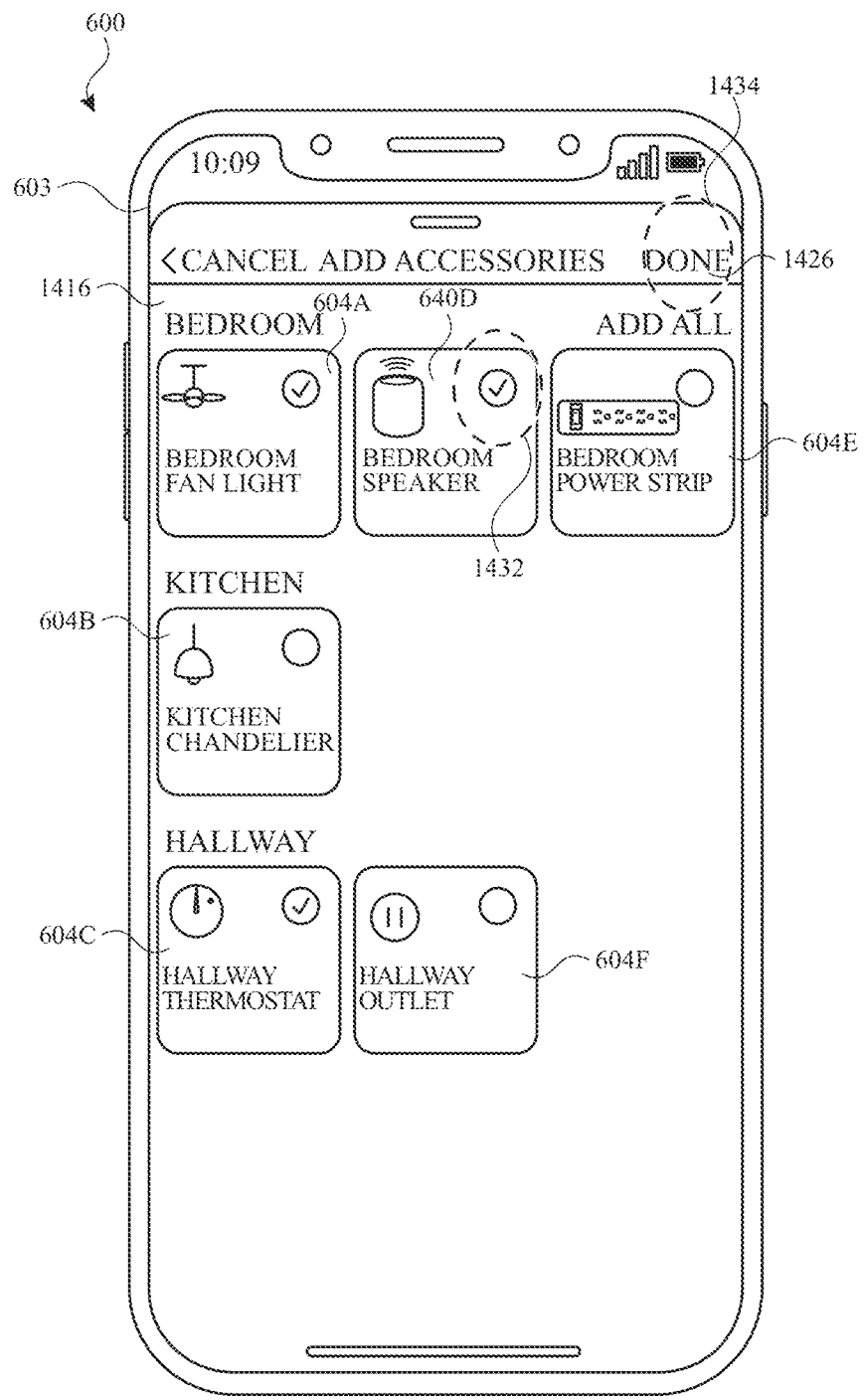
Figure 14H:
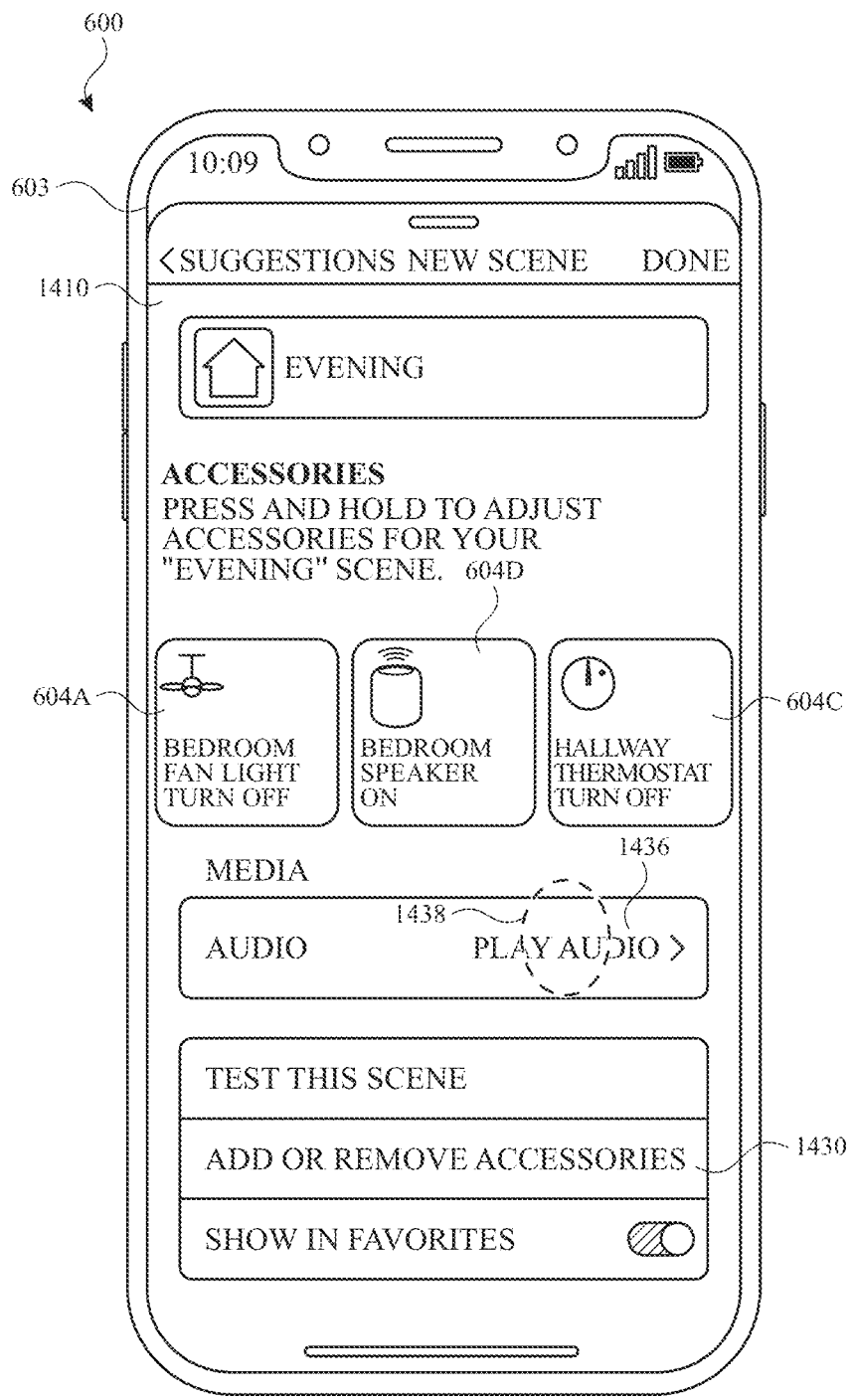
Figure 14I:
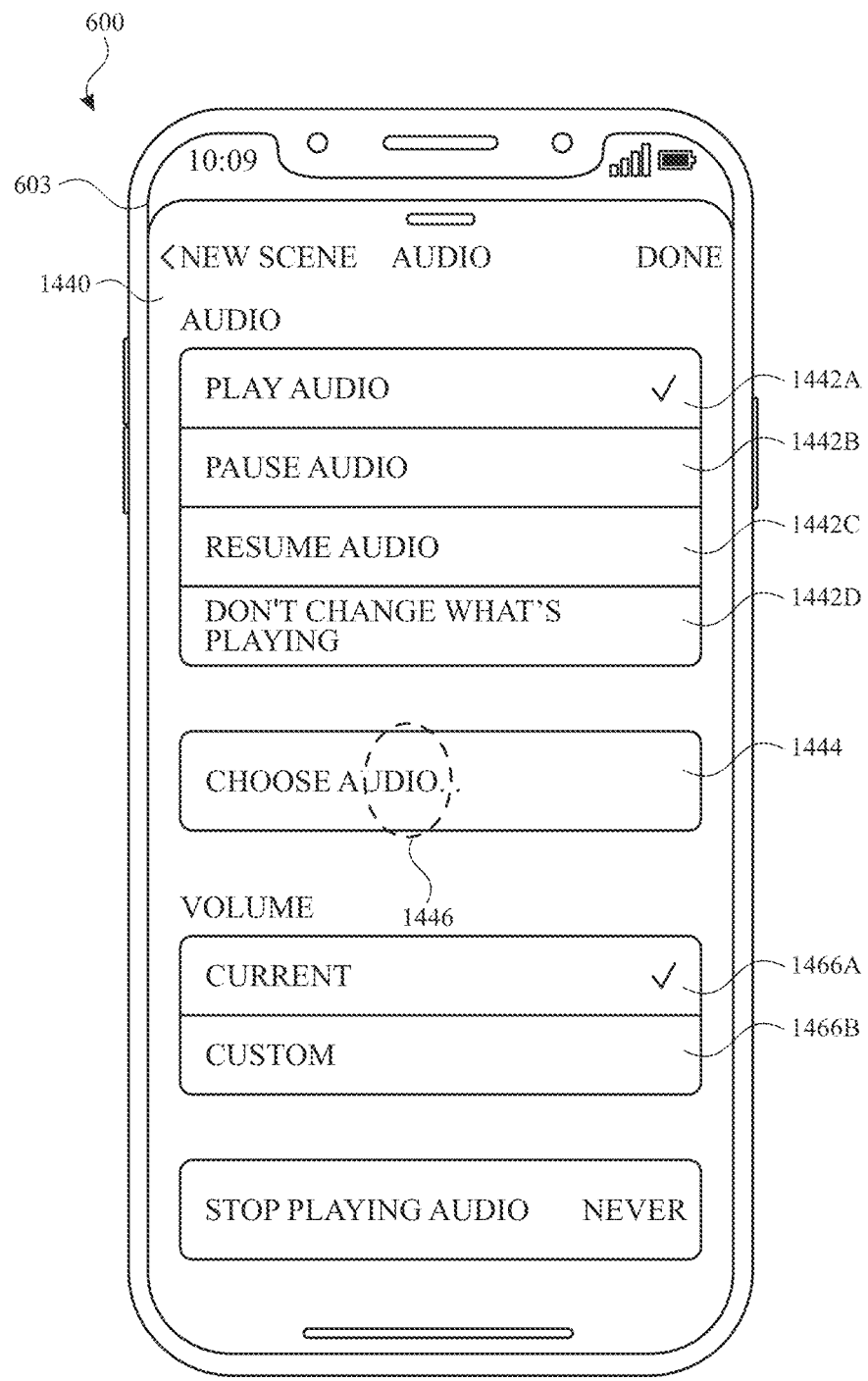
Figure 14J:
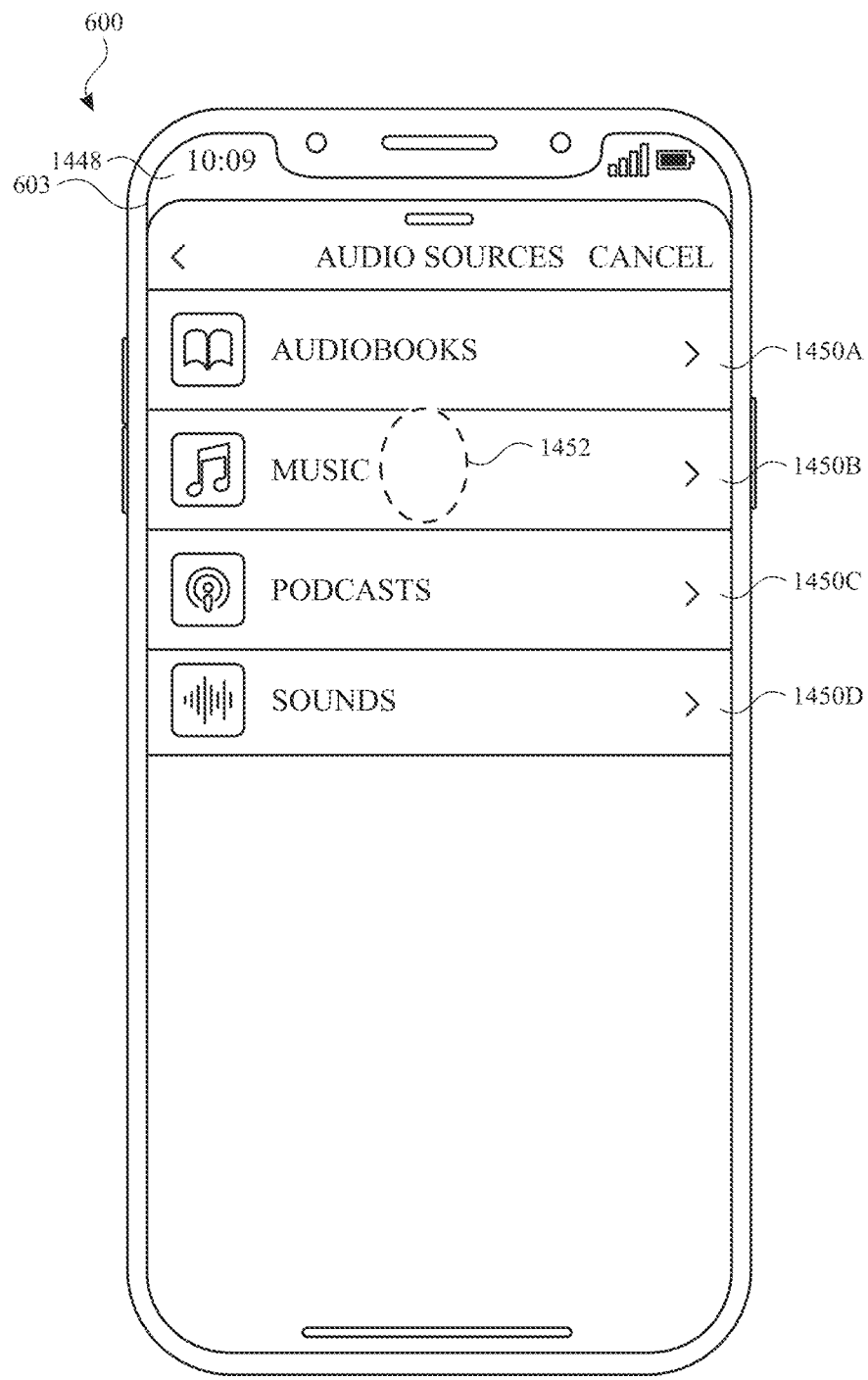
Figure 14K:
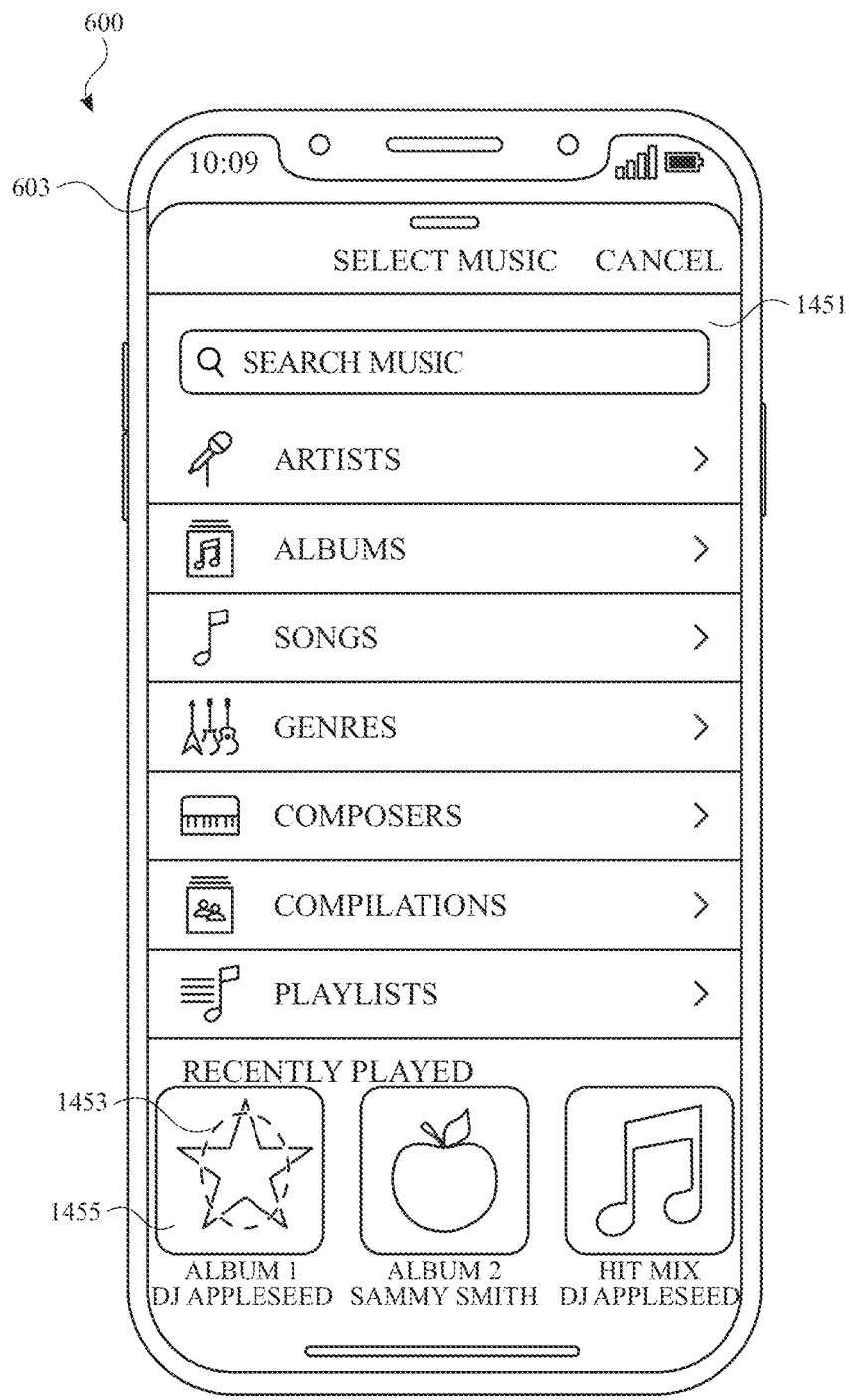
Figure 14L:
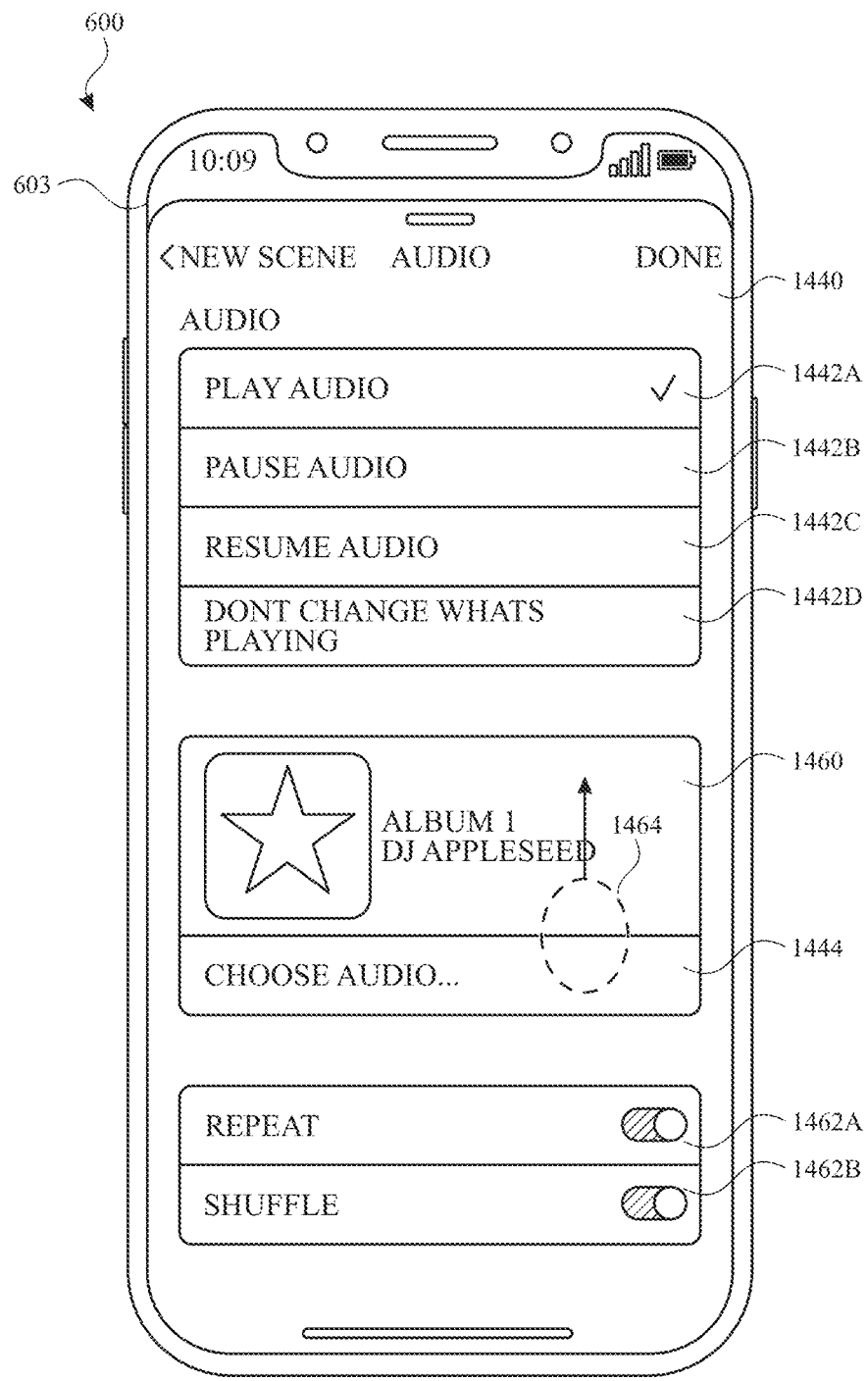
Figure 14M:
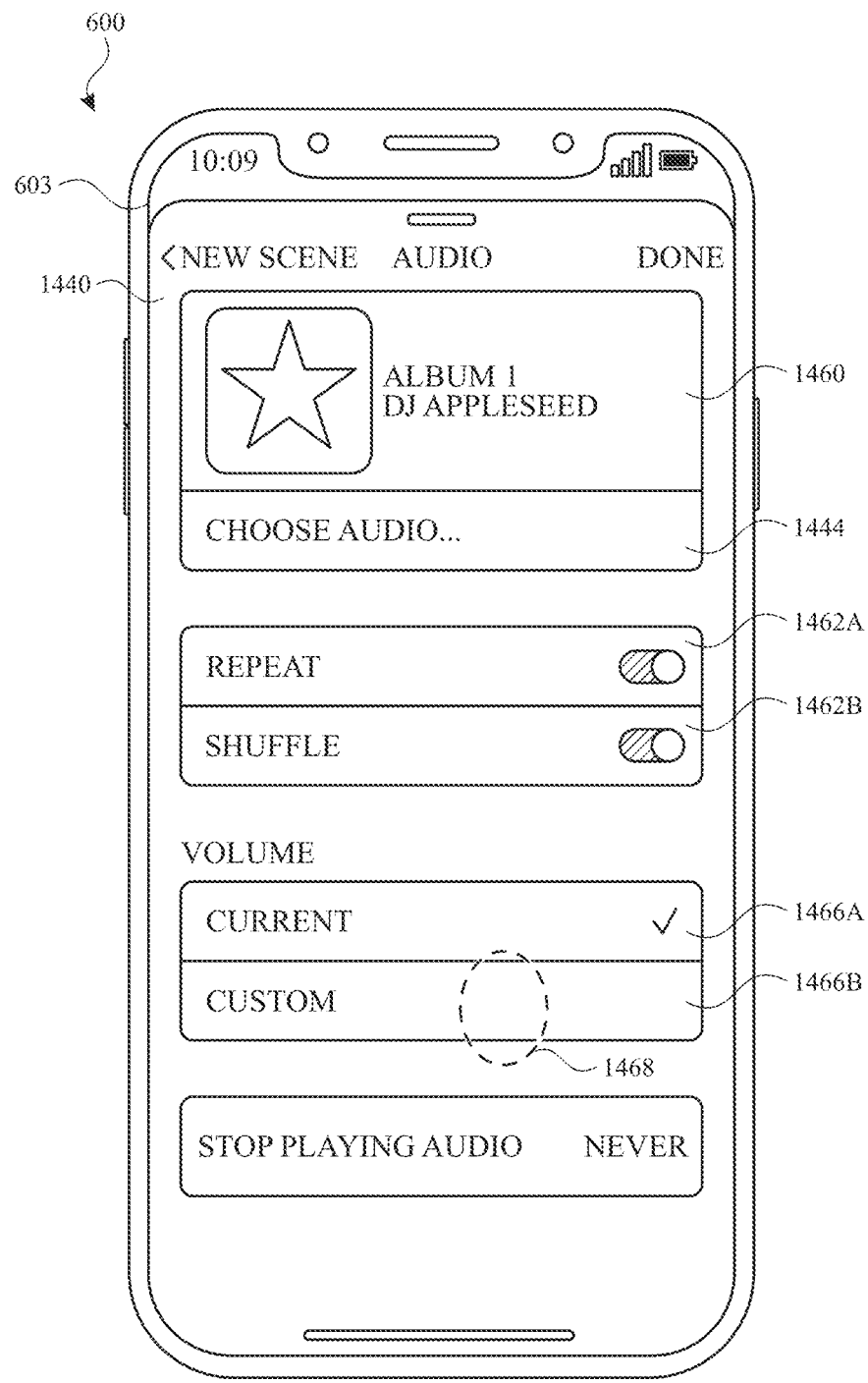
Figure 14N:
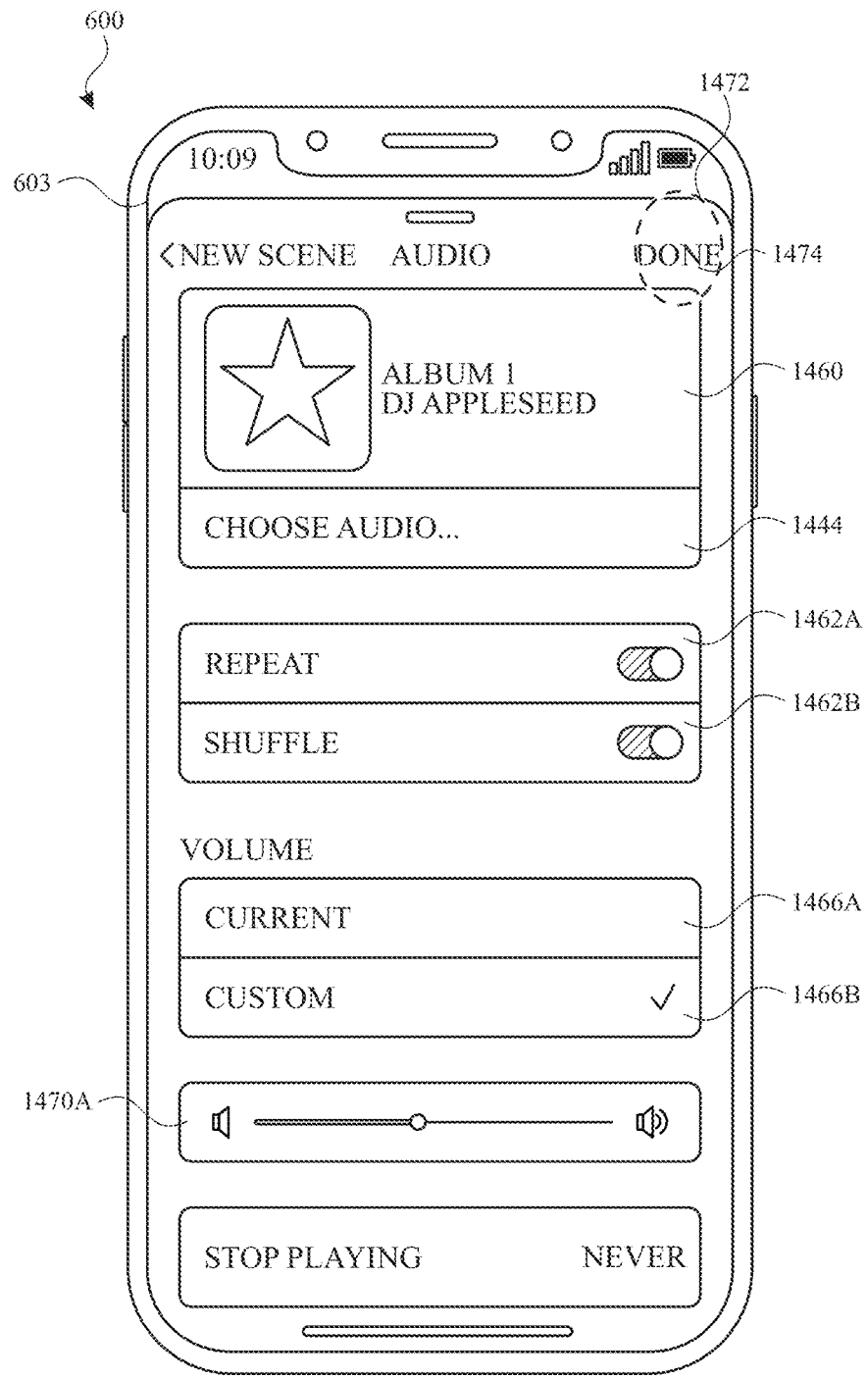
Figure 14O:
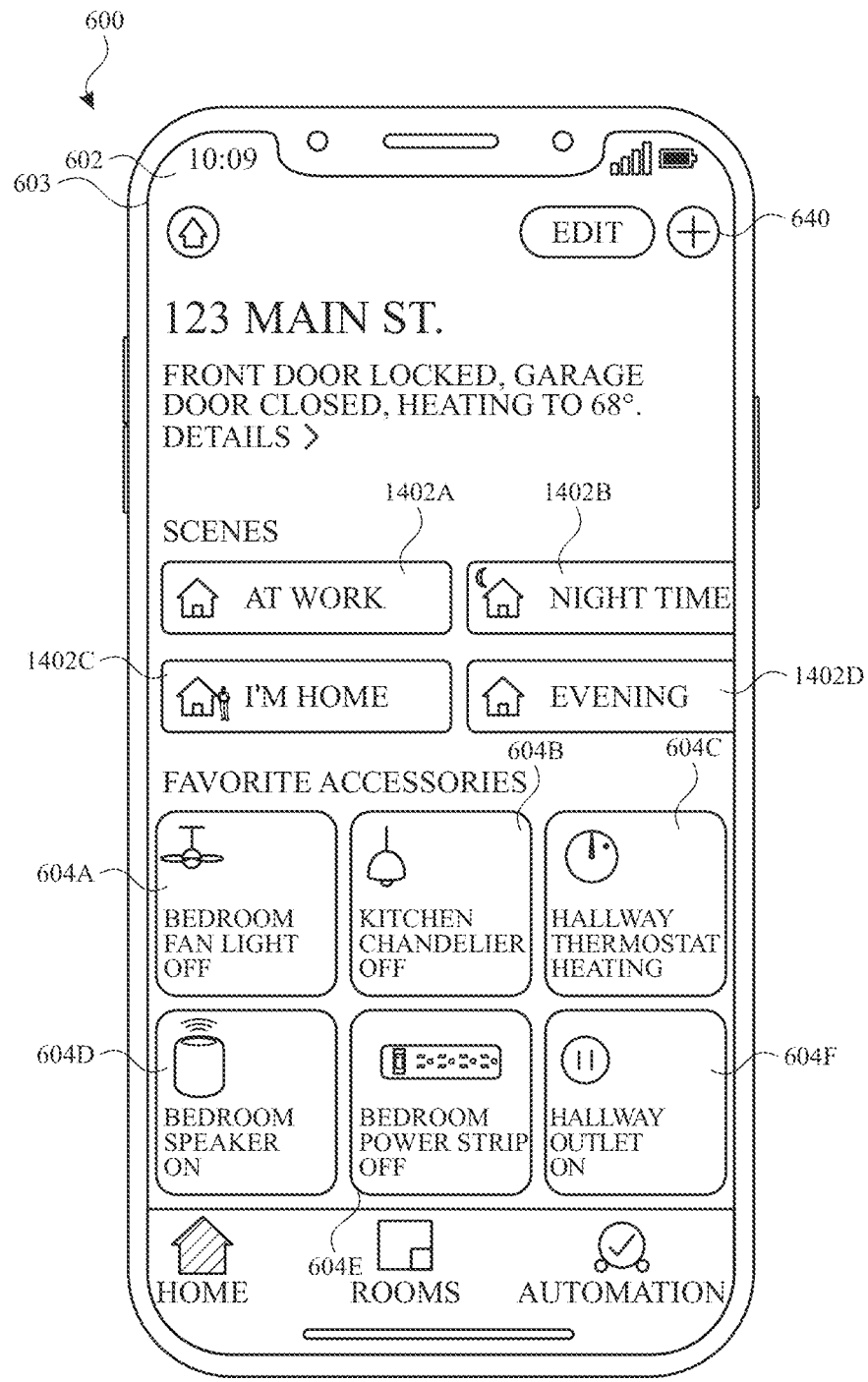
Figure 14P:
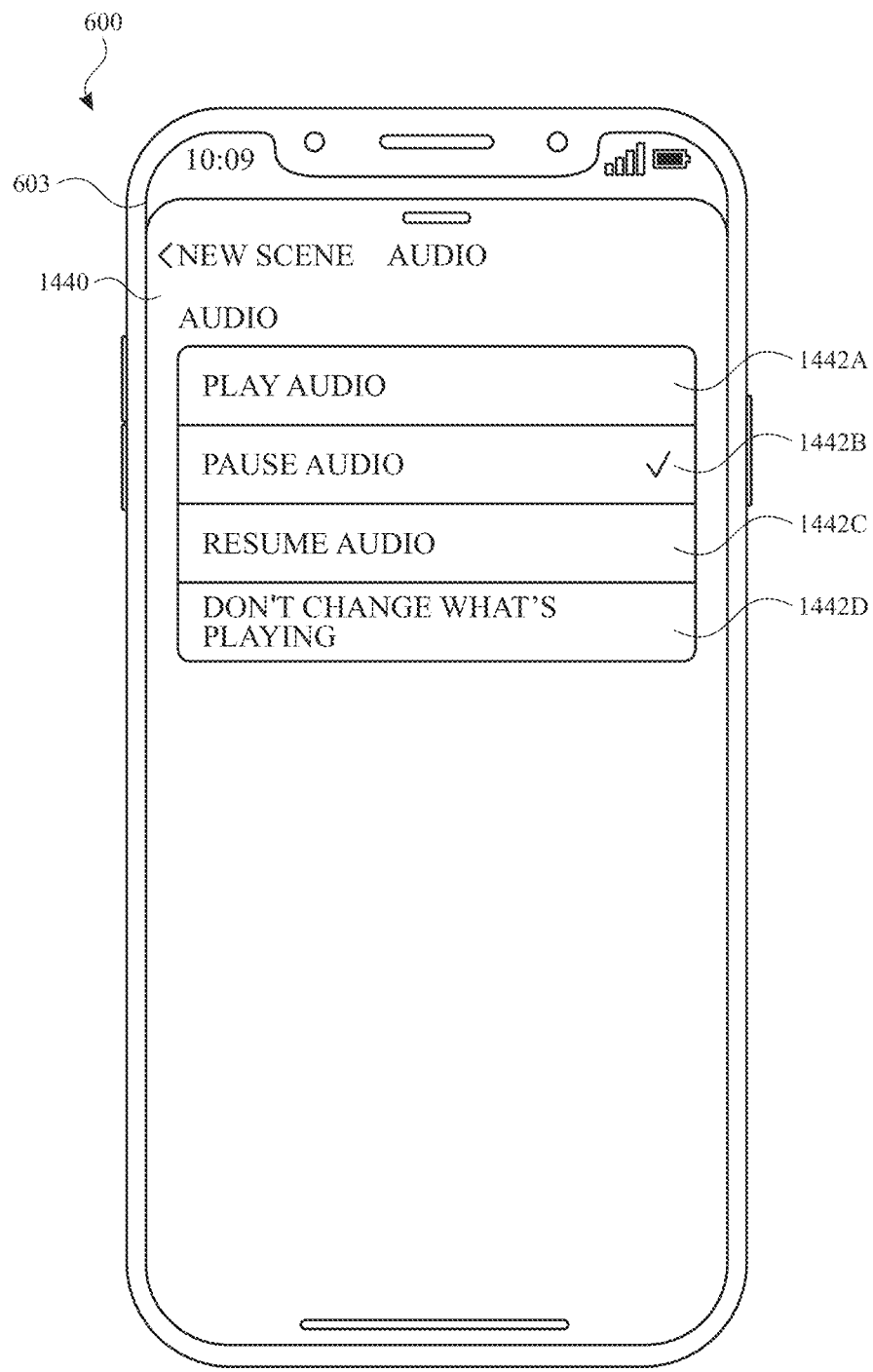
Figure 14Q:
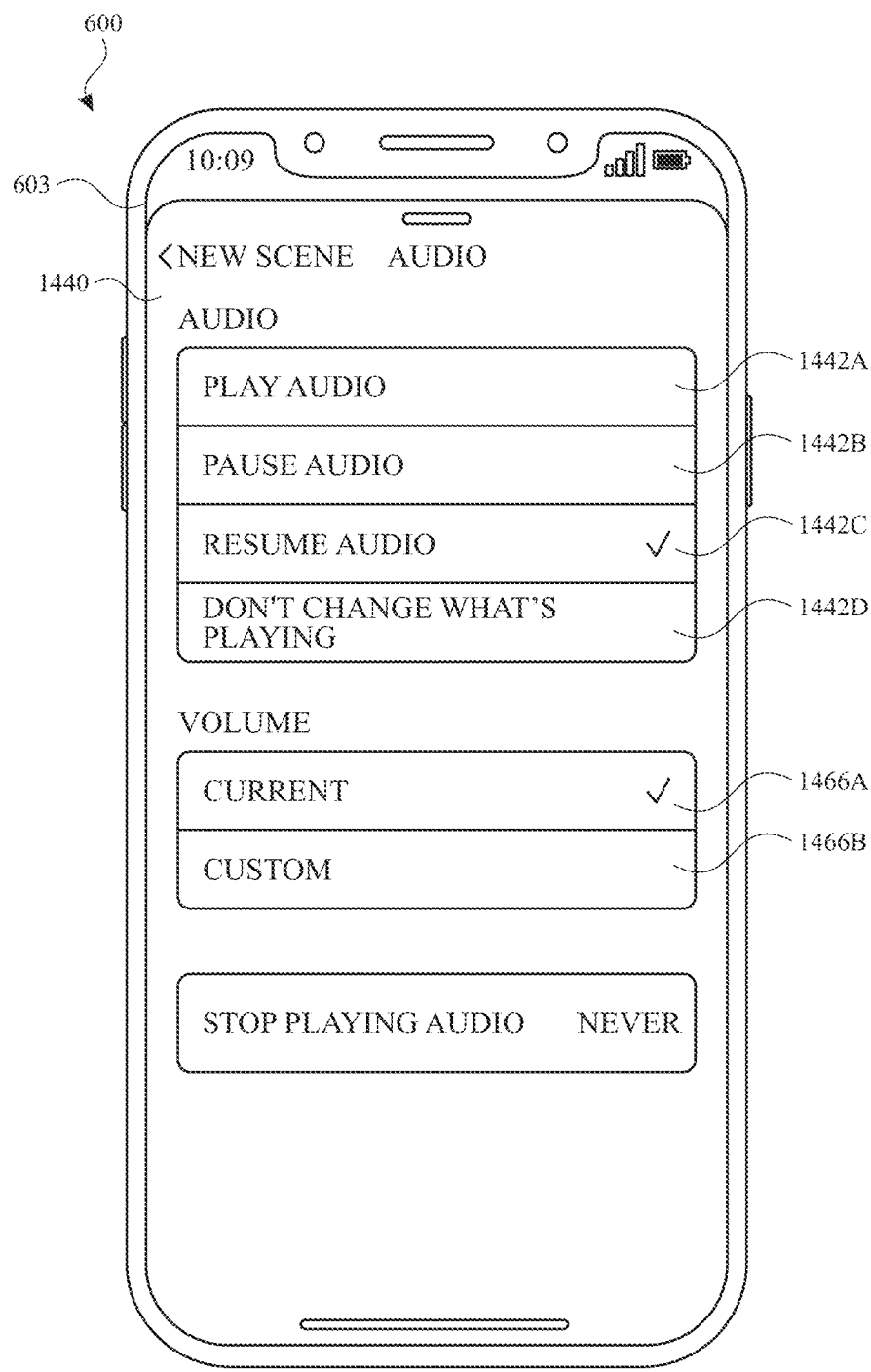
Figure 14R:
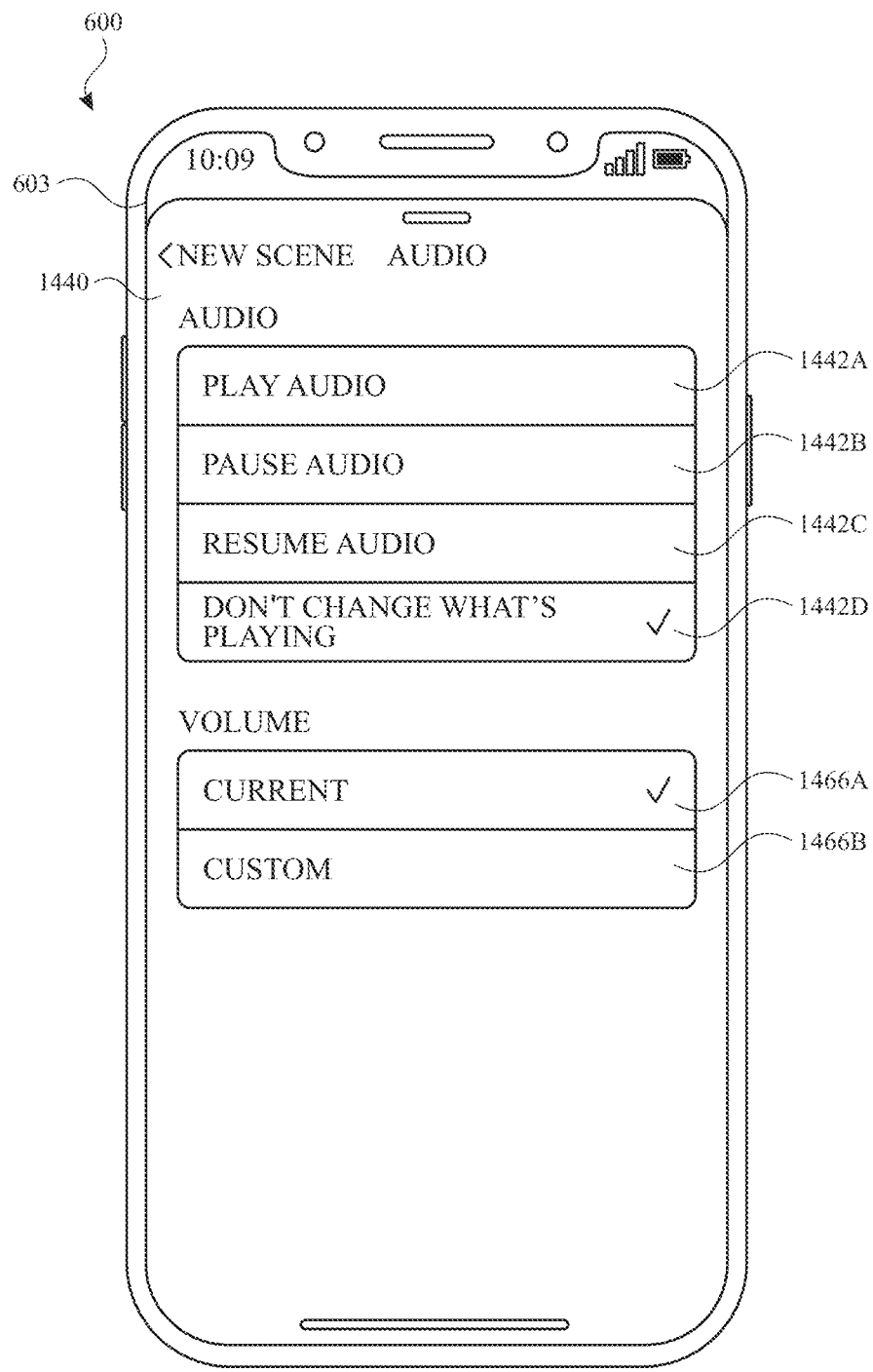
Figure 14S:
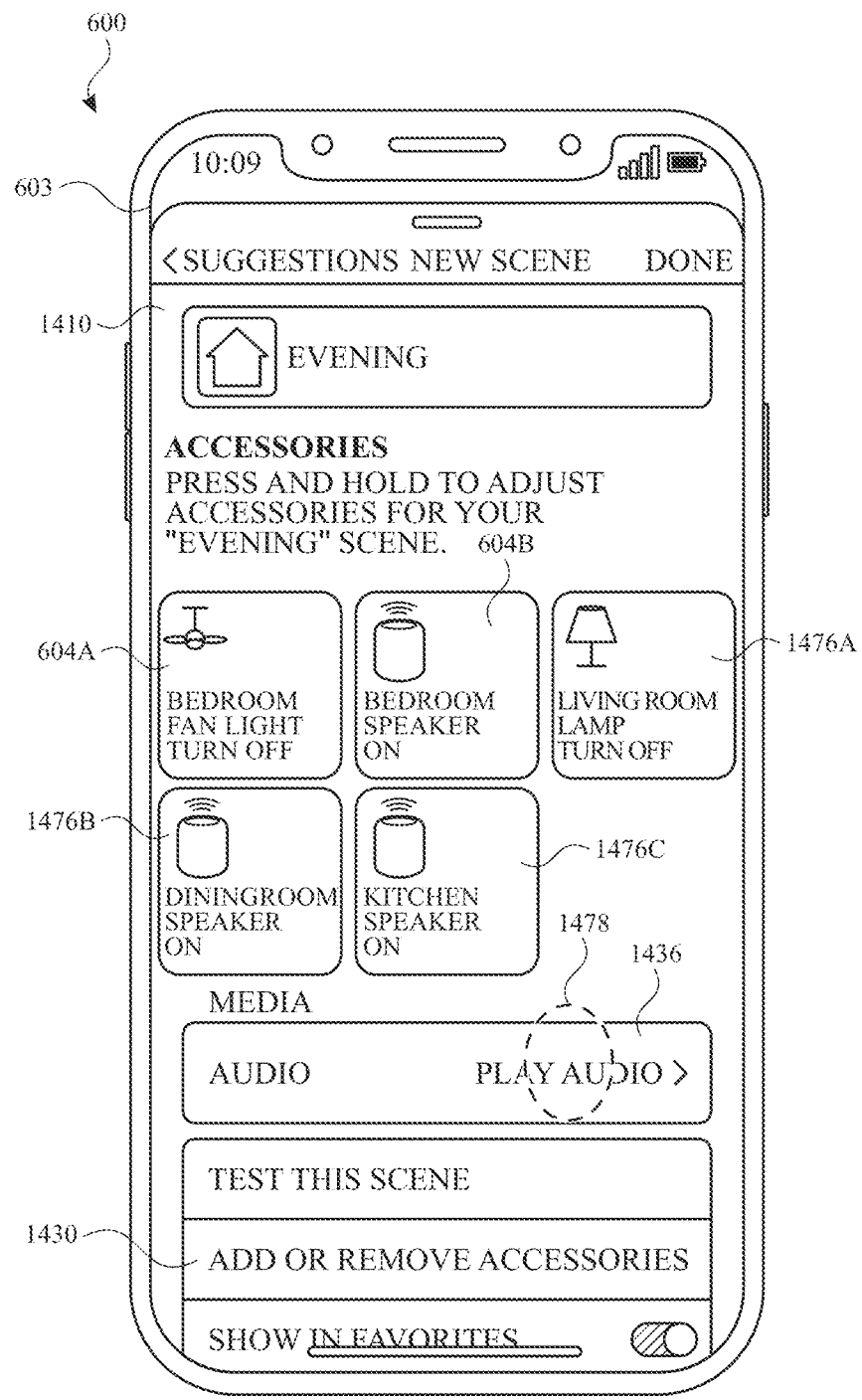
Figure 14T:
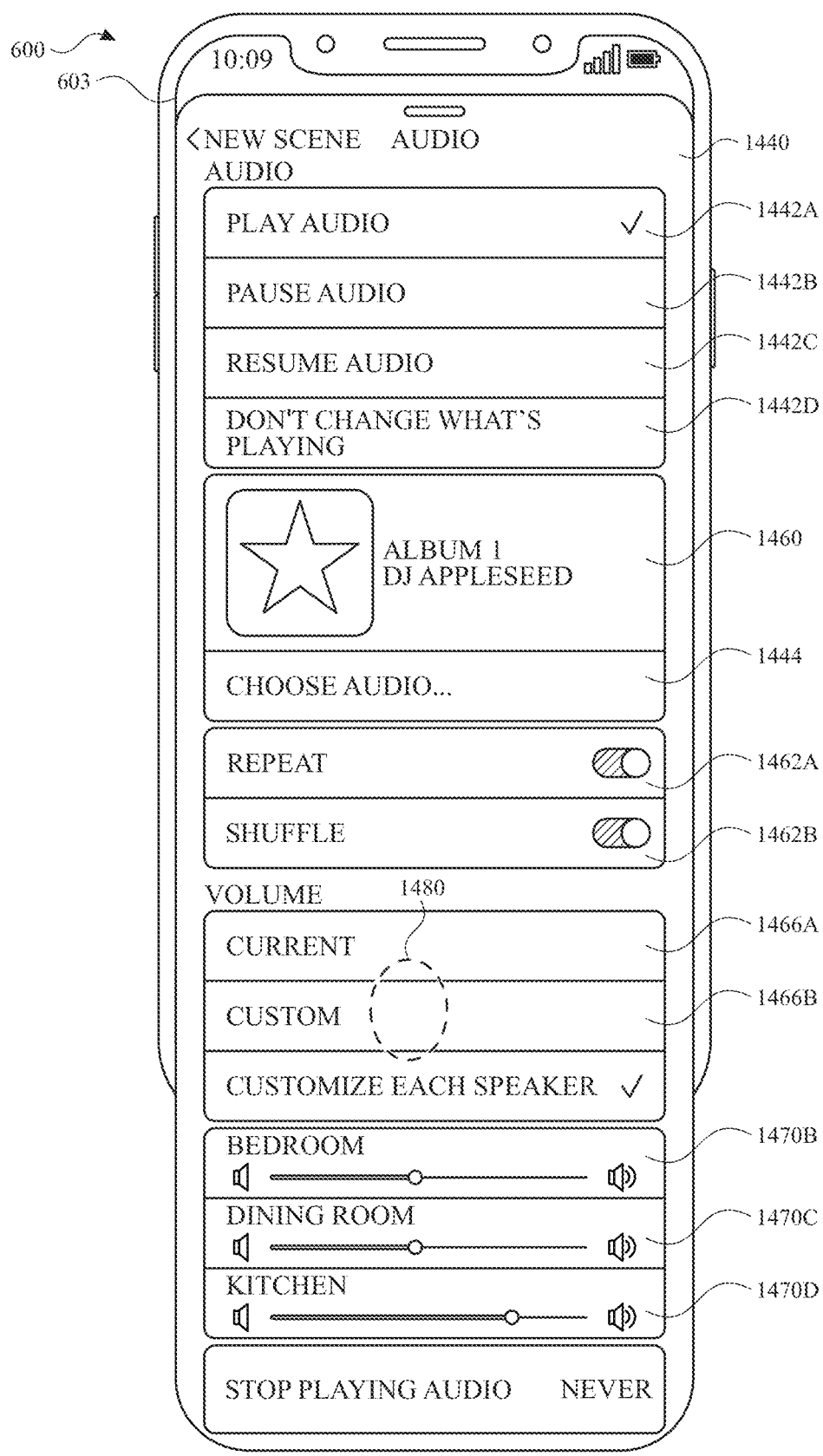

FIGS. 14A-14T illustrate exemplary user interfaces for managing a group of controllable external devices and a speaker. FIG. 15 is a flow diagram illustrating methods of user interfaces for managing a group of controllable external devices and a speaker, in accordance with some embodiments. The user interfaces in FIGS. 14A-14T are used to illustrate the processes described below, including the processes in FIG. 15.

FIGS. 16A-16G illustrate exemplary user interfaces for managing a speaker. FIG. 17 is a flow diagram illustrating methods of managing a speaker in accordance with some embodiments. The user interfaces in FIGS. 16A-16G are used to illustrate the processes described below, including the processes in FIG. 17.

FIGS. 18A-18G illustrate exemplary user interfaces for requesting sounds of a particular type to be played, in accordance with some embodiments. FIG. 19 is a flow diagram illustrating methods of requesting sounds of a particular type to be played, in accordance with some embodiments. The user interfaces in FIGS. 18A-18G are used to illustrate the processes described below, including the processes in FIG. 19.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
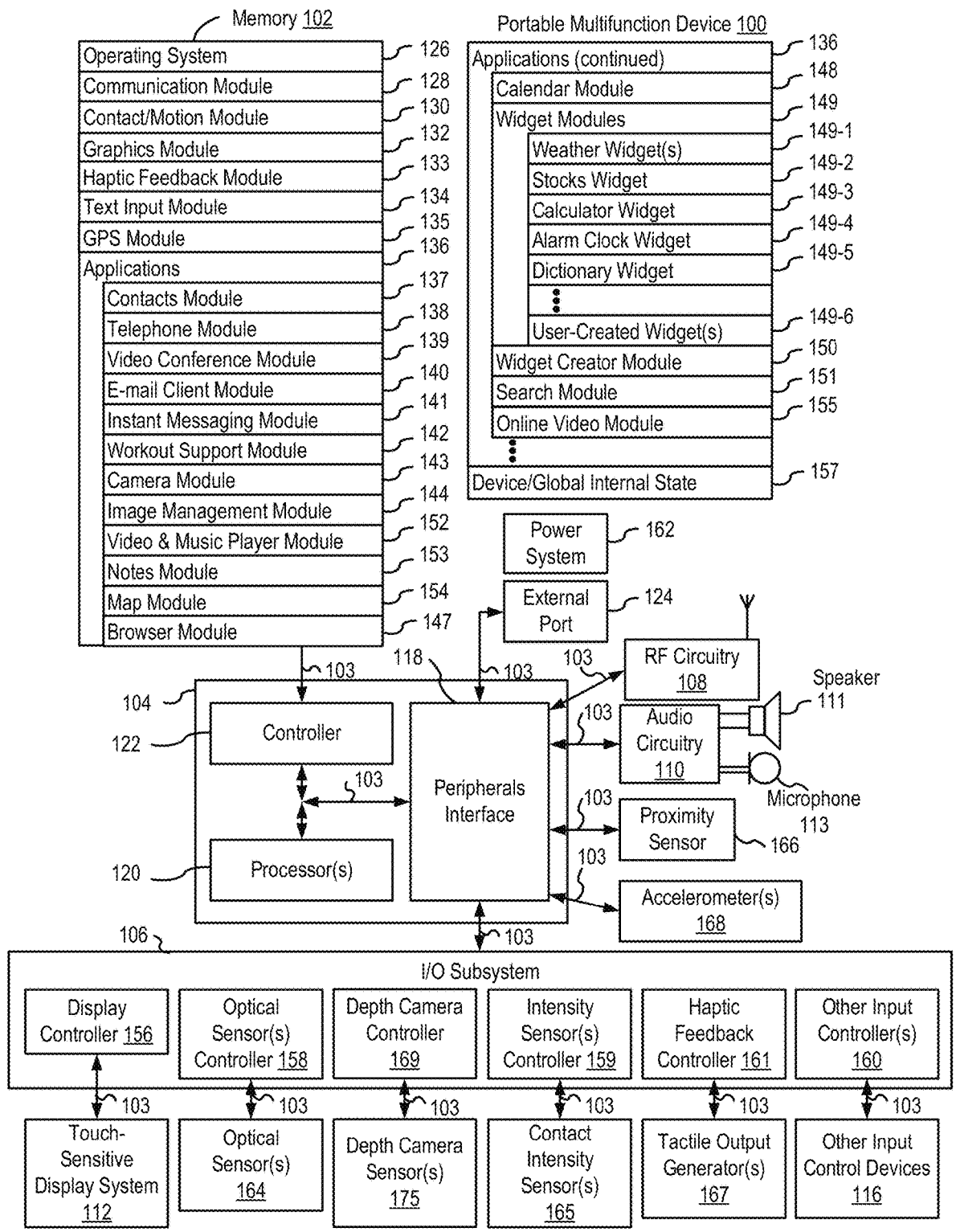
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise some examples not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No.

6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
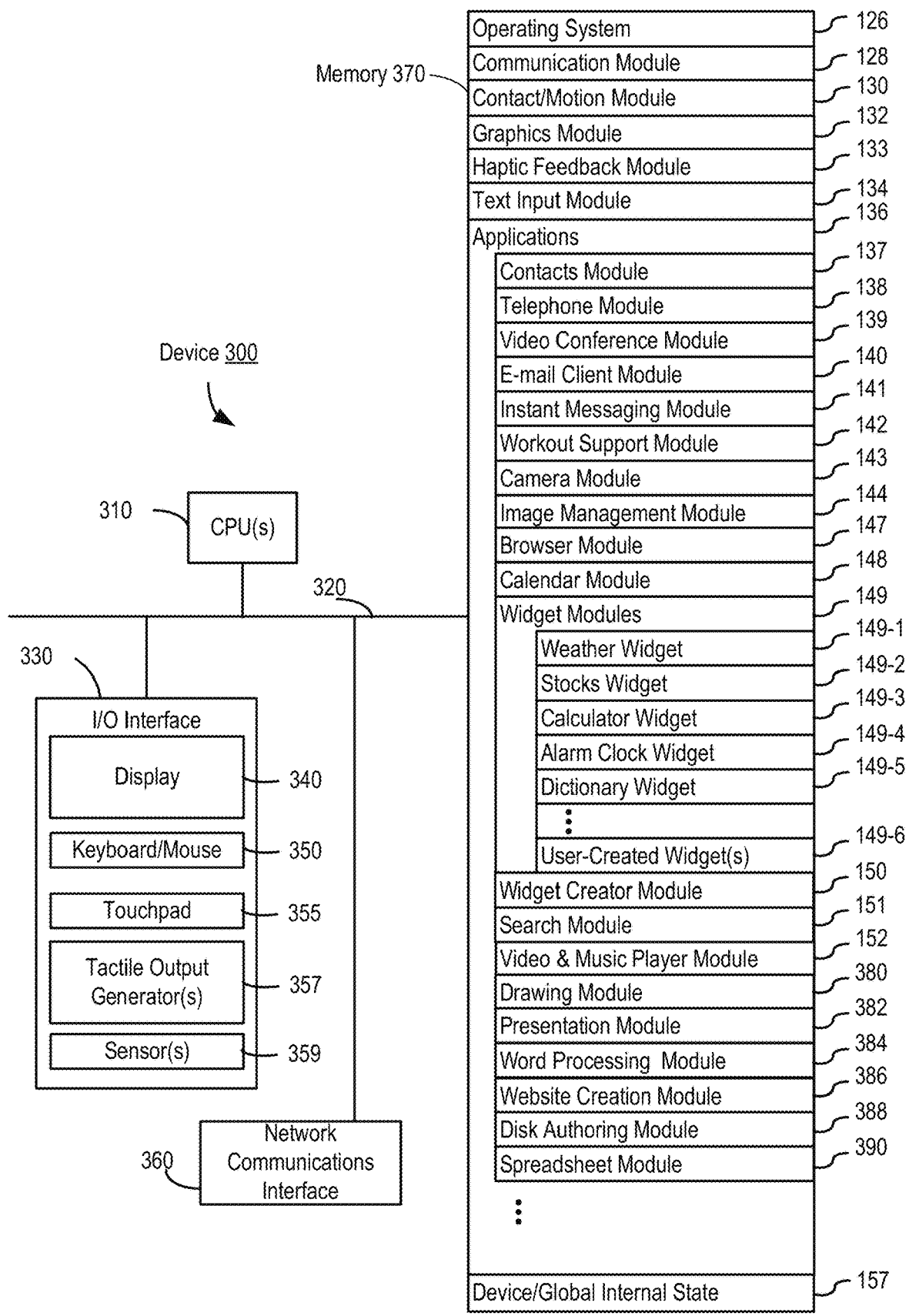
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts).

Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
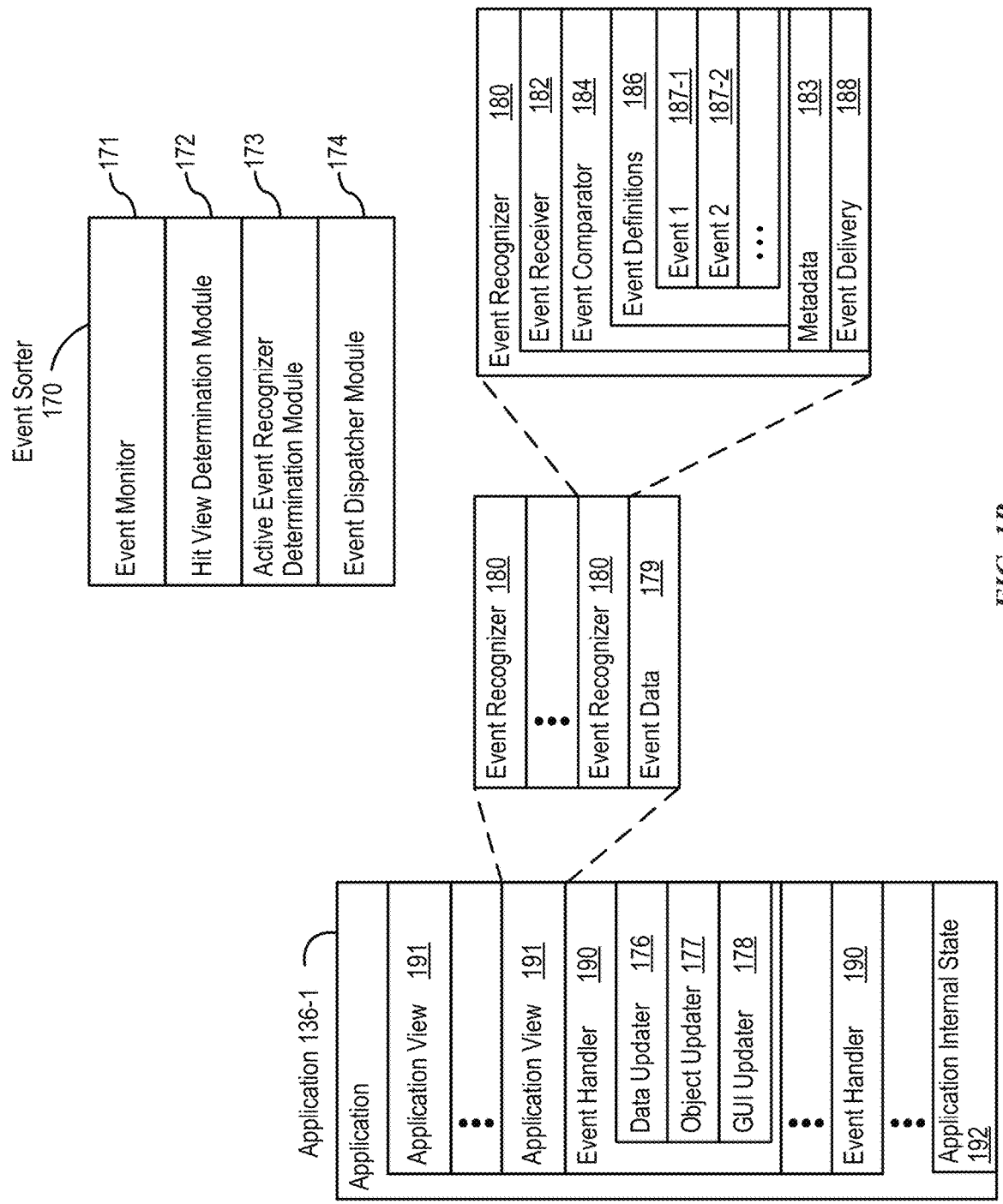
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 1C:
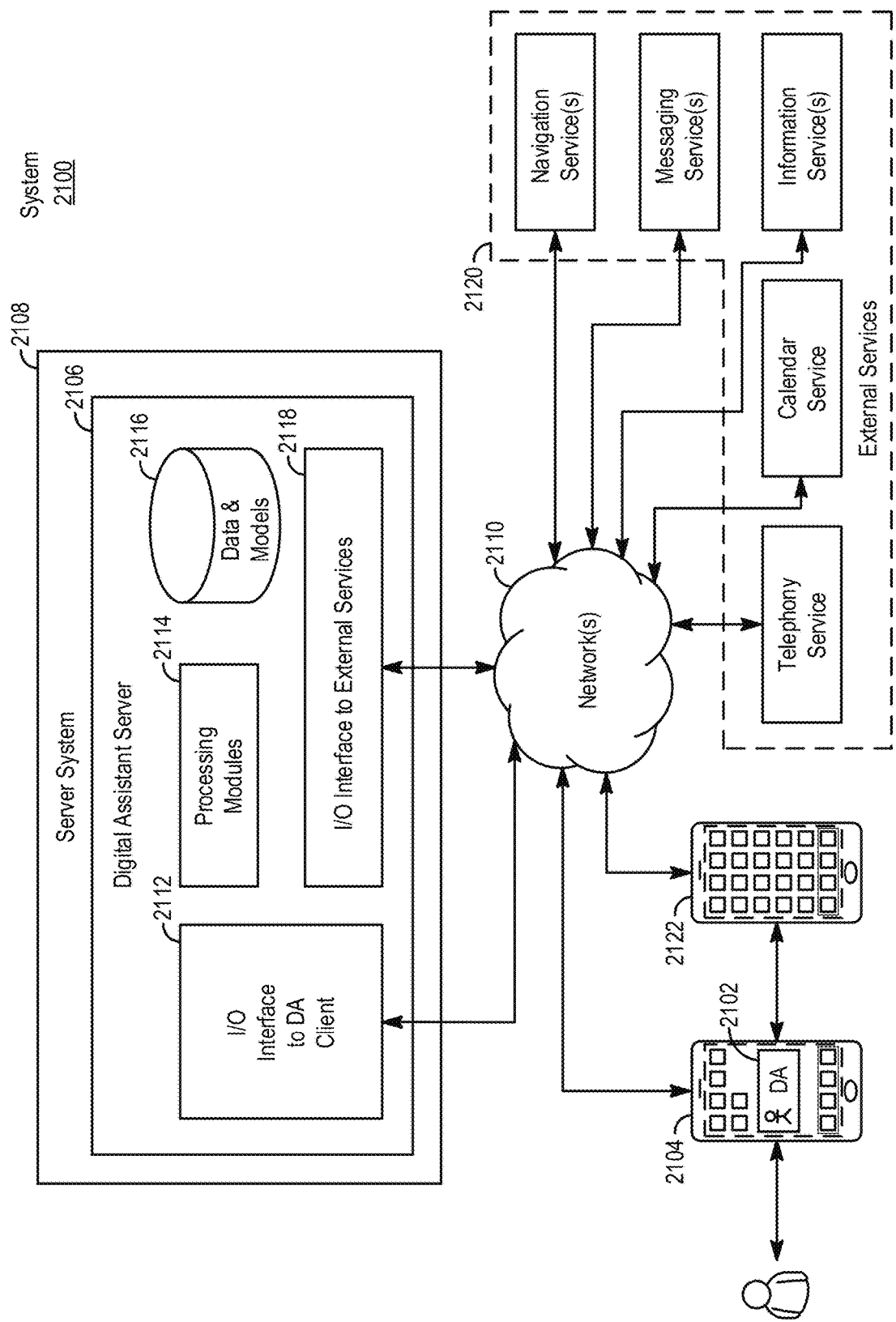
FIG. 1C is a block diagram illustrating a system and environment for implementing a digital assistant, in accordance with some embodiments.

FIG. 1C illustrates a block diagram of system 2100 according to various examples. In some examples, system 2100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1C, in some examples, a digital assistant is implemented according to a client-server model. The digital assistant includes client-side portion 2102 (hereafter "DA client 2102") executed on user device 2104 and server-side portion 2106 (hereafter "DA server 2106") executed on server system 2108. DA client 2102 communicates with DA server 2106 through one or more networks 2110. DA client 2102 provides client-side functionalities such as user-facing input and output processing and communication with DA server 2106. DA server 2106 provides server-side functionalities for any number of DA clients 2102 each residing on a respective user device 2104.

In some examples, DA server 2106 includes client-facing I/O interface 2112, one or more processing modules 2114, data and models 2116, and I/O interface to external services 2118. The client-facing I/O interface 2112 facilitates the client-facing input and output processing for DA server 2106. One or more processing modules 2114 utilize data and models 2116 to process speech input and determine the user's intent based on natural language input. Further, one or more processing modules 2114 perform task execution based on inferred user intent. In some examples, DA server 2106 communicates with external services 2120 through network(s) 2110 for task completion or information acquisition. I/O interface to external services 2118 facilitates such communications.

User device 2104 can be any suitable electronic device. In some examples, user device 2104 is a portable multifunctional device (e.g., device 100, described above with reference to FIG. 1A), a multifunctional device or another electronic device (e.g., device 600, 800, 1000). A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, Calif. Other examples of portable multifunction devices include, without limitation, earphones/headphones, speakers, and laptop or tablet computers. Further, in some examples, user device 2104 is a non-portable multifunctional device. In particular, user device 2104 is a desktop computer, a game console, a speaker, a television, or a television set-top box. In some examples, user device 2104 includes a touch-sensitive surface (e.g., touch screen displays and/or touchpads). Further, user device 2104 optionally includes one or more other physical user-interface devices, such as a physical keyboard, a mouse, and/or a joystick. Various examples of electronic devices, such as multifunctional devices, are described below in greater detail.

Examples of communication network(s) 2110 include local area networks (LAN) and wide area networks (WAN), e.g., the Internet. Communication network(s) 2110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocol.

Server system 2108 is implemented on one or more standalone data processing apparatus or a distributed network of computers. In some examples, server system 2108 also employs various virtual devices and/or services of third-party service providers (e.g., third-party cloud service providers) to provide the underlying computing resources and/or infrastructure resources of server system 2108.

In some examples, user device 2104 communicates with DA server 2106 via second user device 2122. Second user device 2122 is similar or identical to user device 2104. User device 2104 is configured to communicatively couple to second user device 2122 via a direct communication connection, such as Bluetooth, NFC, BTLE, or the like, or via a wired or wireless network, such as a local Wi-Fi network. In some examples, second user device 2122 is configured to act as a proxy between user device 2104 and DA server 2106. For example, DA client 2102 of user device 2104 is configured to transmit information (e.g., a user request received at user device 2104) to DA server 2106 via second user device 2122. DA server 2106 processes the information and returns relevant data (e.g., data content responsive to the user request) to user device 2104 via second user device 2122.

In some examples, user device 2104 is configured to communicate abbreviated requests for data to second user device 2122 to reduce the amount of information transmitted from user device 2104. Second user device 2122 is configured to determine supplemental information to add to the abbreviated request to generate a complete request to transmit to DA server 2106. This system architecture can advantageously allow user device 2104 having limited communication capabilities and/or limited battery power (e.g., a watch or a similar compact electronic device) to access services provided by DA server 2106 by using second user device 2122, having greater communication capabilities and/or battery power (e.g., a mobile phone, laptop computer, tablet computer, or the like), as a proxy to DA server 2106. While only two user devices 2104 and 2122 are shown in FIG. 1C, it should be appreciated that system 2100, in some examples, includes any number and type of user devices configured in this proxy configuration to communicate with DA server system 2106.

Although the digital assistant shown in FIG. 1C includes both a client-side portion (e.g., DA client 2102) and a server-side portion (e.g., DA server 2106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

Figure 2:
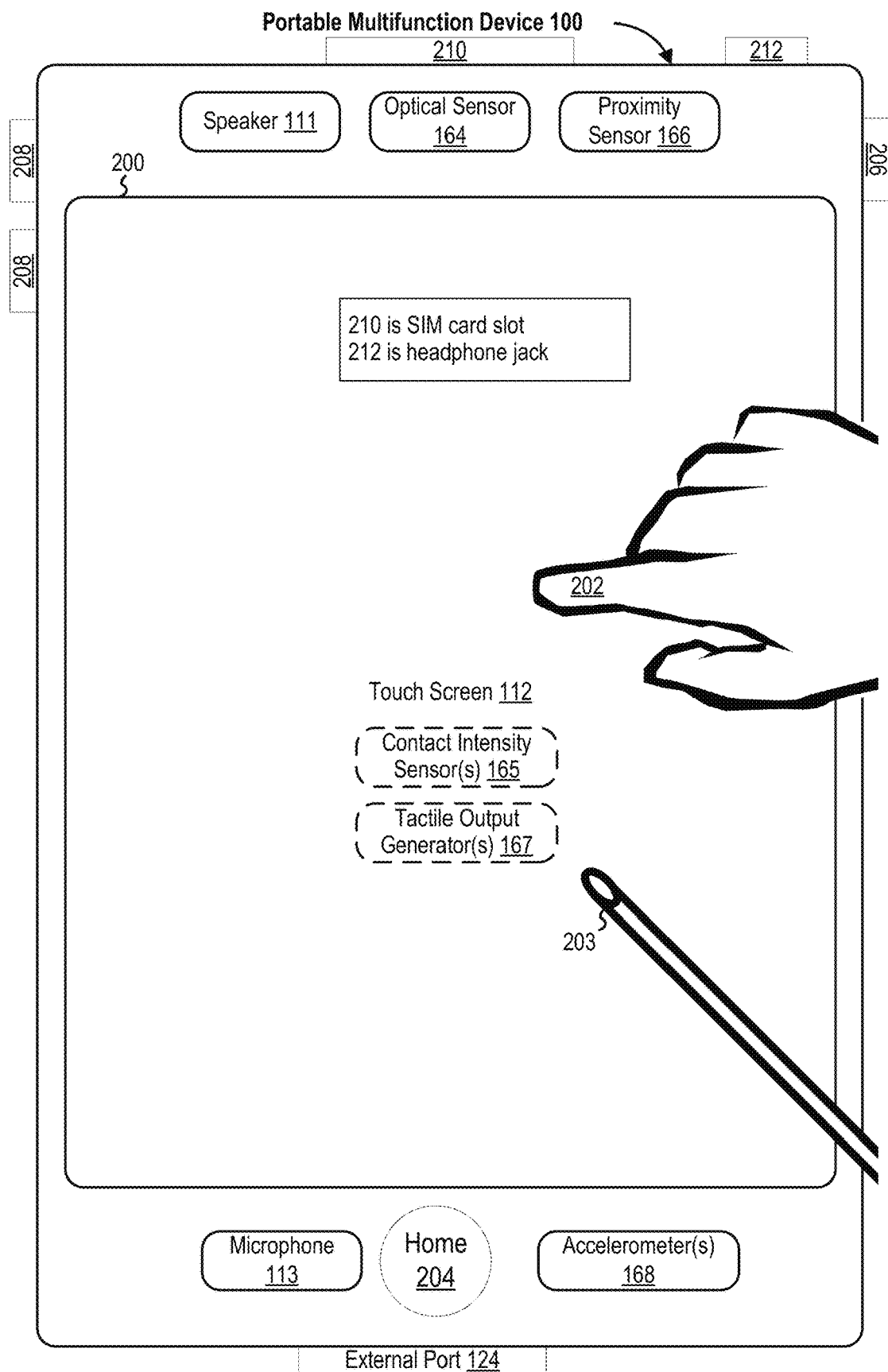
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
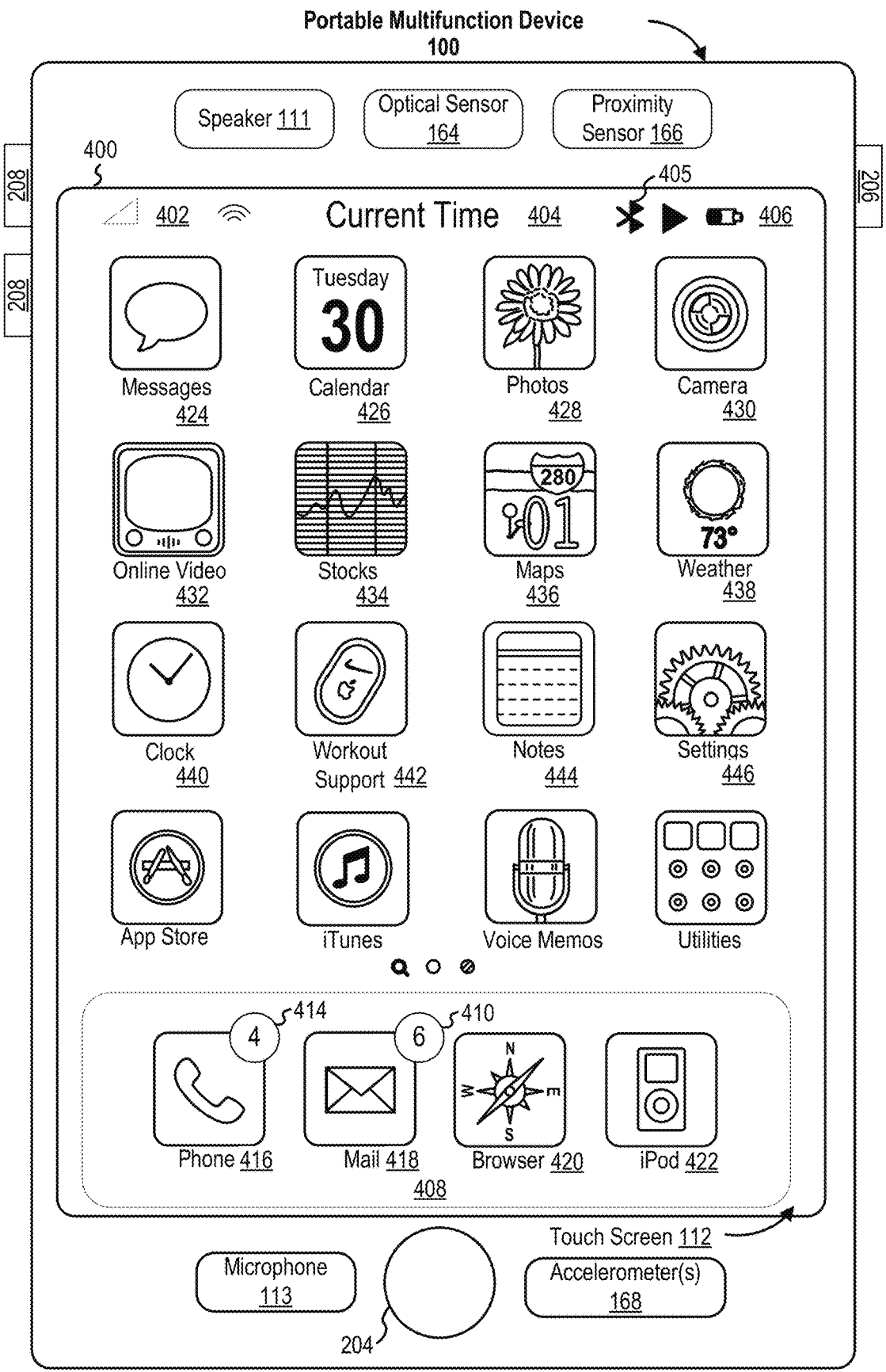
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
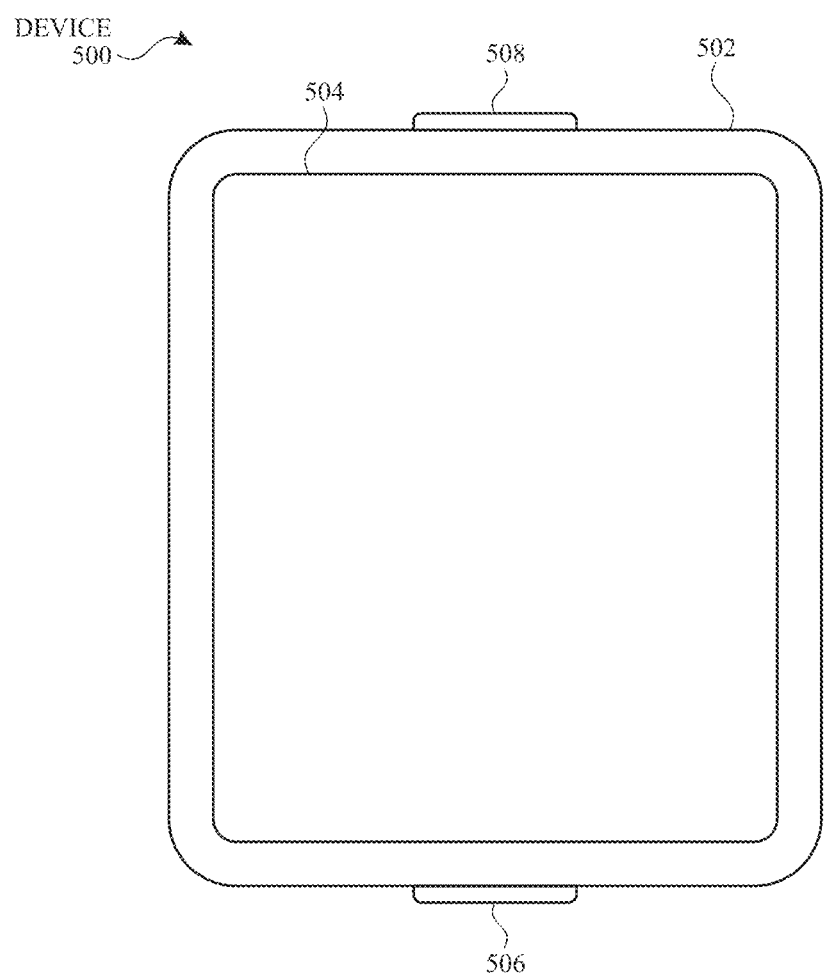
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
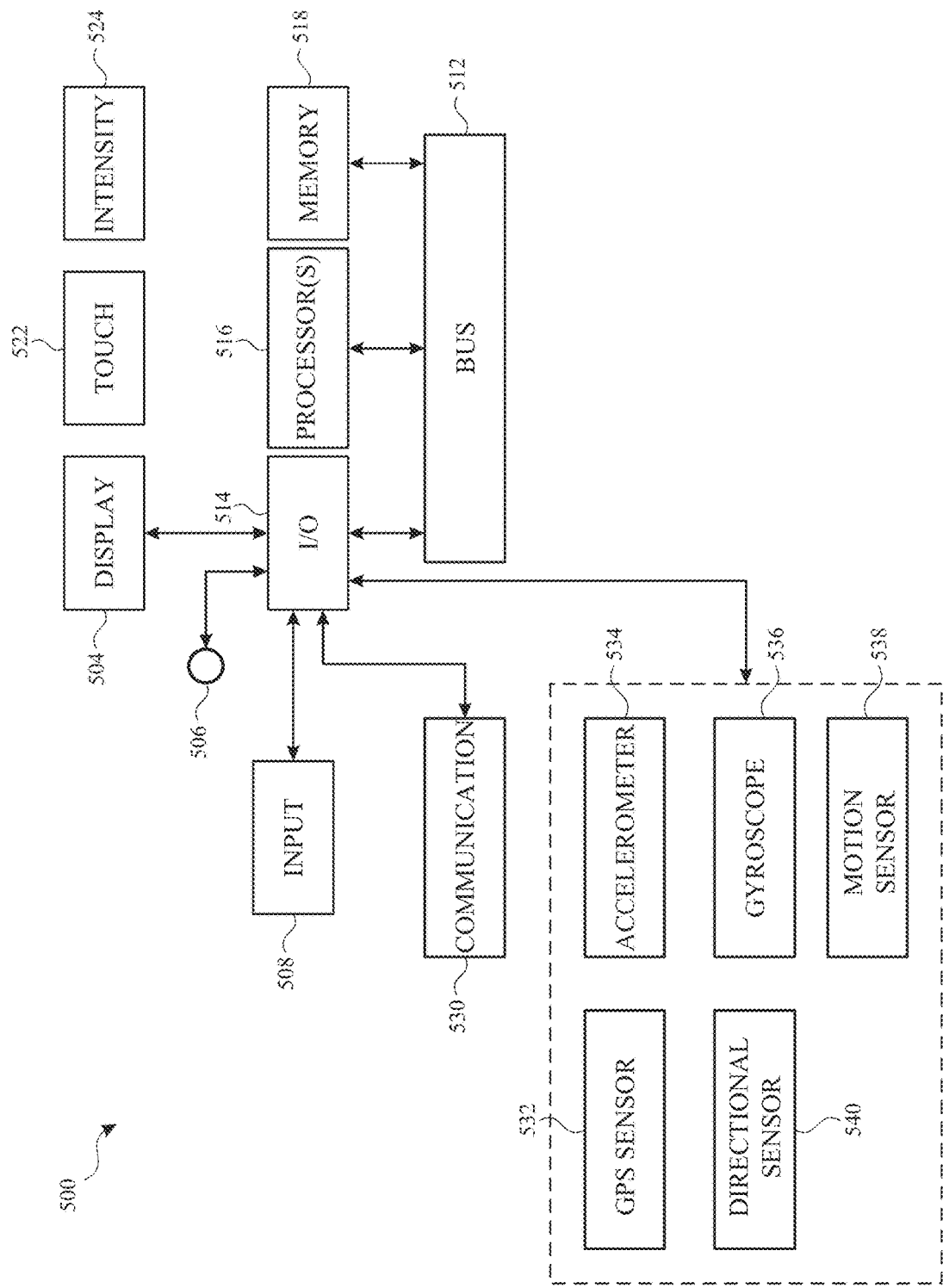
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, 500, and/or 600 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
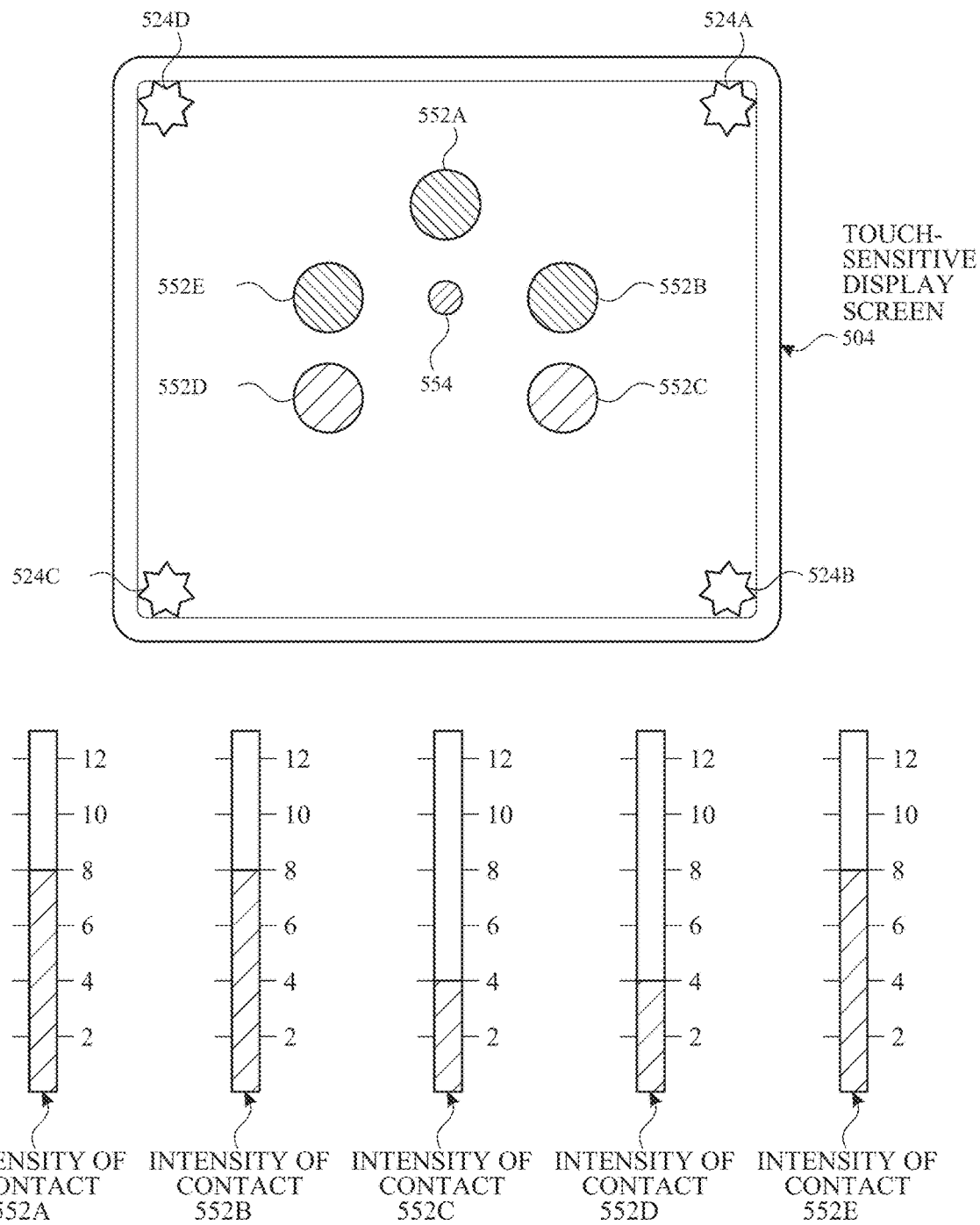
Figure 51:
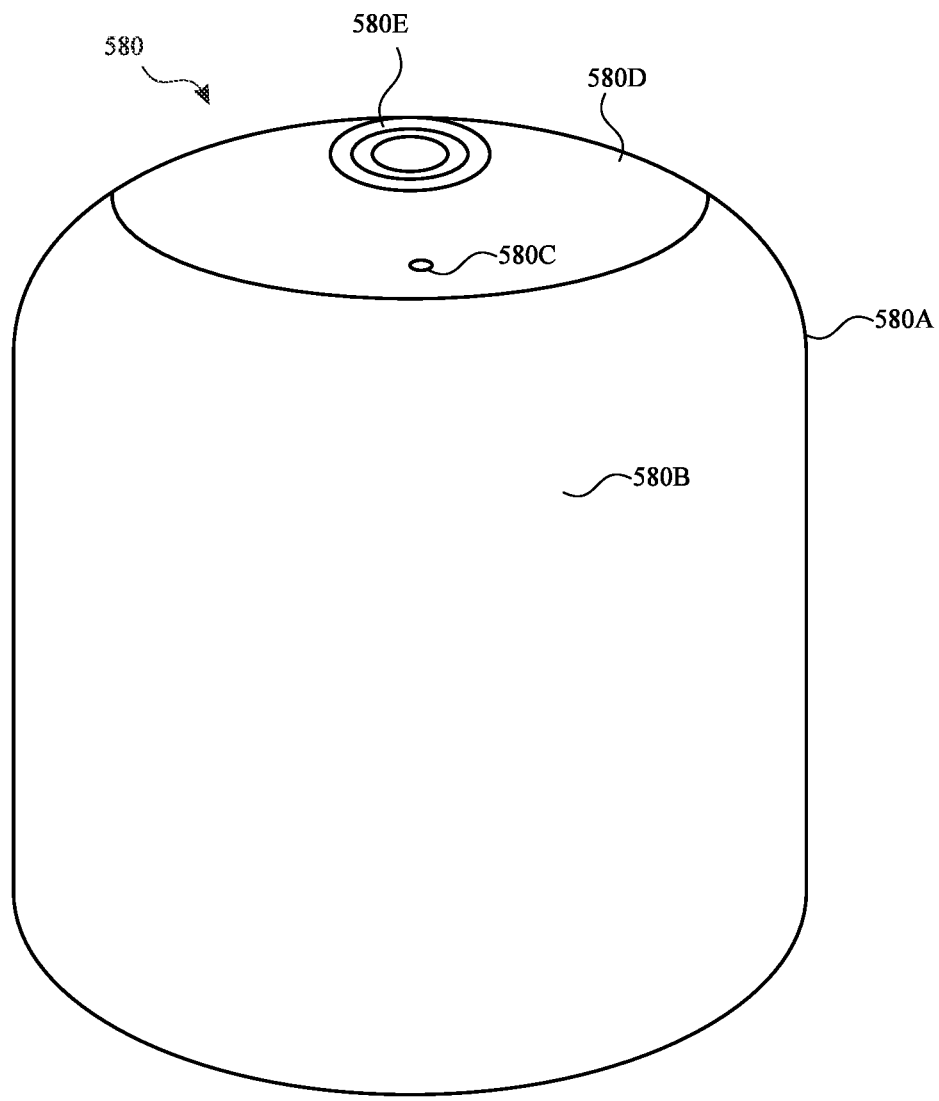

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, 500, or 600. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, 500, or 600.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 5I illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5J:
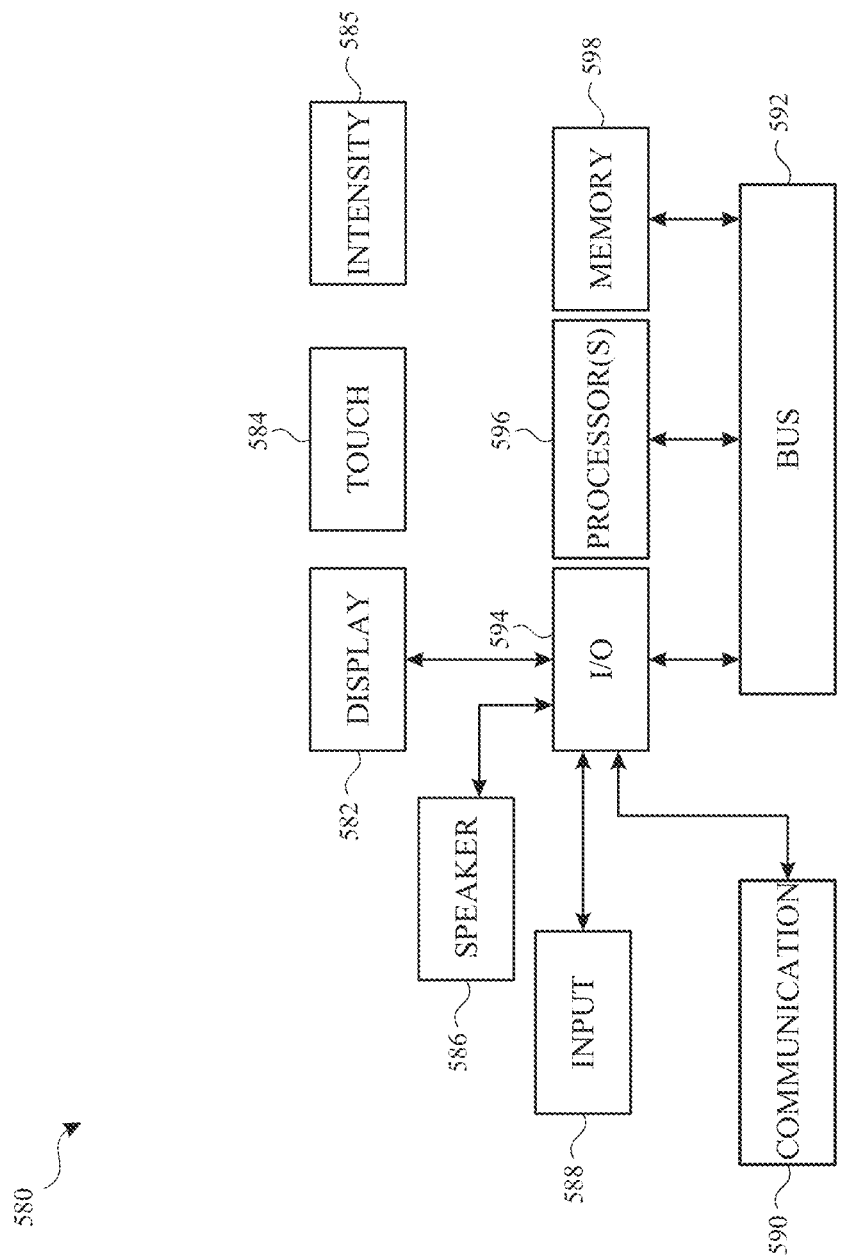
FIG. 5J is a block diagram illustrating an electronic device in accordance with some embodiments.

FIG. 5J depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including processes 1500, 1700, and 1900 (FIGS. 15, 17, and 19). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5J, but can include other or additional components in multiple configurations.

Attention is now directed towards embodiments of user interfaces ("UI") and associated processes that are implemented on an electronic device, such as portable multifunction device 100, device 300, device 500 or device 600.

FIGS. 6A-6R illustrate exemplary user interfaces for controlling an accessory (e.g., a light, a power strip, a thermostat) from an electronic device, in accordance with some embodiments. The user interfaces in these figures are used to illustrate the processes described below, including the processes in FIGS. 7A-7B.

FIG. 6A illustrates home interface 602 on electronic device 600, that includes affordances for accessories (e.g., a controllable external device such as a fan light, chandelier, thermostat, speaker, power strip, and outlet) that have been enabled to be controlled by device 600. Home interface 602 includes affordance 640 for adding a new accessory or a scene (e.g., a set of tasks associated with a condition for execution of the tasks), a status section describing the current state of selected accessories, a scenes section which includes affordances corresponding to sets of automated tasks, and favorites section 604 including accessory affordances or tiles (e.g., 604A-604F) corresponding to respective accessories (e.g., a fan with a light, a chandelier, a thermostat, a speaker, a power strip, and an outlet) that have been added to device 600 (e.g., added to an application of device 600). Favorites section 604 includes accessory affordances for accessories that have been paired with device 600 during a setup process to enable device 600 to transmit commands to configure the accessory. Device 600 displays an accessory affordance (e.g., 604A-604F) in favorites section 604, if during setup, device 600 receives an indication to include the accessory in favorites. The accessory set up process is further discussed with respect to FIGS. 10A-10B.

During setup, device 600 determines, based on information received from the accessory, whether an accessory is of a first type or a second type. Based on the accessory type, device 600 creates a tile corresponding to the accessory that will cause a function to be performed when tapped if the accessory is a first type or a user interface to be displayed if the accessory is a second type. An accessory is of a first type if the accessory has a single function (e.g., a chandelier can be turned on or off) or a primary function (e.g., a fan light has a designated fan function as a main function for the accessory) if the accessory supports multiple functions (e.g., a ceiling light with a fan has a fan function and a light function). In some embodiments, an accessory (e.g., a chandelier) is a first type of accessory if the primary function of the accessory supports binary operating states, where the function causes the accessory to operate in one of two possible states (e.g., an ON state or OFF state). An accessory is of a second type if the accessory has multiple functions (e.g., a thermostat that has a heating function, a cooling function, and a fan function), but is not associated with a primary function. In some embodiments, an accessory is of a second type if the primary function associated with the accessory has more than two operating states (e.g., a thermostat has a primary function for setting a temperature, but the thermostat has a heating, cooling, and fan function). Based on a determination of the accessory type, device 600 creates an accessory affordance (e.g., 604A-604F) corresponding to the accessory for display in home interface 602. When device 600 detects a selection of an accessory affordance for the first type of accessory, device 600 transmits a command to perform the single function or primary function associated with the accessory. For example, tapping on the chandelier tile causes the chandelier to be toggled on or off. If device 600 determines that the accessory has a primary function, selection of the accessory affordance causes device 600 to transmit a command to the accessory to perform the primary function without performing the other functions of the accessory. When device 600 detects a selection of an accessory affordance for the second type of accessory, device 600 displays an accessory interface that includes control affordances (e.g., 608A-608C of FIG. 6F) for configuring the accessory to perform one or more of the multiple functions associated with the accessory. For example, tapping on the thermostat or speaker tiles cause a configurations interface to be displayed without performing a particular function.

FIGS. 6A-6B illustrate turning on the chandelier when chandelier accessory affordance 604B is selected. Chandelier accessory affordance 604B is also updated to show the updated state of the chandelier. In FIG. 6A, device 600 displays chandelier accessory affordance 604B corresponding to a chandelier, which is a first type of accessory having a single function to turn the chandelier on/off. Chandelier accessory affordance 604B includes graphical representation 604B1 of the chandelier indicating that it is currently off and text current status 604B2 indicating that the chandelier is in an OFF state. Device 600 detects input (e.g., a tap) 650A corresponding to selection of chandelier accessory affordance 604B in home interface 602. In response to detecting input 650A, device 600 transmits a command to the chandelier to turn the chandelier to an ON state from the previously OFF state.

As illustrated in FIG. 6B, in response to detecting input 650A, device 600 displays updated chandelier accessory affordance 604B including updated graphical representation 604B1 illustrating the chandelier has a lightbulb that is turned on and updated current status 604B2 indicating the chandelier is in an ON state. In some embodiments, graphical representation 604B1 includes an animation illustrating the state of the accessory. In some embodiments, in response to device 600 detecting a long press (or a deep press) on chandelier accessory affordance 604B, device 600 displays a chandelier interface that includes a control affordance to toggle the lights on/off as further illustrated in FIG. 8B.

FIGS. 6C-6F illustrate displaying an animation to open fan-light accessory interface 610A for controlling the ceiling fan with light, when fan-light tile 604A is selected. In FIG. 6C, device 600 displays fan-light accessory affordance 604A corresponding to a ceiling fan with a light, which is a second type of accessory having multiple functions corresponding to the fan component and the light component (e.g., turn fan on/off and turn light on/off). Fan-light accessory affordance 604A is a grouped accessory affordance that corresponds to both the fan and the light. Thus, the fan and the light are both configurable through fan-light accessory interface 610A that is displayed on device 600 when fan-light accessory affordance 604A is selected. Fan-light accessory affordance 604A includes graphical representation 604A1 illustrating the fan and the light components and text indicating current statuses 604A2 for the fan and the light, which are both in an OFF state. Graphical representation 604A1 includes a representation of each component associated with the accessory. In some embodiments, graphical representation 604A1 includes a representation for each component that has a function that is different from the primary function. In some examples, when the primary function is to turn on/off the ceiling fan, both the ceiling fan and light are displayed in graphical representation 604A1 because the light has a different function (e.g., turning on/off the light) than the primary function, which is to turn on/off the fan. In some embodiments, when the primary function is the same for all of the components, such as a power strip with outlets, graphical representation 604A1 displays only the power strip without displaying the individual outlets. Similarly, current status 604A2 includes a status of each component associated with the accessory has a distinct function. In some embodiments, the current status includes the status of the corresponding components displayed in graphical representation 604A1. If an individual component is not displayed in graphical representation 604A1, then a current status 604A2 for the individual component is also not displayed.

In FIG. 6C, device 600 detects input (e.g., a tap) 650B corresponding to selection of fan-light accessory affordance 604A in home interface 602. In FIG. 6C, the ceiling fan light is an accessory of the second type, where the accessory does not have a primary function associated with it. As a result, when fan-light accessory affordance 610A is selected, the fan-light accessory interface 610A is displayed. In response to detecting input 650B, device 600 displays fan-light accessory interface 610A by displaying an animation that transforms fan-light accessory affordance 604A into fan-light accessory interface 610A.

FIG. 6D-6F illustrate the animation of the fan-light accessory affordance 604A transforming into fan-light accessory interface 610A. FIG. 6D illustrates that as fan-light accessory affordance 604A increases in size, the corresponding graphical representation 604A1 and current status 604A2 also proportionally expand in size. Fan-light accessory affordance 604A expands from the current position of fan-light accessory affordance 604A. As fan-light accessory affordance 604A expands, device 600 determines whether a portion of fan-light accessory interface 610A would be displayed off-screen if fan-light accessory interface 610A kept expanding in the current position. As illustrated in FIG. 6E, in accordance with a determination that a portion of fan-light accessory interface 610A would be displayed off-screen, device 600 aligns or snaps fan-light accessory interface 610A to the left border of display 603 such that no portion of fan-light accessory interface 610A is displayed off-screen. In some embodiments, in accordance with a determination that a portion of fan-light accessory interface 610 would not displayed off-screen, device 600 displays fan-light accessory interface 610A in the current position without aligning fan-light accessory affordance 604A to a left or right boundary of display 603.

FIG. 6F illustrates fan-light accessory affordance 610A with controls for changing additional characteristics of the ceiling fan and light, such as the light color. FIG. 6F illustrates fully expanded fan-light accessory affordance 610A including a proportionally larger graphical representation 610A1 of the fan and light and larger text indicating current status 610A2 of the fan and light. Graphical representation 610A1 of fan-light accessory 610A matches the graphical representation 604A1 of fan-light accessory affordance 604A. Similarly, current status 610A1 of fan-light accessory interface 610A matches the status text 604A2 of fan-light accessory affordance 604A. Fan-light accessory interface 610A includes control affordance 608A for adjusting the fan speed and control affordance 608B for adjusting the brightness of the light. Fan-light accessory interface 610A also includes color selection control 608C, which changes the color of the light. As further discussed below with respect to FIGS. 8A-8J, control affordances 608A-608C are displayed in a first region of fan-light accessory interface 610A, while setting section 620 is displayed in a second region of fan-light accessory interface 610A. Fan-light accessory interface 610A further includes settings shortcut affordance 612. Settings shortcut affordance 612 is displayed at the bottom right corner of the displayed or visible portion of the first region of fan-light accessory interface 610. In response to device 600 detecting selection of settings shortcut affordance 612, device 600 snaps the display to settings section 620 at a top portion of display 603 and scrolls through the remaining controls in the first region. In some embodiments, the settings shortcut affordance 612 is displayed at the bottom of all of the controls in the first region of fan-light accessory interface 610A.

FIG. 6F displays an exemplary layout of the controls on accessory interface 610A. Device 600 determines the layout of the controls on an accessory interface based on the number of controls and sensor affordances an accessory includes and the hierarchy of the controls (e.g., 608A-608C). Primary controls (e.g., 608A-608B) that correspond with the primary function are displayed when the accessory interface 610A is opened. Secondary controls not associated with the primary functions (e.g., 608C) are displayed below primary controls. Secondary controls may not be displayed initially if they are positioned in the overflow region of accessory interface 610A. As described below, FIGS. 8B-8C further illustrate the positioning of controls in the first region of an accessory interface (e.g., 810B).

Device 600 determines the layout of control affordances 608A-608C in fan-light accessory interface 610A based on the number of control affordances and sensor affordances to be displayed. Device 600 determines that the functions of the accessory include two functions corresponding to the fan and light components. When device 600 detects the ceiling fan and light accessory has two or fewer control affordances corresponding to a main function of each accessory (e.g., turning the fan on/off and turning the light on/off) of the accessory, device 600 displays control 608A corresponding to the fan function and control 608B corresponding to the light function in a side-by-side arrangement in fan-light accessory interface 610A as illustrated in FIG. 6F. When there are more than two control affordances of the accessory, device 600 displays control affordances 808A-808C in a top-and-bottom arrangement as illustrated in the chandelier accessory interface 810B in FIG. 8B. In some embodiments, fan-light accessory interface includes additional control affordances that can be displayed in an overflow section that is displayed when the accessory interface is scrolled down as further discussed and illustrated with respect to FIGS. 8B-8D.

In some embodiments, the ceiling fan and light accessory has a primary fan function of the fan turning on/off of the multiple functions supported by the ceiling fan and light accessory. Since the ceiling fan and light accessory has a primary function, device 600 determines that the ceiling fan and light accessory is a first type of accessory. Therefore, in response to device 600 receiving input (e.g., a tap) corresponding to selection of fan-light accessory 604A, instead of displaying fan-light accessory interface 610A, device 600 transmits a command to perform the primary fan function (e.g., turn on the fan). Device 600 does not transmit a command to perform any of the other secondary functions of the ceiling fan and light accessory (e.g., the light is not turned on). In some embodiments, the primary function cannot be set to a secondary function (e.g., primary function cannot be changed to turn on/off the light). In some embodiments, the user can reassign the primary function to a different function (e.g., secondary function) such as selecting the fan-light accessory affordance results in device 600 transmitting a command to turn on the light. Since the ceiling fan and light accessory is a first type of accessory, device 600 displays fan-light interface 610A in response to a long press (or deep press) on accessory affordance 610A.

FIG. 6F also illustrates changing the fan speed and light settings through the controls in fan-light interface 610A. In FIG. 6F, device 600 detects input 650C corresponding to selection of control affordance 608A corresponding to setting the fan to a speed of 50% of the maximum speed. In FIG. 6G, in response to detecting input 650C, device 600 updates graphical representation 610A1 to indicate that the fan is on and updates current status 610A2 to reflect the fan is set to a speed of 50% while the light remains off. In some embodiments, in response to detecting input 650C, device 600 updates graphical representation 610A1 in fan-light accessory interface 610A to include an animation of a spinning fan to indicate that the fan is in an ON state.

In FIG. 6G, device 600 detects input (e.g., a swipe) 650D1 corresponding to selection of control 608B corresponding to turning the light on to a brightness of 75% of the maximum brightness. In FIG. 6H, in response to detecting input 650D1, device 600 updates graphical representation 610A1 to indicate that the light is on and updates current status 610A2 indicating the light has been turned on to a brightness of 75%, while indicating that the fan is set to a speed of 50%. Also in FIG. 6G, device 600 detects an input 650D2 (e.g., a tap) corresponding to selection of the third color that changes the color of the light bulb. In response to detecting input 650D1 and as shown in FIG. 6H, device 600 updates graphical representation 610A1 to include an image of a colored lightbulb that matches the selected color of the light that is in an ON state, as further discussed with respect to FIGS. 8C-8D.

FIG. 6H illustrates how the user can access the settings section 620 by tapping on settings shortcut affordance 612, instead of scrolling to the bottom of the screen to access the settings section 620. In FIG. 6H, device 600 detects input (e.g., a tap) 650E corresponding to selection of settings shortcut affordance 612. In FIG. 6I, in response to detecting input 650E, device 600 displays settings section 620, in fan-light accessory interface 610, corresponding to settings of the ceiling light and fan. In some embodiments, as further described and illustrated with respect to FIGS. 8A-8J, device 600 displays settings section 620 in response to device 600 detecting input resulting in scrolling fan-light accessory interface 610A to a second region (e.g., overflow region), where the second region is below the first region displaying controls 608A-608D. Settings section 620 includes graphical representation 610A1 and current status 610A2 that illustrates the current status of the ceiling fan and light accessory. Settings section 620 includes a group section that includes "group with other accessories" affordance 614A and accessories affordance 614B. "Group with other accessories" affordance 614A corresponds to grouping the ceiling fan in the bedroom with another accessory of the same type (e.g., another fan in the living room).

FIGS. 6I-6K illustrate separating the fan-light accessory group into two separate accessories with a separate accessory affordances (e.g., 604G and 604H) and separate accessory interfaces (e.g., 610H). The fan-light accessory group is separated by selecting show as separate tiles affordance 616 from accessories settings from fan-light accessory interface 610A as illustrated in FIG. 6J. The fan and the light each retain their corresponding settings after the accessory group is disassociated into two separate accessory affordances. In FIG. 6I, device 600 detects input (e.g., a tap) 650F corresponding to selection of accessories affordance 614B. In FIG. 6J, in response to detecting input 650F, device 600 displays accessories interface 622, which includes affordances 618A-618B corresponding to each of the respective components in the group (e.g., a fan and a light) and separation affordance 616 for separating the light from the fan.

In FIG. 6J, device 600 detects input (e.g., a tap) 650G corresponding to selection of separation affordance 616. In FIG. 6K, in response to detecting input 650G, device 600 displays home interface 602 including separate accessory affordances, fan accessory affordance 604G and light accessory affordance 604H in home interface 602, while ceasing to display fan-light accessory affordance 604A because the grouped accessory has been split up. Fan accessory affordance 604G includes graphical representation 604G1 of the fan, which includes an animation of a spinning fan and current status 604G2 indicating the fan is in operating at 50% in an ON state. Similarly, light accessory affordance 604H includes graphical representation 604H1 of the light, which includes a light bulb being in an ON state and current status 604H2 indicating the light is in operating at 75% in an ON state. Light accessory affordance 604H corresponds to the light component only of the ceiling fan and light accessory. The light accessory is a first type of accessory having a single function to turn the light on/off, which operates in binary states. Thus, device 600 transmits a command to turn on/off the light when device 600 receives an input (e.g., a tap) corresponding to selection of light accessory affordance 604H.

FIGS. 6L-6R illustrate that after the accessory group is split, each of the components from the accessory group can be separately configured through the corresponding accessory affordance. For example, the light from the ceiling fan with light is configurable through light accessory affordance 604H. When selected, light accessory affordance 604H transforms into light accessory interface 610H, where the controls of the light are displayed. Similarly, when light accessory interface 610H is closed, the light accessory interface 610H, transforms back into light accessory affordance 604H.

In FIG. 6L, device 600 detects input 650H corresponding to a long press (or a deep press) on light accessory affordance 604H. In FIGS. 6M-6O, in response to detecting input 650H, device 600 displays an animation of light accessory affordance 604H transforming into light accessory interface 610H. FIG. 6M illustrates that as light accessory affordance 604H increases in size, the corresponding graphical representation 604H1 and text corresponding to current status 604H2 also proportionally expand in size. Device 600 displays the animation of expanding light accessory affordance 604H based on the current position of light accessory affordance 604H, which positioned in the center of home interface 602. As illustrated in FIG. 6N in accordance with a determination that a portion of light accessory interface 610H would not be displayed off-screen if displayed in the current position, device 600 displays light accessory interface 610 in the current position without aligning the light accessory affordance to a left or right boundary of the screen.

FIG. 6O illustrates fully expanded light accessory interface 610H including a proportionally larger graphical representation 610H1 of the light and larger text indicating current status 610H2 of the light in the center of display device 603, where light accessory affordance 604H is positioned. Light accessory interface 610H includes control affordance 608A for adjusting the brightness of the light and color control affordance 608C corresponding to the color of the light. Device 600 displays additional control affordances associated with the light below color control affordance 608C in the overflow region of light accessory interface 610H, as further discussed with respect to FIG. 8C.

In FIG. 6O, device 600 detects input 650I (e.g., a swipe) corresponding to selection of control affordance 608A to adjust the brightness to 90%. In FIG. 6O, in response to detecting input 650I, device 600 updates graphical representation 610H1 to indicate that the light is on and updates current status 610H2 indicating the light has been set to 90% brightness. In some embodiments, in response to detecting input 650I, device 600 updates graphical representation 610A1 in light accessory interface 610H to include an animation.

In FIG. 6O, device 600 detects input (e.g., a tap) 650I corresponding to selection of "X" affordance 630 to close fan accessory interface 610H. As illustrated in FIGS. 6P-6R, in response to detecting input 650I, device 600 displays an animation of the light accessory interface 610H transitioning back into light accessory affordance 604H in home interface 602. FIG. 6P-6Q illustrates that as light accessory interface 610H decreases in size, the corresponding graphical representation 60GA1 and text corresponding to current status 604H2 also proportionally decrease in size. Device 600 ceases to display control affordances 608A and sensor affordances 608C-608D in light accessory interface 610H as the size of light accessory interface 610H decreases. In FIG. 6R, device 600 displays light accessory affordance 604H in home interface 602 with an updated graphical representation 604H1 and updated current status 604H2 that the light is set to 90% brightness. In some embodiments, graphical representation 604H1 and current status 604H2 remain the same as before the brightness of the light was changed as illustrated in FIG. 6L.

FIGS. 7A-7B are a flow diagram illustrating a method 700 for controlling external devices using an electronic device in accordance with some embodiments. Method 700 is performed at a device (e.g., 100, 300, 500, 600) with a display device (e.g., 603). Some operations in method 700 are, optionally, combined, the orders of some operations are, optionally, changed, and some operations are, optionally, omitted.

As described below, method 700 provides an intuitive way for managing controllable external devices from a home interface (e.g., 602) that provides access to affordances (e.g., 604A-604H) corresponding to the controllable external devices. Allowing users to manage controllable external devices from the home interface reduces the cognitive burden on a user because all the controllable external devices are accessible from the home interface. Thus, the user does not need to open a separate application to manage the configurations for each controllable external device, thereby creating a more efficient human-machine interface. For battery-operated computing devices, managing the controllable external devices from a unified home interface reduces the number of inputs needed to manage each controllable external device, allowing the user to efficiently conserve power on the device and increases the time between battery charges.

At block 702, the device (e.g., 600) (e.g., a smart phone; a smart home control device) with a display device (e.g., 603) (e.g., a touch-sensitive display device) and a communication device (e.g., a wireless antenna) displays, on the display device, a user interface (e.g., 602) (e.g., the home page showing a tile for each accessory) including a first accessory affordance (e.g., 604A-604G) (e.g., a selectable, graphical tile) associated with a first controllable external device (e.g., a device that has at least one controllable function (e.g., a smart light bulb, a smart thermostat, a smart speaker)).

In some embodiments, the first accessory affordance (e.g., 604A) includes a first graphical element (e.g., 604A1) (e.g., an icon representing the first controllable external device (e.g., an image of a light bulb)) and a first text element (e.g., 604A2) (e.g., a name representing the first controllable external device (e.g., "light bulb") including a current status (e.g., light bulb is "on")). In some embodiments, in accordance with a determination that the first controllable external device is associated with a second controllable component (e.g., a fan of a ceiling fan with a light), the second controllable component associated with the first function (e.g., turning on the fan), includes a graphical indication (e.g., 604A, 604G) of the second controllable component (e.g., the tile includes an icon of the fan). In some embodiments, in accordance with a determination that the first controllable external device is associated with a third controllable component (e.g., the light of the ceiling fan with a light), the third controllable component associated with the second function (e.g., turning on the light), includes a graphical indication of the third controllable component (e.g., 604A, 604H). In some embodiments, in accordance with a determination that the first controllable device is associated with the second controllable component and the third controllable component, including the graphical indication of the second controllable component and the graphical indication of the third controllable component (e.g., the tile includes an icon or image of each of the subcomponents in the accessory such as a fan and a light, or a power strip with several outlets) (e.g., 604A, 604E). Displaying a graphical indication (e.g., 604A1) of the components (e.g., a fan and a light) and a text status (e.g., 604A2) in the first accessory affordance (e.g., 604A) provides visual information to the user as to which controllable external devices and components are part of the accessory group (if multiple components) and the current status of the accessory. Allowing users to see which controllable external devices are controlled by the accessory affordance reduces the cognitive burden. Thus, the user does not need to provide additional input (e.g., a long press) to manage the configurations for each controllable external device and its corresponding components, thereby creating a more efficient human-machine interface. For battery-operated computing devices, reducing the number of inputs needed to manage each controllable external device allows the user to efficiently conserve power on the device and increases the time between battery charges. Further the user obtains visual confirmation that a selected function was performed or setting was configured.

In some embodiments, in accordance with a determination that the first controllable external device is associated with the second controllable component and the third controllable component, the first accessory affordance includes the graphical indication of the second controllable component and the graphical indication of the third controllable component (e.g., 604A).

In some embodiments, at block 704, the first controllable external device (e.g., a fan with a light) is associated with the first function (e.g., a primary or main function such as turning on the fan) and the second function (e.g., a secondary function such as turning on the light).

At block 706, the device (e.g., 600) detects a first input (e.g., a tap input) (e.g., 650A, 650B) corresponding to selection of the first accessory affordance (e.g., 604A). In some embodiments, at block 708, the first accessory affordance has a first appearance prior to detecting the first input.

At block 710, in response to detecting the first input (e.g., 650A): at block 714, in accordance with a determination that a set of command transmission criteria are met (e.g., the accessory has a single primary function), the device (e.g., 600) transmits, via the communication device, a command to the first controllable external device to perform a first function (e.g., turn on a light of the device if currently off; turn off if currently on). In some embodiments, at block 712, in response to detecting the first input and in conjunction with (e.g., concurrently with) transmitting the command to the first controllable external device to perform the first function, updating the first accessory affordance (e.g., 604B) to a second appearance (e.g., 604B1 in FIG. 6B) that is based on the first function (e.g., the first function is changing the state of a light that is part of the first controllable external device and the second appearance includes an image of a light in a state that matches the changed state of the light). Updating the first accessory affordance to a second appearance that reflects the updated state of the accessory provides the user with visual feedback that a command has been performed. Allowing users to see which controllable external devices have been updated by the accessory affordance reduces the cognitive burden. Thus, the user does not need to provide additional input (e.g., a long press) to manage the configurations for each controllable external device and its corresponding components, thereby creating a more efficient human-machine interface. For battery-operated computing devices, reducing the number of inputs needed to manage each controllable external device allows the user to efficiently conserve power on the device and increases the time between battery charges. Further the user obtains visual confirmation that a selected function was performed or setting was configured.

In some embodiments, at block 716, the set of command transmission criteria includes a first criterion that is satisfied when the first function (e.g., a primary function such as turning on the fan) associated with the first controllable external device is a primary function (e.g., a designated main function if the accessory supports multiple functions; a sole function of associated with the device) of the first controllable external device (e.g., an accessory with multiple functions such as a fan with a light). In some embodiments, the set of command transmission criteria includes a second criterion that is satisfied when the first function (e.g., the accessory only has a single function with a binary state—being turned on or off) associated with the first controllable external device is associated with a first controllable component (e.g., a fan of the ceiling fan with a light) of the external device that has binary operating states (e.g., off or on; not three or more states). In some embodiments, the first function is transitioning from a current operating state of the first controllable component of the first controllable external device to the other operating state of the first controllable component of the first controllable external device (e.g., when the component is on, the function is to turn off and vice versa). In some embodiments, tapping on the accessory tile causes the fan of the ceiling fan with light to turn on or off.

In some embodiments, at block 718, in accordance with a determination that the set of command transmission criteria (e.g., determining whether the accessory is associated with a primary function) are met (e.g., the accessory has a single primary function), transmitting, via the communication device, a command to the first controllable external device to perform the first function without transmitting, via the communication device, a command to the first controllable external device to perform the second function. In response to detecting the first input (e.g., 650A) and in conjunction with (e.g., concurrently with) transmitting the command to the first controllable external device to perform the first function, updating the first accessory affordance (e.g., 604B) to a second appearance (e.g., 604B1) that is based on the first function (e.g., the first function is changing the state of a light that is part of the first controllable external device and the second appearance includes an image of a light in a state that matches the changed state of the light). In some embodiments, the second appearance includes an animation (e.g., a repeating/looping animation) based on the first function (e.g., the fan was turned on, so the animation of the tile shows a spinning fan). The device transmitting a command to the first controllable external device to perform the first function when transmission criteria are met, without having to display an additional accessory interface provides a more efficient user interface. Because the first controllable external device is mapped to a primary function, the primary function is performed without requiring additional user interaction. This reduces the cognitive burden of the user and preserves battery as a single input will cause the first controllable external device to perform the primary function.

At block 720, in accordance with a determination that the set of command transmission criteria are not met (e.g., the accessory has a more than a single primary function such as a thermostat where you can change the temperature and toggle it on and off), displaying, on the display device, a first accessory interface (e.g., 610A in FIG. 6F, 1210C in FIG. 12B) (e.g., without transmitting a command to the controllable external device). The first accessory interface includes: at block 722, a first control affordance (e.g., 608A-608C in FIG. 6F, 1208 in FIG. 12B) (e.g., a dimmer for lights, the temperature dial for a thermostat) that, when selected, transmits a command to the controllable external device to perform the first function and a second control affordance (e.g., changing the color of the light, the mode of the thermostat—AC, heater, fan) that, when selected, transmits a command to the external accessory device to perform a second function that is different than the first function. Displaying the accessory interface to allow the user to manage the settings of the first controllable external device when the device is not mapped to a primary function provides the user with a more efficient user interface. Because the controllable external device is not mapped to a primary function, displaying the accessory interface provides a more efficient user interface as the user can manage the controls of the controllable external device. This preserves battery as the accessory interface is not displayed every time a corresponding accessory affordance is selected.

In some embodiments, the first accessory interface (e.g., 610A) includes the first control affordance (e.g., 608A) and the second control affordance (608B, 608C). In some embodiments, displaying the first accessory interface includes: in accordance with the first function and the second function meeting a first set of layout criteria (e.g., the first set of layout criteria includes a criterion that is met when the first function and the second function are categorized at the same level in a hierarchy of functions), displaying the first control affordance (e.g., 608A) and the second control affordance (e.g., 608B) in a side-by-side arrangement (e.g., in a horizontal arrangement). In some embodiments, in accordance with the first function and the second function meeting a second set of layout criteria (e.g., the first set of layout criteria includes a criterion that is met when the first function and the second function are categorized at different levels in a hierarchy of functions), displaying the first control affordance (e.g., 608A) above the second control affordance (e.g., 608C) in a top-and-bottom arrangement (e.g., in a vertical arrangement).

In some embodiments, the first accessory interface (e.g., 610A1) includes a second graphical element (610A1) that corresponds to (e.g., matches) the first graphical element (e.g., 604A1) and a second text element (e.g., 610B2) that corresponds to the first text element (e.g., 604A2). In some embodiments, displaying the first accessory interface further comprises: displaying an animation of the first graphical element visually transitioning into the second graphical element (e.g., an animation of the first graphical element expanding to become the second graphical element) and displaying an animation of the first text element visually transitioning into the second text element.

In some embodiments, in accordance with a determination that a portion of the first accessory interface (e.g., 610A in FIG. 6E) would be displayed in a position that exceeds a boundary (e.g., a portion of the user interface of the accessory, (e.g., a card associated with the accessory would be displayed outside the boundary of the screen of the device) of the display device, displaying the first accessory interface at a first position (e.g., 610A in FIG. 6E) where the first accessory interface is aligned with the boundary (e.g., snap the user interface of the accessory to be aligned with the boundary or the edge of the screen). In some embodiments, in accordance with a determination that the portion of the first accessory interface (e.g., 610A in FIG. 6N) would not be displayed in a position that exceeds the boundary of the display device (e.g., the user interface would be within the boundary of the screen), displaying the first accessory interface at a second position (e.g., 610A in FIG. 6N) that is based on a position of the first accessory affordance (e.g., 604H) (e.g., display the user interface at the position where the tile is located). Having the device determine the appropriate layout for each accessory interface based on the number of controls and sensors supported by the controllable external device results in a more intuitive user interface that reduces the cognitive burden of the user. The layout of the controls and sensors helps to reduce the number of inputs needed to configure the controllable external device, thereby conserving battery.

In some embodiments, while displaying the first accessory interface (e.g., 610H in FIG. 6O) (in some embodiments, and while not displaying the first accessory affordance), detecting a second input (e.g., 650J) corresponding to a request to cease to display the first accessory interface. In response to detecting the second input, ceasing to display the first accessory interface (in some embodiments, and re-displaying the first accessory affordance), including: displaying an animation of the second graphical element (e.g., 610H1) visually transitioning into the first graphical element (e.g., 604H1) (e.g., an animation of the second graphical element shrinking to become the first graphical element) displaying an animation of the second text element (e.g., 610H2) visually transitioning into the first text element (e.g., 604H2).

In some embodiments, wherein the first controllable external device is associated with the second controllable component (e.g., the fan of the ceiling fan with light) and the third controllable component (e.g., the light of the ceiling fan with light), while displaying the first accessory interface (e.g., 610A) (e.g., displaying the card of the ceiling fan with light), detecting a first set of one or more inputs (e.g., 650F-650G in FIGS. 6I-6J and 1050J-1050I in FIGS. 10K-10L) (e.g., selecting the accessories affordance and clicking on the "show as separate tiles" affordance) (e.g., that further includes a request to re-display the user interface) that includes an input corresponding to a control reconfiguration affordance (e.g., 616 in FIG. 6J, 1020 and 1022 in FIG. 10L) (e.g., for ungrouping a subcomponent from the group) (e.g., ungroup the fan and the light into two separate tiles). In response to detecting the first set of one or more inputs, displaying a second instance of the user interface (e.g., 602 in FIG. 6K) that includes: a second accessory affordance (e.g., 604G) (e.g., an affordance that, when selected, performs a function associated with the second controllable component) (e.g., an tile corresponding to the fan) associated with the second controllable component of the first controllable external device and that is not associated with the third controllable component of the first controllable external device and a third accessory affordance (e.g., 604H) (e.g., an affordance that, when selected, performs a function associated with the third controllable component)) (e.g., an tile corresponding to the light) associated with the third controllable component of the first controllable device and that is not associated with the second controllable component of the first controllable device. In some embodiments, the second instance of the user interface does not include the first accessory affordance (e.g., 604A). In some embodiments, the grouped ceiling fan with light tile is no longer displayed and instead, two separate tiles (e.g., fan tile and light tile) are displayed. Updating accessory affordance in the home interface based on whether accessories are grouped together or separated provides the user with a more intuitive user interface for managing controllable external devices. Grouped accessories are represented by a single accessory affordance to reduce the cognitive burden of the user. Thus, selecting the single accessory affordance allows the user to manage all the controls of the accessory in one place, rather than have to access the controls of each component or controllable external device in the group separately. This also conserves power as the number of inputs needed to configure grouped accessories are reduced. Similarly, grouped accessories that are separated are shown as individual accessory affordances to provide the user with a more intuitive user interface. Because the user has selected to separate the components of an controllable external device, providing separate user interfaces for configuring each component makes it clear which component the user is interacting with, which reduces the cognitive burden of the user.

Note that details of the processes described above with respect to method 700 (e.g., FIGS. 7A-7B) are also applicable in an analogous manner to the methods described below/above. For example, method 700 optionally includes one or more of the characteristics of the various methods described above with reference to method 900, 1100, and 1300. For example, the controllable external device described in method 900 can be the controllable external device of method 700, which can be configured and accessed using the interfaces described in method 700. For brevity, these details are not repeated below.

FIGS. 8A-8J illustrate exemplary user interfaces for configuring an accessory (e.g., a light, a power strip, a thermostat), in accordance with some embodiments. The user interfaces in these figures are used to illustrate the processes described below, including the processes in FIGS. 9A-9B.

Figure 8A:
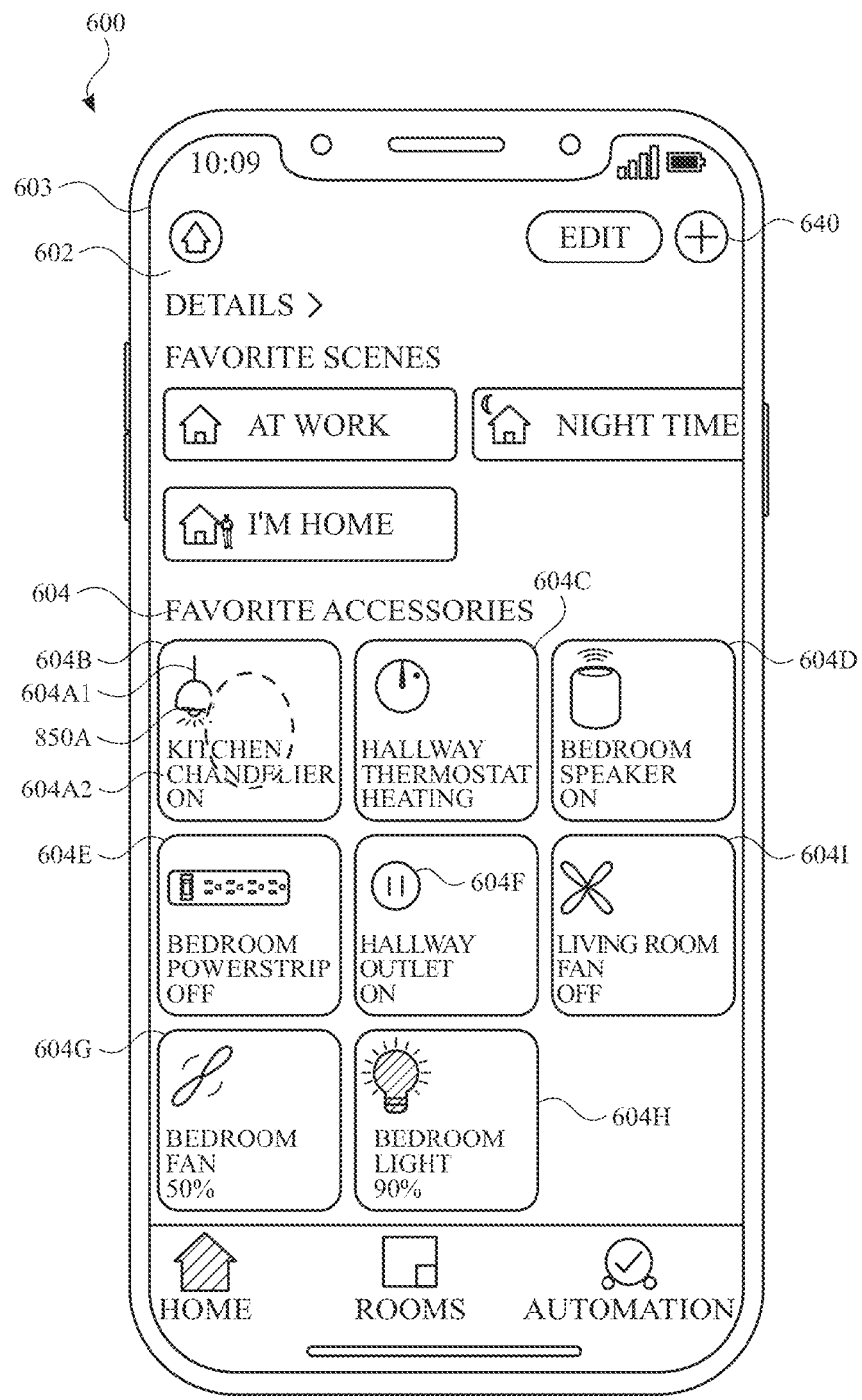
FIGS. 8A-8J illustrate exemplary user interfaces for managing controllable external devices in accordance with some embodiments.
Figure 8B:
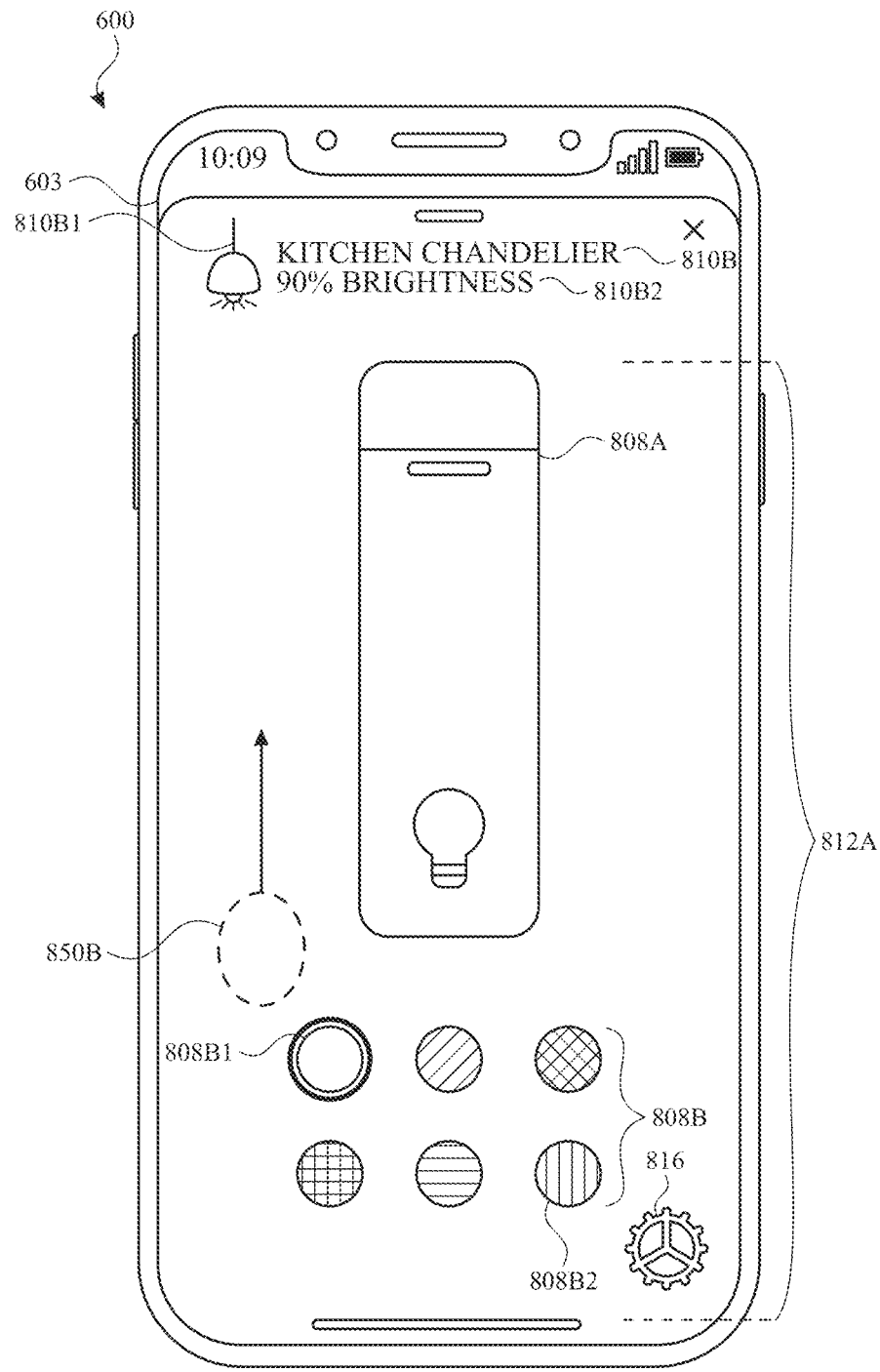

FIGS. 8A-8B illustrate accessing the controls of the chandelier by long pressing on chandelier accessory affordance 604B. In FIG. 8A, device 600 displays chandelier accessory affordance 604B corresponding to a chandelier. Chandelier accessory affordance 604B includes graphical representation 604A1 of the chandelier indicating that it is currently in an ON state and text indicating current status 604A2 that the chandelier is in an ON state. Device 600 detects input 850A corresponding to a long press (or a deep press) on chandelier accessory affordance 604B in home interface 602. In FIG. 8B, in response to detecting input 850A corresponding to a long press on the chandelier accessory affordance 604B, device 600 displays chandelier accessory interface 810B. In some embodiments, when the accessory is a second type of accessory that does not have a primary function, device 600 displays an accessory interface (e.g., chandelier accessory interface 810B) in response to device 600 detecting input (e.g., a tap) corresponding to selection of the accessory affordance.

Figure 8C:
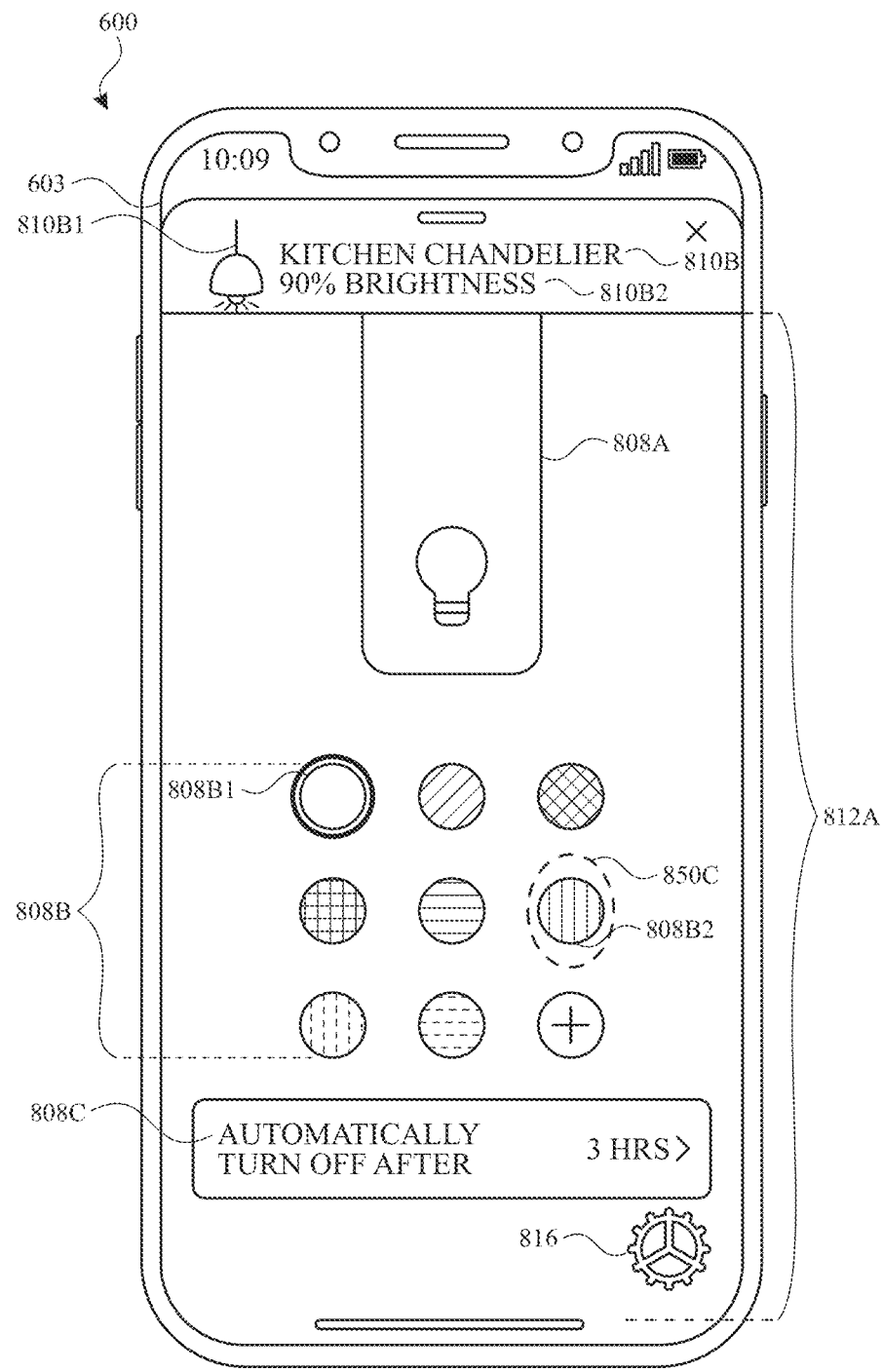
Figure 8D:
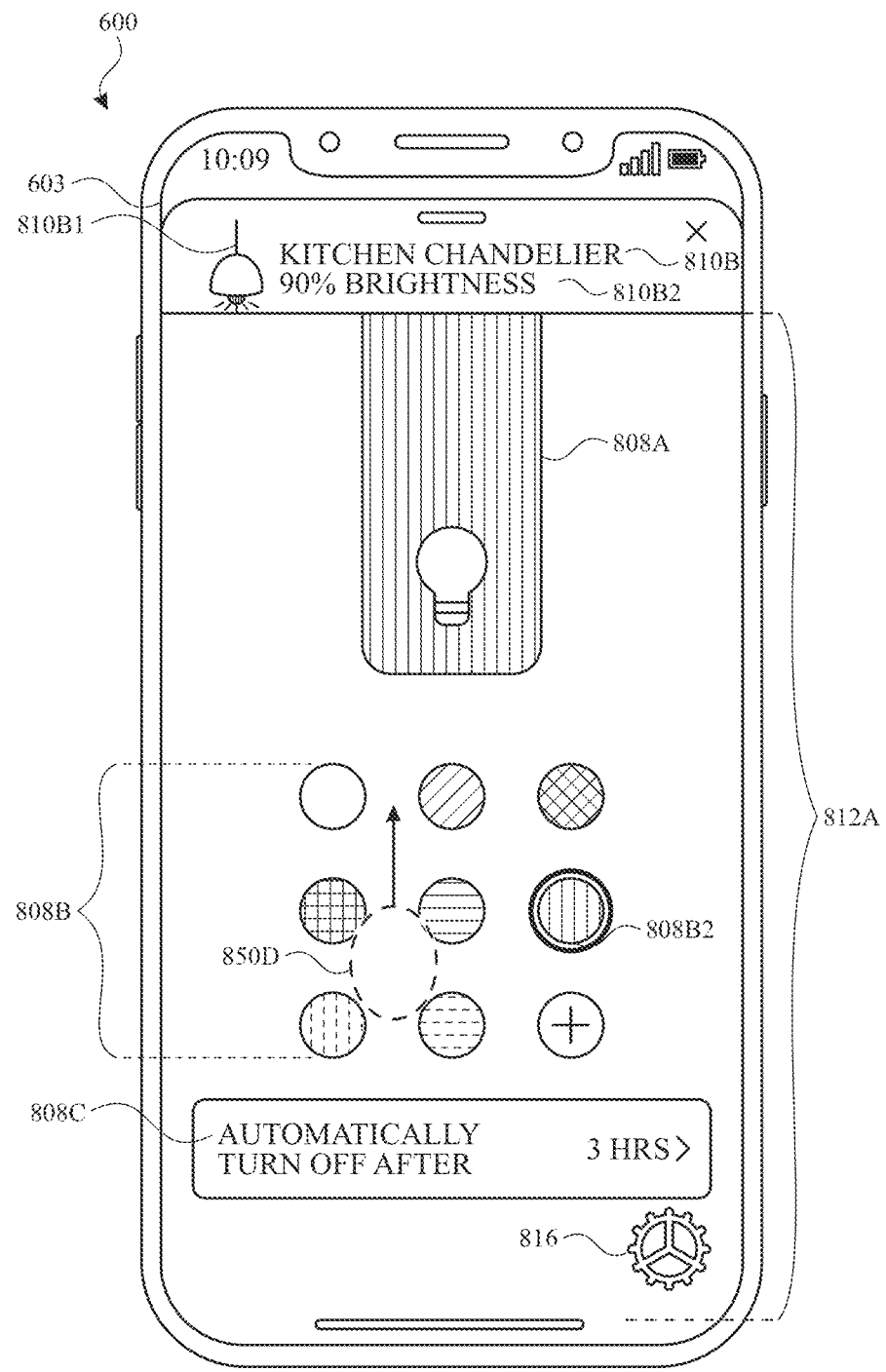

FIGS. 8B-8D illustrate the layout of controls in chandelier accessory interface 810B, which is made up of first region 812A that is displayed when chandelier accessory interface 810B is initially displayed. Second region 812B (the overflow region) includes accessory settings. Settings section 822 is displayed if the user scrolls past first region 812A. A user can scroll between the regions by using a swipe gesture. In FIGS. 8B-8D, device 600 displays chandelier accessory interface 810B, including first region 812A that is displayed and second region 812B that is not displayed. A first portion of first region 812A is displayed, on display 603, when device 600 displays chandelier accessory interface 810B in response to detected input 850A. First region 812A includes graphical representation 810B1, current status 810B2, and control affordances 808A-808C. First region 812A includes an overflow region that is not initially displayed. The overflow region of first region 812A includes additional control affordances and sensors that are not initially displayed in the first region, such as affordance 808C. Device 600 displays the overflow region of first region 812A in response to detecting input corresponding to scrolling down in first region 812A.

Control affordance 808A corresponds to a control to change the brightness of the chandelier. In FIG. 8B, the chandelier is set to 90% brightness. Control affordance 808B corresponds to different colors to which the chandelier can be set. In FIG. 8B, six different colors are initially displayed in the first portion of first region 812A of chandelier accessory interface 810B. Additional colors are displayed in the overflow region of first region 812A, which is not displayed until chandelier accessory interface 810B is scrolled. In FIG. 8B, the chandelier is set to color 808B1. Graphical representation 810B1 reflects the selected light color indicated by control 808B.

In FIG. 8B, device 600 detects input 850B corresponding to a swipe gesture to scroll down in chandelier accessory interface 810B. In FIG. 8C, in response to detecting input 850B, device 600 displays an overflow region of first region 812A, while still maintaining display of control affordances 808A and 808B. The overflow region of first region 812A includes a third row of colors for the chandelier for control 808B and timer control affordance 808C specifying a time period after which the chandelier should be automatically turned off. Device 600 maintains display of graphical representation 810B1 and current status 810B2 while displaying the overflow region of first region 812A. Control affordance 808A is partially displayed as first region 812A is scrolled to show control affordance 808C. As the user is scrolling through chandelier accessory interface 810B, settings shortcut affordance 816 is displayed at the bottom of the screen while scrolling in first region 812A to provide the user with quick access to settings section 822. Thus, as device 600 scrolls through the first region 812A of chandelier accessory affordance 810B, device 600 maintains display of settings shortcut affordance 816 at the bottom corner of the first region of chandelier accessory affordance 810B. Settings shortcut affordance 816 is not displayed in the second region of chandelier accessory affordance 810B. Settings shortcut affordance 816 provides quick access to settings section 822 in the second region 812B of chandelier accessory interface 810B, so that the user does not have to scroll through first region 812A to get to the settings section.

FIGS. 8C-8D illustrate that graphical representation 810B1 and status text 810B2 update as the settings are changed in chandelier accessory interface 810B. In FIG. 8C, device 600 detects input (e.g., a tap) 850C corresponding to selection of second color 808B2. In FIG. 8D, in response to detecting input 850C, device 600 updates display of control affordance 808A and graphical representation 810B1 to reflect the selected color of the light. Device 600 determines that the bottom of first region 812A of chandelier accessory interface 810B is displayed. In response to the determination, device 600 displays settings shortcut affordance 816. Device 600 displays the second region of chandelier accessory interface 810B in response to detecting selection of the settings shortcut affordance. In some embodiments, settings shortcut affordance 816 is displayed at the bottom of first region 812A. In some embodiments, settings shortcut affordance 816 is displayed at the bottom of display 603, regardless of what portion of first region 812A is displayed.

Figure 8E:
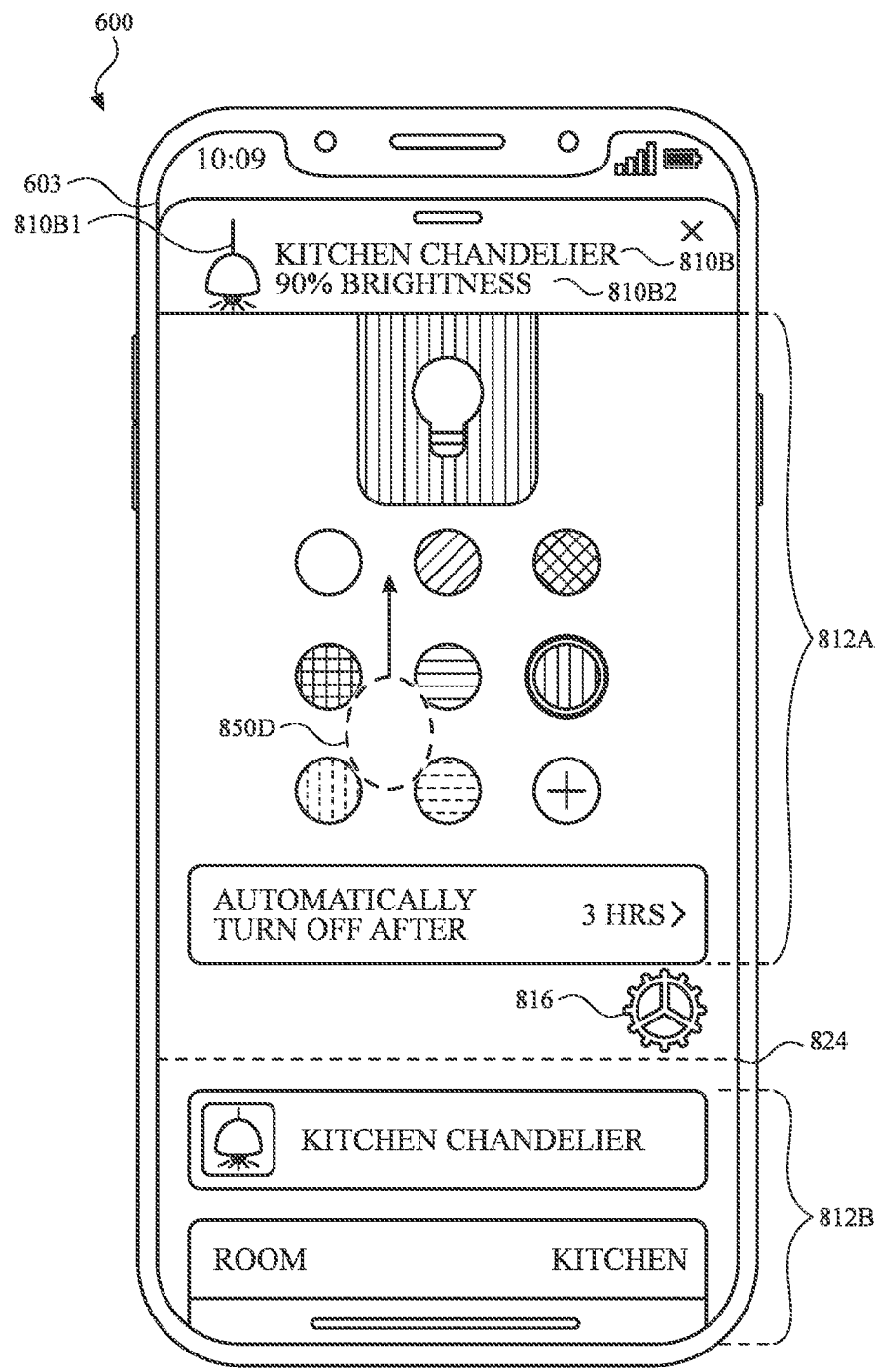
Figure 8F:
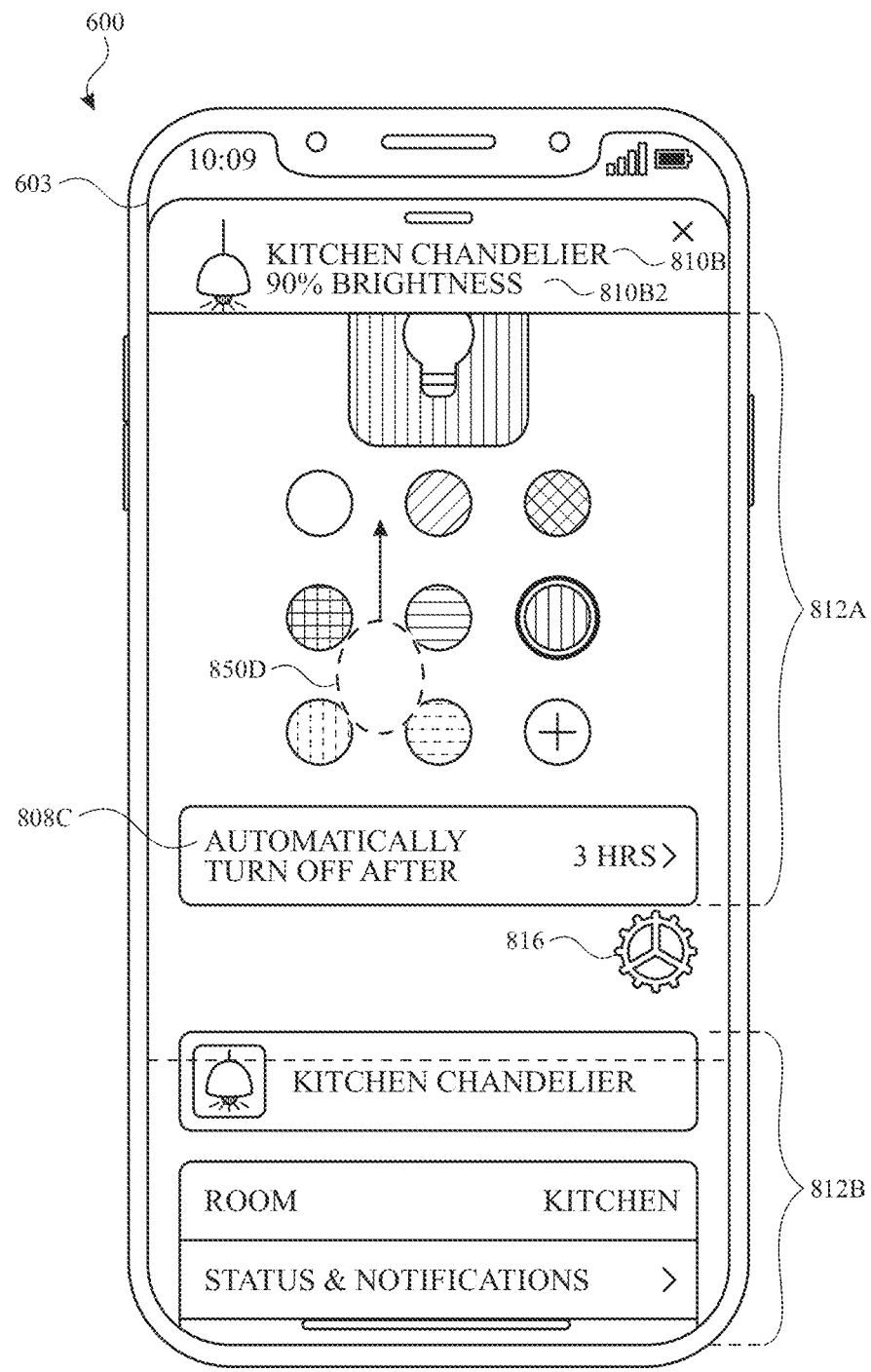
Figure 8G:
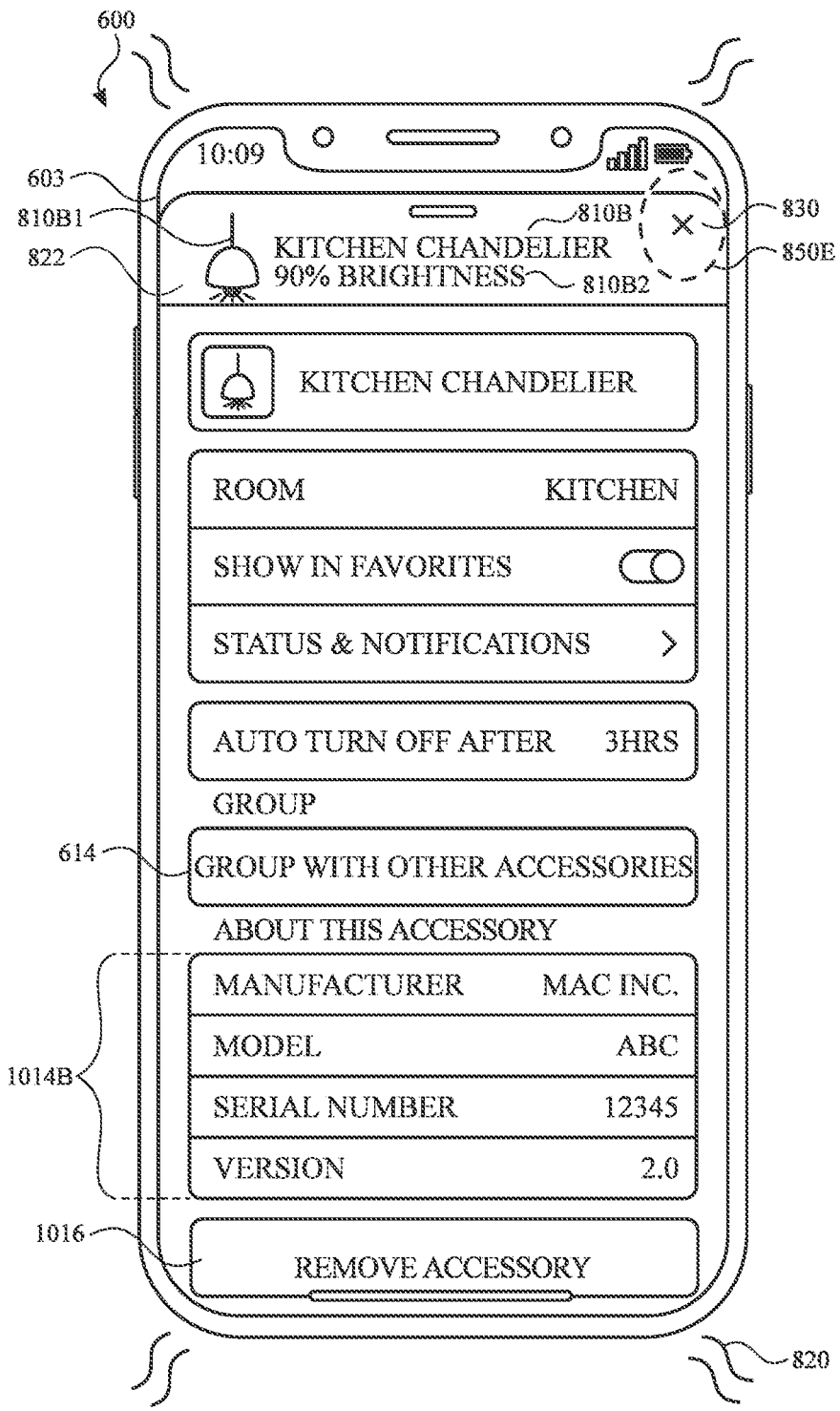

FIGS. 8D-8F illustrate accessing second region 812B by using a swipe gesture in chandelier accessory interface 810B. In FIG. 8D, device 600 detects input 850D corresponding to a swipe gesture to further scroll down in chandelier accessory interface 810B. In FIG. 8E, in response to detecting input 850D, device 600 displays a portion of second region 812B of chandelier accessory interface 810B as a finger of the user is still in contact with display 603. Device 600 determines whether the displayed portion of second region 812B exceeds threshold amount 824. FIG. 8E illustrates in accordance with a determination that the displayed portion of second region 812B does not exceed threshold amount 824, device 600 displays a bounce animation (e.g., a rubber band effect) when the user releases a finger from the swipe gesture. As a result of the bounce animation, FIG. 8D illustrates device 600 snaps back to the previously displayed portion of first region 812A of chandelier accessory interface 810B, without displaying second region 812B. FIGS. 8F-8G illustrate, in accordance with a determination that the displayed portion of second region 812B exceeds threshold amount 824 (as a result of a quick swipe gesture), device 600 snapping to second region 812B of chandelier accessory interface 810B to display second region 812B at a top portion of display 603.

FIG. 8G illustrates second region 812B (the settings section 822) of chandelier accessory interface 810B. Second region 812B includes graphical representation 810B1 and current status 810B2 that is the same as that displayed in first region 812A. Second region 812B includes settings section 822 for configuring the settings of the chandelier. In response to device 600 snapping to display second region 812B of chandelier accessory interface 810B, device 600 outputs haptic and audio output 820 indicating the transition from display of first region 812A to second region 812B. In some embodiments, device 600 outputs a haptic output without an audio output. In some embodiments, device 600 outputs an audio output without a haptic output.

Figure 8H:
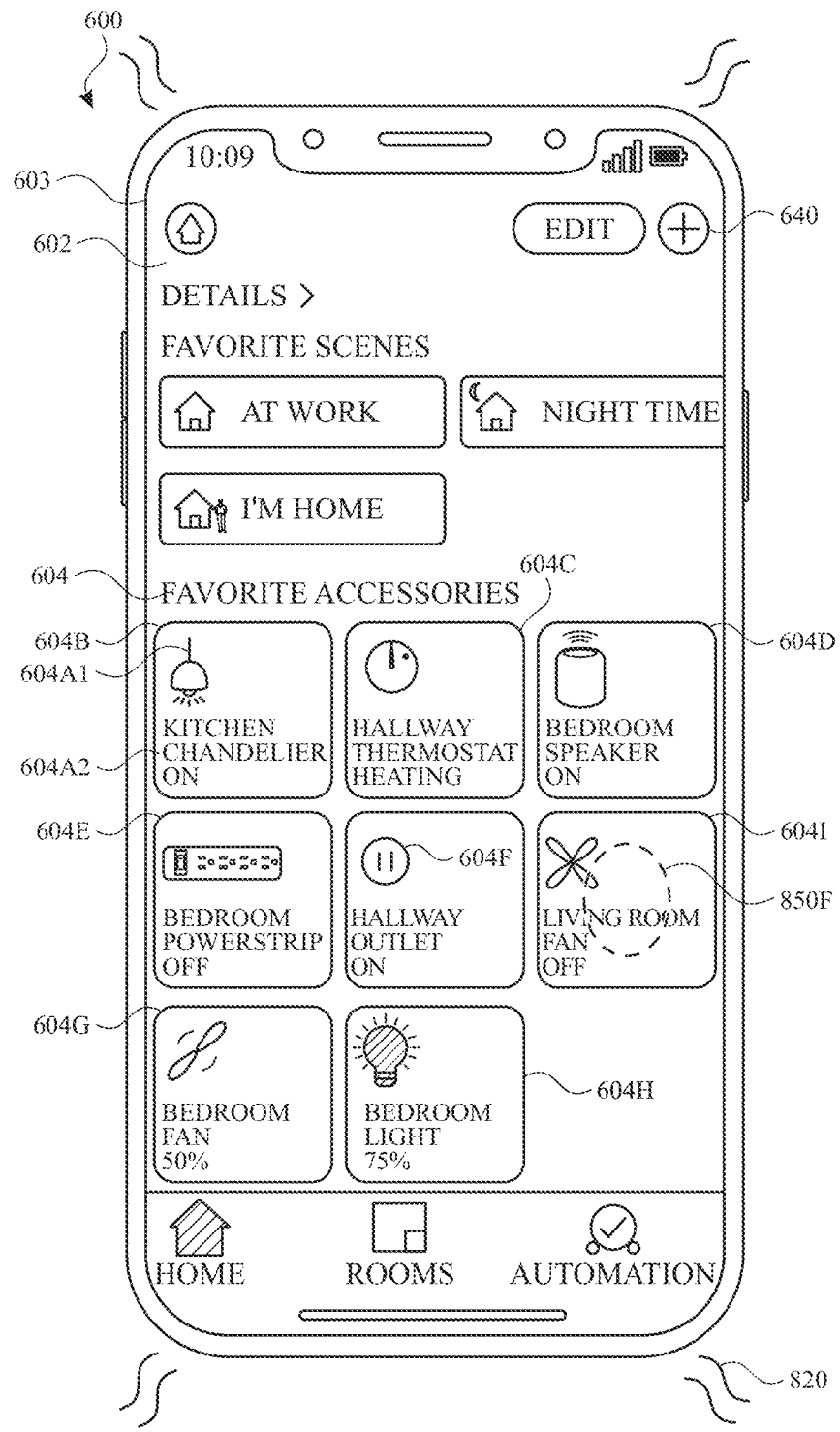

In FIG. 8G, device 500 detects input (e.g., a tap) 850E corresponding to selection of "X" affordance 830 to close chandelier accessory interface 810B. In FIG. 8H, in response to detecting input 850E device 600 displays an updated chandelier accessory affordance 604B including graphical representation 604A1 indicating the light color has changed to color 808B2 and current status 604A2 indicating the light is at 90% brightness in the ON state. In some embodiments, in response to detecting input 850E, device 600 outputs a haptic output and an audio output when chandelier accessory interface 810B is closed. In some embodiments, device 600 outputs a haptic output without an audio output. In some embodiments, device 600 outputs an audio output without a haptic output.

Figure 8I:
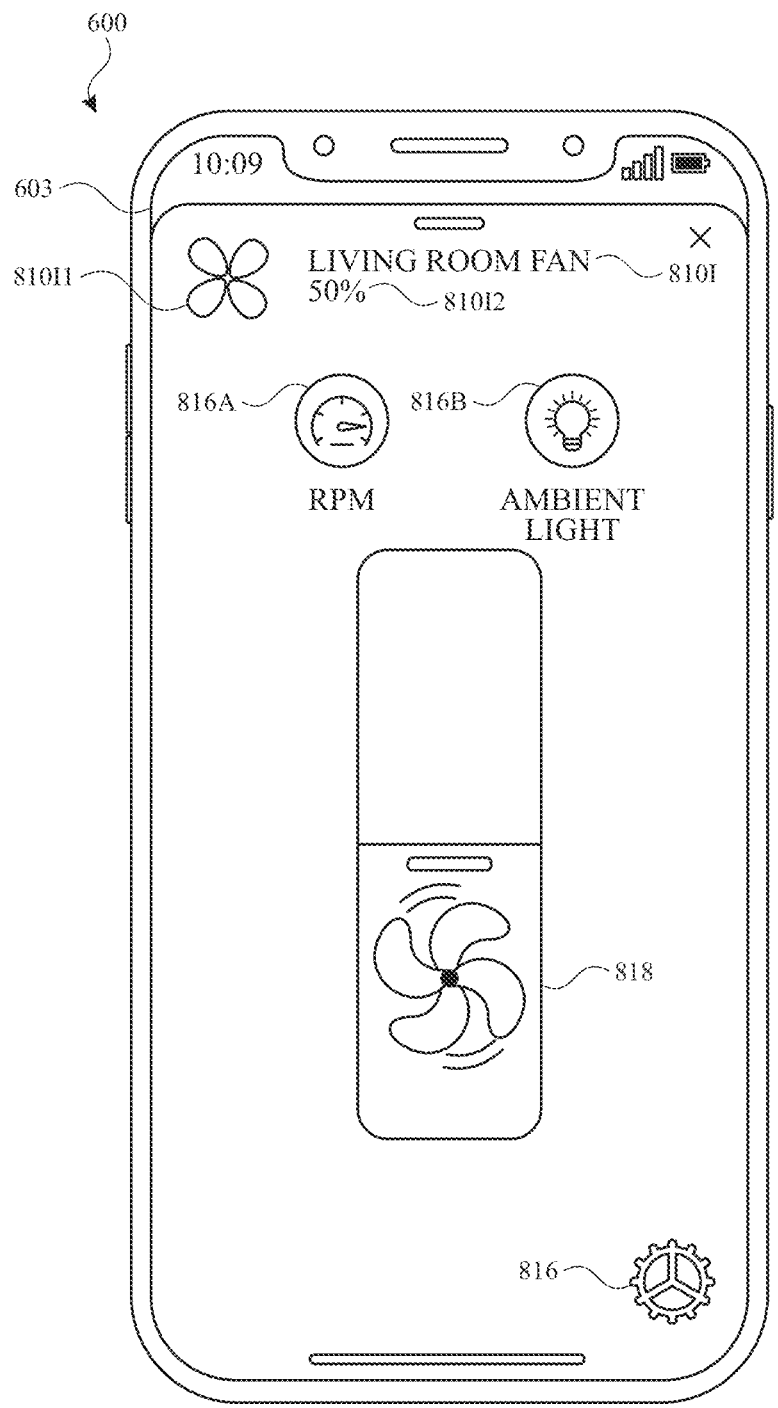
Figure 8J:
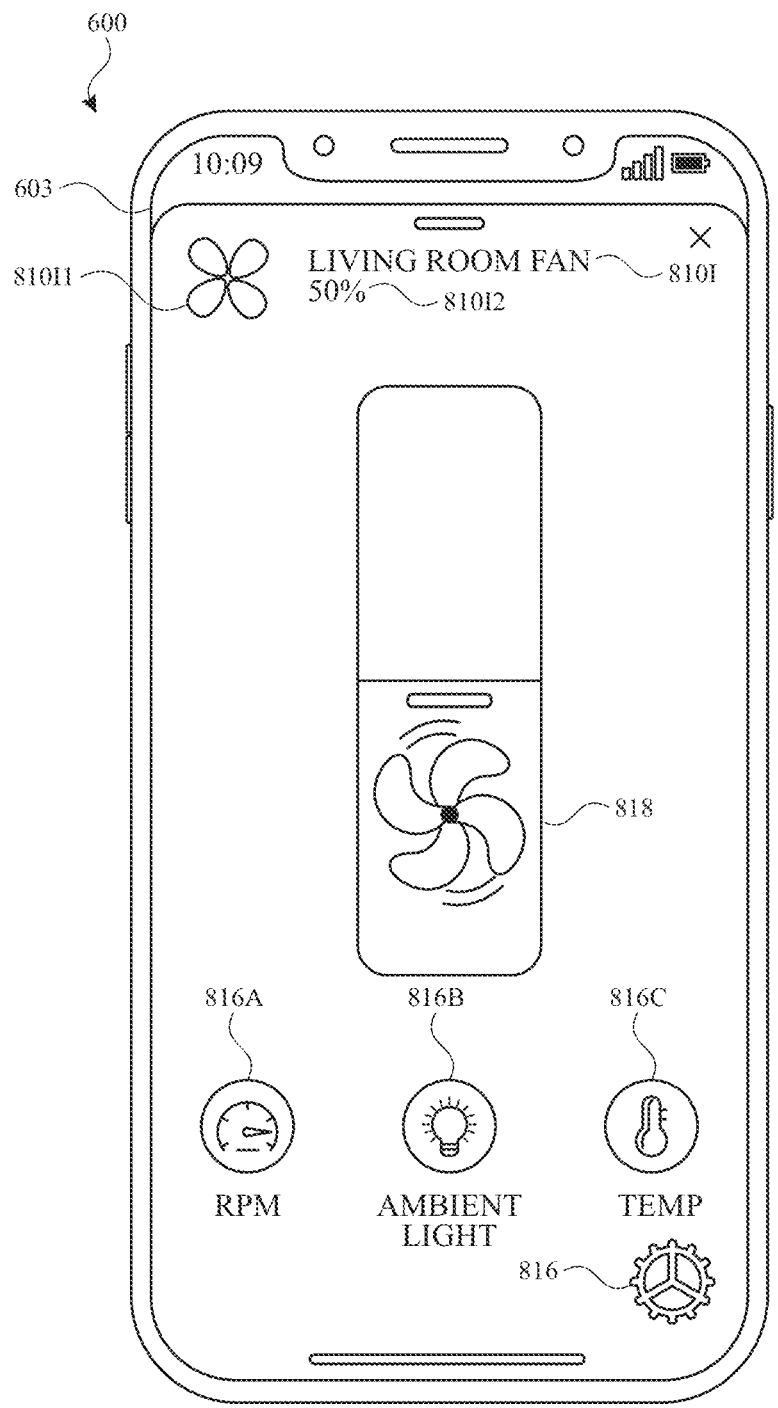

FIGS. 8H-8J illustrate several layouts for the controls in fan interface 810I. As discussed above with respect to FIG. 6F, device 600 determines the layout depending on the number of controls and sensors associated with the accessory. In FIG. 8H, device 600 detects input 850F corresponding to a long press (or a deep press) on living room fan accessory affordance 604I. In response to detecting input 850F, device 600 displays living room fan accessory interface 610I. FIGS. 8I-8J illustrate two layouts for living room fan accessory interface 610I. Device 600 determines the layout of control affordances and sensors affordances in fan accessory interface 610I based on the number of control affordances and sensor affordances to be displayed as generally discussed with respect to FIG. 6F. In FIG. 8I, device 600 determines whether the living room fan has two or fewer sensor affordances (e.g., 816A-816B). In accordance with a determination that the fan has two sensor affordances 816A-816B, device 600 displays a layout in fan accessory interface 610I where sensor affordances 816A-816B are displayed above control 818. In FIG. 8J, device 600 determines that the living room fan has three sensor affordances 816A-816C. In accordance with a determination that the fan has more than two sensor affordances, device 600 displays a layout in fan accessory interface 610I where sensor affordances 816A-816C are displayed below control 818.

FIGS. 9A-9B are a flow diagram illustrating a method 900 for controlling external devices using an electronic device in accordance with some embodiments. Method 900 is performed at a device (e.g., 100, 300, 500, 600) with a display device (e.g., 603). Some operations in method 900 are, optionally, combined, the orders of some operations are, optionally, changed, and some operations are, optionally, omitted.

As described below, method 900 provides an intuitive way for managing controllable external devices from a home interface (e.g., 602) that provides access to affordances corresponding to the controllable external devices. Allowing users to manage the controllable external devices in the home from the home interface reduces the cognitive burden on a user because all the controllable external devices are accessible from the home interface. Thus, the user does not need to open a separate application to manage the configurations for each controllable external device, thereby creating a more efficient human-machine interface. For battery-operated computing devices, enabling a user to manage the controllable external devices from the home interface reduces the number of inputs needed to open multiple applications allowing the user to efficiently conserve power on the device and increases the time between battery charges.

At block 902, device (e.g., 600) displays, on the display device, a user interface (e.g., the home page showing a tile for each accessory) including a first accessory affordance (e.g., 604B) (e.g., a selectable, graphical tile) associated with a first controllable external device (e.g., a device that has at least one controllable function (e.g., a smart light bulb, a smart thermostat, a smart speaker)).

In some embodiments, at block 904, the first accessory interface (e.g., 810B) includes a first total number of control affordances (e.g., 808A-808C), wherein all of the first total number of control affordances are included in the first region (e.g., 812A) (e.g., all controls for the accessory are displayed in the first region) and none of the first total number of control affordances are included in the second region (e.g., 812B) (e.g., no controls are displayed in the settings section displayed in the second region). In some embodiments, the first region of the first accessory interface includes a second region affordance (e.g., 816) (e.g., the settings shortcut) at a third location in the first region (e.g., adjacent of the displayed portion of the first region).

At block 906, the device (e.g., 600) detects a first input (e.g., 850A) (e.g., a tap on an affordance) corresponding to selection of the first accessory affordance.

At block 908, in response to detecting the first input (e.g., 850A) (e.g., a tap), the device (e.g., 600) displays, on the display device (e.g., 603), a first region (e.g., 812A) of the first accessory interface (e.g., 810B) (e.g., the a user interface displaying all the controls of the accessory, e.g., a card associated with the accessory) that includes a first control affordance (e.g., 808A) that, when selected, controls (e.g., transmits a control signal) a first function of the first controllable external device (e.g., dimmer for lights, change color of light), without displaying a second region (e.g., 812B) of the first accessory interface (e.g., the settings section). In some embodiments, the first region includes all the controls of the accessory and a second region includes the accessory's settings section (e.g., 816).

In some embodiments, at block 910, in accordance with a determination that the first controllable external device is associated with (e.g., includes) less than a predetermined number (e.g., 3 sensors) of sensors (e.g., temperature, humidity, and/or ambient light sensors), the first region (812A) of the first accessory interface (e.g., 810I) includes a set of control affordances (e.g., 816A-816C) corresponding to the sensors of the first controllable device at a first location in the first region (e.g., above the first control affordance).

In some embodiments, at block 912, in accordance with a determination that the first controllable external device is associated with (e.g., includes) the predetermined number or more sensors, the first region (e.g., 812A) of the first accessory interface (e.g., 810I) includes the set of control affordances (e.g., 816A-816C) corresponding to the sensors of the first controllable device at a second location in the first region (e.g., 812A) (e.g., below the first control affordance (e.g., 818)) that is different than the first location.

At block 914, while displaying, on the display device (e.g., 603), the first region (e.g., 812A) of the first accessory interface (e.g., 810B), the device detects a second input (e.g., 850B, 850D) (e.g., a swipe). In some embodiments, the second input includes a swipe (e.g., 850B) that causes the display to scroll to display additional controls further down on the card that is not currently displayed. In some embodiments, the swipe (e.g., 850D) causes the display to snap to a sections settings that causes the display to snap to the settings section (e.g., 822), such that the controls are no longer displayed).

At block 916 and block 918, in response to detecting the second input (e.g., 850D): in accordance with a determination that the second input (e.g., 850D) causes a portion (e.g., a quarter of the settings section is displayed on the screen) of the second region (e.g., 812B) to be displayed that exceeds a threshold amount (e.g., a threshold amount of content or area of the second region), at block 920, the device (e.g., 600) updates display of the first accessory interface (e.g., 810B) to display the second region at a top portion of the first accessory interface (e.g., 810B) (e.g., snap to the settings section of the accessory) while ceasing display of the first region (e.g., 812A) (e.g., the controls in the first region are no longer displayed), wherein the second region includes one or more settings (e.g., the settings is the main settings page of the accessory that allows users to manage the setup of the accessory (e.g., sharing data, including in favorites, receiving notifications, adding people to the access list of the accessory)) of the first controllable external device. In some embodiments, at block 922, the device outputs haptic and audio feedback (e.g., 820). Displaying the controls and the settings in the same accessory interface provides a more efficient user interface for accessing the controls of the controllable external device. Allowing users to access the controls and settings of a controllable external devices from one interface reduces the cognitive burden on a user. Thus, the user does not need to open a separate applications to manage the configurations for each controllable external device. Further, since the settings of the controllable external device is less commonly used than the other controls, they are hidden unless the user intentionally tries to access the settings. Thus, by using a threshold to determine when to display the settings provides a more efficient user interface, as it is only displayed when the user intentionally wants to access the settings section. Further, a floating settings shortcut affordance allows the user to navigate to the settings section without having to scroll to the bottom of the accessory interface.

At block 924, in response to detecting the second input: in accordance with a determination that the second input does not cause a portion of the second region (e.g., 812B) to be displayed that exceeds the threshold amount (e.g., less than a quarter of the settings section is displayed), the device (e.g., 600) updates display of the first accessory interface (e.g., 810B) based on the second input (e.g., 850D) (e.g., scroll through the first region (e.g., 812A) incrementally to display a second control (e.g., 808C) on the paged that was previously not displayed, corresponding to the velocity of the swipe without snapping to the settings section) to a second control affordance (e.g., 808B, 808C) (e.g., changing the color of the light; the second control was not previously shown prior to the second input) in the first region of the first accessory interface (e.g., the second control was previously not displayed. In some embodiments, scrolling down the page to display the second control results in the first control to not be displayed) without displaying the second region (e.g., 812B) of the first accessory interface (e.g., 810B). Not displaying the settings section when the threshold is not exceeded provides a more efficient user interface. Instead, focus is directed to the controls of the controllable external device, which reduces the cognitive burden of the user.

In some embodiments, the device (e.g., 600) detects a fourth input (e.g., 650E in FIG. 6H) corresponding to the second region affordance (e.g., 816). In response to detecting the fourth input corresponding to the second region affordance, the device updates display of the first accessory interface (e.g., 610A) (e.g., and scrolling through the other controls in the overflow region of the first region) to display the second region (e.g., 620 in FIG. 6H) at a top portion of the first accessory interface (e.g., snap to the settings section of the accessory) while ceasing display of the first region.

In some embodiments, while displaying, on the display device (e.g., 603), the first accessory interface (e.g., 810B), the device detects a third input (e.g., 830) (e.g., the third input dismisses or closes the first accessory interface). In response to detecting the third input, the device ceases display of the first accessory interface and outputs haptic and audio feedback (e.g., 820) indicating the first accessory interface is no longer displayed (e.g., dismiss feedback to indicate the card is closed).

Note that details of the processes described above with respect to method 900 (e.g., FIGS. 9A-9B) are also applicable in an analogous manner to the methods described below/above. For example, method 900 optionally includes one or more of the characteristics of the various methods described above with reference to method 700, 1100, and 1300. For example, the accessory interfaces of method 900 are used to configure the controllable external devices of method 700. For brevity, these details are not repeated below.

FIGS. 10A-10AC illustrate exemplary interfaces for grouped accessories (e.g., a power strip), in accordance with some embodiments. The interfaces in these figures are used to illustrate the processes described below, including the processes in FIGS. 11A-11B.

Figure 10B:
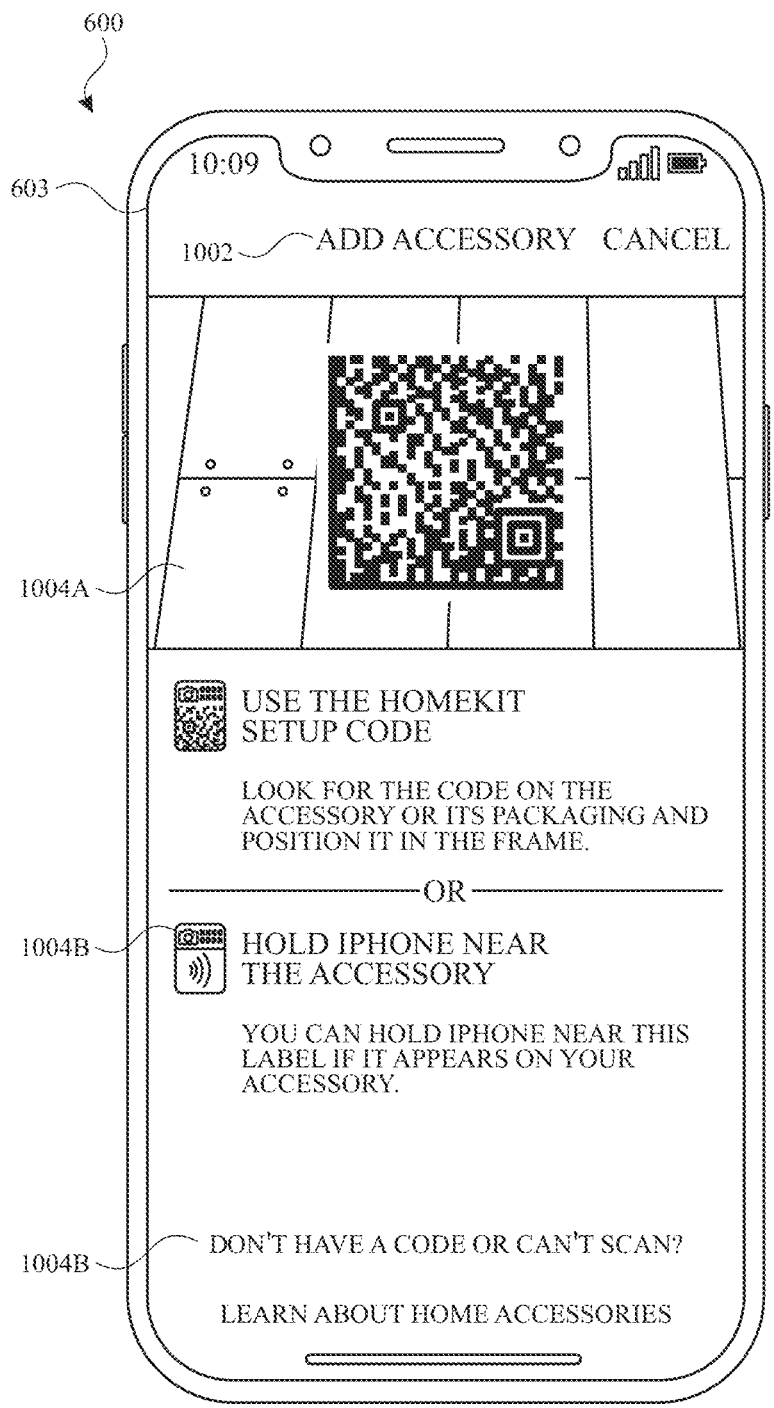
Figure 10C:
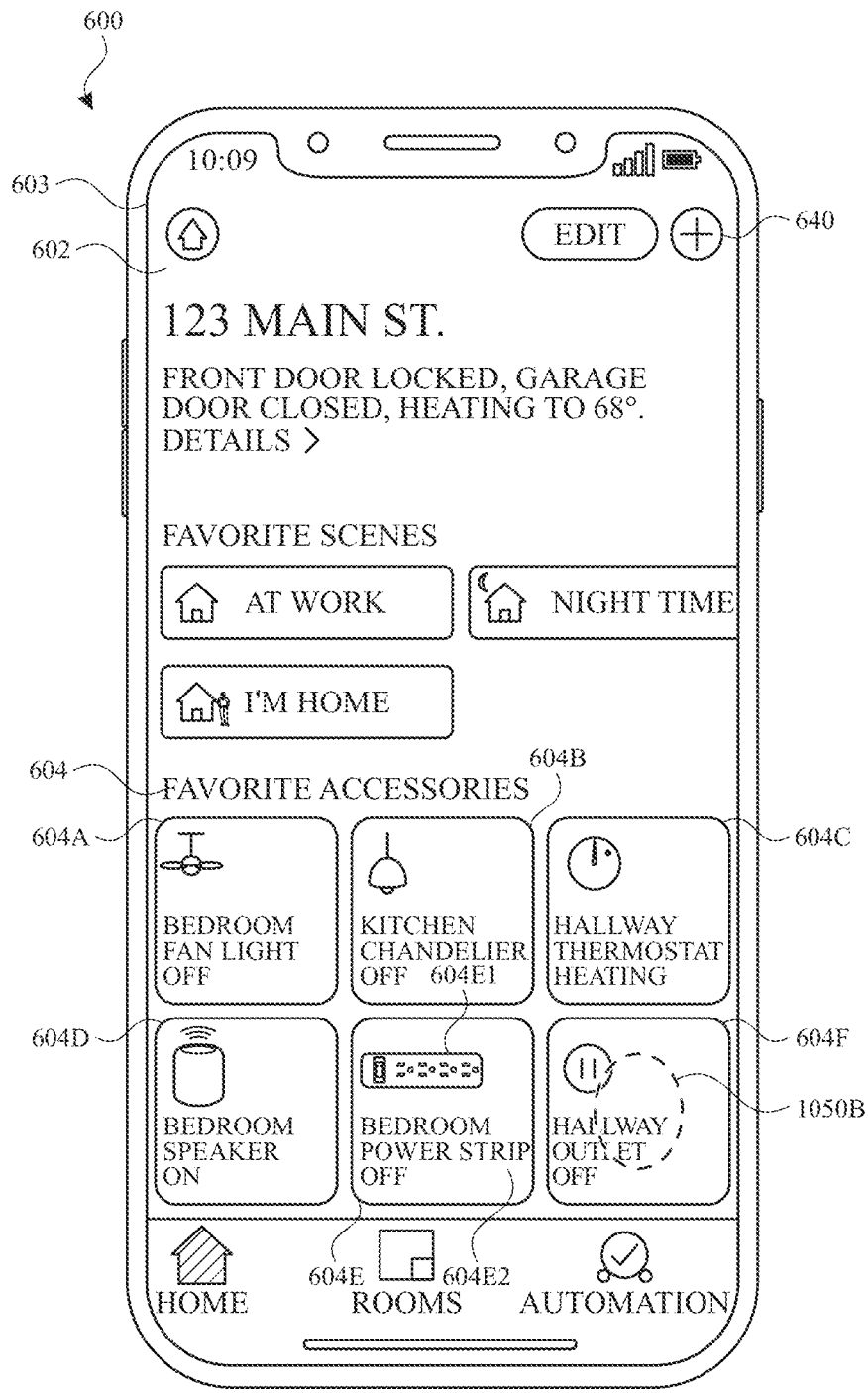

In FIGS. 10A-10C, a power strip and an outlet are added to home interface 602. A user can scan a code or enter a code to add the accessory. Once the accessory is added, an accessory affordance (e.g., 604E and 604F) is added to home interface 602. The user can manage the configurations of the accessory by tapping on the accessory affordance (e.g., 604E) corresponding to the accessory (e.g., power strip). In FIG. 10A, device 600 displays home interface 602 including affordance 640 for adding a new accessory or a scene. Device 600 detects a set of inputs 1050A (e.g., taps) corresponding to selection of affordance 640 and selecting to add a new accessory. In FIG. 10B, in response to detecting input 1050A, device 600 displays "add accessory" interface 1002 for adding a new accessory to be controllable by device 600. Add accessory interface 1002 includes a viewfinder 1004A and instructions for scanning a code (e.g., a bar code, a QR code, or a series of digits) associated with the new accessory using device 600. Add accessory interface 1002 also includes affordance 1004B for manually entering a code to add the new accessory.

In FIG. 10C, subsequent to (e.g., in response to) successfully adding the new accessory, device 600 displays home interface 602 including an accessory affordance corresponding to the added accessory. FIG. 10C illustrates a newly added power strip accessory affordance 604F and hallway outlet accessory affordance 604F, in home interface 602, corresponding to the power strip accessory and outlet accessory respectively. Device 600 determines whether the accessory will have a corresponding accessory affordance that performs a function when tapped or opens an accessory interface to allow the user to manage the accessory based on received information about the functions that the accessory can perform. For example, outlet accessory affordance 604F toggles the outlet on and off when outlet accessory affordance 604F is tapped. In contrast, thermostat accessory affordance 604C results in device 600 opening up thermostat interface 1210C of FIG. 12B when thermostat accessory affordance 604C is tapped. During setup, device 600 determines that the outlet accessory is a first type of accessory based on received information from the outlet, because the outlet has a single function that operates in two binary states: to turn the outlet or off. During setup, device 600 determines that the power strip is a grouped accessory that is also a first type of accessory based on received information from the power strip, because the power strip has a single function that operates in two binary states: to turn the power strip on or off. In contrast, the thermostat, as described with respect to FIGS. 12A-12B below, is a second type of accessory because the thermostat does not have a primary function.

Figure 10D:
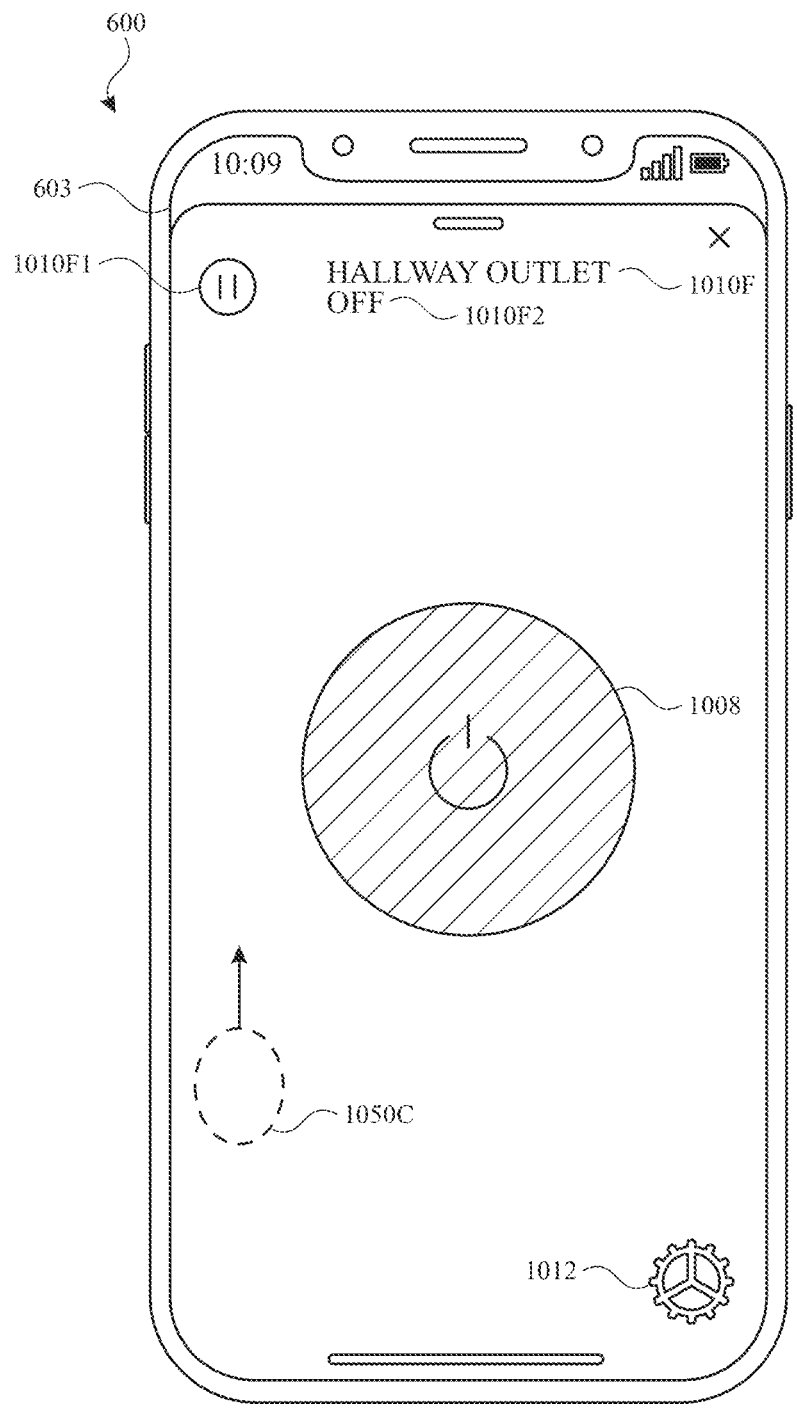

In FIG. 10C, device 600 detects input 1050B, corresponding to a long press (or a deep press) on outlet accessory affordance 604F in home interface 602. In FIG. 10D, in response to detecting input 1050B, device 600 displays outlet accessory interface 1010F. Outlet accessory interface 1010F includes graphical representation 1010F1 and current status 1010F2 indicating the outlet is currently off. Outlet accessory interface 1010F includes control affordance 1008, corresponding to toggling the outlet to an ON or OFF state.

Figure 10E:
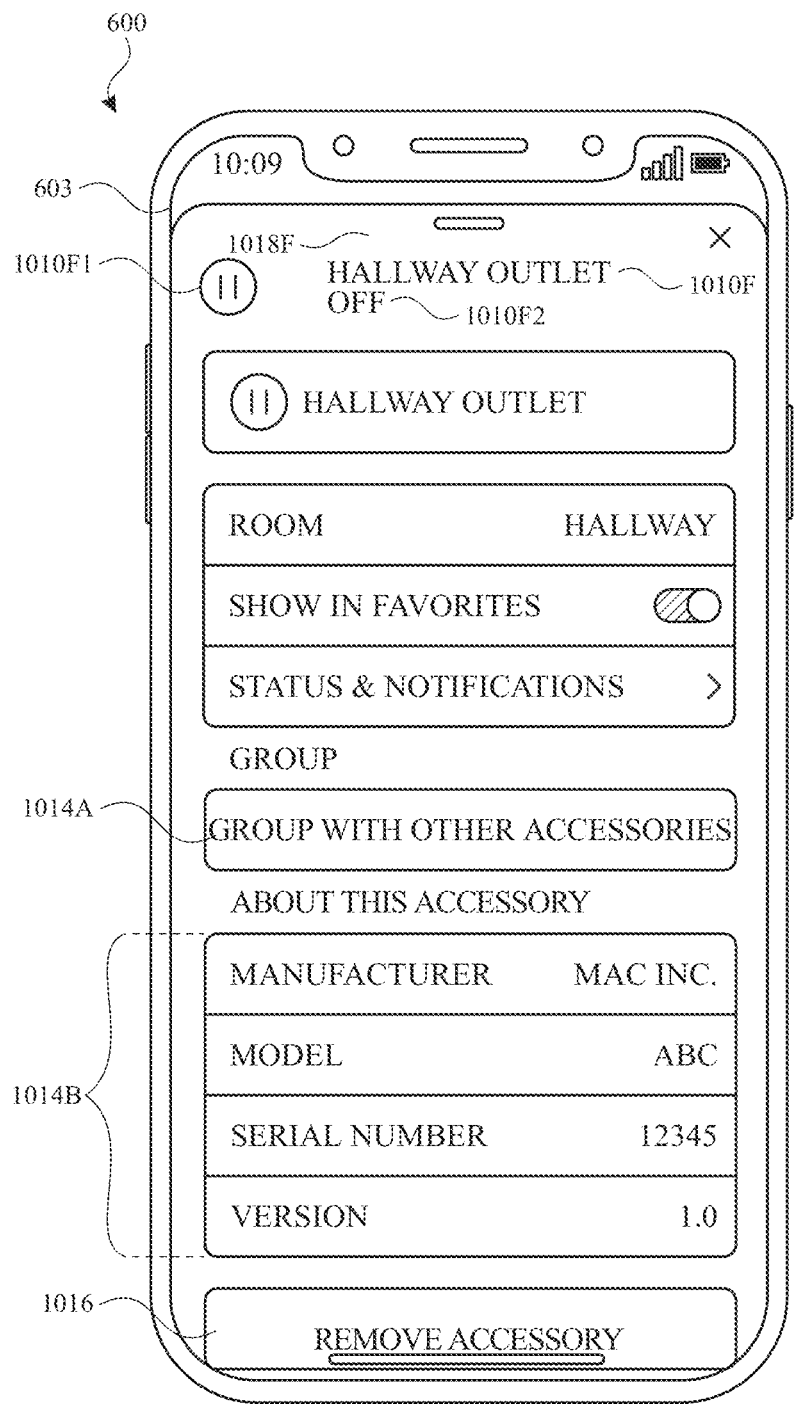

In FIG. 10D, device 600 detects input 1050C corresponding to a swipe gesture to scroll down in outlet accessory interface 1010F to access outlet settings section 1018. Outlet settings section 1018 does not include affordances for reconfiguring the outlet because the outlet is not part of an accessory group. In FIG. 10E, in response to detecting input 1050C, device 600 snaps the display of outlet accessory interface 1010F to outlet settings section 1018. Outlet settings section 1018 does not include accessory reconfiguration affordances for reconfiguring the components of the accessory, because the outlet is a single accessory component. For example, outlet settings section 1018 does not include affordance 1014B as illustrated in FIG. 10K, which is associated with adding or removing components from the grouped set of accessories or affordance 1014C as illustrated in FIG. 10R, which is associated with rejoining a group with the accessory it is physically part of (e.g., an outlet is a component of a power strip).

Figure 10F:
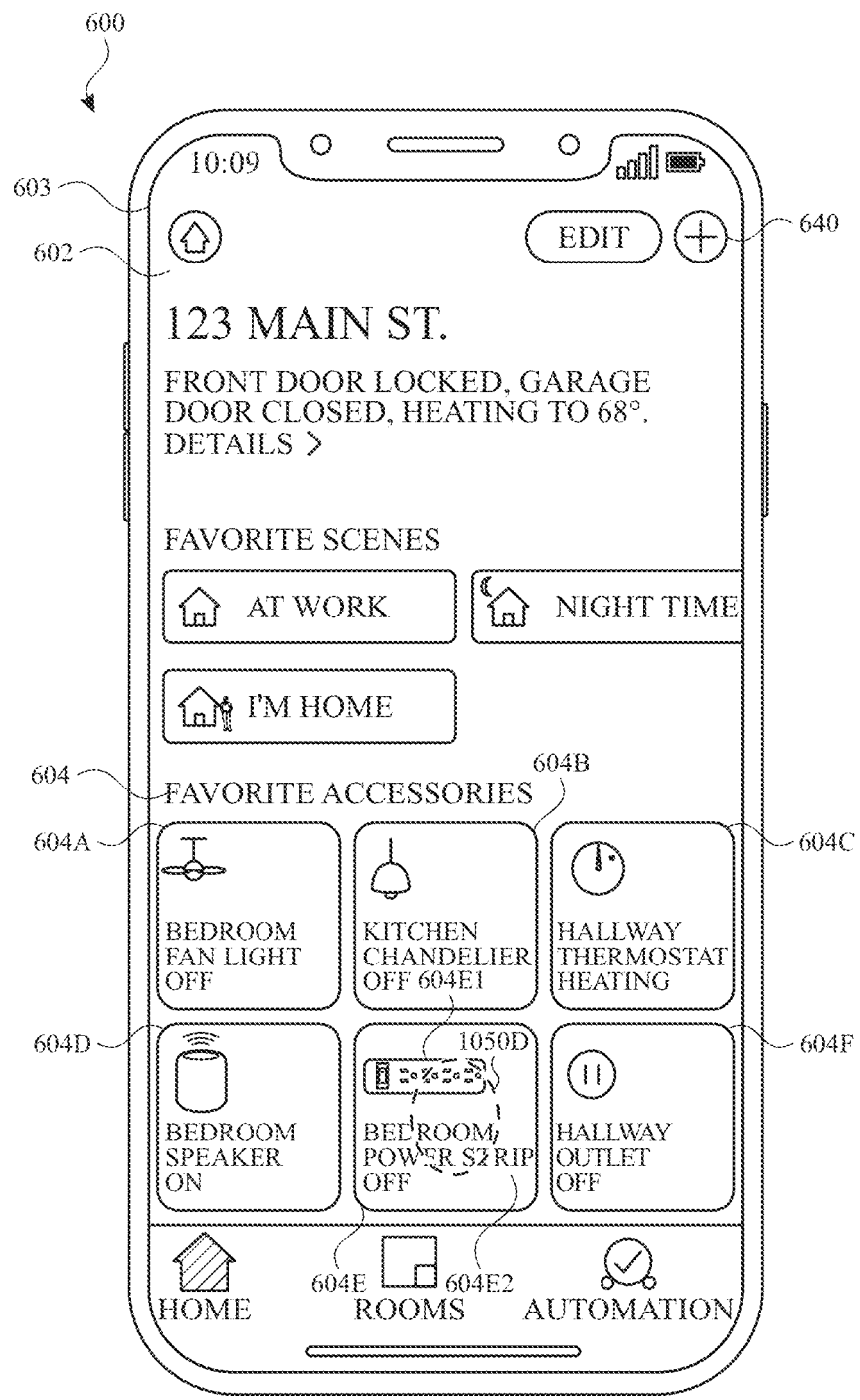

FIG. 10F illustrates a newly added power strip accessory affordance 604E, in home interface 602, corresponding to a power strip accessory that includes six individual outlet components (e.g., sub-components). Power strip affordance 604E represents an accessory group including the six outlets. The power strip has a primary function of being turned on/off. The six individual outlet components of the power strip also have the same primary function of being turned on and off. Thus, device 600 creates a single power strip accessory affordance 604E for the accessory group including the power strip and the six individual outlet components. The accessory group can be turned on or off together or the individual components can be controlled separately. Thus, in response to device 600 detecting input (e.g., a tap) corresponding to selection of the power strip accessory affordance 604E, device 600 transmits a command to the power strip to turn on/off the entire accessory group. The power strip and individual outlets can be individually toggled to an ON or OFF state by control affordances associated with each outlet component in power strip accessory interface 1010E.

Figure 10G:
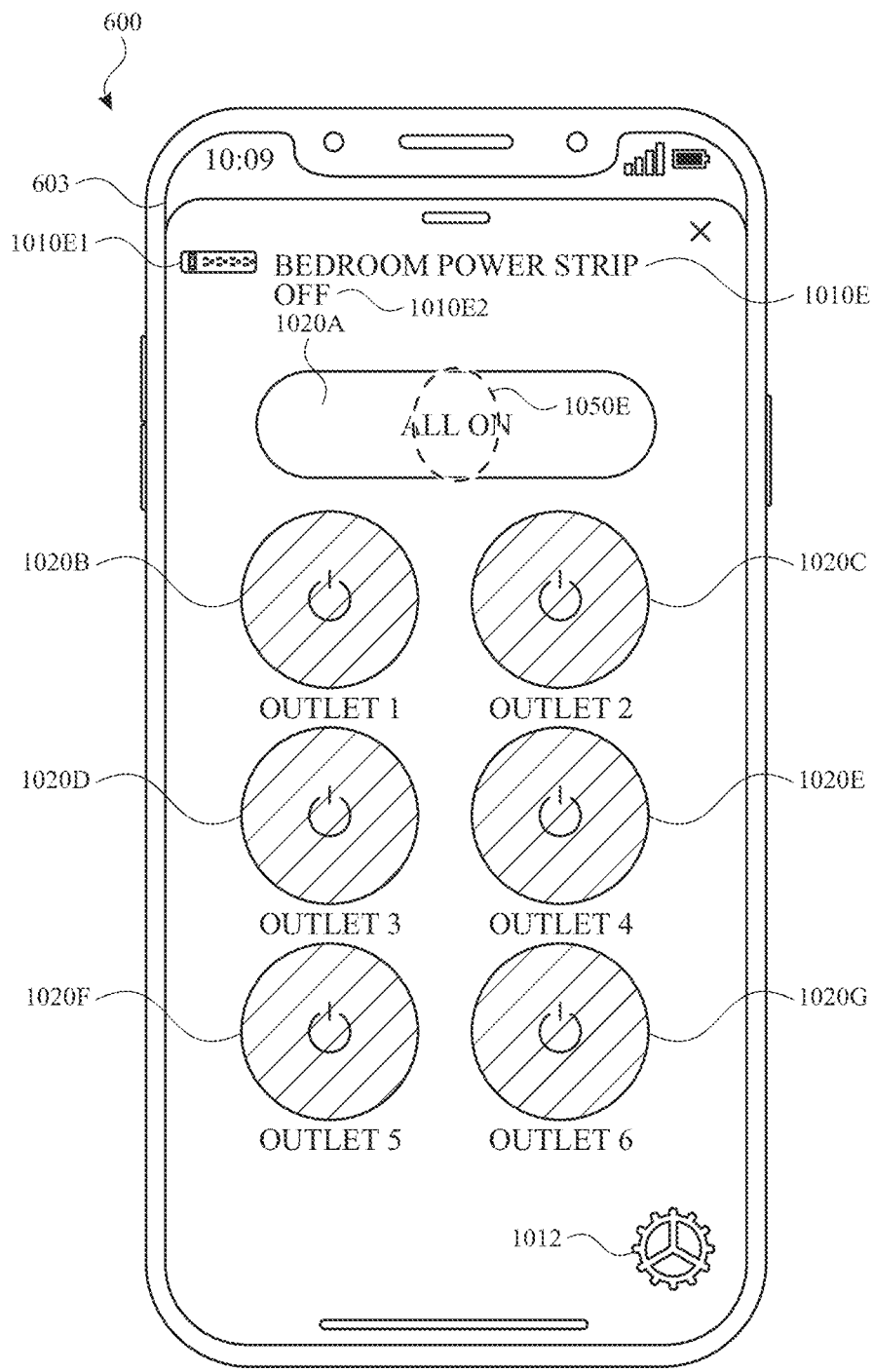

In FIG. 10F, device 600 detects input 1050D, corresponding to a long press (or a deep press) on power strip accessory affordance 604E to access the individual controls corresponding to each outlet. In FIG. 10G, in response to detecting input 1050D, device 600 displays power strip accessory interface 1010E. Power strip accessory interface 1010E includes controls 1020A-1020G for managing the states of each outlet and the entire power strip. Power strip accessory interface 1010E includes graphical representation 1010E1 illustrating a power strip that is off and current status 1010E2 indicating that all of the outlets in the power strip are currently off. Outlet accessory interface 1010E includes control affordance 1020A-1020G. Control affordance 1020A sets the power strip, including all six outlet components of the power strip to an ON state when the power strip is currently in an OFF state and sets the power strip to an OFF state when the power strip is currently in an ON state. Any outlet that is already in an ON state when control affordance 1020A is activated to turn the power strip on, remains in the ON state. Similarly, any outlet that is already in an OFF state when control affordance 1020A is selected to turn the power strip off, remains in the OFF state. Control affordances 1020B-1020G correspond to control affordances corresponding to each respective outlet in the group, which can set to an ON or OFF state without affecting the state of the other outlets in the group. Power strip accessory interface 1010E also includes settings shortcut affordance 1012.

FIGS. 10G-10J illustrate turning the power strip or an individual outlet in the power strip accessory group on. Power strip accessory affordance 604E in home interface 602 is updated whenever the state of the power strip is updated.

Figure 10H:
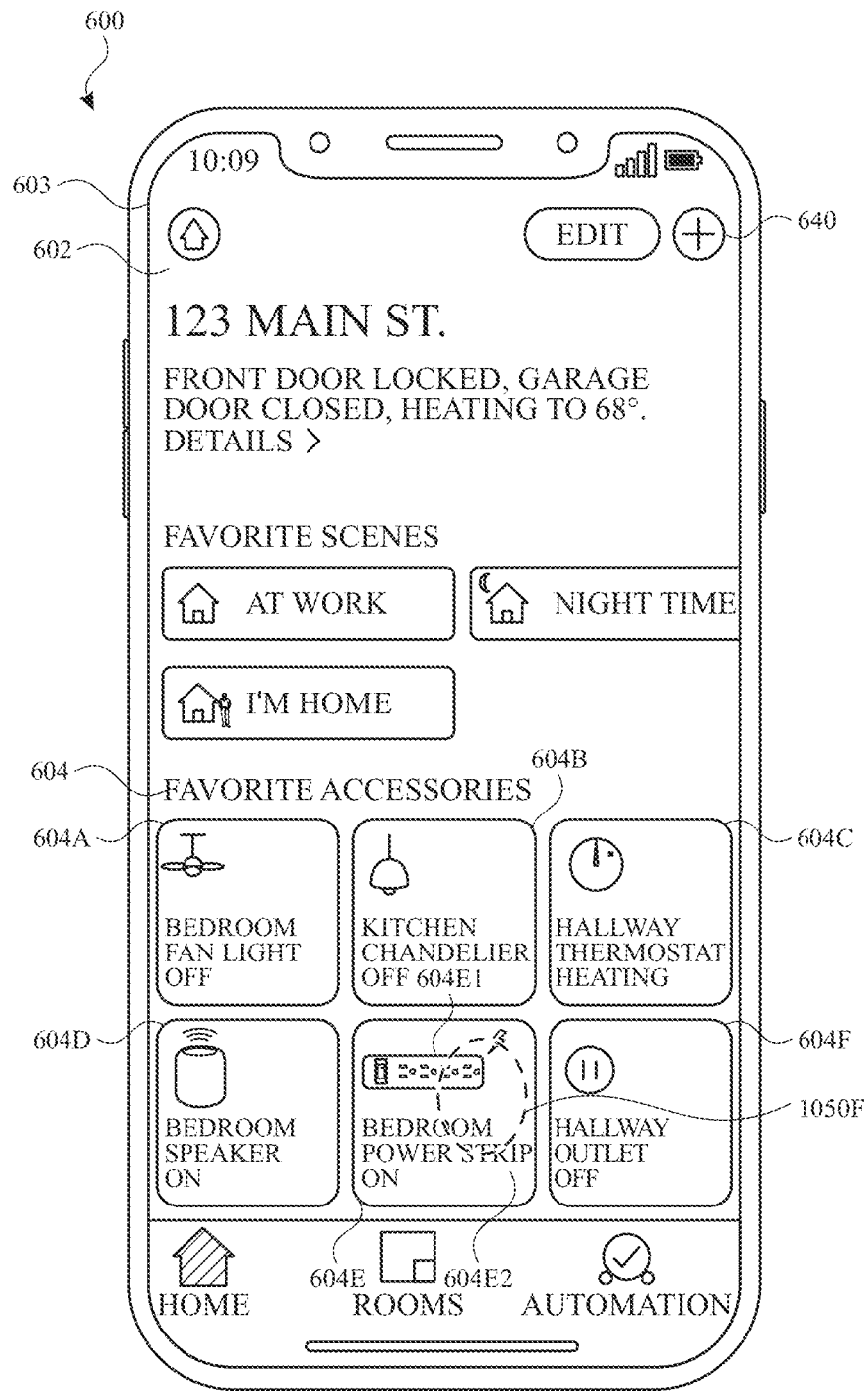

In FIG. 10G, device 600 detects input (e.g., a tap) 1050E corresponding to selection of control affordance 1020A to turn the power strip on. In response to detecting input 1050E, device 600 transmits a command or instructions to the power strip accessory to turn on each of the six outlet components. In FIG. 10H, subsequent to detecting input 1050E, device 600 updates display of power strip accessory affordance 604E in home interface 602. Graphical representation 604E1 of power strip accessory affordance 604E is updated to show that the power strip is turned on as indicated by the lightening symbol. Current status 604E2 of power strip accessory affordance 604E is updated to indicate the power strip is in an ON state.

Figure 10I:
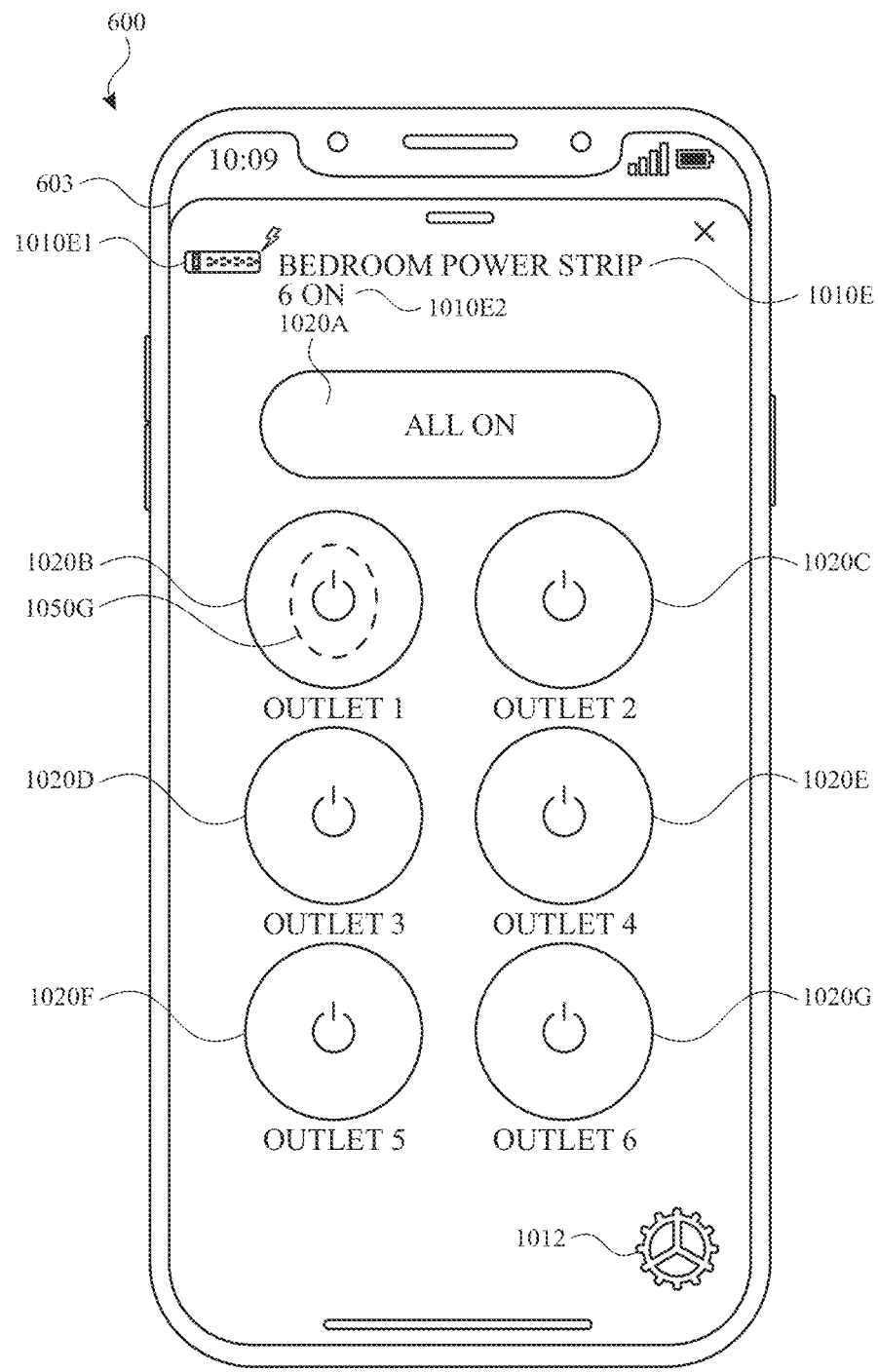

In FIG. 10H, device 600 detects input 1050F corresponding to a long press (or a deep press) on power strip accessory affordance 604E. In FIG. 10I, in response to detecting input 1050F, device 600 displays power strip accessory interface 1010E. Power strip accessory interface 1010E includes graphical representation 1010E1, which matches updated graphical representation 604E1 in FIG. 10H, indicating the power strip is in an ON state. Current status 1010E2 is updated to show the power strip is in an ON state, with each of the six outlets being in the ON state. Device 600 updates control affordance 1020A for turning off the power strip in response to device 600 determining the power strip is currently in an ON state. Control affordances 1020B-1020G indicate each of the respective outlets is in an ON state, and tapping on any one of control affordances 1020B-1020G will turn off the corresponding outlet.

Figure 10J:
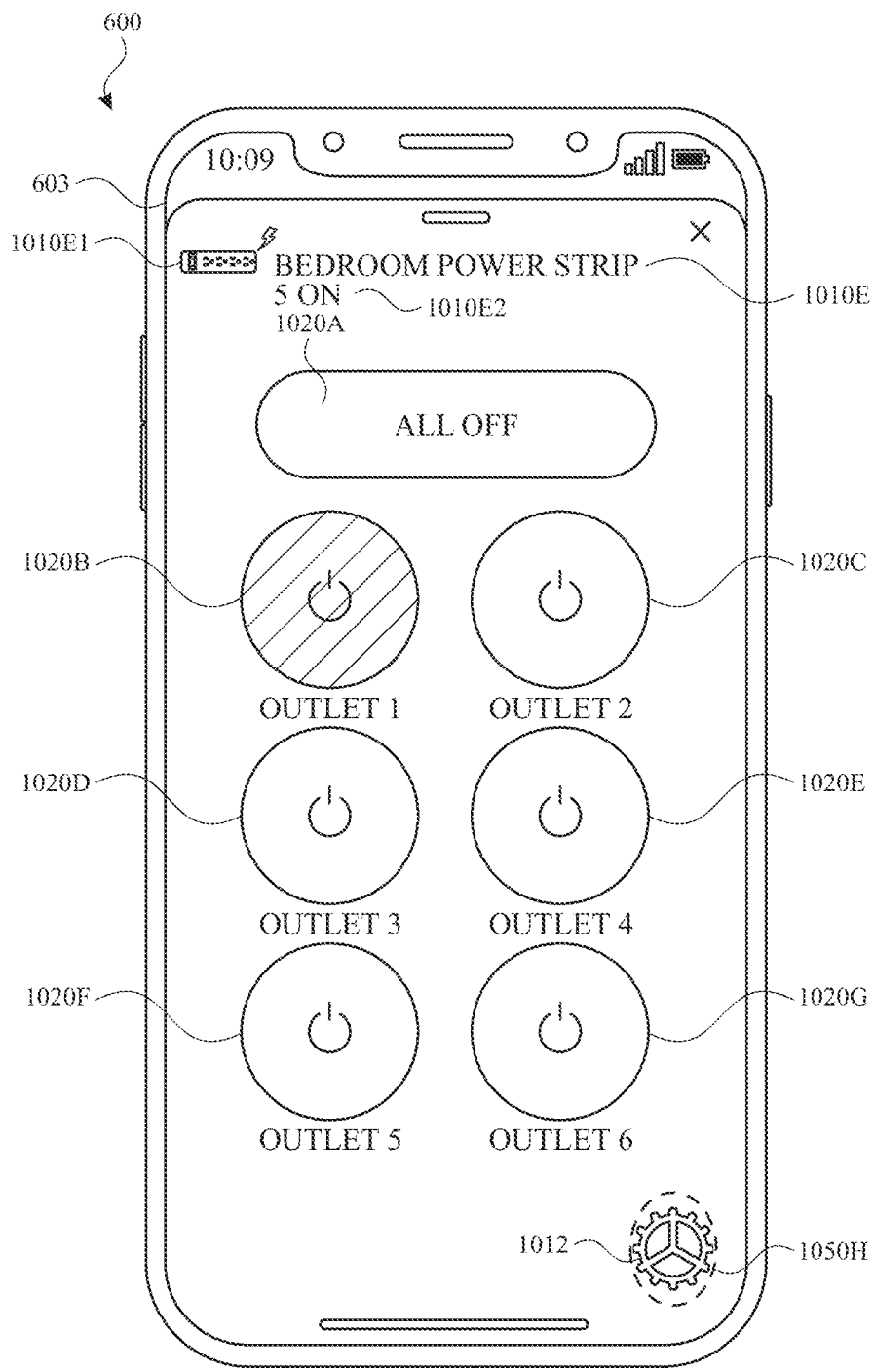
Figure 10K:
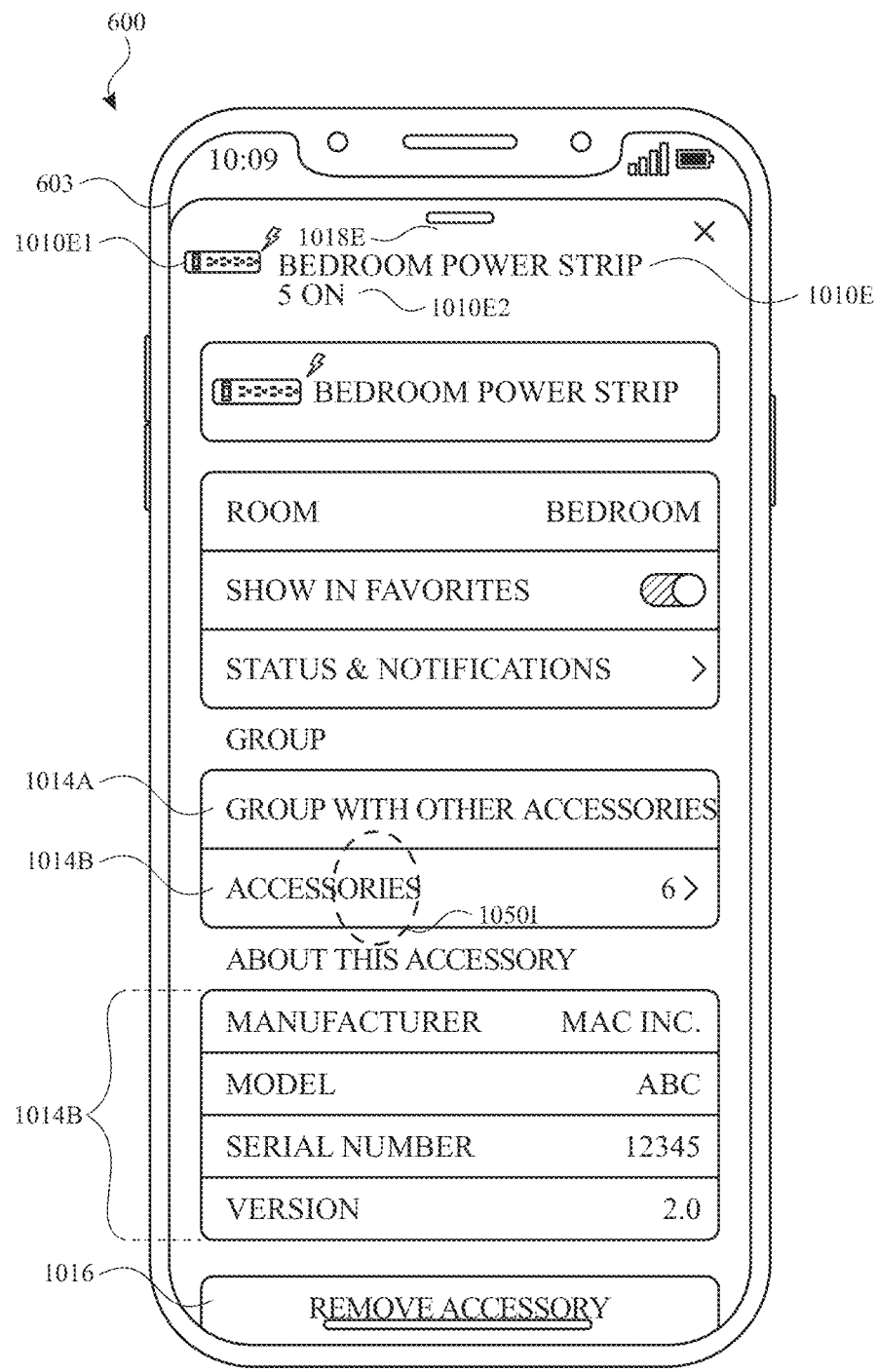

In FIG. 10I, device 600 detects input (e.g., a tap) 1050G corresponding to selection of control affordance 1020B corresponding to outlet 1. In FIG. 10J, subsequent to (and in response) to detecting input 1050G, device 600 transmits a command to the power strip accessory to turn off outlet 1. Device 600 updates display of control affordance 1020B to show the outlet is now in an OFF state. Device 600 can detect a subsequent tap on control affordance 1020B to turn on outlet 1. Control affordances 1020C-020G indicates each of the respective outlets remains in the ON state, and tapping on a corresponding control affordance will turn off the corresponding outlet.

The power strip accessory group can be reconfigured to remove an outlet, add an outlet, or split up the group through settings section 1018E. FIGS. 10K-10O illustrate the process of removing an outlet from the power strip accessory group. In FIG. 10J, device 600 detects input (e.g., a tap) 1050H corresponding to selection of settings shortcut affordance 1012. In FIG. 10K, in response to detecting input 1050H, device 600 displays power strip settings section 1018E. Power strip settings section 1018E includes graphical representation 1010E1 and status 1010E2 corresponding to the state of the outlet accessory as indicated in outlet accessory interface 1010E. An outlet settings section includes a "group with other accessories" affordance 1014A for grouping the outlet with other accessories of the same type and accessories affordance 1014B for reconfiguring the power strip accessory (e.g., by removing or adding components to and from the power strip). Accessories affordance 1014B indicates there are currently six outlet components in the group.

In FIG. 10K, device 600 detects input (e.g., a tap) 1050I corresponding to selection of accessories affordance 1014B.

Figure 10L:
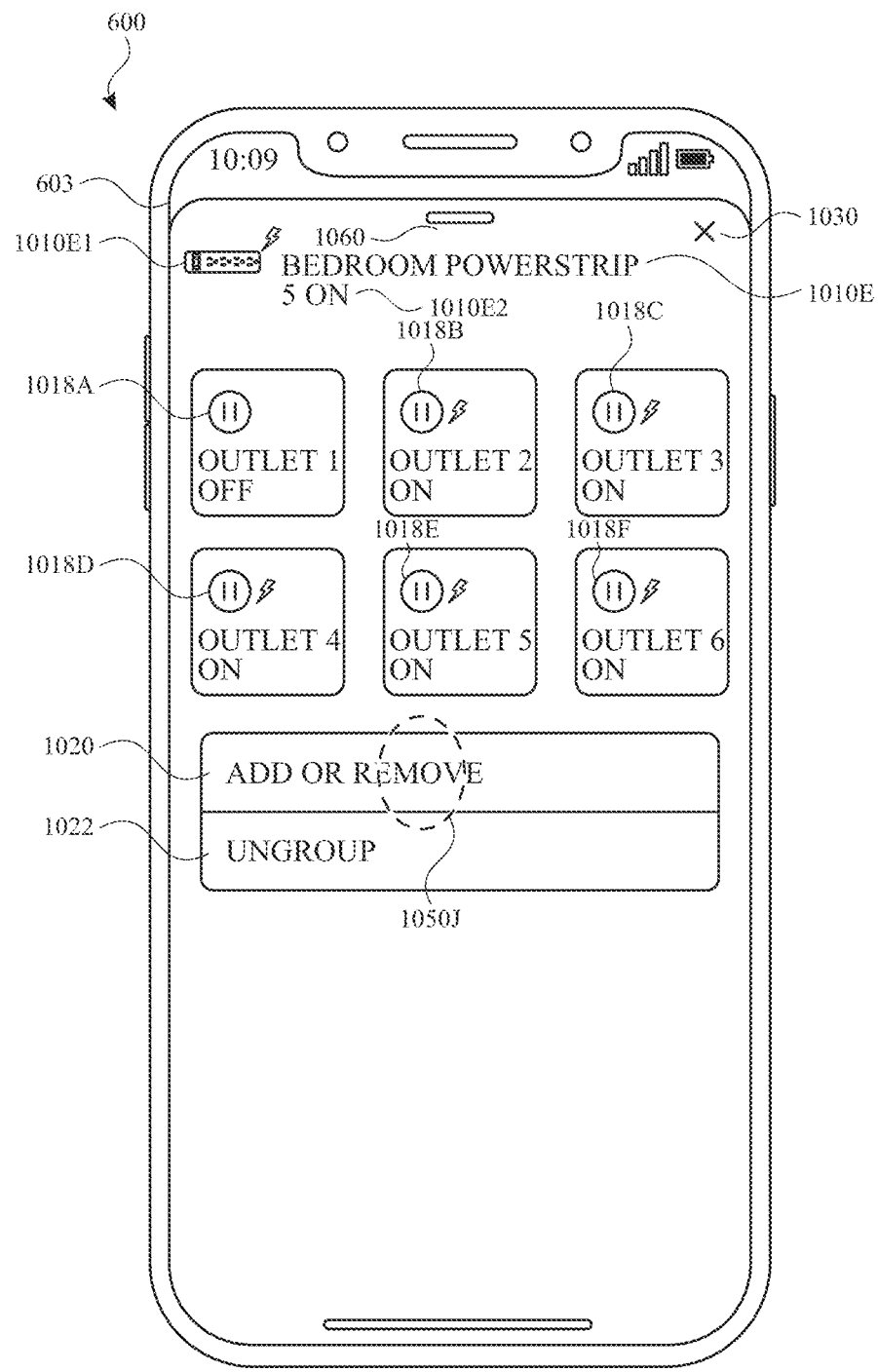

In FIG. 10L, in response to detecting input 1050I, device 600 displays accessories interface 1060. Accessories interface 1060 includes a set of six accessory affordances 1018A-1018F corresponding to each of the outlet components in the power strip accessory group. Accessories interface 1060 includes "add or remove" affordance 1020 for adding an outlet that has been removed from the power strip or removing an outlet from the power strip and ungroup affordance 1022 for dissolving the group by creating a separate accessory affordance for each of the components in the group (e.g., an outlet accessory affordance for each of the six outlets).

Figure 10M:
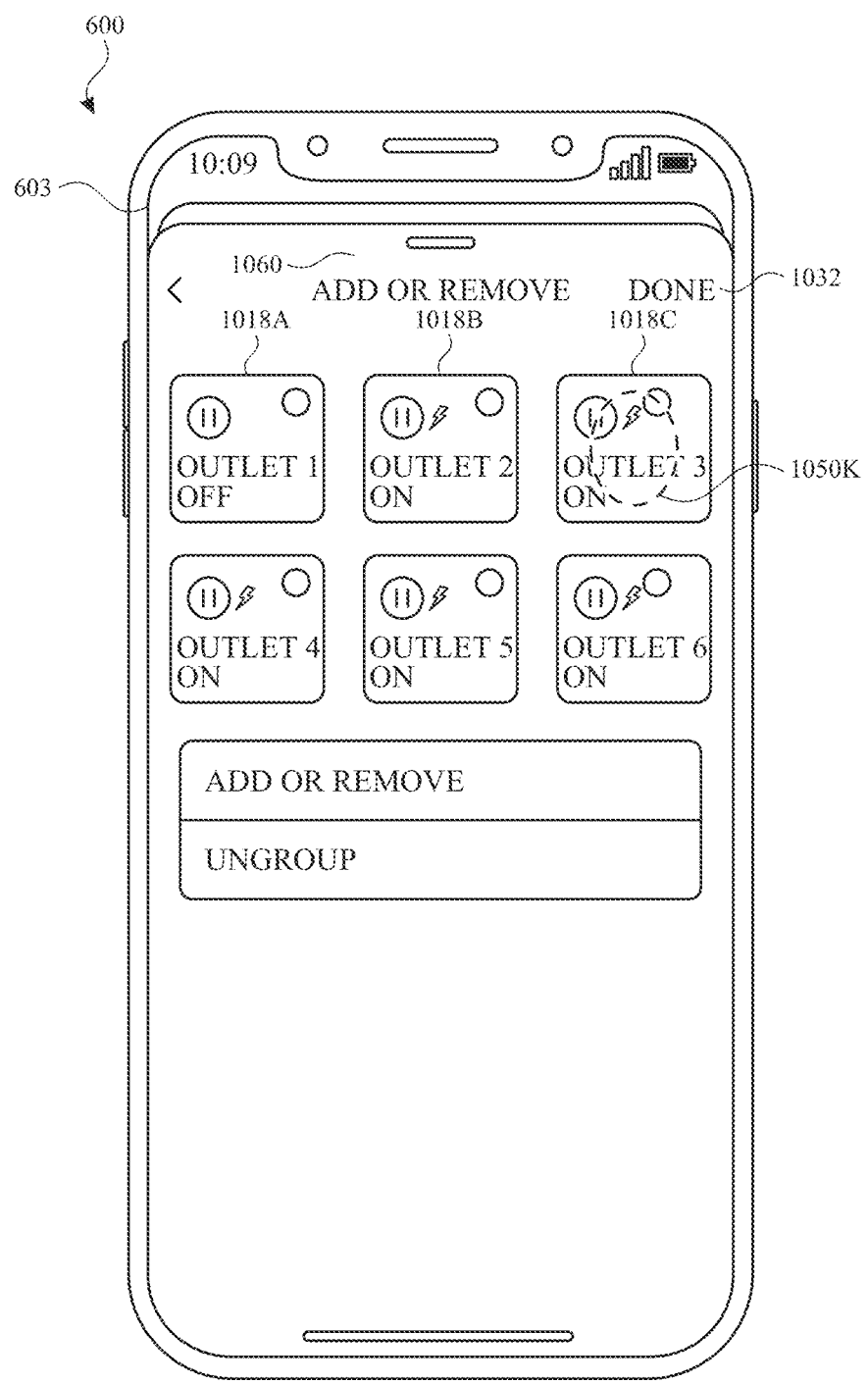
Figure 10N:
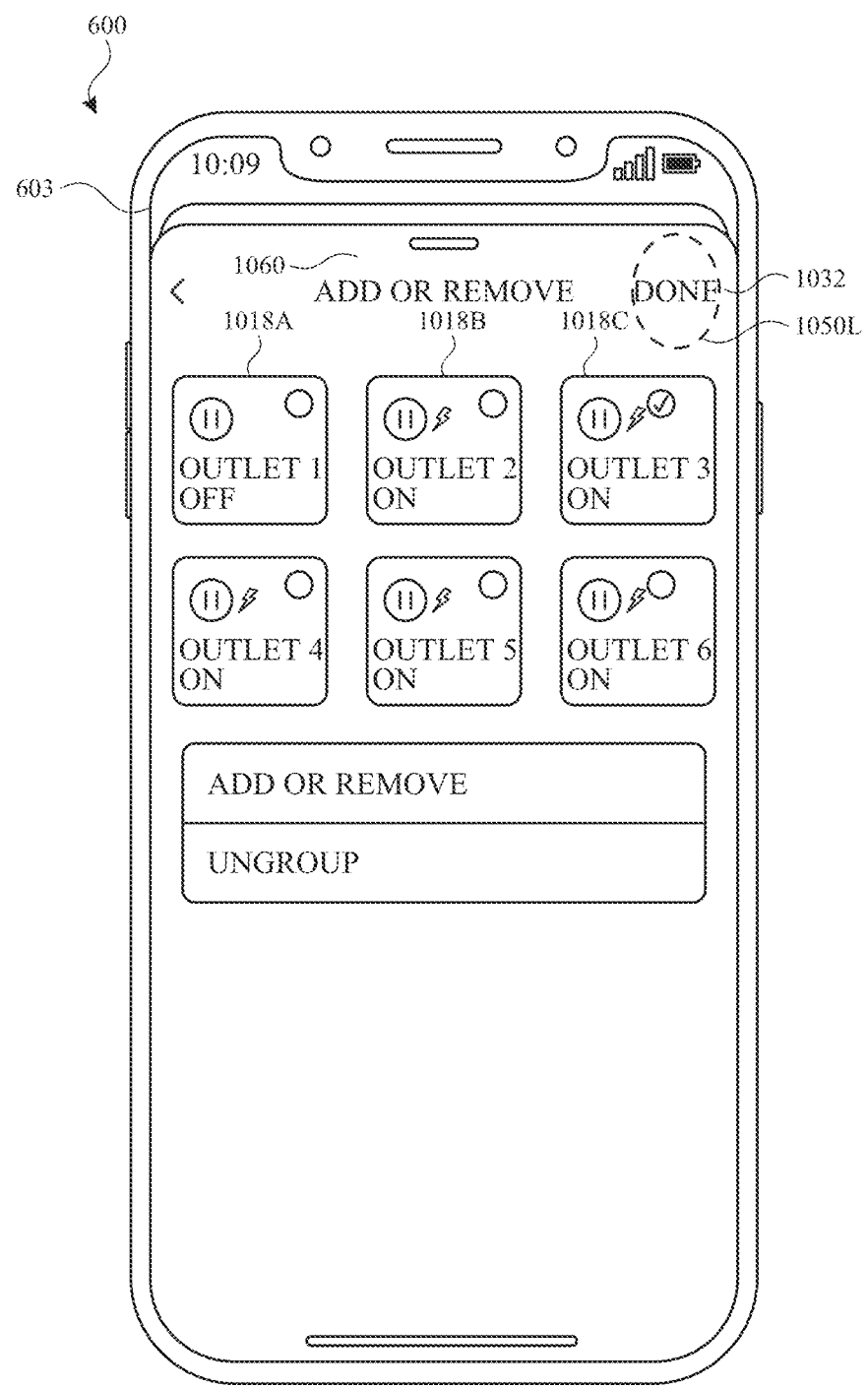

In FIG. 10L, device 600 detects input 1050J corresponding to selection of "add or remove" affordance 1020. In FIG. 10M, in response to detecting input 1050J, device 600 updates display of add or remove interface 1060 to enable selection or deselection of each outlet accessory affordance 1018A-1018F. Device 600 detects input (e.g., a tap) 1050K corresponding to selection of outlet accessory affordance 1018C to remove outlet 3 from the power strip group. In FIG. 10N, in response to detecting input 1050K, device 600 displays a checkmark next to selected outlet accessory affordance 1018C. In FIG. 10N, device 600 detects input (e.g., a tap) 1050L corresponding to selection of Done button 1032. Subsequent to detecting input 1050L, device 600 removes outlet 3 from the power strip accessory group.

Figure 10O:
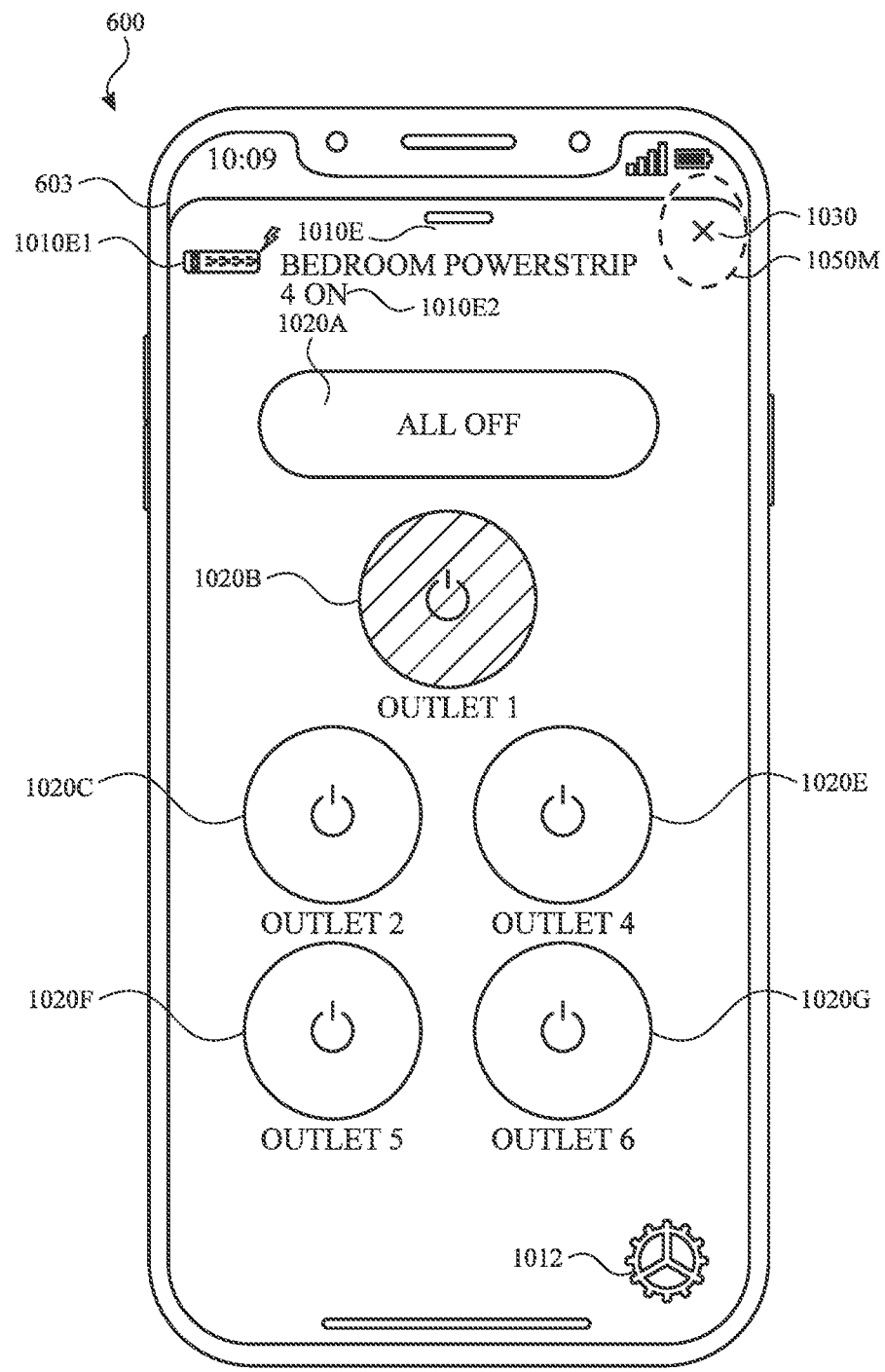

In FIG. 10O, in response to detecting input 1050L, device 600 displays power strip accessory interface 1010E with only five control affordances corresponding to outlets 1020B, 1020C, 1020E, 1020F, and 1020G. Control affordance 1020D is not displayed because corresponding outlet 3 has been removed. Adding or removing outlets from the power strip accessory group does not change the state of an outlet that is still in the group (e.g., outlets 1-2 and 4-6) or an outlet that is removed from the group (e.g., outlet 3). Thus, outlet 1 remains in the OFF state and outlet 3 remains in the ON state, as indicated in FIG. 10J, which is the same state the corresponding outlet was in prior to the removal of outlet 3 from the power strip accessory group. Graphical representation 1010E1 remains unchanged while current status 1010E2 is updated to indicate 4 outlets are on in the power strip accessory group. In FIG. 10O, device 600 detects input 1050M corresponding to selection of X button 1030.

Figure 10P:
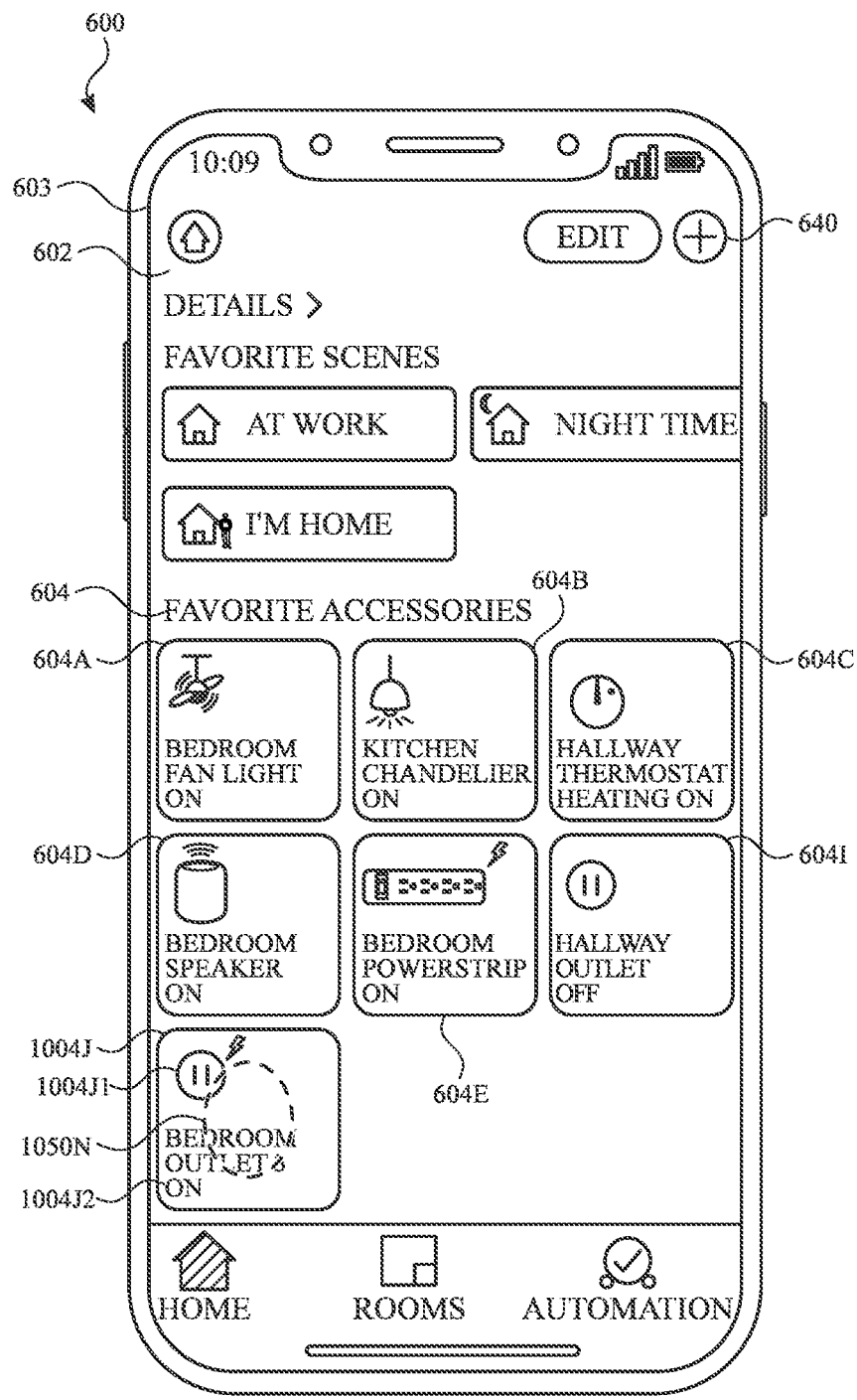

Once outlet 3 is removed from the power strip group, device 600 displays outlet 3 with its own corresponding outlet 3 accessory affordance 1004J. In FIG. 10P, in response to detecting input 1050M, device 600 displays new outlet 3 accessory affordance 1004J added to home interface 602. Outlet 3 accessory affordance 1004J includes graphical representation 1004J1 indicating the outlet is in an ON state as indicated by the lightening symbol and current status 1004J2 indicating the outlet is in an ON state. Power strip accessory affordance 604E remains unchanged in home interface 602.

Figure 10Q:
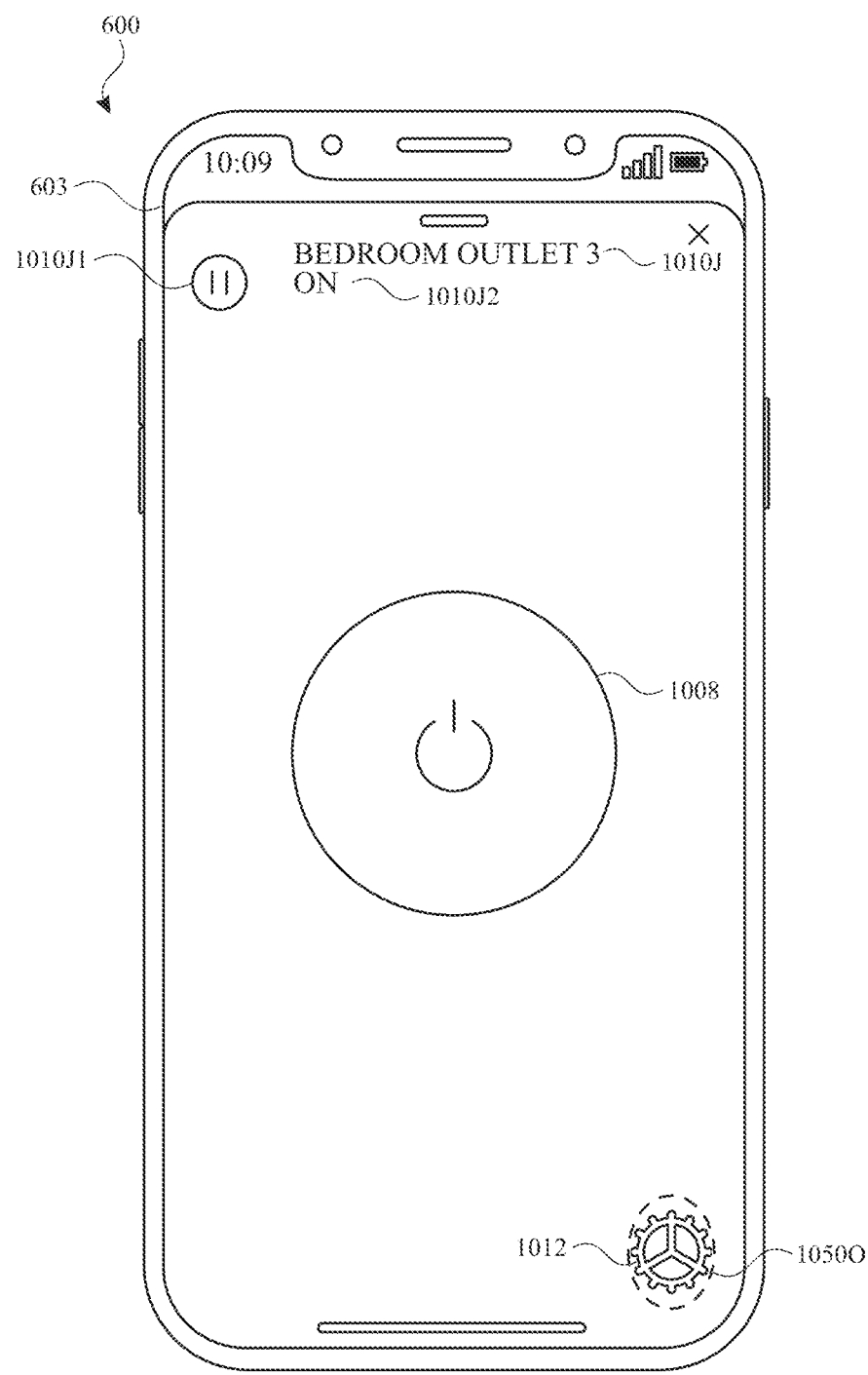
Figure 10R:
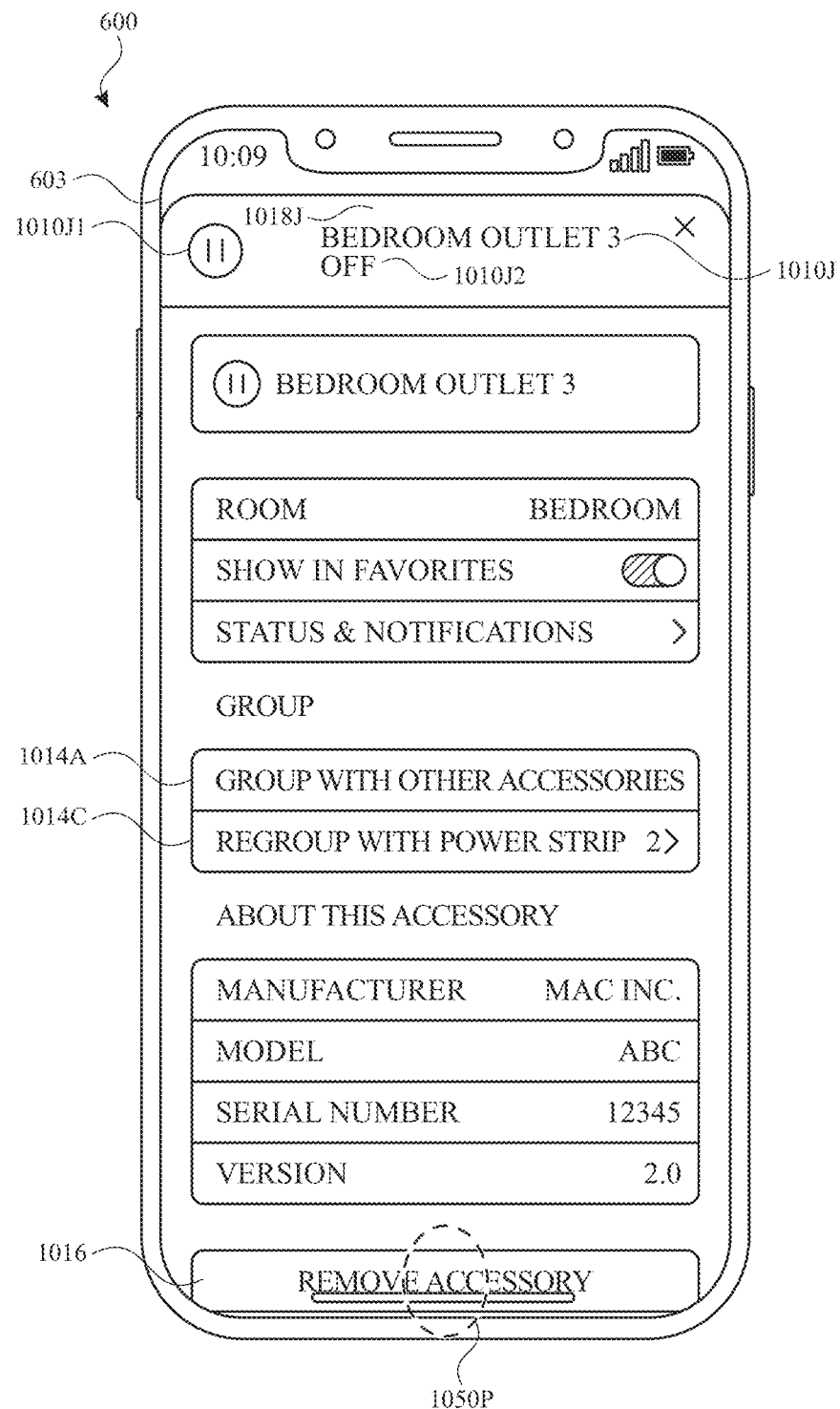

In FIG. 10P, device 600 detects input 1050N corresponding to a long press (or a deep press) on outlet 3 accessory affordance 1004J. Since device 600 determines that outlet 3 is an accessory of a first type, having a single function, a detected tap on affordance 1004J would cause device 600 to transmit a command to turn outlet 3 on/off instead of causing device 600 to display outlet 3 accessory interface 1010J. In FIG. 10Q, in response to detecting input 1050N, device 600 displays outlet 3 accessory interface 1010J. Outlet 3 accessory interface 1010J includes graphical representation 1010J1 and current status 1010J2 indicating outlet 3 is in an ON state. Outlet 3 accessory interface 1010J includes single control affordance 1008 to turn outlet 3 on/off.

In FIG. 10Q, device 600 detects input (e.g., a tap) 1050O corresponding to selection of settings shortcut affordance 1012. In FIG. 10R, in response to detecting input 1050O, device 600 displays outlet 3 settings section 1018J in outlet 3 accessory affordance 1010J. Settings section 1018J includes a regrouping affordance 1014C for regrouping outlet 3 with the power strip accessory that it was originally grouped with. Settings section 1018J also includes remove accessory affordance 1016 for deleting the accessory from home interface 602 and thereby being disassociated with device 600.

Figure 10S:
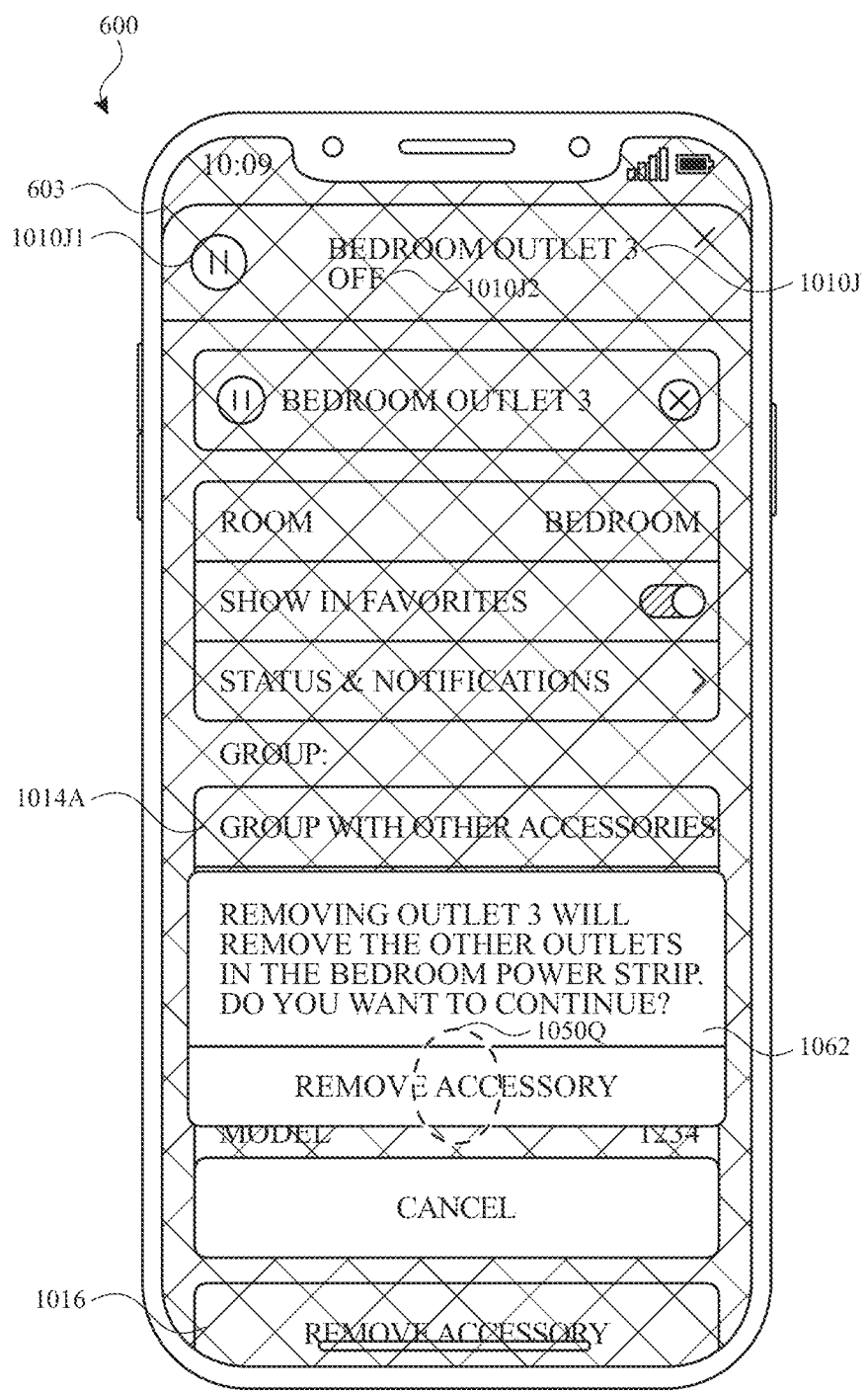
Figure 10T:
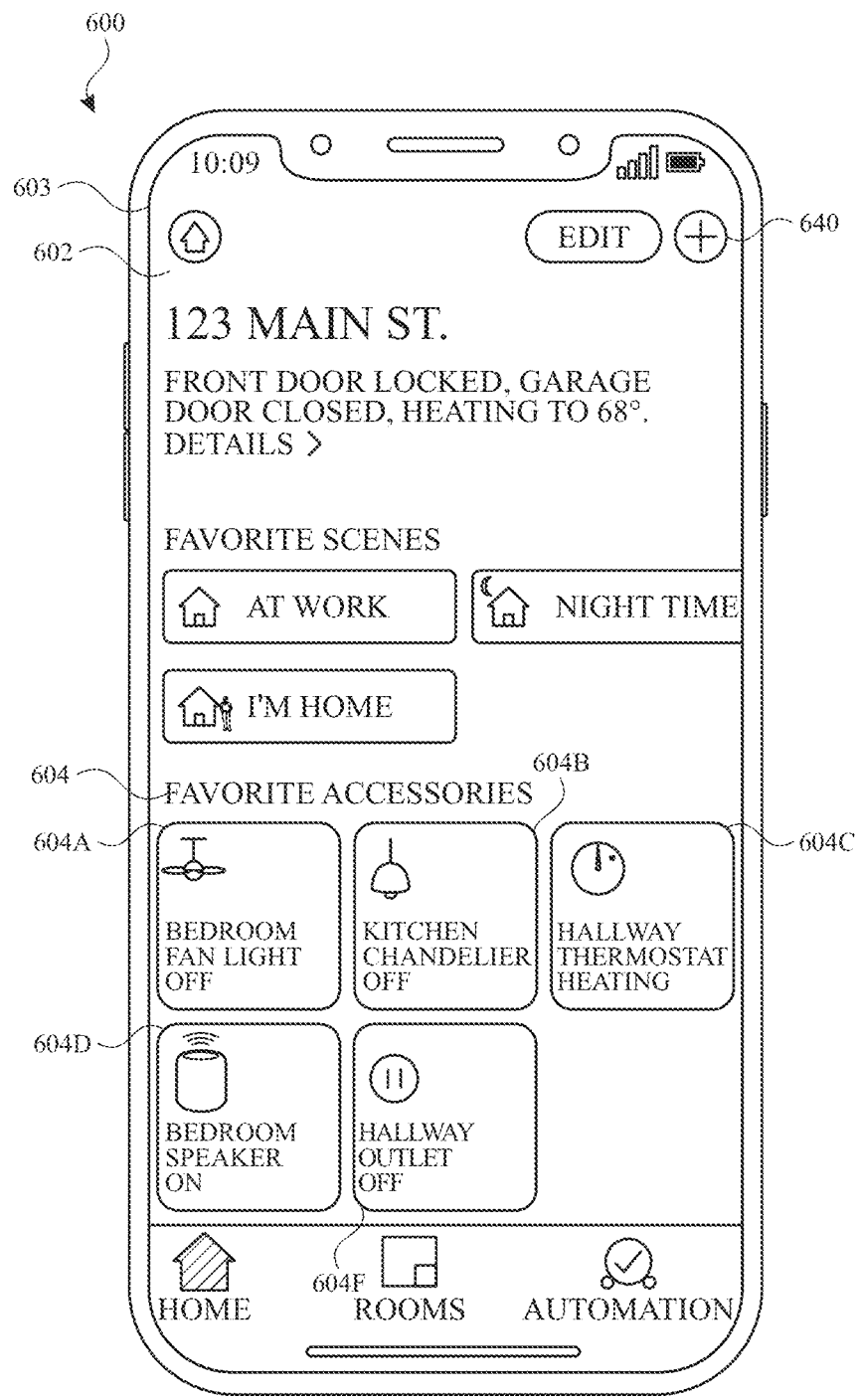

FIGS. 10R-10T illustrate that when a component of an accessory, such as an outlet of a power strip, is removed, notification 1062 prompts the user to confirm proceeding. If the user proceeds to remove the component, then the accessory is also removed along with the accessory affordance in home interface 602. In FIG. 10R, device 600 detects input (e.g., a tap) 1050P corresponding to selection of remove accessory affordance 1016. In FIG. 10S, in response to detecting input 1050P, device 600 displays a notification indicating that removing outlet 3 will cause the power strip and the other five outlet components to be disassociated with device 600. Because outlet 3 is physically part of the power strip, removing outlet 3 will cause the removal of the entire power strip accessory in which outlet 3 is part of. In FIG. 10S, device 600 detects input 1050Q corresponding to removing outlet 3.

In FIG. 10T, subsequent to (and in response to) removing outlet 3, device 600 updates display of home interface 602. Outlet 3 accessory affordances 1004J and power strip accessory affordance 604E are removed from home interface 602, since the power strip and the outlet accessories are no longer associated with device 600.

Figure 10U:
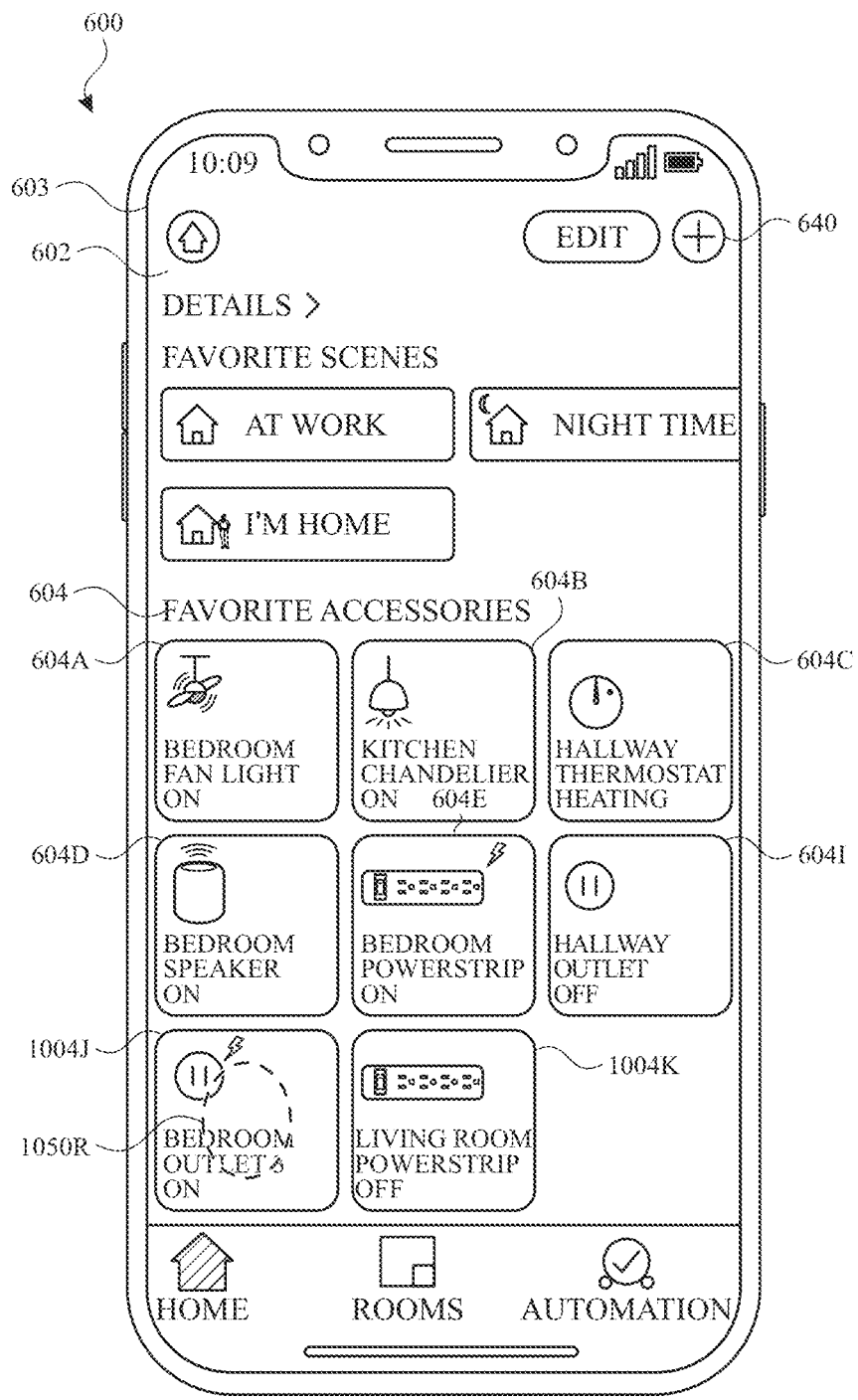
Figure 10V:
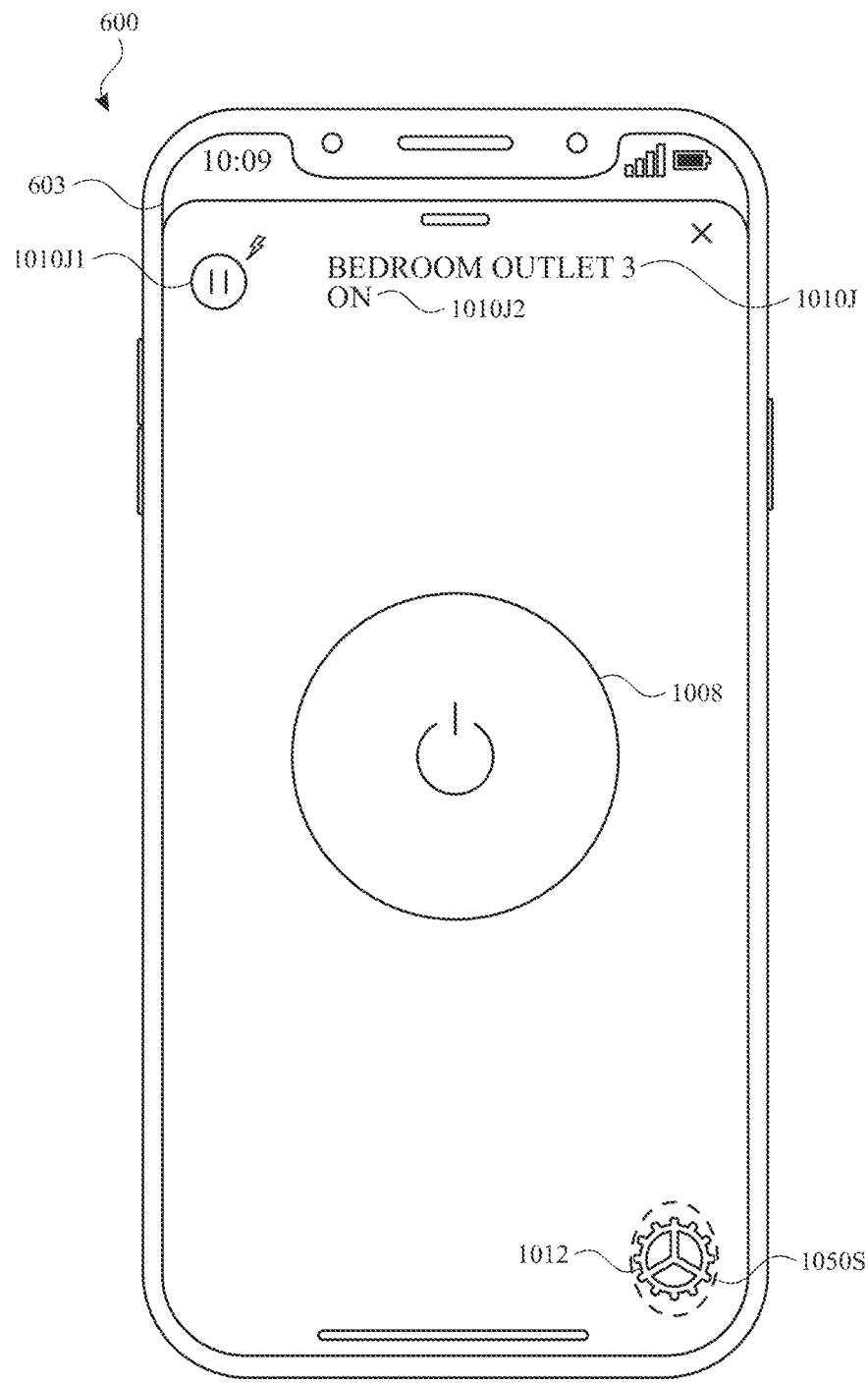

In FIGS. 10U-10X, illustrate regrouping outlet 3 with the power strip through regroup affordance 1014C that is selected from outlet 3 settings section 1018J of outlet 3 accessory interface 1010J. In FIG. 10U, device 600 displays home interface 602 including power strip accessory affordance 604E and outlet 3 accessory affordance 1004J prior to outlet 3 accessory affordance 1004J being removed. Device 600 detects input 1050R, corresponding to a long press (or a deep press) on outlet 3 accessory affordance 1004J. In FIG. 10V, in response to detecting input 1050R, device 600 displays outlet 3 accessory interface 1010J as discussed above with respect to FIG. 10Q. Device 600 detects input (e.g., a tap) 1050S corresponding to selection of settings shortcut affordance 1012.

Figure 10W:
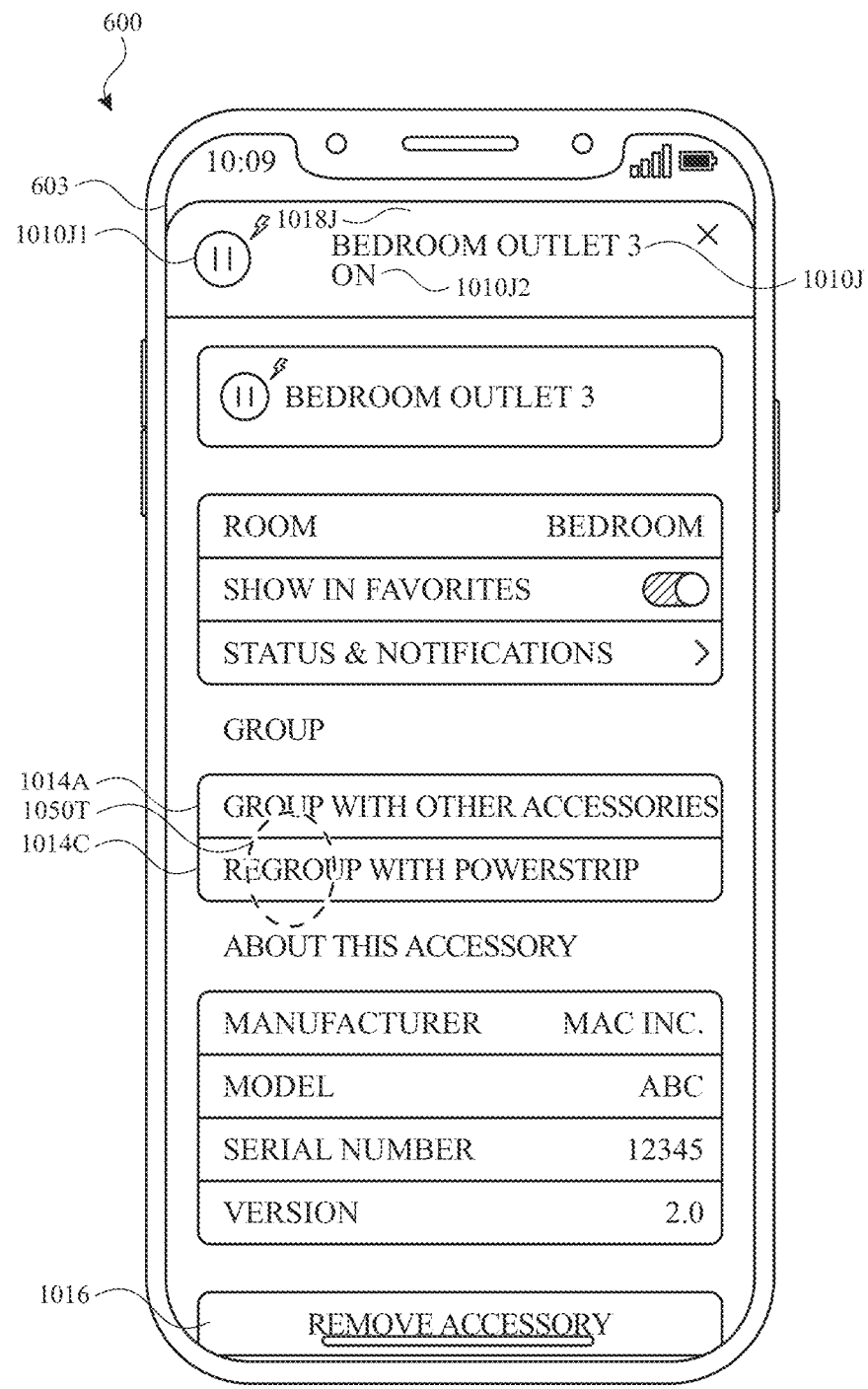

In FIG. 10W, in response to detecting input 1050S, device 600 displays outlet 3 settings section 1018J as discussed above with respect to FIG. 10R. Device 600 detects input (e.g., a tap) 1050T corresponding to selection of regroup affordance 1014C to rejoin outlet 3 with the power strip accessory that outlet 3 was originally grouped with.

Figure 10X:
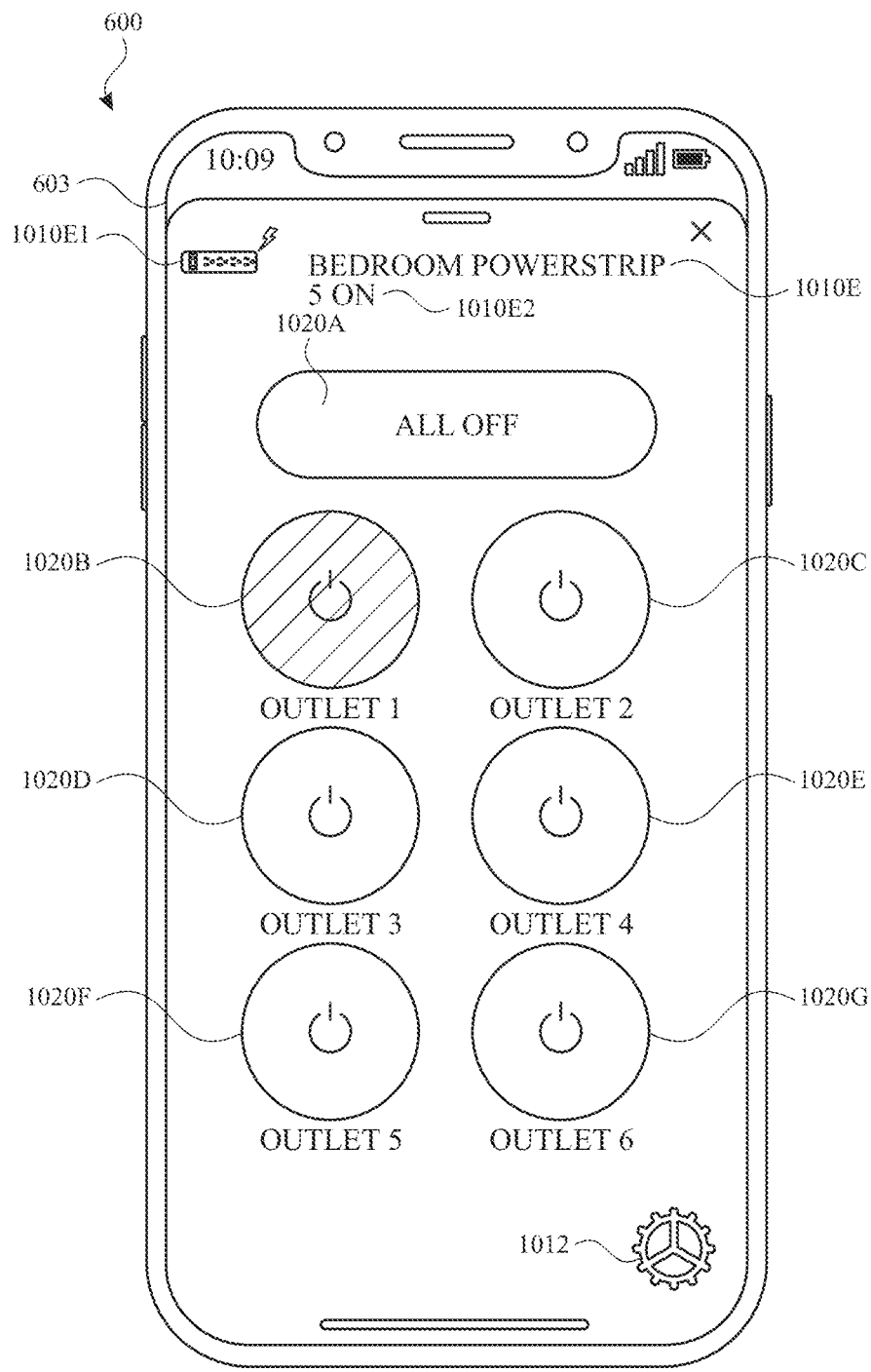

In FIG. 10X, subsequent to (e.g., in response to) detecting input 1050T, device 600 displays power strip accessory interface 1010E indicating that outlet 3 has been re-added to the power accessory group. Power strip accessory interface 1010E displays six control affordances corresponding to each of the six outlets, including outlet 3 which was just re-added to the power strip accessory group. Each of the six control affordances indicate that the corresponding outlet remains in the same state it was in prior to outlet 3 being re-added to the group. For example, outlet 1 was previously in an OFF state, and remains in the OFF state. Similarly, outlet 3 was in an ON state prior to being removed from the group, and remains in the ON state after being re-added to the group. In FIG. 10X, device 600 detects an input (e.g., a tap) corresponding to selection of settings shortcut affordance 1012. In some embodiments, once outlet 3 is rejoined with the power strip, outlet 3 accessory affordance 1004J is no longer displayed in home interface 602.

Figure 10Y:
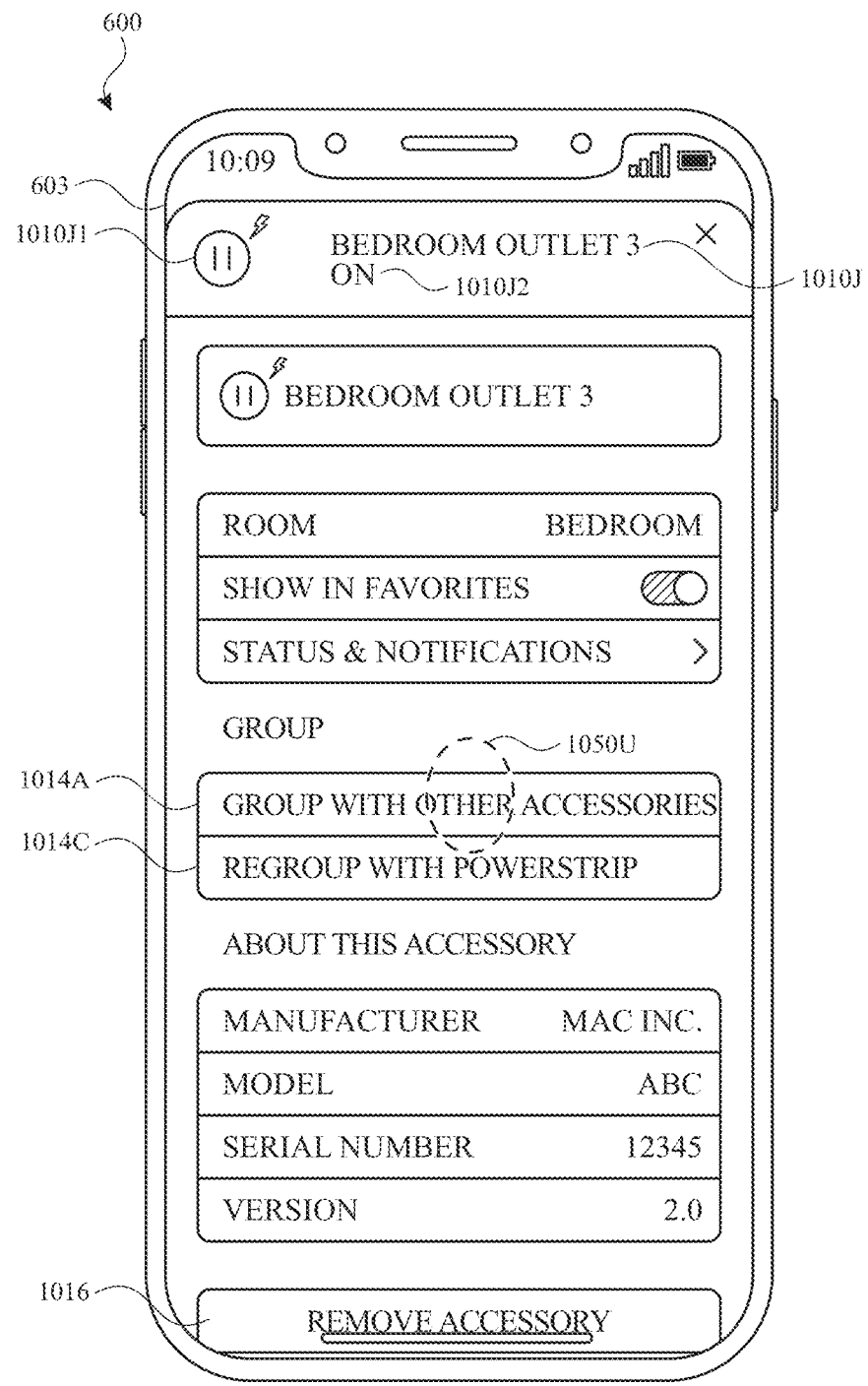

FIGS. 10Y-10AC illustrate joining outlet 3 with outlets from a living room power strip. As a result, an outlet group accessory affordance 1004L is created in home interface 602 and outlet 3 accessory affordance 1004J and the living power strip accessory affordance 1004K are no longer displayed. In FIG. 10Y, prior to outlet 3 being rejoined with the power strip, device 600 displays outlet 3 accessory interface 1010J. Device 600 detects input (e.g., a tap) 1050U corresponding to selection of "group with other accessories" affordance 1014A to add outlet 3 to a custom accessory group including other outlets and power strips accessories.

Figure 10Z:
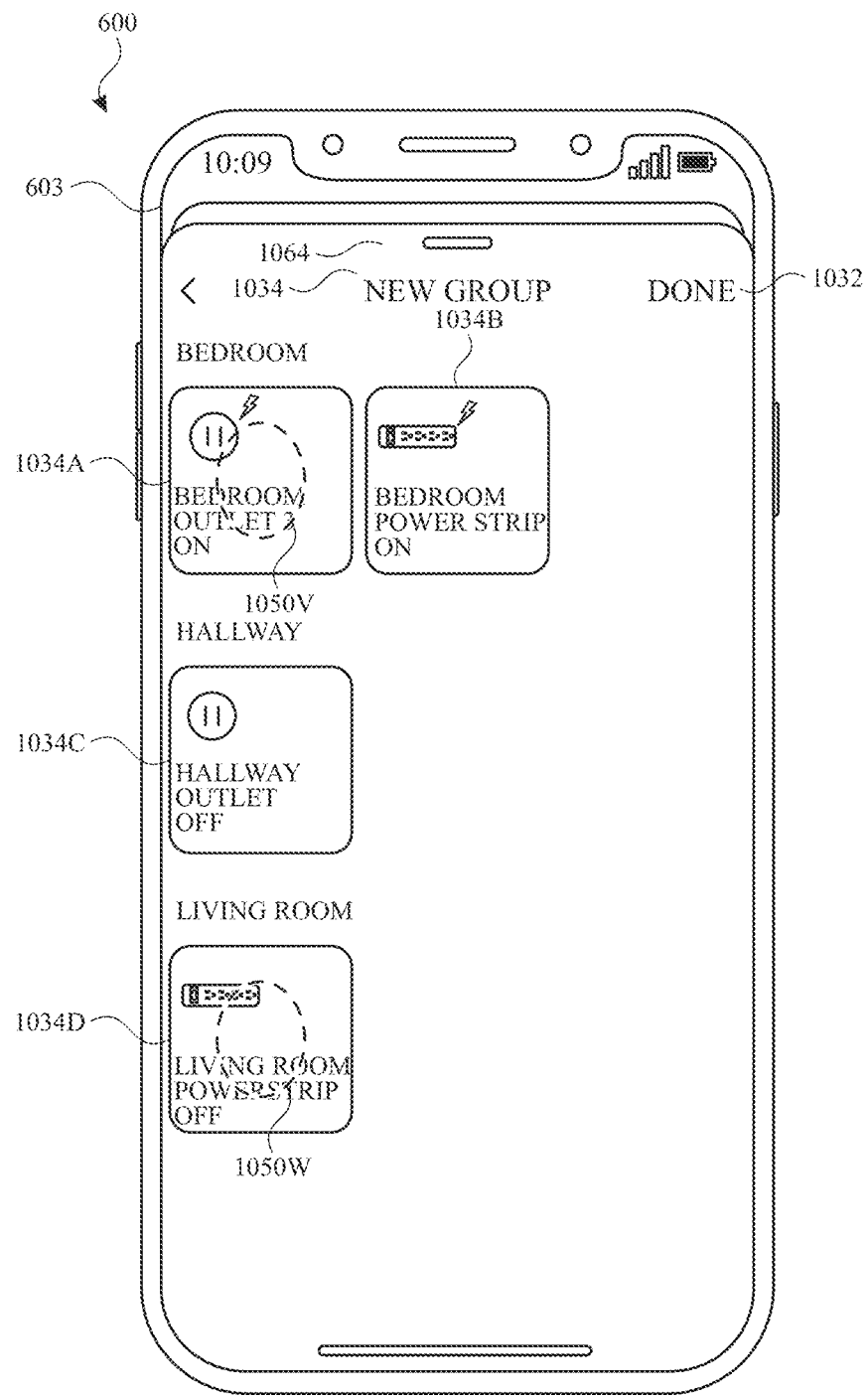
Figure 10A:
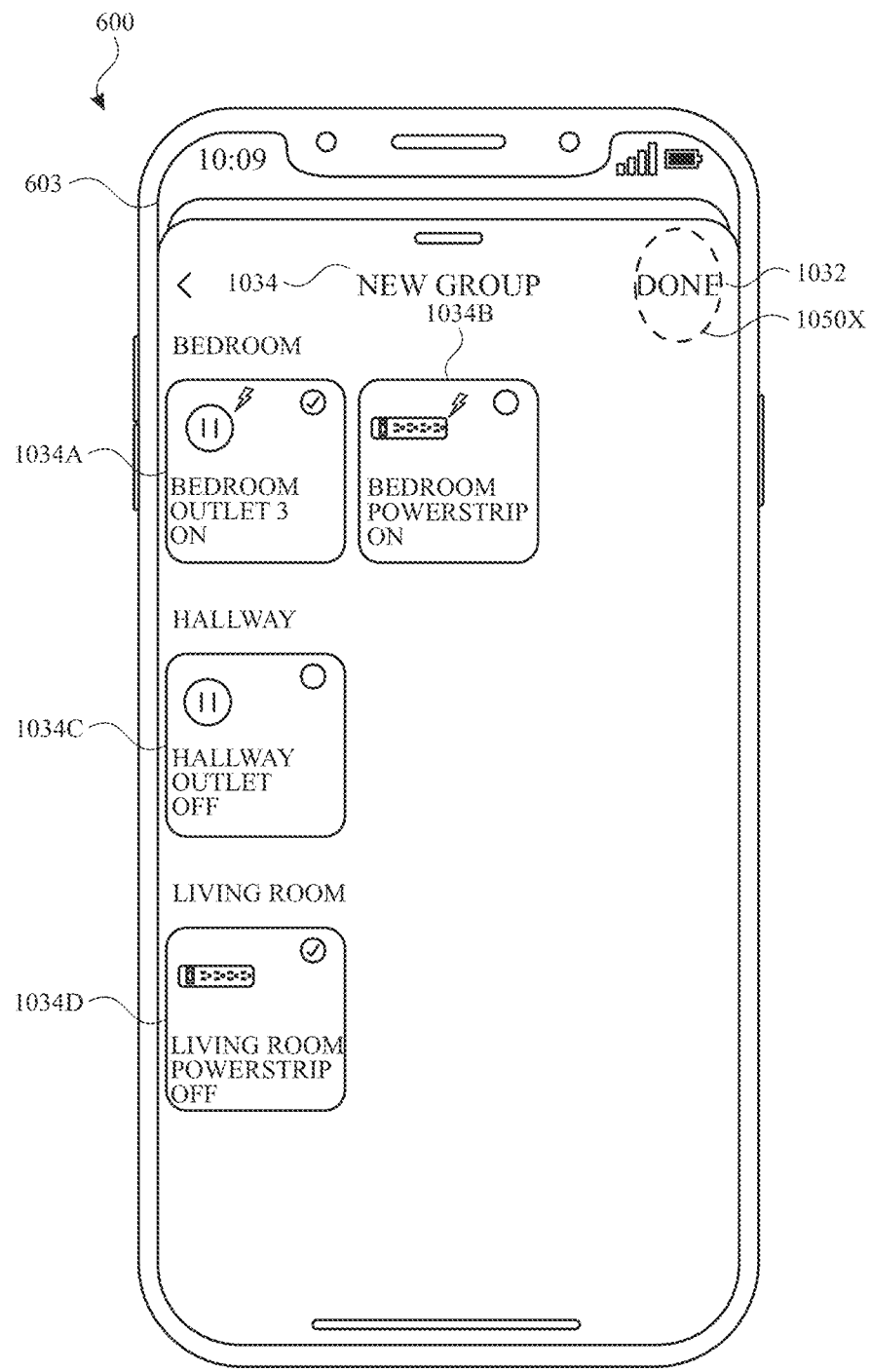
Figure 10A:
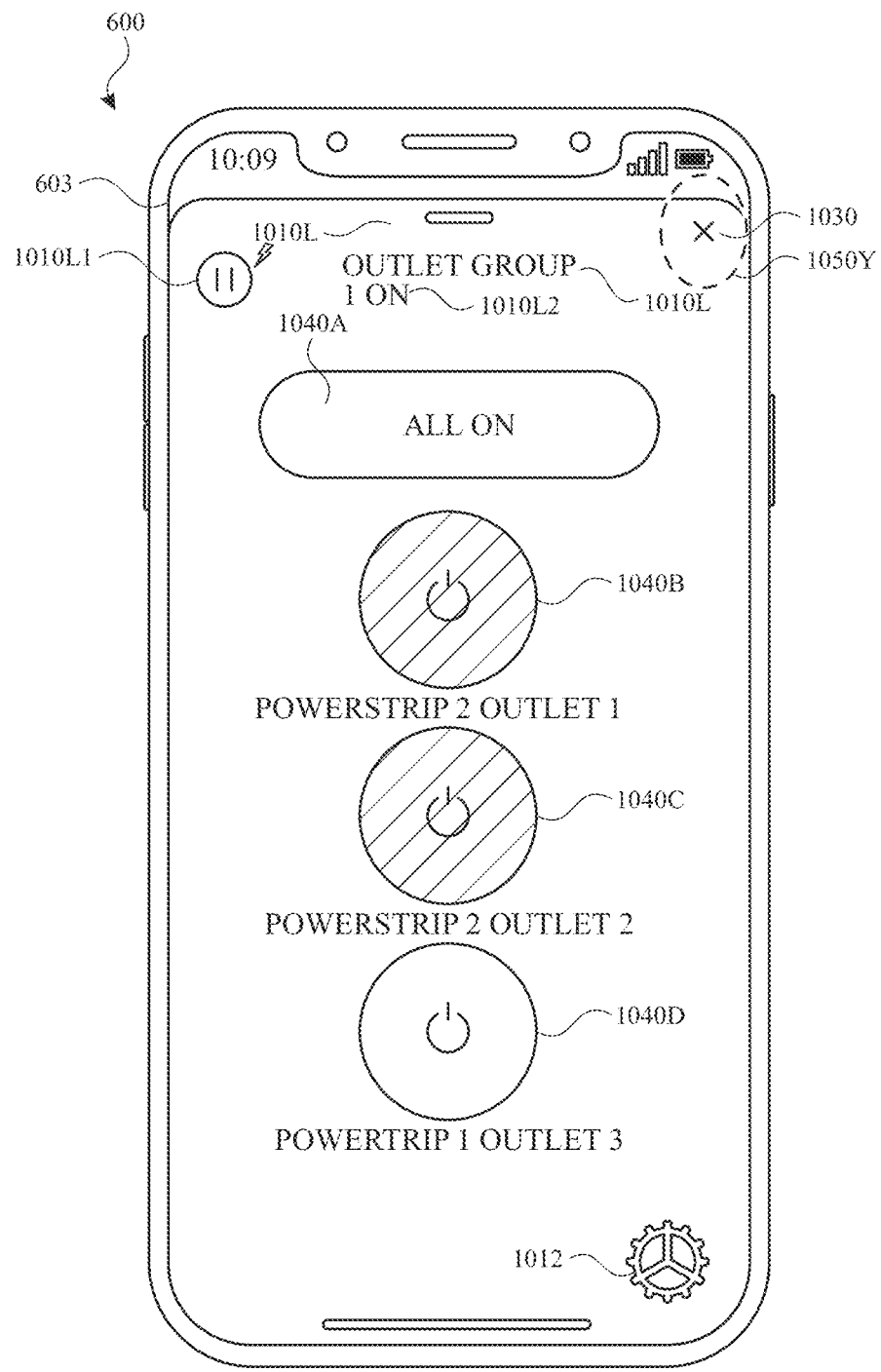
Figure 10A:
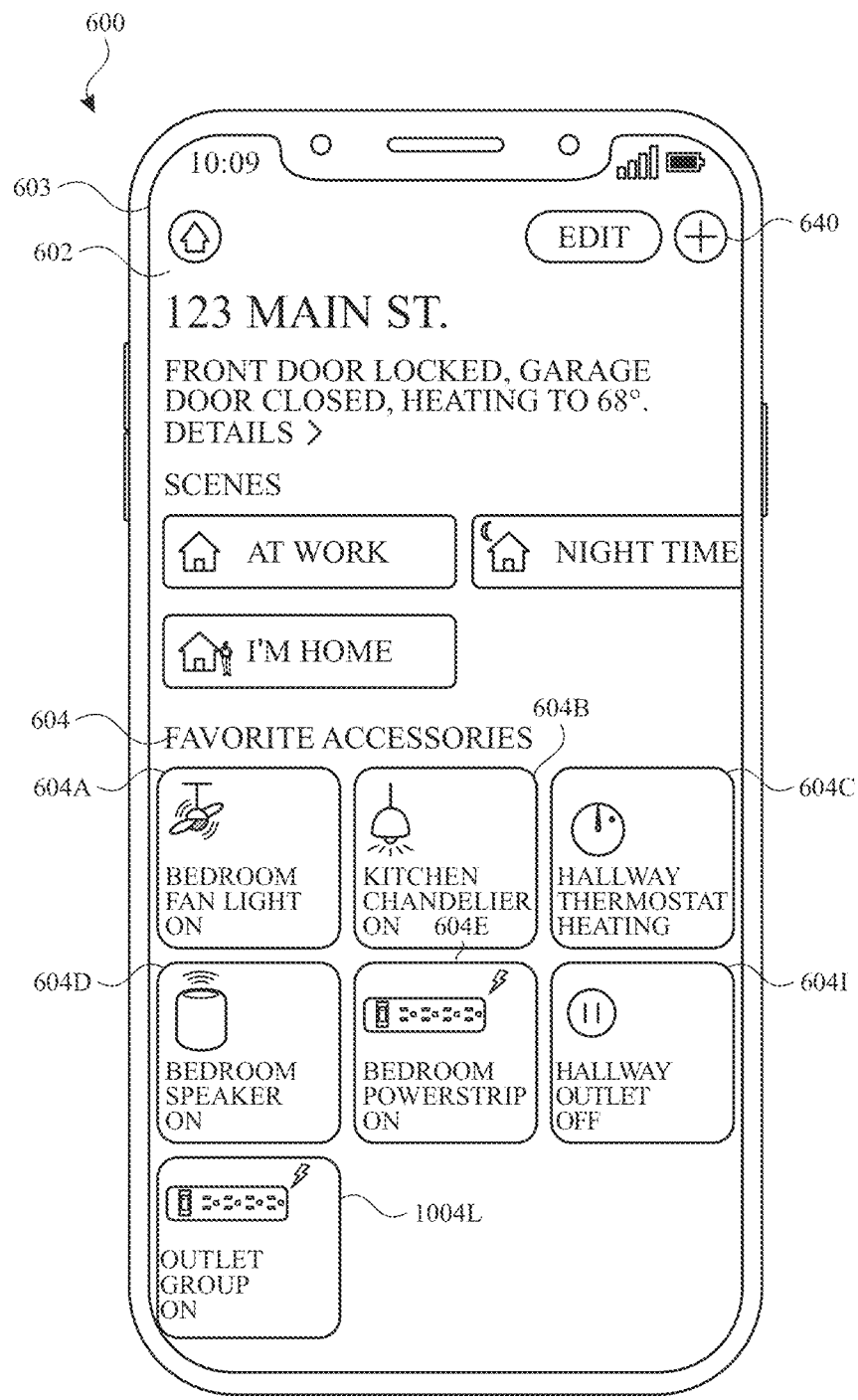

In FIG. 10Z, in response to detecting input 1050U, device 600 displays new group interface 1064. Device 600 displays outlet and power strip affordances 1034A-1034D corresponding to the outlet and power strip accessories in the home that can be selected to form a new group in new group interface 1064. For example, bedroom outlet 3 and power strip accessory affordances 1034A-1034B are displayed under Bedroom. Hallway outlet accessory affordance 1034C is displayed under Hallway. Living Room power strip accessory affordance 1034D is displayed under Living Room. In FIG. 10Z, device 600 detects inputs (e.g., taps) 1050V-1050W corresponding to selection of outlet 3 accessory affordance 1034C and living room power strip accessory affordance 1034D to identify the accessories to group together. In FIG. 10AA, in response to detecting inputs 1050V-1050W, device 600 display checkmarks next to selected accessories outlet 3 accessory affordance 1034C and power strip accessory affordance 1034D. Device 600 detects input (e.g., a tap) 1050X corresponding to selection of Done button 1032. In some embodiments, the user can group together a variety of accessories that are of different types (e.g., thermostat, light, and power strips) to create a shortcut access to the group (e.g., shortcut to a group of tasks to be triggered by a voice command) to be triggered by an event or a voice command (e.g., when someone is home, turn on the accessories in the group).

In FIG. 10AB, in response to detecting input 1050X, device 600 displays a new outlet group accessory interface 1010L including control affordances 1040A-1040D for the living room power strip outlets and outlet 3 that are now in a new outlet accessory group. Outlet group accessory interface 1010L includes graphical representation 1010L1 indicating the group includes outlet accessories and current status 1010L2 indicating there is 1 outlet in the accessory group that are in the ON state. Control affordance 1040A turns on all of the outlet accessories in the group. Control affordance 1040B and 1040C correspond to controls to toggle the on/off state of outlets 1 and 2 associated with the living room power strip. Control affordance 1040D corresponds to a control to toggle the on/off state of outlet 3. Device 600 detects input (e.g., a tap) 1050Y corresponding to selection of "X" button 1030.

In FIG. 10AC, in response to detecting input 1050Z, device 600 displays new outlet group accessory affordance 1004L corresponding to the new outlet accessory group. Device 600 removes outlet 3 accessory affordance 1004J and living room power strip accessory affordance 1004K and replaces them with new outlet group accessory affordance 1004L.

FIGS. 11A-11B are a flow diagram illustrating a method 1100 for controlling a group of external devices using an electronic device in accordance with some embodiments. Method 1100 is performed at a device (e.g., 100, 300, 500, 600) with a display device. Some operations in method 1100 are, optionally, combined, the orders of some operations are, optionally, changed, and some operations are, optionally, omitted.

As described below, method 1100 provides an intuitive way for managing controllable external devices with multiple components. The method reduces the cognitive burden on a user for managing controllable external devices with multiple components, thereby creating a more efficient human-machine interface. Allowing users to manage controllable external devices with multiple components from the same device interface reduces the cognitive burden on a user because the controls for the group can be managed from one place. Thus, the user does not need to open a separate application to manage the configurations for each controllable external device and subcomponent, thereby creating a more efficient human-machine interface. For battery-operated computing devices, enabling a user to manage the controllable external devices and components from the same device interface reduces the number of inputs needed to configure the components of the controllable external device allowing the user to efficiently conserve power on the device and increases the time between battery charges.

At block 1102, while the device (e.g., 600) (e.g., a smart phone; a smart home control device) with a display device (e.g., a touch-sensitive display device) is not configured to control a first controllable external device, the device detects a first set of one or more inputs (e.g., 1050A) corresponding to a request to configure the electronic device to control the first controllable external device.

At block 1104, in response to detecting the first set of one or inputs (e.g. 1050A), the device initiates a process to configure the electronic device to control the first controllable external device, wherein the process includes: at block 1106, receiving information (e.g., from the accessory device, from a server that stores characteristics of devices) corresponding to the first controllable external device.

At block 1108, in accordance with a determination, based on the received information, that the first controllable external device is associated with a plurality of controllable functions (e.g., turning on/off a plurality of outlets of a power strip, turning on/off a light, turning on/off a fan) associated with a plurality of subcomponents (e.g., outlets for a power strip, a light of a ceiling fan) of the first controllable external device, (e.g., accessory is associated with subcomponents, e.g., a power strip with multiple outlets, a fan with a ceiling light), the device (e.g., 600) displays, on the display device (e.g., 603), a first accessory affordance (e.g., 604E) (e.g., a tile representing the group) corresponding to a group including the first controllable external device and the plurality of subcomponents.

At block 1110, in accordance with a determination, based on the received information, that the first controllable external device is not associated with the plurality of subcomponents (e.g., with any plurality of subcomponents, a determination that the accessory includes no subcomponents or only one subcomponent), the device displays, on the display device, a second accessory affordance (e.g., 1004J) (e.g., a tile representing just the accessory) corresponding to the first controllable external device. Displaying a grouped accessory affordance for a controllable external device and its components instead of individual accessory affordances for each component in the group provides a more efficient user interface and reduces the cognitive burden on the user. Selecting the grouped accessory affordance provides a single entry point to access all the controls of the accessory group. This reduces the number of inputs needed to configure the controllable external device and its components, thereby conserving battery power.

At block 1112, while displaying, on the display device (e.g., 603), the first accessory affordance or the second accessory affordance, the device (e.g., 600) detects a second input (e.g., 1050B, 1050D) (e.g., a contact that is maintained for more than predetermined period of time).

At block 1114, in response to detecting the second input (e.g., 1050D): at block 1116, in accordance with a determination that the second input corresponds to a selection of the first accessory affordance (e.g., 604E) (e.g., the grouped accessory tile), the device (e.g., 600) displays, on the display device (e.g., 603), a first accessory interface (e.g., 1010E) (e.g., the configuration page (e.g., a card) for the accessory) including a plurality of control affordances (e.g., 1020A-1020G) (e.g., controls to turn the accessory on/off, change the light color, change the temperature) corresponding to the first controllable external device and the plurality of subcomponents and a control reconfiguration affordance (e.g., 1020) (e.g., for ungrouping a subcomponent from the group) that, when selected, initiates a process to remove at least a first control affordance (e.g., 1020D) of the plurality of control affordances from the first accessory interface.

In some embodiments, the first accessory interface includes a group control affordance (e.g., 1020A) that, when selected, transmits a command to the first controllable external device that affects the states of the subcomponents of the plurality of subcomponents (e.g., affects/alters the states of each of the plurality of subcomponents (e.g., all of the subcomponents of the first controllable external device)). In some embodiments, the first accessory interface (e.g., 100E) includes a remove accessory affordance (e.g., 1016). In some embodiments, the plurality of control affordances of the first accessory interface includes a first control affordance (e.g., 1020B) associated with a first subcomponent (e.g., a first outlet of the a multi-outlet power strip) of the plurality of subcomponents and a second control affordance associated with a second subcomponent (e.g., 1020D) (e.g., a second outlet of the multi-outlet power strip) of the plurality of subcomponents. In some embodiments, the plurality of control affordances (e.g., 1020A-1020G) include one or more control affordances that correspond to subcomponents of a first type (e.g., light subcomponents; outlet subcomponents; fan subcomponents) and one or more control affordances that correspond to subcomponents of a second type.

At block 1118, in accordance with a determination that the second input (e.g., 1050B) corresponds to a selection of the second accessory affordance (e.g., 604F), the device (e.g., 600) displays, on the display device (e.g., 603), a second accessory interface (e.g., 1010F) (e.g., the configuration page (e.g., a card) for the accessory) including controls (e.g., 1008) for the first controllable external device without displaying the control reconfiguration affordance (e.g., 1020).

In some embodiments, device (e.g., 600) detects a third input (e.g., a tap gesture) corresponding to a selection of the first control affordance (e.g., 1020A). In response to detecting the third input, transmitting a command to the first controllable external device that affects the states of the subcomponents of the plurality of subcomponents (e.g., turn on/off all the outlets of the power strip). Controlling the accessory group (e.g., power strip and outlets) with a single control affordance (e.g., 1020A) provides a more efficient user interface that reduces the cognitive burden on the user. For example, the power strip includes six outlets. Rather than toggle each outlet on/off, the user can tap a single control affordance to toggle all the outlets in the group. This not only simplifies controlling the power strip, but also reduces the number of inputs, which helps to preserve battery power for the electronic device.

In some embodiments, while displaying the first accessory interface (e.g., 1010E), the device (e.g., 600) detects a fourth input (e.g., 1050G) (e.g., a tap gesture) corresponding to the first control affordance (e.g., 1020B). In response to detecting the fourth input, the device transmits a command to the first controllable external device that affects a state of the first subcomponent (e.g., toggles a state of the first outlet off and on) without transmitting a command to the first controllable external device that affects a state of the second subcomponent (e.g., the second outlet of the power strip is not affected). Displaying an aggregate accessory interface (e.g., 1010E) where the user can manage the configurations of each component of the grouped accessory provides a more efficient user interface that reduces the cognitive burden on the user. The user can control a particular component without affecting the state of another component in the group. Thus, this simplifies management of the accessory group as the controls for the group are accessible from one user interface. This not only simplifies management of components in an accessory group, but also reduces the number of inputs, which helps to preserve battery power for the electronic device.

In some embodiments, the device detects a fifth input (e.g., 1050P) corresponding to the remove accessory affordance (e.g., 1016) (e.g., remove the accessory so that it is no longer controlled by the electronic device). In response to detecting the fifth input corresponding to the remove accessory affordance, the device (e.g., 600) initiates a process to configure the electronic device (e.g., 600) to no longer control the first controllable external device, including: in accordance with a determination that a set of alert criteria are met, the alert criteria including a criterion that is met when the first controllable external device is a subcomponent device of a composite external device that includes at least one other subcomponent device that the electronic device is currently configured to control (e.g., only display the notification if the accessory that is being removed is a subcomponent that is part of a controllable accessory (e.g., removing an outlet that is part of a power strip), displaying an indication (e.g., 1062) that completing the process to configure the electronic device to no longer control the first controllable external device will also configure the electronic device to no longer control the at least one other subcomponent device (e.g., notification that removing the outlet removes the entire power strip from being controlled by the electronic device). In accordance with a determination that the set of alert criteria are not met (e.g., the accessory being removed is a standalone accessory such as a light or a thermostat), the device forgoes displaying the indication that completing the process to configure the electronic device to no longer control the first controllable external device will also configure the electronic device to no longer control the at least one other subcomponent device (e.g., remove the accessory without displaying a notification). Displaying a notification warning the user that removing a component in an accessory group will remove the entire accessory (e.g., removing an outlet will remove a power strip) provides a more efficient user experience that reduces the cognitive burden of the user. Often, the user does not realize that by removing a component of a group, the entire accessory will be removed. Therefore, the notification requesting the user to confirm before proceeding to remove the component saves the user time from having to re-add the unintentionally removed accessory.

In some embodiments, while displaying the first accessory interface (e.g., 610A in FIG. 6J, 1010E in FIG. 10I) (e.g., the accessory user interface or card for the accessory including a plurality of control affordances associated with subcomponents), the device (e.g., 600) detects a second set of one or inputs (e.g., 650G in FIG. 6J, 1050I-1050L in FIGS. 10K-10N) (e.g., In some examples selection of the reconfigure affordance (e.g., 616 in FIG. 6J, 1020 and 1022 in FIG. 10L), selecting a particular subcomponent (e.g., 1018C) to ungroup, clicking on the "done" button (e.g., 1032)) including an input (e.g., 650G in FIG. 6J, 1050J in FIG. 10L) correspond to the control reconfiguration affordance (e.g., the grouped accessories affordance, and the add or remove affordance). In response to detecting the second set of one or more inputs: the device ceases to display the first accessory interface (e.g., 610A) and ceases to display the first accessory affordance (e.g., 604A) (e.g., break apart the group). In some embodiments, only the selected subcomponent (e.g., an outlet) (e.g., 1018C) is removed from of the group (e.g., the power strip) and has its own tile (e.g., 1050N), while the remaining accessory with the subcomponents remain grouped (e.g., remaining outlets in the power strip) in the grouped tile (e.g., 604E).

The device displays a third accessory affordance (e.g., 604G, 1004J) that, when selected, displays a third accessory interface (e.g., 1010J in FIGS. 10V-10Y, 810I) including the one or more control affordances (e.g., 1008) that correspond to subcomponents of a first type (e.g., the fan, the outlet). In some embodiments, a new grouped tile (e.g., 1004L) shows all subcomponents of the same type including the subcomponent that was broken out of the prior group, e.g., a new group of lights including the light from the ceiling fan with light accessory. In some embodiments, the third accessory interface includes a regroup affordance (e.g., 1014C).

The device displays a fourth accessory affordance (e.g., 604H) that, when selected, displays a fourth accessory interface (e.g., 610H) including the one or more control affordances (e.g., 608B-608C) that correspond to subcomponents of a second type (e.g., the light). In some embodiments, selecting the control reconfiguration affordance (e.g., 616) provides an option to disassociate all of the control affordances (e.g., 608A-608C) that have been grouped together in the first accessory interface (e.g., 610A) and create new groups of control affordances (e.g., new groups of lights: 614A, new groups of outlets: 1014A and 1064 in FIGS. 10Y-10Z) based on the types of subcomponents in the original group. In some embodiments, a new grouped tile shows all fan components, including a fan that was previously part of the ceiling fan with light accessory. Updating the display of new grouped accessory affordances and accessory affordances that are no longer relevant (e.g., because they were removed or joined with another group) provides the user with a more intuitive home interface that is less cluttered. Keeping the home interface with updated accessory affordances provides a more efficient user interface, which allows the user to easily find a particular accessory affordance of interest. This reduces the cognitive burden on the user and allows the user to manage the accessory with fewer inputs, thereby, preserving the batter power of the electronic device.

In some embodiments, while displaying the third accessory interface (e.g., 604G in FIG. 6K, 1010J in FIGS.

10V-10Y, 810I), the device detects a third set of one or more inputs (e.g., 1014T) including an input (e.g., 1014T) corresponding to selection of the regroup affordance (e.g., 1014C) (e.g., the card of the split off outlet has an affordance to rejoin the group with the power strip). In response to detecting the third set of one or more inputs: the device ceases to display the third accessory affordance (e.g., 604G, 1004J) and the fourth accessory affordance (e.g., 604H, another outlet that was split from the power strip) and re-displays the first accessory affordance (e.g., 604A, 604E) that, when selected, displays the first accessory interface (e.g., 610A, 1010E) that includes the plurality of control affordances (e.g., 608A-608C in FIG. 6G, 1020A-1020G in FIG. 10X). In some embodiments, selecting the regroup affordance (e.g., 1014A) provides an option to reassemble a group of control affordances (e.g., 608A-608C in FIG. 6G, 1020A-1020G in FIG. 10X) that was ungrouped via the control reconfiguration affordance (e.g., 616). Providing interface options to split up grouped accessories and form new accessory groups gives users the flexibility to manage accessories in a way that is more intuitive to the user. For example, a user can want to group all the lights in the common space in one group, but keep the bedroom lights separate. Thus, the reconfiguration affordances allow users to manage accessories more efficiently. Further, by grouping accessories more intuitively, this reduces the number of inputs needed to manage accessories, which further preserves the battery power of an electronic device.

Note that details of the processes described above with respect to method 1100 (e.g., FIGS. 11A-11B are also applicable in an analogous manner to the methods described below/above. For example, method 900 optionally includes one or more of the characteristics of the various methods described above with reference to method 700, 900, and 1300. For example, the controllable external device with multiple components described in method 1100 can be the controllable external device of method 700, which can be configured and accessed using the interfaces described in method 700. For brevity, these details are not repeated below.

FIGS. 12A-12Q illustrate exemplary user interfaces for a thermostat accessory, in accordance with some embodiments. The user interfaces in these figures are used to illustrate the processes described below, including the processes in FIGS. 13A-13B.

In FIG. 12A, device 600 displays thermostat accessory affordance 604C, in home interface 602, corresponding to a thermostat. Thermostat accessory affordance 604C includes graphical representation 604C1 of the thermostat and text indicating current status 604C2 that the thermostat is in a heating mode. Device 600 detects input 1250A (e.g., a tap) corresponding to selection of thermostat accessory affordance 604C in home interface 602. In response to detecting input 1250A corresponding to selection of the thermostat accessory affordance 604C, device 600 displays thermostat accessory interface 1210C, as illustrated in FIG. 12B. In some embodiments, a detected long press on thermostat accessory affordance 604C also results in thermostat accessory interface 1210C being displayed on device 600.

FIG. 12B illustrates the controls of the thermostat. FIG. 12B illustrates thermostat accessory interface 1210C including graphical representation 1210C1 of the thermostat and text indicating current status 1210C2 of the thermostat. Graphical representation 1210C1 of thermostat accessory interface 1210C matches the graphical representation 604C1 of thermostat accessory affordance 604C. Graphical representations 604C1 and 1210C1 include an icon of thermostat in a color that matches the color of the temperature displayed in temperature control affordance 1208. Similarly, current status 1210C2 of thermostat accessory interface 1210C matches current status 604C2 of thermostat accessory affordance 604C. In FIG. 12B, device 600 detects input 1250B corresponding to selection of cooling mode 1220A and selection of target temperature 68 degrees. In response to detecting input 1250B, device 600 updates graphical representation 1210C1 to change the color of the thermostat icon to a purple color and status 1210C2 to indicate the thermostat is "cooling to 68 degrees". Accordingly, graphical representation 604C1 of thermostat accessory affordance 604C and current status 604C2 of thermostat accessory affordance 604 is updated, when thermostat accessory interface 1210C is closed.

Thermostat accessory interface 1210C includes additional temperature data, such as the current temperature outside and the current room temperature in section 1204. Thermostat accessory interface 1210C also includes settings shortcut affordance 1216, which corresponds to thermostat settings section 1218 for configuring the thermostat.

Thermostat accessory interface 1210C includes temperature control affordance 1208 for setting the room to a specified temperature or to a temperature within a range of temperatures. Temperature control affordance 1208 consists of a wheel corresponding to a range of temperatures, including a minimum temperature and a maximum temperature, in which a temperature can be selected. Temperature control affordance 1208 is divided into a plurality of sections corresponding to the range of temperatures. Each section of temperature control affordance 1208 is displayed in a different color gradient from blue at the minimum temperature range to red at the maximum temperature range. For example, in FIG. 12B, temperature control affordance 1208 includes a first section in a blue gradient corresponding to temperatures between 50 degrees to 60 degrees. A second section of temperature control affordance 1208 is displayed in a blue to red gradient corresponding to temperatures between 60 degrees to 70 degrees. A third section of temperature control affordance 1208 is displayed in a red gradient corresponding to temperatures between 70 degrees to 80 degrees. Temperature control affordance 1208 includes one or more sliders (e.g., 1214A-1214C) for selecting a temperature or range of temperatures depending on the selected operating mode as indicated in mode affordance 1220. In some embodiments, when the thermostat is in a cooling mode or a heating mode, single slider 1214A is displayed for selecting the target room temperature. In some embodiments, when the thermostat is in an automatic mode, home mode, away mode, or a custom mode, temperature control affordance 1208 includes multiple sliders for selecting a minimum temperature and a maximum temperature in a target range of temperatures, outside of which will trigger cooling or heating. Temperature control accessory 1208 includes text 1212 indicating the current status and target temperature.

Thermostat accessory interface 1210C includes mode affordance 1220, which includes a list of operating modes of the thermostat. Mode affordance 1220 includes an off mode, heating mode, cooling mode, automatic mode, home mode, and away mode. Custom modes can also be created as discussed with respect to FIGS. 12C-12G and added to mode affordance 1220. When the thermostat is set to off mode, the thermostat is turned off. When the thermostat is set to heating mode, the thermostat immediately turns on the heater until a target temperature is reached. Similarly, when the thermostat is set to cooling mode, the thermostat immediately turns on the air conditioner until a target temperature is reached. When the thermostat is set to automatic mode, the thermostat turns on the heater or the air conditioner when the thermostat detects that the current room temperature is outside a target range of temperatures. When the thermostat is set to home mode, away mode, or a custom mode, the thermostat cools or heats the room to a target temperature or a temperature within a target temperature range during a specified period of time (e.g., during the hours when someone is home, during the hours when no one is home, or a custom period of time).

In FIG. 12B, device 600 displays the thermostat is set to cooling mode 1220A at a target temperature of 68 degrees. Device 600 detects input 1250B corresponding to moving slider 1214A to a target temperature of 68 degrees in temperature control affordance 1208. Subsequent to (and in response to) detecting input 1250B, device 600 transmits a command to the thermostat to turn on the air conditioner until the current temperature reaches a target temperature of 68 degrees. Subsequent to (and in response to) detecting input 1250B, device 600 updates the color of graphical representation 1210C1 to match the color of the selected temperature in temperature control affordance 1208. In some embodiments, device 600 updates the graphical representation 1210C1 to blue when the device is in a cooling mode and red when the device is in a heating mode. Device 600 updates the color of the displayed target temperature (e.g., 68 degrees) in thermostat status 1212 to a purple color based on the position of the temperature in the blue to red color gradient corresponding to the 60 degree to 70 degree section of temperature control affordance 1208. Device 600 updates the operating mode of thermostat status 1212 to indicate the thermostat is "cooling to 68 degrees".

FIGS. 12C-12G illustrate creating a custom temperature mode in thermostat accessory interface 1210C. In FIG. 12C, in response to detecting input 1250C, device 600 displays thermostat settings section 1218. In some embodiments, device 600 detects a swipe gesture to scroll down to thermostat accessory interface 1210C to display thermostat settings section 1218 using the technique as discussed above with respect to FIGS. 8A-8F. Thermostat settings section 1218 includes settings for configuring the thermostat. Thermostat settings section 1218 includes mode affordance 1240 for creating custom modes and schedule affordance 1260 for scheduling when a mode should be activated or enabled.

In FIG. 12C, device 600 detects input 1250D corresponding to selection of mode affordance 1240. In FIG. 12D, in response to detecting input 1250D, device 600 displays mode interface 1242, which includes a plurality of custom modes that have been created (e.g., home mode 1242A and away mode 1242B) and custom mode affordance 1242C for adding a new custom mode.

In FIG. 12D, device 600 detects input 1250E corresponding to selection of custom mode affordance 1242C. In FIG. 12E, in response to detecting input 1250E, device 600 displays new mode interface 1244 for creating a new custom mode. New mode interface 1244 includes affordance 1208 indicating the name (e.g., Sleep) of the custom mode and temperature control affordance 1208 for setting a target temperature range. Temperature control affordance 1208 includes two sliders 1214B-1214C for selecting the maximum and minimum temperatures of the target temperature range. In some embodiments, temperature control affordance 1208 displays a default range of 52 degrees to 72 degrees. Device 600 displays thermostat status 1212 including a target temperature range of 52 degrees in a blue color and 72 degrees in a red color based on the position of the temperature in the color gradient in temperature control affordance 1208.

In FIGS. 12E-12F, device 600 detects input 1250F1 from slider 1214C being moved from 72 degrees to 68 degrees. In response to detecting input 1250F, device 600 updates the display of the target temperature range of thermostat status 1212 indicating a maximum temperature of 68 degrees in a purple color. In FIGS. 12E-12F, device 600 detects input 1250F2 from slider 1214B being moved from 52 degrees to 62 degrees. In response to detecting input 1250F, device 600 updates the display of the target temperature range of thermostat status 1212 indicating a minimum temperature of 62 degrees in a light blue color. Thus, sleep mode sets a target temperature range of 62 degrees to 68 degrees. When the current room temperature is outside target temperature range of 62 degrees to 68 degrees, the thermostat will turn on the heater or air conditioner. Device 600 detects input 1250G corresponding to selection of the done button 1232. In FIG. 12G, in response to detecting input 1250G, device 600 adds sleep mode affordance 1242D corresponding to the custom sleep mode to the list of modes in mode interface 1242.

FIGS. 12H-12Q illustrate setting up a schedule for which a custom temperature mode is set. The user selects a time range and a custom temperature mode, which will take effect during the selected time range. In FIG. 12G, device 600 detects input 1250H corresponding to selection of back button 1236. In FIG. 12H, in response to detecting input 1250H, device 600 displays thermostat settings section 1218. Device 600 detects input 1250I corresponding to selection of schedule affordance 1260. In FIG. 12I, in response to detecting input 1250I, device 600 displays schedule interface 1262 for scheduling scenes or designated times in which the selected temperature modes should be activated or enabled on the thermostat. Schedule interface 1262 includes a customize affordance 1270 for selecting the days of the week in which the schedule should be applied and an everyday affordance that applies the schedule to every day of the week. Schedule interface 1262 includes schedule section 1264, which includes a list of the scheduled scenes corresponding to affordances 1264A-1264B. Schedule section 1264 includes scene affordance 1264A specifying a time range 9:00 AM-4:00 PM in which the thermostat is set in away mode and scene affordance 1264B specifying a time range 4:00 PM-11:00 PM in which the thermostat is set in home mode. Away mode and home mode correspond to target temperature ranges. For example, away mode can include a broader, target temperature range (e.g., 50 degrees to 80 degrees) to prevent the thermostat from turning on the heater or air conditioner between 9:00 AM-4:00 PM when no one is home to conserve energy. Home mode can include a narrower, target temperature range (e.g., 60 degrees to 70 degrees) to trigger the thermostat to turn on the heater or air conditioner to maintain a more comfortable room temperature between 4:00 PM-11:00 PM when someone is home. Scenes can be edited by selecting the corresponding affordance. Schedule section 1264 includes affordance 1264C to add additional scenes to the schedule.

In FIG. 12I, device 600 detects input 1250I corresponding to selection of customize affordance 1270. In FIG. 12J, in response to detecting input 1250J, device 600 updates display of schedule section 1264 in schedule interface 1262 to display affordances 1266A-1266G corresponding to each day of the week and a state indicating whether the schedule is enabled for the respective day. Scenes 1264A-1264B are not displayed. In FIG. 12J, device 600 displays that the schedule is only enabled for Sunday, Friday, and Saturday. The schedule is not enabled for Monday-Thursday.

In FIG. 12J, device 600 detects input 1250K corresponding to selection of affordance 1266A corresponding to Sunday. In FIG. 12K, in response to detecting input 1250K, device 600 displays an interface for Sunday including the schedule of scenes 1264A-1264B enabled for Sunday and affordance 1264C to add a new scene to the Sunday schedule.

In FIG. 12K, device 600 detects input 1250L corresponding to selection of affordance 1264C to add a new scene. In FIG. 12L, in response to detecting input 1250L, device 600 displays "add time" interface 1284 for creating a new scene. "Add time" interface 1284 includes affordances 1286A-1286B for specifying a start and end time for the new scene, mode affordance 1288 for selecting an operating mode, and temperature control affordance 1208 for specifying a temperature range. In some embodiments, by default, the operating mode selected in mode affordance 1288 is Automatic mode. In some embodiments, the temperature control affordance includes sliders 1214B-1214C to enable selection of a target temperature range.

FIGS. 12L-12O illustrates selecting a time in which an operating mode is set to be enabled. In FIG. 12L, device 600 detects input 1250M corresponding to selection of affordance 1286A. In FIG. 12M, in response to detecting input 1250M, device displays a drop down menu to enable selection of a time for the scene to be enabled. In FIGS. 12M-12N, device 600 detects input 1250N corresponding to scrolling down in the drop down menu to select 11:00 PM as the start time of the scene. Similarly, device 600 detects input setting the end time of the scene to 6:00 AM in affordance 1286B.

In FIG. 12N, device 600 detects input 1250O, corresponding to selection of mode affordance 1288. In accordance with input 1250O, device 600 displays a drop down menu listing the available operating modes for the thermostat. In FIGS. 12N-12O, device 600 detects input 1250P corresponding to scrolling down to select the sleep mode.

In FIG. 12P, in response to detecting input 1250Q, device 600 updates temperature control affordance 1208 to display the target temperature range 62 degrees to 68 degrees specified in the sleep mode. Temperature control affordance 1208 does not include sliders 1214B-1214C since the temperature range is set by the sleep mode and cannot be adjusted. Device 600 updates display of target temperature range of thermostat status 1212 is 62 degrees to 68 degrees in the corresponding colors. In some embodiments, automatic mode is selected to specify a different target temperature range. Device 600 detects selection 1250R of done button 1232, to add the scene to the Sunday schedule. As illustrated in FIG. 12Q, device 600 displays the enabled scenes in the schedule for Sunday in schedule section 1264. Device 600 displays affordances 1264A-1264C, in schedule section 1264, corresponding to the enabled scenes for Sunday, including the newly added scene corresponding to affordance 1264C. In some embodiments, shortcuts can be created for a schedule or a temperature mode such that an event (e.g., the weather) can be used to trigger the shortcut. For example, a shortcut (e.g., a scene) can be created such that the thermostat is turned on to cooling mode when the weather exceeds 75 degrees.

FIGS. 13A-13B are a flow diagram illustrating a method 1300 for controlling a thermostat using an electronic device in accordance with some embodiments. Method 1300 is performed at a device (e.g., 100, 300, 500, 600) with a display device (e.g., 603). Some operations in method 1300 are, optionally, combined, the orders of some operations are, optionally, changed, and some operations are, optionally, omitted.

As described below, method 1300 provides an intuitive way for managing temperature settings for a thermostat device from an electronic device (e.g., 600). The method reduces the cognitive burden on a user for managing thermostat settings and schedules, thereby creating a more efficient human-machine interface. For battery-operated computing devices, enabling a user to quickly select custom thermostat modes allows the user to set up the thermostat device faster and more efficiently, which conserves power and increases the time between battery charges of the electronic device.

At block 1302, the device (e.g., 600) displays, on the display device (e.g., 603), a temperature mode creation user interface (e.g., 1234) (e.g., a thermostat app including a thermostat dial) including a first set of controls (e.g., 1208) (e.g., one or more controls, e.g., a dial for changing the temperature) for creating a temperature mode (e.g., 1246) (e.g., a custom temperature setting) for an external thermostat device controllable by the electronic device.

At block 1304, while displaying, on the display device (e.g., 603), the temperature mode creation user interface (e.g., 1234), the device (e.g., 600) detects a first set of one or more inputs (e.g., 1250F1 and 1250F2) (e.g., tapping and selecting temperature ranges using the dial).

At block 1306, in response to the first set of one or more inputs (e.g., 1250F1 and 1250F2): at block 1308, the device (e.g., 600) selects a temperature range (e.g., selecting the temperature ranges in the temperature dial) (e.g., 1212) that includes a minimum temperature (a minimum ambient temperature (e.g., a temperature that, when detected, causes the external thermostat device to engage a heating element)) and a maximum temperature (e.g., a maximum ambient temperature (e.g., a temperature that, when detected, causes the external thermostat device to engage a cooling element)), different than the minimum temperature range.

Optionally, at block 1310, the device displays, in the temperature mode creation user interface (e.g., 1208), a graphical indication (e.g., 1212) of the selected temperature range (e.g., a temperature dial), including: optionally, at block 1312, in accordance with a first portion of the selected temperature range being within a first predetermined temperature range, the device displays a first portion of the graphical indication in a first color that corresponds to the first predetermined temperature range (e.g., a portion of the graphical indication that is between 70° and 75° is displayed in orange). In some embodiments, at block 1314, in accordance with the first portion of the selected temperature range being within a second predetermined temperature range, the device displays the first portion of the graphical indication in a second color, different from the first color, that corresponds to the second predetermined temperature range (e.g., a portion of the graphical indication that is between 65° and 69° is displayed in yellow).

In some embodiments, the device displays a numeric indication of the minimum temperature (e.g., 1212). In accordance with the minimum temperature being with the first predetermined temperature range, the device displays the numeric indication of the minimum temperature in the first color (e.g., display min temperature in the temperature range in the color corresponding to the color of the lower temperature range). In accordance with the minimum temperature being with the second predetermined temperature range, the device displays the numeric indication of the minimum temperature in the second color (e.g., update the color of the min temperature text with the updated color if the temperature moves to a second region that has a different color associated with it). In some embodiments, the device displays a numeric indication of the maximum temperature (e.g., 1212). In accordance with the maximum temperature being with the first predetermined temperature range, the device displays the numeric indication of the maximum temperature in the first color (e.g., display max temperature in the temperature range in the color corresponding to the color of the higher temperature range). In accordance with the maximum temperature being with the second predetermined temperature range, the device displays the numeric indication of the maximum temperature in the second color (e.g., update the color of the max temperature text with the updated color if the temperature moves to a second region that has a different color associated with it). Displaying the temperature in a color that matches the temperature range in the temperature control accessory provides the user with visual feedback of the temperature settings in the thermostat. This helps to provide a more efficient user interface and reduces the cognitive burden on the user by allowing the user to quickly recognize that a red number corresponds to a higher temperature and a blue number corresponds to a lower temperature.

At block 1316, the device associates the temperature range with a first temperature mode (e.g., 1242D) (e.g., a custom temperature setting, a scene). At block 1318, after associating the temperature range with a first temperature mode, the device (e.g., 600) displays, on the display device, a temperature scheduling user interface (e.g., 1262) including a second set of controls (e.g., 1286A-1286B, 1288) for creating a scheduled operation of the external thermostat device. Allowing the user to create custom temperature modes or operating modes by saving temperature range settings provides a more efficient user interface. Particularly because certain temperature settings are relevant in daily routines, (e.g., set a temperature range for when no one is home vs. set a different temperature range when someone is home), being able to select a saved temperature setting saves time. This also helps to reduce the cognitive burden on the user from remembering certain settings and preserves battery power on the electronic device by reducing the number of inputs needed to set a temperature setting.

At block 1320, while displaying, on the display device (e.g., 603), the temperature scheduling user interface (e.g., 1262), the device (e.g., 600) detects a second set of one or more inputs (e.g., 1250M-1250Q). At block 1322, in response to detecting the second set of one or more inputs: optionally, at block 1324, the second set of one or more inputs includes an input corresponding to a selection of the first temperature mode (e.g., 1250Q) from among a plurality of available temperature modes (e.g., 1288) (e.g., a displayed list of stored temperature modes), at block 1326, the device selects a first criteria (e.g., a time range) (e.g., 1286A-1286B) for activation of a first scheduled operation. At block 1328, the device associates the first temperature mode with the first scheduled operation (e.g., 1264C) (e.g., selecting an affordance associated with the first temperature mode).

Note that details of the processes described above with respect to method 1300 (e.g., FIGS. 13A-13B) are also applicable in an analogous manner to the methods described below/above. For example, method 1300 optionally includes one or more of the characteristics of the various methods described above with reference to method 700, 900, and 1100. For example, the thermostat of method 1300 is a first controllable external device that uses the method of method 900. For brevity, these details are not repeated below.

FIGS. 14A-14T illustrate exemplary user interfaces for an application for managing accessory devices, in accordance with some embodiments. The user interfaces in these figures are used to illustrate the processes described below, including the processes in FIG. 15.

FIG. 14A depicts electronic device 600, which is a smartphone with display 603. Display 603 includes a touch-sensitive surface on which electronic device 600 can detect user gestures (e.g., tap, swipe, drag). In some embodiments, electronic device 600 is, or includes one or more features of, electronic device 100, 300, 500, or 600.

At FIG. 14A, electronic device 600 displays home user interface 602 for configuring accessory devices. Home user interface 602 is further discussed above with respect to FIG. 6A. In some embodiments, an accessory device can also be referred to as a controllable external device. Home user interface 602 includes scene objects 1402A-1402C, which represent respective scene profiles. In some embodiments, a scene profile includes data regarding designated states of one or more accessory devices at a location. In some embodiments, a scene profile can also be referred to as a "scene". Additionally, home user interface 602 includes accessory affordances 604A-604F, where an accessory affordance is a graphical tile representing an accessory device. For example, accessory affordance 604D represents a bedroom speaker, which is capable of audio output via its speaker.

At FIG. 14A, a user performs a tap gesture to initiate a process for adding an accessory or a scene profile to be configured by electronic device 600. As a result, electronic device 600 detects tap gesture 1400 at affordance 640 (e.g., a selectable user interface object).

At FIG. 14B, upon detecting tap gesture 1400, electronic device 600 optionally blurs home user interface 602, and displays accessory button 1404 and scene button 1406 overlaid on top of home user interface 602. The user performs a tap gesture to initiate a process for adding a scene profile. As a result, electronic device 600 detects tap gesture 1408 at scene button 1406. In some embodiments, detecting a tap gesture at accessory button 1404 results in initiating a process for adding an accessory device to home user interface 602.

At FIG. 14C, upon detecting tap gesture 1408, electronic device 600 displays new scene user interface 1410 for adding a new scene profile. New scene user interface 1410 includes a text field for naming the scene profile (e.g., "Evening"). The user performs a tap gesture to add accessory device(s) to a set of accessory devices that is to be configured for a scene profile. As a result, while displaying new scene user interface 1410, electronic device 600 detects tap gesture 1412 at accessory button 1414.

At FIG. 14D, upon detecting tap gesture 1412, electronic device 600 replaces display of new scene user interface 1410 with display of accessory selection user interface 1416. Accessory selection user interface 1416 includes accessory affordances (e.g., 604A-604F) representing accessory devices that are available to be configured for a scene profile. The accessory affordances have been modified to include a visual indication of its selection state (e.g., selected or not selected). The user selects the bedroom fan light and hallway thermostat to be added to the scene profile. As a result, electronic device 600 detects tap gesture 1418 at accessory affordance 604A and tap gesture 1420 at accessory affordance 604C. At FIG. 14D, prior to detection of tap gesture 1418, accessory affordances 604A and 604C are displayed with a visual indication that the accessory affordances are not selected.

At FIG. 14E, upon detecting tap gestures 1418 and 1420, electronic device 600 displays the accessory affordances (e.g., 604A, 604C) with a visual indication that the accessory affordances have been selected. With the desired accessory devices having been selected, the user performs a tap gesture to confirm the selection of the accessory devices and add the selected accessory devices to the set of accessory devices for the scene profile. As a result, electronic device 600 detects tap gesture 1424 at done button 1426.

At FIG. 14F, upon detecting the input (e.g., 1424) to add the selected accessory devices to the set of accessory devices, electronic device 600 adds the bedroom fan light and hallway thermostat to the set of accessory devices for the scene profile. In particular, as shown in FIG. 14F, electronic device 600 returns to displaying new scene user interface 1410, including displaying accessory affordances 604A and 604C due to having been selected at FIG. 14D. Accessory affordances 604A and 604C have been modified to include an action state (e.g., "Turn off"), which represents an action that takes place for a respective accessory device when the scene profile is triggered (e.g., activated).

In some embodiments, upon detecting the input (e.g., 1424) to add the selected accessory devices to the set of accessory devices, electronic device 600 determines whether one of the selected accessory devices (e.g., 604A, 604C) is of a particular type. In some embodiments, an accessory device is of the particular type if the accessory device is capable of outputting sound (e.g., via a speaker). In some embodiments, electronic device 600 performs this determination in order to determine whether to provide certain configuration option(s) (e.g., 1436 of FIG. 14H) associated with the particular type of accessory device.

At FIG. 14F, upon a determination that none of the selected accessory devices is of the particular type, electronic device 600 does not provide the certain configuration option(s) (e.g., 1436 of FIG. 14H). As demonstrated below with respect to FIGS. 14G-14H, if the user had selected an accessory device of the particular type (e.g., bedroom speaker), electronic device 600 would have provided the certain configuration options at FIG. 14F upon detecting the input (e.g., 1424) to add the selected accessory devices to the set of accessory devices.

The user proceeds to perform one or more inputs to add an accessory device of the particular type to the set of accessory devices for the scene profile, thereby resulting in the certain configuration options being provided in FIG. 14H. Back to FIG. 14F, the user performs a tap gesture to edit the set of accessory devices for the scene profile. While displaying new scene user interface 1410 of FIG. 14F, electronic device 600 detects tap gesture 1428 at accessories button 1430.

At FIG. 14G, upon detecting tap gesture 1428, electronic device 600 returns to displaying accessory selection user interface 1416. While displaying accessory selection user interface 1416, electronic device 600 detects tap gesture 1432 at accessory affordance 640D. Upon detecting tap gesture 1432, displays accessory affordance 640D with a visual indication that the accessory affordance has been selected. With the desired accessory device having been selected, the user performs a tap gesture to confirm the selection of the accessory device and add the selected accessory device to the set of accessory devices for the scene profile. As a result, electronic device 600 detects tap gesture 1434 at done button 1426.

At FIG. 14H, upon detecting the input (e.g., 1434) to add the selected accessory devices to the set of accessory devices, electronic device 600 adds the bedroom speaker to the set of accessory devices for the scene profile. In particular, as shown in FIG. 14H, electronic device 600 returns to displaying new scene user interface 1410, including displaying accessory affordances 604A, 604C, and 604D. Accessory affordance 604D has been modified to include an action state ("ON"), which represents an action that takes place for a respective accessory device when the scene profile is triggered (e.g., activated).

As discussed above, in some embodiments, upon detecting the input (e.g., 1424, 1434) to add the selected accessory devices to the set of accessory devices, electronic device 600 determines whether one of the selected accessory devices (e.g., 604A, 604C, 604D) is of the particular type (e.g., an accessory device capable of outputting sound). At FIG. 14H, upon a determination that one of the selected accessory devices (e.g., 604D) is of the particular type, electronic device 600 displays audio options button 1436 and provides certain configuration options(s) with audio options button 1436, which, when selected, initiates a process for configuring options associated with capabilities of the particular type of accessory device.

At FIG. 14H, the user performs a tap gesture to initiate the process for configuring audio options for the bedroom speaker. As a result, electronic device 600 detects tap gesture 1438 at audio options button 1436. FIGS. 14I-14N, as discussed below, illustrate various configuration options associated with an accessory device of the particular type.

At FIG. 14I, upon detecting tap gesture 1438, electronic device 600 displays audio user interface 1440. Audio user interface 1440 includes playback options 1442A-1442D. Playback option 1442A is the default option, as demonstrated by the visual indication (e.g., "Play Audio") in audio options button 1436 of FIG. 14H. The different playback options determine the state of the audio playback for the accessory device of the particular type (e.g., bedroom speaker). For example, selecting playback option 1442A provides the user the ability to select an audio item (e.g., song, audiobook, podcast, soundscape) to be played on the accessory device of the particular type. In particular, selecting playback option 1442A for the scene profile results in configuring the accessory device of the particular type (e.g., bedroom speaker) to play the selected audio item when the scene profile is triggered (e.g., activated). Other playback options are discussed further below with respect to FIGS. 14P-14R.

To select an audio item to be played on the accessory device of the particular type, the user performs a tap gesture at audio selection button 1444. As a result, while displaying audio user interface 1440, electronic device 600 detects tap gesture 1446 at audio selection button 1444.

At FIG. 14J, upon detecting tap gesture 1446, electronic device 600 displays audio sources user interface 1448. Audio sources user interface 1448 includes source options 1450A-1450D, which provide different categories of audio items to be selected by the user. In particular, detecting selection of a source option (e.g., 1450A-1450D) triggers initiation of a process for selecting an audio item belonging to the category of the selected source option. For example, detecting selection of source option 1450B results in display of a music user interface (e.g., 1451) from which the user can navigate to select a music audio file. As another example, detecting selection of source option 1450D results in display of a soundscapes user interface (e.g., 1630 of FIG. 16F) from which the user can select a soundscape audio file.

Soundscapes are further described below with respect to FIGS. 18A-18G. In some embodiments, upon detecting tap gesture 1446, electronic device 600 does not display audio sources user interface 1448, and instead proceeds immediately to displaying the music user interface (e.g., 1451).

The user performs a tap gesture to select source option 1450B. As a result, while displaying audio sources user interface 1448 at FIG. 14J, electronic device 600 detects tap gesture 1452 at source option 1450B.

At FIG. 14K, upon detecting tap gesture 1452, electronic device 600 replaces display of audio sources user interface 1448 with display of music user interface 1451. Music user interface 1451 includes options for navigating to an audio item (e.g., song, album, playlist) for selection. At FIG. 14K, the user performs a tap gesture to select album item 1455. As a result, electronic device 600 detects tap gesture 1453 at album item 1455.

At FIG. 14L, upon detecting tap gesture 1453, electronic device 600 replaces display of music user interface 1451 with audio user interface 1440. In contrast to FIG. 14I, audio user interface 1440 of FIG. 14L includes representation 1460, which represents the audio item (e.g., Album 1 by DJ Appleseed) selected by the user. Further, upon a determination that an audio item has been selected, electronic device 600 displays repeat option 1462A and shuffle option 1462B for the selected audio item. As depicted in FIG. 14I, upon a determination that an audio item has not been selected, electronic device 600 forgoes displaying repeat option 1462A and shuffle option 1462B. To view the other available audio options, the user performs a scroll gesture. As a result, electronic device 600 detects scroll gesture 1464 with movement in the upward direction.

At FIG. 14M, upon detecting scroll gesture 1464, electronic device 600 scrolls volume options 1466A-1466B onto display 603. Selecting volume option 1466A for the scene profile results in configuring the accessory device of the particular type (e.g., bedroom speaker) to play, when the scene profile is triggered (e.g., activated), the selected audio item at the volume at which the accessory device is currently set. In contrast, selecting volume option 1466B for the scene profile results in configuring the accessory device to play, when the scene profile is triggered (e.g., activated), the selected audio item at a custom volume selected by the user. The user performs a tap gesture to select volume option 1466B. As a result, electronic device 600 detects tap gesture 1468 at volume option 1466B.

At FIG. 14N, upon detecting tap gesture 1468, electronic device 600 selects volume option 1466B and displays a visual indication that volume option 1466B has been selected. Further upon detecting tap gesture 1468, electronic device 600 displays volume control 1470A below volume option 1466B. Volume control 1470A enables the user to select a custom volume at which the selected audio item will play.

Having finished configuring the scene profile, the user performs a tap gesture to complete the scene profile and add a corresponding scene object to home user interface 602. As a result, electronic device 600 detects tap gesture 1472 at done button 1474.

At FIG. 14O, upon detecting tap gesture 1472, electronic device 600 completes the scene profile and adds scene object 1402D to home user interface 602. Accordingly, when the scene profile corresponding to scene object 1402D is activated (e.g., by selecting scene object 1402D), electronic device 600 transmits instructions to one or more accessory devices in accordance with the configuration of the scene profile. For example, based on the scene profile configured in FIGS. 14C-14N, activating the scene profile corresponding to scene object 1420D would result in the bedroom speaker playing a song from Album 1 by DJ Appleseed at a custom volume that was set in FIG. 14N.

As discussed below, other options are available for configuring the scene profile for an accessory device of the particular type. Playback option 1442A has been discussed above with respect to FIG. 14I. FIGS. 14P-14R illustrate other available playback options (e.g., 1442B-1442D).

At FIG. 14P, selecting playback option 1442B provides the user the ability to pause any audio playback that might be occurring at the accessory device of the particular type. In particular, selecting playback option 1442A for the scene profile results in configuring the accessory device of the particular type (e.g., bedroom speaker) to pause any audio playback that might be occurring when the scene profile is triggered (e.g., activated). Moreover, selecting playback option 1442B causes certain options (e.g., 1444, 1466A-1466B) to cease to be displayed.

At FIG. 14Q, selecting playback option 1442C provides the user the ability to resume any audio playback that had been occurring at the accessory device of the particular type (e.g., audio playback is in a paused state). In particular, selecting playback option 1442C for the scene profile results in configuring the accessory device of the particular type (e.g., bedroom speaker) to resume audio playback when the scene profile is triggered (e.g., activated). Moreover, selecting playback option 1442C causes certain options (e.g., 1444) to cease to be displayed.

At FIG. 14R, selecting playback option 1442D provides the user the ability to forgo changing the state of audio playback at the accessory device of the particular type. In particular, selecting playback option 1442D for the scene profile results in configuring the accessory device of the particular type (e.g., bedroom speaker) to continue with the current state of audio playback when the scene profile is triggered (e.g., activated). For example, if the accessory device of the particular type is already playing a certain audio file when the scene profile is triggered, the accessory device will continue to play that same certain audio file. Moreover, selecting playback option 1442D causes certain options (e.g., 1444) to cease to be displayed.

FIGS. 14S-14T illustrate additional options that are provided when multiple accessory devices of the particular type are added to the set of accessory devices for the scene profile. At FIG. 14S, multiple accessory devices (e.g., 604D, 1476B-1476C) of the particular type have been added to the scene profile. The user performs a tap gesture to configure the audio options for the scene profile. As a result, electronic device 600 detects tap gesture 1478 at audio options button 1436.

At FIG. 14T, upon detecting tap gesture 1478, electronic device 600 displays audio user interface 1440. The user selects volume option 1466B to set a custom volume for each accessory device of the particular type. As a result, electronic device 600 detects tap gesture 1480 at volume option 1466B. Upon detecting tap gesture 1480, electronic device 600 displays volume controls 1470B-1470D (e.g., which were not display prior to detecting tap gesture 1480), where a volume control corresponds to a respective accessory device of the particular type. For example, volume control 1470B corresponds to the bedroom speaker, while volume control 1470C corresponds to the dining room speaker.

FIG. 15 is a flow diagram illustrating a method for 1500 using an electronic device in accordance with some embodiments. Method 1500 is performed at a device (e.g., 100, 300, 500, 600) with a display device. Some operations in method 1500 are, optionally, combined, the orders of some operations are, optionally, changed, and some operations are, optionally, omitted.

As described below, method 1500 provides an intuitive way for managing a group of controllable external devices and a speaker. The method reduces the cognitive burden on a user for managing a group of controllable external devices by providing interfaces to set up scenes in which the group of controllable external devices and speaker perform predetermined tasks at a tap of an affordance, thereby creating a more efficient human-machine interface. In particular, when the group of controllable external devices includes a speaker, interfaces specific to the speaker are displayed, in comparison to not displaying the interfaces when the speaker is not included. Showing only relevant interfaces based on the group of controllable external devices reduces user error in configuring settings that are not relevant. For battery-operated computing devices, enabling a user to set up scenes and manage a group of controllable external devices faster and more efficiently conserves power for the electronic device and increases the time between battery charges.

At block 1502 electronic device displays, via the display device, a first accessory affordance (e.g., 604A-604F, a selectable, graphical tile) (e.g., a user interface object with an indication (e.g., text, graphical icon) of a controllable external device that the user interface object represents) corresponding to a first controllable external device (e.g., a device that has at least one controllable function (e.g., a smart light bulb, a smart thermostat, a smart speaker)). In some embodiments, a controllable device is an electronic device that is external to the electronic device. In some examples, the controllable external device has one or more features that are configurable using (e.g., via) the electronic device.

At block 1504, the electronic device detects one or more inputs to add the first controllable external device (e.g., 1418, 1420, 1432, via a user input detected at a location corresponding to (e.g., at/on) the first accessory affordance) to a first set of controllable external devices (e.g., to be configured for a first scene (e.g., a scene profile that includes data regarding designated states of one or more controllable external devices (e.g., at a particular location))). In some embodiments, the first controllable external device is added when the electronic device detects a user gesture corresponding to selection of the first accessory affordance and detects a user gesture confirming the selection.

At block 1506, in response to detecting the one or more inputs to add the first controllable external device to the first set of controllable external devices, at block 1508, the electronic device updates the first set of controllable external devices to include the first controllable external device.

At block 1506, in response to detecting the one or more inputs to add the first controllable external device to the first set of controllable external devices, at block 1510 in accordance with a determination that the first controllable external device is of a first type (e.g., a device that is capable of performing a certain operation (e.g., playing an audio file, outputs sound)), the electronic device concurrently displays: a second accessory affordance (e.g., 604D at FIG. 14H) corresponding to the first controllable external device, and a configuration affordance (e.g., 1436 at FIG. 14H) that, when selected, initiates a process for configuring audio settings for the first controllable external device. In some embodiments, initiating the process for configuring audio settings includes displaying an affordance for selecting a media (e.g., audio) item to be played. In some embodiments, the second accessory affordance corresponding to the first controllable external device is the same as the first accessory affordance corresponding to the first controllable external device. In some embodiments, the second accessory affordance corresponding to the first controllable external device is different from the first accessory affordance (e.g., the second accessory affordance has an additional visual indication (e.g., a current state (e.g., on/off).

At block 1506, in response to detecting the one or more inputs to add the first controllable external device to the first set of controllable external devices, at block 1512 in accordance with a determination that the first controllable external device is not of the first type, the electronic device displays the second accessory affordance (e.g., 604A, 604C at FIG. 14F) corresponding to the first controllable external device without the configuration affordance that, when selected, initiates a process for configuring audio settings for the first controllable external device.

In some embodiments, the electronic device detects selection of the configuration affordance, thereby initiating the process for configuring audio settings for the first controllable external device. Displaying the configuration affordance that initiates a process for configuring audio settings for the first controllable external device provides the user with feedback that the first controllable external device can be configured for audio settings. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, as part of initiating the process for configuring audio settings for the first controllable external device, the electronic device displays an audio selection affordance (e.g., choose audio button) (without concurrently displaying a representation of an audio item). In some examples, the electronic device detects selection (e.g., 1446) of the audio selection affordance (e.g., 1444). In some examples, in response to detecting selection of the audio selection affordance, the electronic device initiates a process for choosing an audio item (e.g., album, playlist, song, radio station) of a first media type (e.g., music) to be played at the first controllable external device, including displaying one or more options for navigating to the audio item of the first media type (e.g., FIGS. 14J-14K). In some embodiments, as part of initiating a process for choosing an audio item, the electronic device displays the music user interface. In some embodiments, as part of initiating the process for choosing an audio item of the first media type includes the electronic device displays a search bar for searching for an audio item of the first media type, a recently played item (e.g., album, song, playlist), and/or an affordance that, when selected, triggers display of audio items belonging to particular category (e.g., artists, albums, songs, playlists, radio stations). In some embodiments, a different audio item can be chosen for each controllable external device. Displaying one or more options for navigating to the audio item of the first media type provides the user with feedback that particular audio can be selected for playback at the first controllable external device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, as part of initiating the process for configuring audio settings for the first controllable external device, the electronic device displays an audio selection affordance (e.g., choose audio button) (without concurrently displaying a representation of an audio item). In some examples, the electronic device detects selection of the audio selection affordance. In some examples, in response to detecting selection of the audio selection affordance, the electronic device concurrently displays, via the display device, a first audio category option that, when selected, initiates a process for choosing an audio item of a first media type (e.g., audiobooks, music, podcasts, soundscapes) and a second audio category option that, when selected, initiates a process for choosing an audio item of a second media type different from the first media type (e.g., 14J, audiobooks, music, podcasts, soundscapes). In some embodiments, the first and second audio category options are displayed in a sources user interface. In some embodiments, selecting the music option at the sources user interface results in replacing display of the sources user interface with the music user interface. In some embodiments, as part of initiating the process for choosing the audio item of a particular media type (e.g., first, second), the electronic device replaces the display of the first and second audio category options with one or more options for navigating to the audio item of the particular media type (e.g., first, second). Displaying multiple categories of audio options provides the user with feedback that different audio types can be selected for playback at the first controllable external device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, as part of initiating the process for configuring audio settings for the first controllable external device includes the electronic device displays an audio selection affordance (e.g., choose audio button). In some examples, subsequent to detecting selection of the audio selection affordance, the electronic device detects one or more user inputs for choosing an audio item to be played at the first controllable external device. In some examples, subsequent to detecting one or more user inputs for choosing the audio item to be played at the first controllable external device, the electronic device concurrently displays, via the display device the audio selection affordance (e.g., 1444 at FIG. 14L), and a representation of the audio item (e.g., 1460 at FIG. 14L, album art) that was chosen to be played at the first controllable external device. In some embodiments, the representation of the audio item is not displayed prior to detecting the one or more user inputs for choosing the audio item to be played at the first controllable external device. Displaying the representation of the audio item (e.g., album art) that was chosen to be played at the first controllable external device provides the user with feedback about which audio item is correctly chosen for playback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, as part of initiating the process for configuring audio settings for the first controllable external device, the electronic device displays an audio selection affordance (e.g., choose audio button). In some examples, subsequent to detecting selection of the audio selection affordance, the electronic device detects one or more user inputs for choosing an audio item to be played at the first controllable external device. In some examples, subsequent to detecting one or more user inputs for choosing the audio item to be played at the first controllable external device, the electronic device concurrently displays, via the display device a repeat affordance (e.g., 1462A) that, when selected, configures whether the audio item repeats during playback at the first controllable external device and a shuffle affordance (e.g., 1462B) that, when selected, configures the order in which the audio item is played at the first controllable external device. In some embodiments, the repeat and shuffle affordances are concurrently displayed with the audio selection affordance. In some embodiments, the repeat and shuffle affordances were not displayed prior to detecting the one or more user inputs for choosing the audio item to be played at the first controllable external device. Displaying the repeat affordance and the shuffle affordance provides the user with feedback that different types of playback can be performed at the first controllable external device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some examples, as part of initiating the process for configuring audio settings for the first controllable external device, the electronic device displays an (e.g., a plurality of) audio playback option (e.g., audio selection affordance, current volume, custom volume, option to stop playing audio after selected amount of time elapses, repeat and shuffle options) in accordance with a determination that a first audio mode type has been selected. In some embodiments, the first type of audio mode is an audio mode (e.g., "play audio") for playing a chosen audio item at the first controllable external device. In some embodiments, the first audio mode type is the default option that is selected. In some embodiments, the affordance corresponding to the first audio mode type is displayed with a visual indication that the first audio mode type has been selected. In some embodiments, choose audio, volume, and stop playing options are concurrently displayed.

In some examples, while displaying the audio playback option, the electronic device detects selection of an audio mode. In some examples, in response to detecting the selection of the audio mode, in accordance with a determination that the first audio mode type has been selected, the electronic device continues to display the audio playback option (e.g., FIG. 14Q). In some examples, in response to detecting the selection of the audio mode, in accordance with a determination that a second audio mode type has been selected, ceasing to display the audio playback option (e.g., FIG. 14P), wherein the second audio mode type is different from the first audio mode type. In some embodiments, a second audio mode type is an audio mode (e.g., pause audio, resume audio, don't change what's playing) for not playing a chosen audio item at the first controllable external device. Examples include removing "choose audio" option or removing volume options.

In some examples, the electronic device detects one or more inputs to add a second controllable external device (e.g., via a user input detected at a location corresponding to (e.g., at/on) a second accessory affordance) to the first set of controllable external devices. In some examples, in response to detecting the one or more inputs to add the second controllable external device to the first set of controllable external devices, the electronic device updates the first set of controllable external devices to include the second controllable external device.

In some examples, subsequent to initiating the process for configuring audio settings for the first controllable external device, the electronic device detects a user input for customizing a playback volume of an audio item that was chosen to be played at the first controllable external device (e.g., the audio item that was chosen to be played at the first controllable external device). In some examples, in response to detecting the user input for customizing the playback volume, in accordance with a determination that the first set of controllable external devices includes a single controllable external device of the first type, the electronic device displays (e.g., initially displaying) a single volume control for adjusting (e.g., via drag input) the playback volume of the audio item at the first controllable external device.

In some examples, in response to detecting the user input for customizing the playback volume, in accordance with a determination that the first set of controllable external devices includes a plurality of controllable external devices of the first type, the electronic device displays (e.g., initially displaying) a plurality of volume controls for adjusting (e.g., via drag input) the respective playback volumes of the audio item at the respective controllable external devices. In some embodiments, the default option that is selected is "current volume". In some embodiments, if there is one controllable external device, the electronic device forgoes displaying information identifying the controllable external device. In some embodiments, if there is a plurality of controllable external devices, the electronic device displays information identifying each of the controllable external devices. In some embodiments, a respective volume control is displayed for each respective controllable external device of the first type.

Note that details of the processes described above with respect to method 1500 (e.g., FIG. 15 are also applicable in an analogous manner to the methods described below/above. For example, method 1500 optionally includes one or more of the characteristics of the various methods described above with reference to method 700, 900, and 1100. For example, the controllable external device with multiple components described in method 1500 can be the controllable external device of method 700, which can be configured and accessed using the interfaces described in method 700. For brevity, these details are not repeated below.

FIGS. 16A-16F illustrate exemplary user interfaces for an application for managing an accessory device of a particular type, in accordance with some embodiments. The user interfaces in these figures are used to illustrate the processes described below, including the processes in FIG. 17.

Figure 16A:
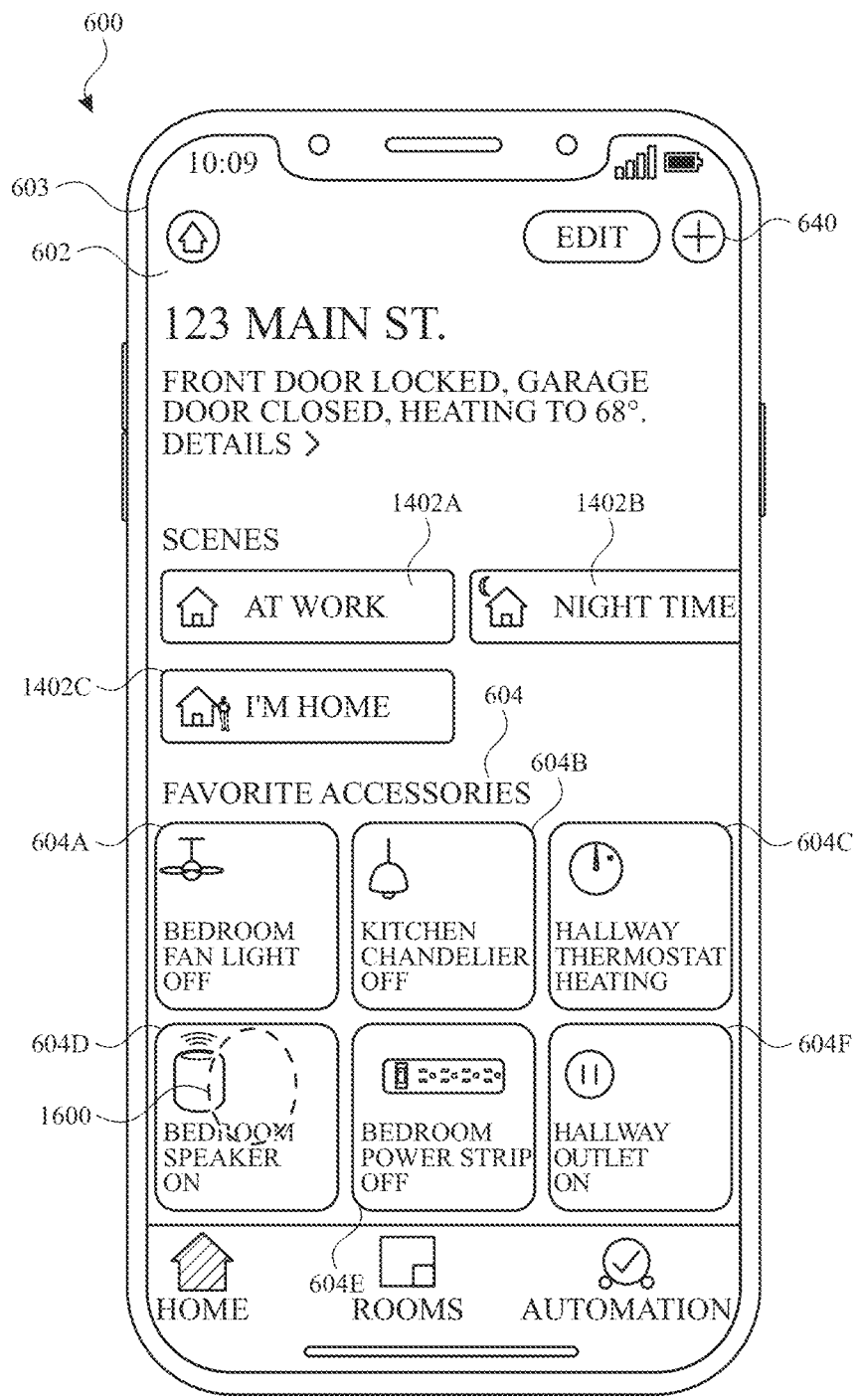
FIGS. 16A-16G illustrates exemplary user interfaces for managing a speaker in accordance with some embodiments.

FIG. 16A depicts electronic device 600, which is a smartphone with display 603. Display 603 includes a touch-sensitive surface on which electronic device 600 can detect user gestures (e.g., tap, swipe, drag). In some embodiments, electronic device 600 is, or includes one or more features of, electronic device 100, 300, 500 or 600.

At FIG. 16A, electronic device 600 displays home user interface 602 for configuring accessory devices. Home user interface 602 is further discussed above with respect to FIGS. 6A and 14A. In some embodiments, an accessory device can also be referred to as a controllable external device. Home user interface 602 includes scene objects 1402A-1402C, which represent respective scene profiles. In some embodiments, a scene profile includes data regarding designated states of one or more accessory devices at a location. In some embodiments, a scene profile can also be referred to as a "scene". Additionally, home user interface 602 includes accessory affordances 604A-604F, where an accessory affordance is a graphical tile representing an accessory device. For example, accessory affordance 604D represents a bedroom speaker, which is capable of audio output via its speaker.

At FIG. 16A, a user performs a tap gesture to configure an accessory device of a particular type (e.g., an accessory device capable of outputting sound (e.g., via speaker)). As a result, while displaying home user interface 602, electronic device 600 detects tap gesture 1600 at accessory affordance 604D (e.g., representing bedroom speaker).

Figure 16B:
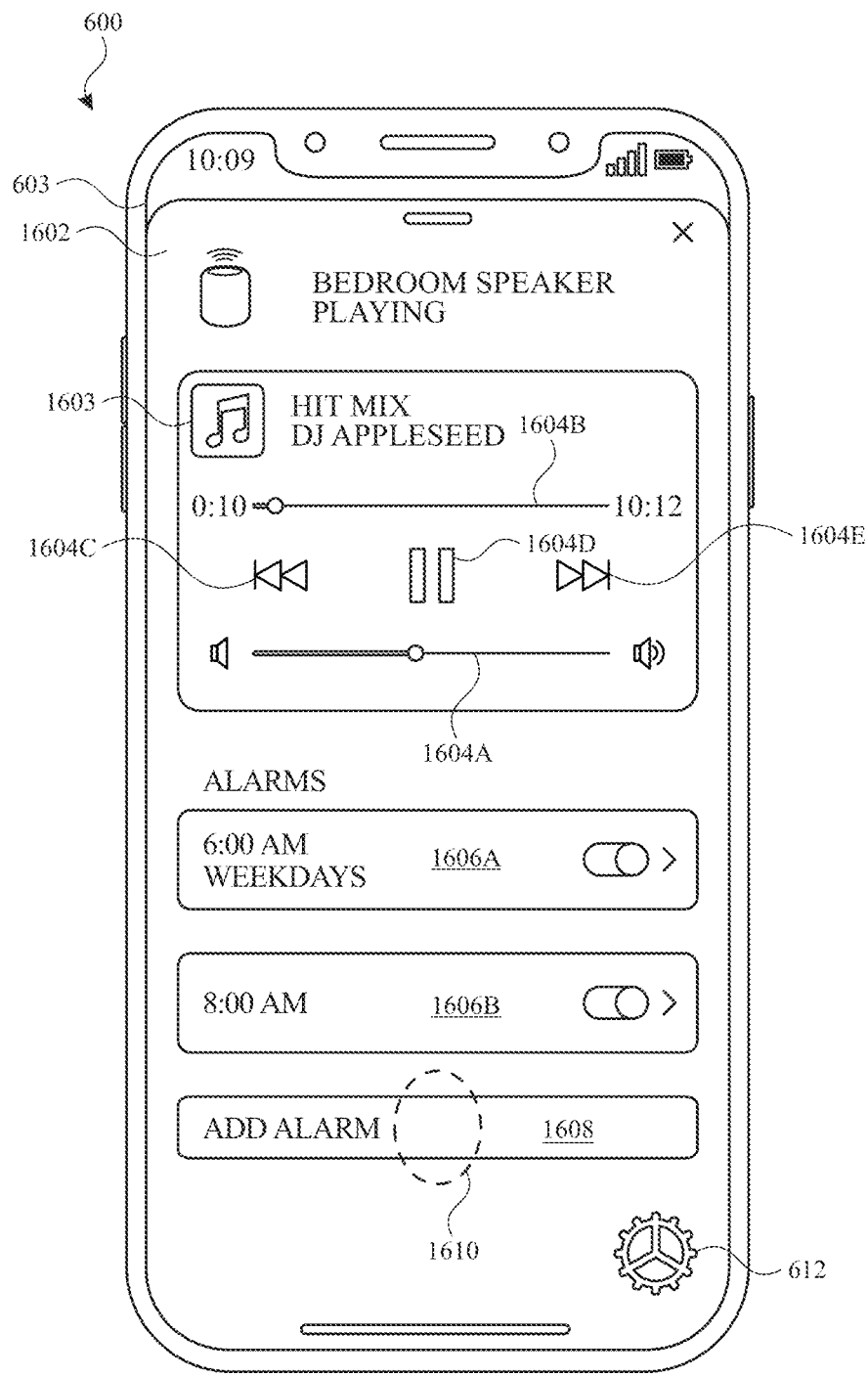

At FIG. 16B, upon detecting tap gesture 1600, electronic device 600 replaces display of home user interface 602 with display of speaker accessory interface 1602. Electronic device 600 displays speaker accessory interface 1602 when the accessory device that is selected on home user interface 602 is of a particular type (e.g., an accessory device capable of outputting sound). On speaker accessory interface 1602, electronic device 600 concurrently displays playback controls 1604A-1604E and alarm configuration options (e.g., 1606A-1606B and 1608). In some embodiments, electronic device 600 forgoes concurrent display of playback controls and alarm configuration options if the selected accessory device is not of the particular type. Additionally, speaker accessory interface 1602 includes settings shortcut 612, which, when selected, results in display of additional settings for the bedroom speaker.

Playback controls 1604A-1604E provide various options for controlling audio playback at the bedroom speaker. Playback control 1604A provides an adjustable slider for setting the volume of the bedroom speaker (e.g., by transmitting a corresponding instruction to the bedroom speaker). Playback control 1604B provides an adjustable slider for scrubbing an audio file (e.g., by transmitting a corresponding instruction to the bedroom speaker). Detecting selection of playback control 1604C results in playing the previous track, while detecting selection of playback control 1604E results in playing the next track (e.g., by transmitting a corresponding instruction to the bedroom speaker). Detecting selection of playback control 1604D causes audio playback to start if audio playback is in a paused state, or alternatively, causes audio playback to pause if audio playback is in a play state (e.g., by transmitting a corresponding instruction to the bedroom speaker).

As discussed above, speaker accessory interface 1602 also includes alarm configuration options (e.g., 1606A-1606B and 1608). For example, electronic device 600 displays edit alarm buttons 1606A-1606B for editing the settings of a currently set alarm. Additionally, electronic device displays new alarm button 1608 for setting a new alarm. At FIG. 16B, the user performs a tap gesture to set a new alarm. As a result, electronic device 600 detects tap gesture 1610 at new alarm button 1608.

Figure 16C:
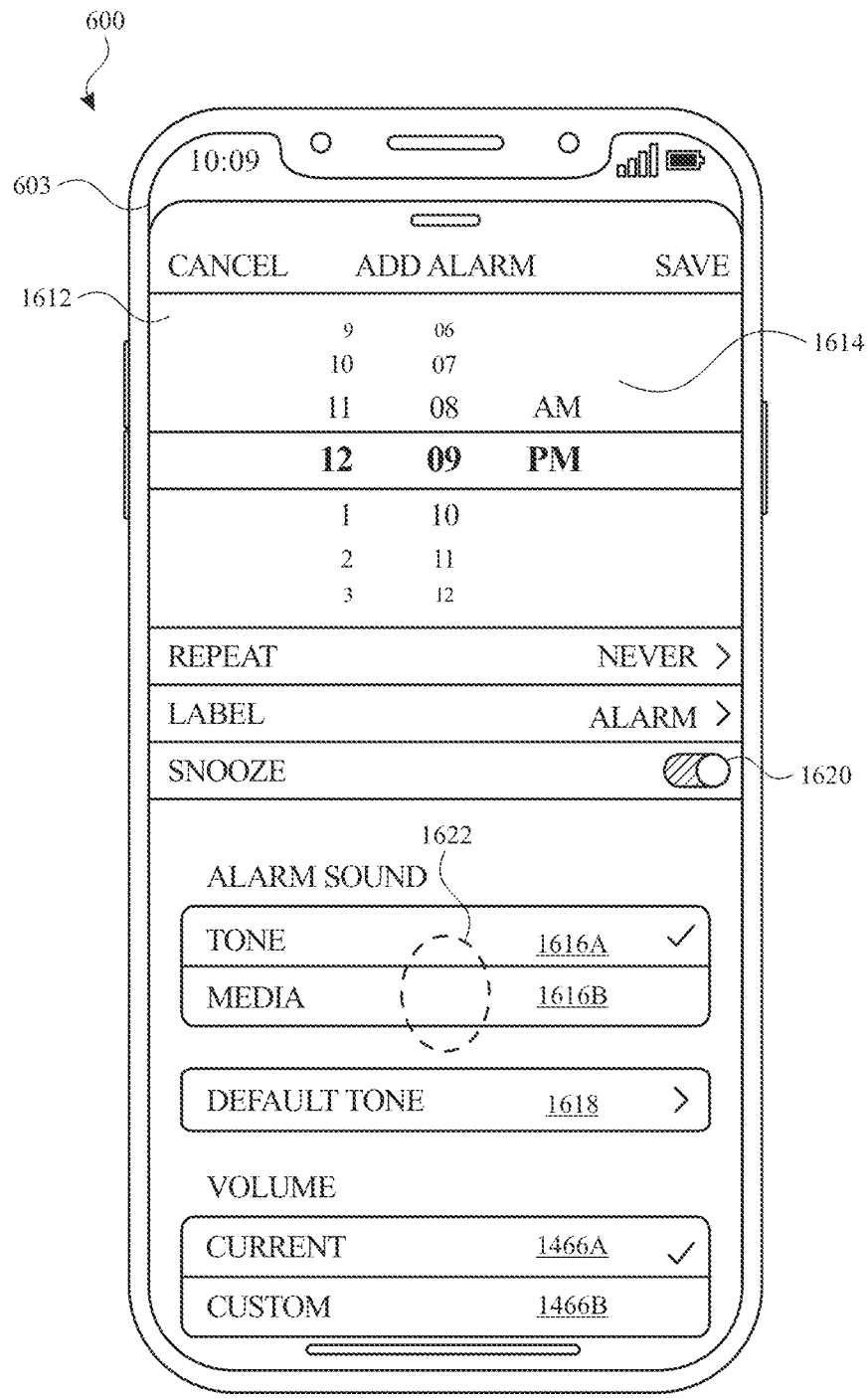

At FIG. 16C, upon detecting tap gesture 1610, electronic device 600 replaces display of speaker accessory interface 1602 with display of alarm user interface 1612 for configuring and setting an alarm. Alarm user interface includes time controls 1614 for selecting a time at which to set the alarm. In some embodiments, upon a determination that a new alarm is being set, electronic device 600 sets time controls 1614 to the current time (e.g., 10:09 a.m.). As depicted in FIG. 16C, electronic device 600 has set the time for the alarm to 12:09 p.m. In some embodiments, electronic device 600 sets the time in response to detecting one or more inputs at time controls 1614 corresponding to a request to set the time for the alarm. In some embodiments, upon a determination that a currently set alarm is being edited, electronic device 600 sets time controls 1614 to the time at which the currently set alarm was set. For example, if instead tap gesture 1610 was detected at edit alarm button 1606A, electronic device 600 displays user interface 1612 with time controls 1614 set to the time associated with edit alarm button 1606A (e.g., 6:00 a.m.).

As shown in FIG. 16C, alarm user interface 1612 also includes sound options 1616A-1616B. Sound option 1616A is a user interface object that, when selected, results in displaying tone button 1618. Sound option 1616B is a user interface object that, when selected, results in displaying audio selection button 1444. Additionally, alarm user interface 1612 includes volume options 1466A-1466B, as discussed above with respect to FIGS. 14M-14N, and snooze option 1620. Detecting selection of snooze option 1620 results in either enabling or disabling, via voice input, the ability to snooze an alarm that sounds on the accessory device (e.g., bedroom speaker). In some embodiments, a user can snooze the alarm on the accessory device via voice input (e.g., "Hey Speaker, snooze the alarm").

In some embodiments, detecting selection of tone button 1618 initiates a process for selecting a tone. For example, electronic device 600 displays a list of selectable tones to play when the alarm sounds. In some embodiments, instead of displaying tone button 1618, electronic device 600 immediately displays a list of selectable tones upon detecting selection of sound option 1616A. In some embodiments, a tone is a curated version of an audio file that is less than a fixed amount of time (e.g., 15, 30, 45 seconds).

While alarm user interface 1612 is being displayed in FIG. 16C, the user performs one or more user inputs to initiate a process for selecting a media item (e.g., audiobook, music, podcast, soundscape). As a result, electronic device 600 detects tap gesture 1622 at sound option 1616B.

Figure 16D:
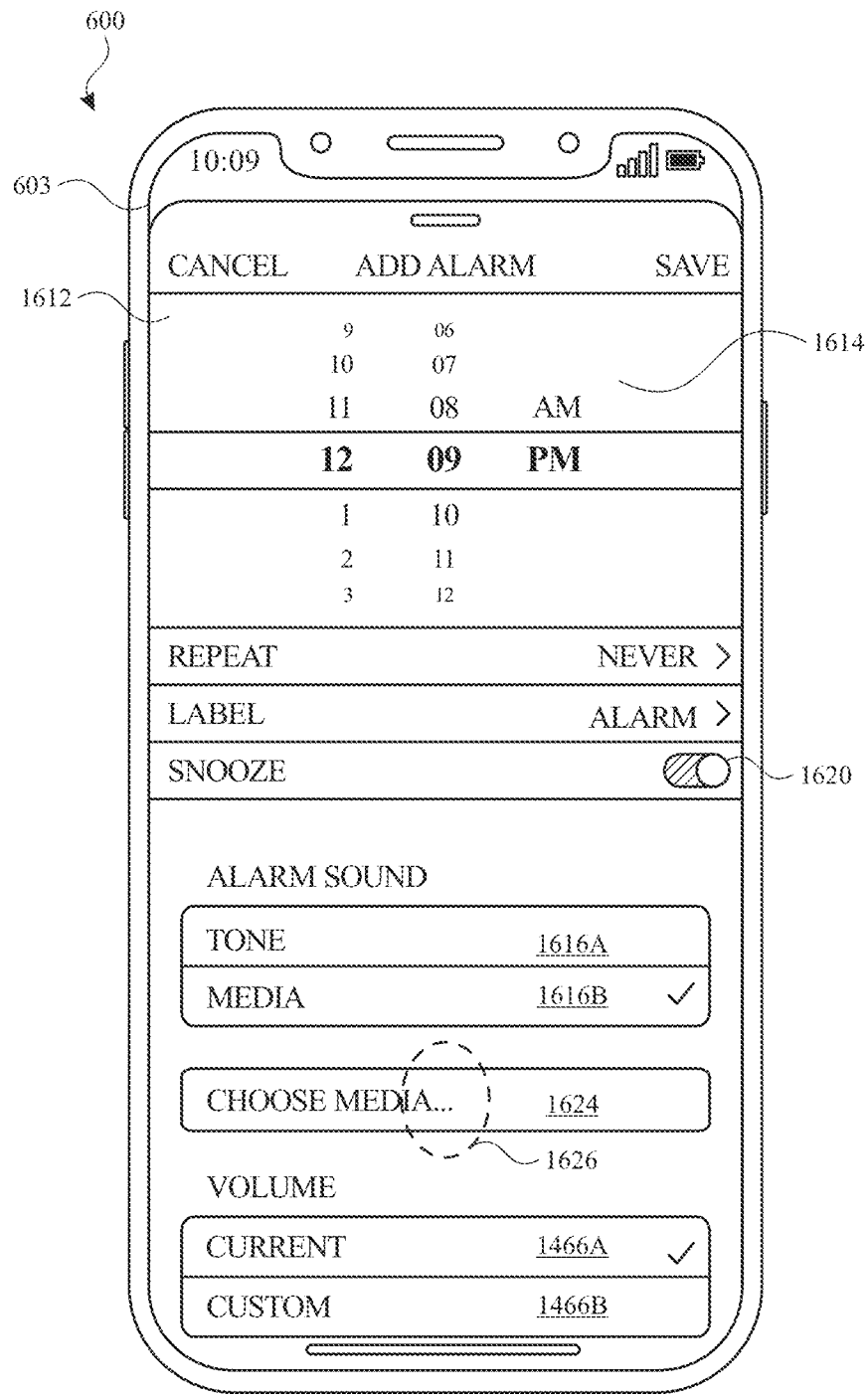

At FIG. 16D, upon detecting tap gesture 1622, electronic device 600 displays media selection button 1624. In some embodiments, media selection button 1624 is replaced with audio selection button 1444. To select an audio item for an alarm of the accessory device, the user performs a tap gesture at media selection button 1624. As a result, while displaying alarm user interface 1612, electronic device 600 detects tap gesture 1626 at media selection button 1624.

Figure 16E:
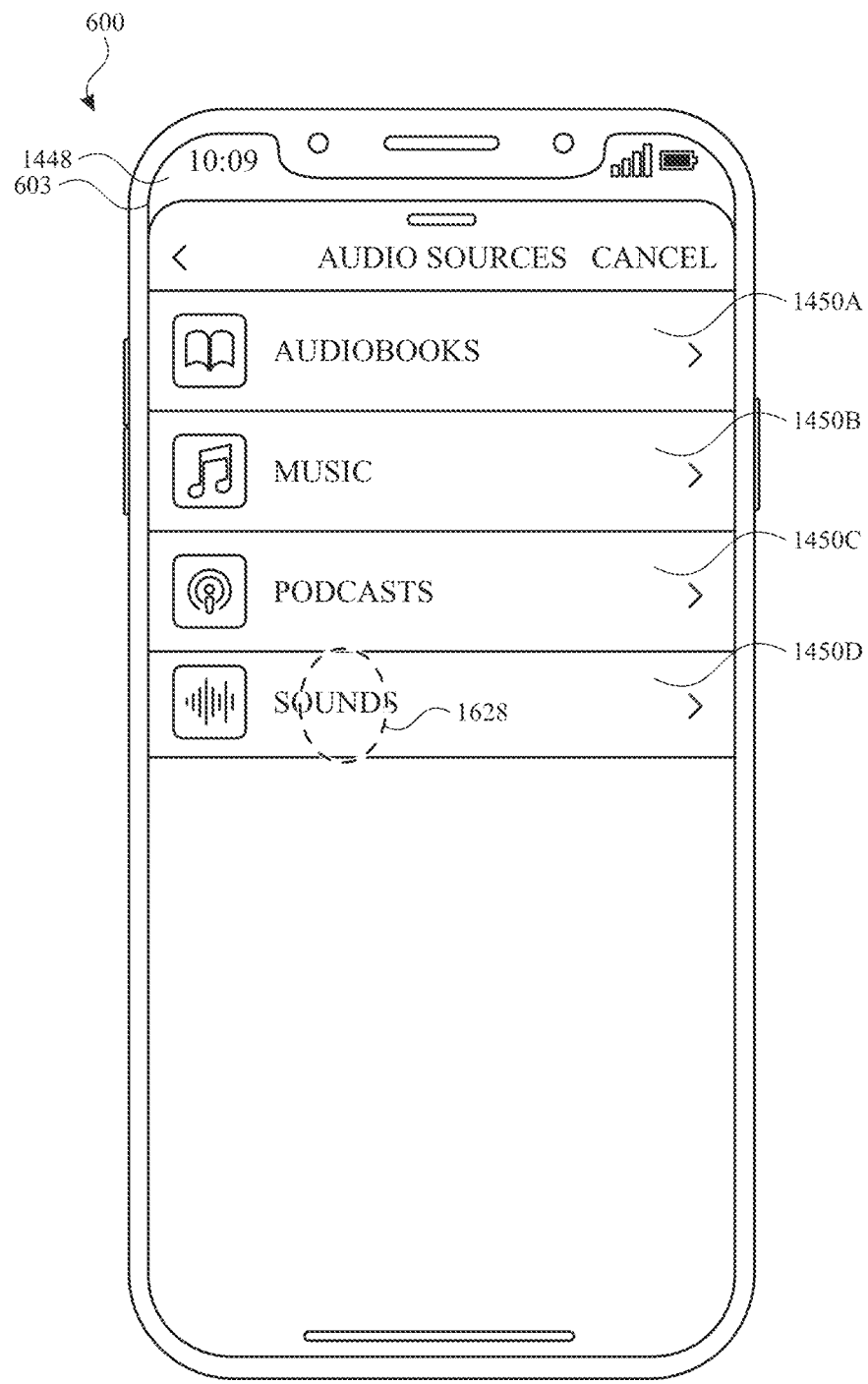

At FIG. 16E, upon detecting tap gesture 1626, electronic device 600 displays audio sources user interface 1448. As discussed above with respect to FIG. 14J, audio sources user interface 1448 includes source options 1450A-1450D, which provide different categories of audio items to be selected by the user. In particular, detecting selection of a source option (e.g., 1450A-1450D) triggers initiation of a process for selecting an audio item belonging to the category of the selected source option. For example, detecting selection of source option 1450B results in display of a music user interface (e.g., 1451 of FIG. 14K), from which the user can navigate to select an audio item (e.g., playlist, song, album). As another example, detecting selection of source option 1450D results in display of a soundscapes user interface (e.g., 1630) from which the user can select a soundscape item (e.g., an audio file or a collection of audio files). It is noted that soundscapes are further described below with respect to FIGS. 18A-18G. In some embodiments, upon detecting tap gesture 1626, electronic device 600 does not display audio sources user interface 1448, and instead proceeds immediately to displaying soundscapes user interface 1630 of FIG. 16F.

As shown in FIG. 16E, the user performs a tap gesture to initiate a process for selecting a soundscape item. As a result, electronic device 600 detects tap gesture 1628 at source option 1450D.

Figure 16F:
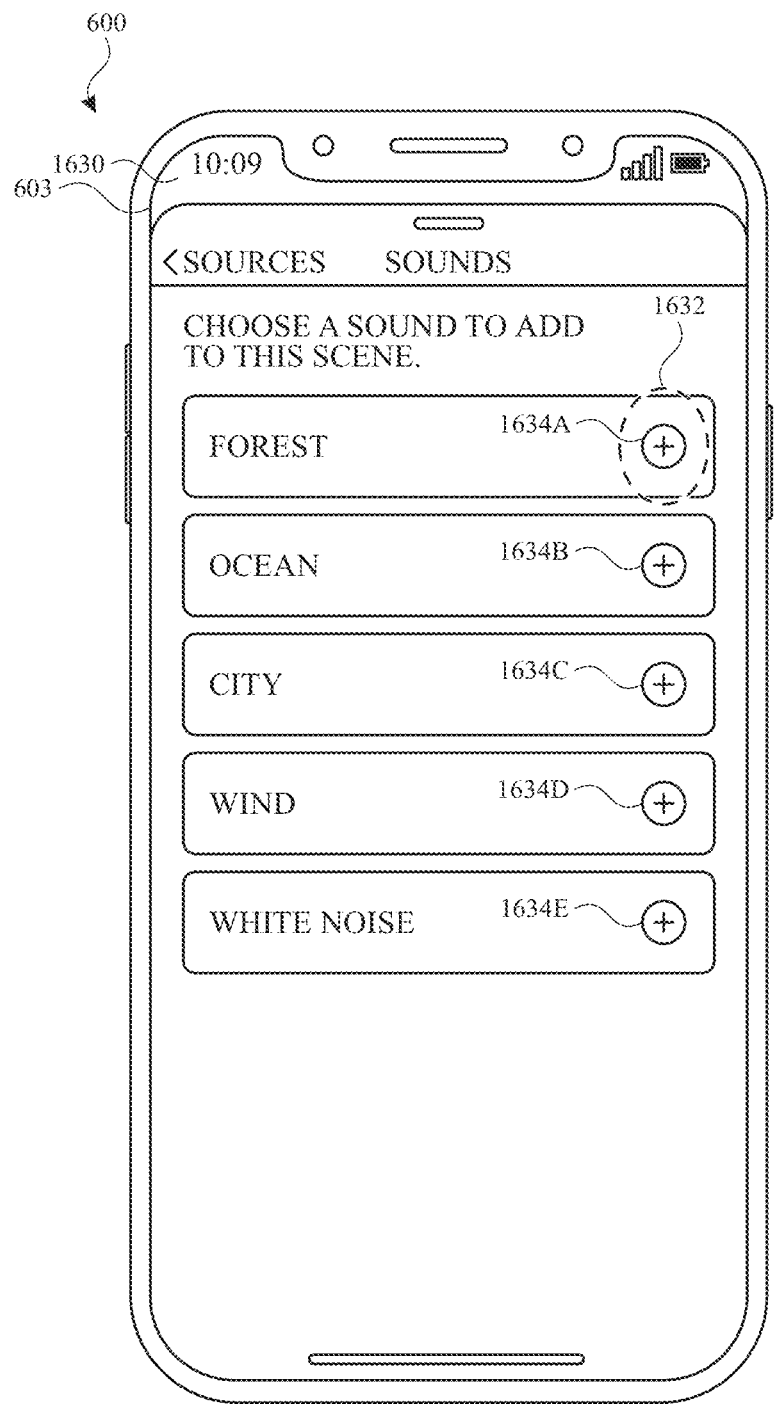

At FIG. 16F, upon detecting tap gesture 1628, electronic device 600 replaces display of audio sources user interface 1448 with soundscapes user interface 1630 which includes affordances (e.g., 1634A-1634E) for selecting a soundscape item. The user performs a tap gesture to select the Forest soundscape. As a result, electronic device 600 detects tap gesture 1632 at affordance 1634A.

Figure 16G:
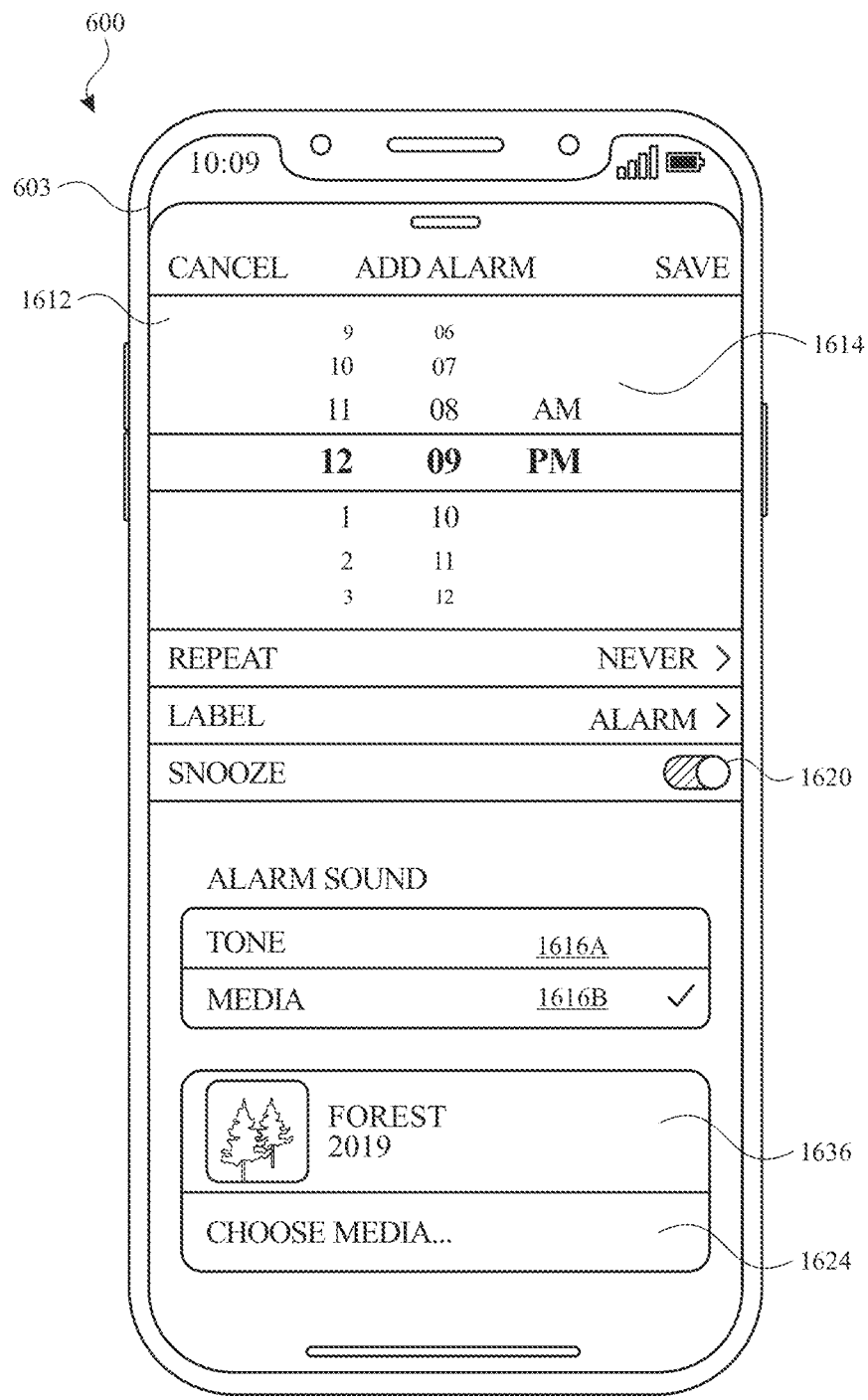

At FIG. 16G, upon detecting tap gesture 1632, electronic device 600 replaces display of soundscapes user interface 1630 with display of alarm user interface 1612. Since a media item has been selected (e.g., Forest soundscape), alarm user interface 1612 now includes representation 1636, which represents the media item (e.g., Forest soundscape) selected by the user.

In some embodiments, after having configured an alarm via input detected at the user interfaces discussed above, electronic device 600 transmits instructions to the accessory device (e.g., bedroom speaker) in accordance with the configuration of the alarm. For example, the instructions can include the time at which the alarm is to sound, the audio file (e.g., tone or media, link to audio file) that is to be played when the alarm sounds, whether the ability to snooze is enabled or disabled, the volume level (e.g., current or custom), or a combination thereof.

FIG. 17 is a flow diagram illustrating a method for 1700 using an electronic device in accordance with some embodiments. Method 1700 is performed at a device (e.g., 100, 300, 500, 600) with a display device. Some operations in method 1700 are, optionally, combined, the orders of some operations are, optionally, changed, and some operations are, optionally, omitted.

As described below, method 1700 provides an intuitive way for managing a speaker. The method reduces the cognitive burden on a user for managing a speaker by displaying affordances for configuring the speaker in one user interface, thereby creating a more efficient human-machine interface. For battery-operated computing devices, enabling a user to efficiently manage a speaker from one user interface provides a more efficient user interface and more efficiently conserves power, which increases the time between battery charges.

At block 1702, electronic device concurrently displays, via the display device, a set of one or more playback controls (e.g., 1406A-1406E, user interface object that, when selected, causes a corresponding change in the playback of audio (e.g., tapping next button causes the next song/media item to play, tapping pause button causes the song/media item to stop playing)) for performing a playback function (e.g., play, pause, next, previous) on a media item (e.g., an audio file, song, audiobook, podcast) and an alarm configuration affordance (e.g., 1608 at FIG. 16B, a user interface object that, when selected, initiates a process for configuring an alarm (e.g., editing the settings of a current alarm, adding a new alarm)). In some embodiments, the set of one or more playback controls and the alarm configuration affordance are displayed in an accessory control user interface.

At block 1704, electronic device detects a user input (e.g., 1610, voice input, user gesture (e.g., tap gesture)).

At block 1706, in response to detecting the user input, at block 1708, in accordance with a determination that the detected user input corresponds to selection of a playback control of the set of one or more playback controls, the electronic device initiates a process for performing a playback function (e.g., play, pause, next, previous) at a controllable external device (e.g., same as the first controllable external device, as described above) based on the selected playback control. In some embodiments, the process for performing the playback function at the controllable external device is initiated while continuing to concurrently display the set of one or more playback controls and the alarm configuration affordance.

At block 1706, in response to detecting the user input, at block 1710, in accordance with a determination that the detected user input corresponds to selection of the alarm configuration affordance (e.g., 1608), the electronic device replaces the concurrent display of the set of one or more playback controls and the alarm configuration affordance with a set of time affordances (e.g., 1614, wheel of time) for setting a time (e.g., at the controllable external device) for a first alarm. In some embodiments, the set of time affordances are displayed in a configuration alarm user interface. In some embodiments, the configuration alarm user interface replaces the display of the accessory control user interface. In some embodiments, a second alarm configuration affordance is displayed concurrently with the alarm configuration affordance. In some embodiments, in accordance with a determination that a detected user input corresponds to selection of the second alarm configuration affordance, the electronic device replaces the concurrent display of the set of one or more playback controls and the alarm configuration affordance with a set of time affordances for setting a time for a second alarm different from the first alarm. Concurrently displaying the playback controls and the alarm configuration affordance provides the user with feedback that playback functions can be performed at the controllable external device and that an alarm can be configured for the controllable external device. Providing improved visual feedback to the user and displaying the controls and alarm affordances in the same user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with the determination that the detected user input corresponds to selection of the alarm configuration affordance, the electronic device concurrently displays, with the set of time affordances for setting a time for the first alarm (e.g., 1614), a plurality of alarm sound options, including a first (e.g., 1616A, tones) option and a second (e.g., 1616B, media) option. In some embodiments, in accordance with the determination that the detected user input corresponds to selection of the alarm configuration affordance, the electronic device detects a second user input (e.g., 1622) corresponding to one of the plurality of alarm sound options. In some embodiments, in accordance with the determination that the detected user input corresponds to selection of the alarm configuration affordance, in response to detecting the second user input corresponding to one of the plurality of alarm sound options, in accordance with a determination that the second user input corresponds to selection of the first option, the electronic device initiates a process for choosing a media item of a first media type (e.g., tones) for the first alarm (e.g., display drop down list of selectable tones, replaces concurrent display of the set of time affordance and the plurality of alarm sound options with list of selectable tones). In some embodiments, in accordance with the determination that the detected user input corresponds to selection of the alarm configuration affordance, in response to detecting the second user input corresponding to one of the plurality of alarm sound options, in accordance with a determination that the second user input corresponds to selection of the second option, the electronic device initiates a process for choosing a media item of a second media type (e.g., song, album, playlist) for the first alarm (e.g., display drop down list of selectable media items, replaces concurrent display of the set of time affordance and the plurality of alarm sound options with one or more options for navigating to a media item to be chosen by the user (e.g., display sources user interface or music user interface)). In some embodiments, media items of a first media type are populated from a first source/stored in a first database. In some embodiments, media items of a second media type are populated from a second source/ stored in a second database. Concurrently displaying the first (e.g., tones) option and the second (e.g., media) option provides the user with feedback that different types of audio can be chosen for the alarm for the controllable external device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of initiating the process for choosing a media item of a first media type for the first alarm, the electronic device replaces the concurrent display of the set of time affordances and the plurality of alarm sound options with display of a plurality of selectable media items of the first media type. In some embodiments, the plurality of selectable media items of the first media type are shown in a drop down list on the current user interface. In some embodiments, a media item of the first media type is a curated version of an audio file (e.g., tone) that is less than a fixed amount of time (e.g., 15, 30, 45 seconds).

In some embodiments, as part of initiating the process for choosing a media item of a second media type for the first alarm, the electronic device replaces the concurrent display of the set of time affordances and the plurality of alarm sound options with display of one or more options (e.g., 1624) for navigating to a media item of the second media type (e.g., to be selected by a user). In some embodiments, the one or more options are displayed as part of the music user interface or as part of the sources user interface. In some embodiments, the electronic device detects one or more inputs corresponding to selection of a media item of the second media type (e.g., a song) to be played at the controllable external device when the alarm sounds, wherein the media item of the second media type is the same media item that can be controlled via the set of one or more playback controls. Put another way, a user can change the volume of a song that is currently playing using the set of one or more playback controls, while also configuring an alarm to play that same song at the time at which the alarm is set. Display of options for navigating to a media item of the second media type provides the user with an interface to efficiently locate the desired media item, thereby reducing the number of inputs required. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the alarm configuration affordance is of a first type (e.g., for adding a new alarm), the set of time affordances (e.g., wheel of time) for setting a time (e.g., at the controllable external device) for the first alarm initially include a visual indication of the current time for the time for the first alarm (e.g., without intervening user input causing the visual indication of the current time to occur). In some embodiments, in accordance with a determination that the alarm configuration affordance is of a second type (e.g., for changing/editing a current (e.g., already set) alarm) different from the first type, the set of time affordances (e.g., wheel of time) for setting a time (e.g., at the controllable external device) for the first alarm initially include a visual indication of the time at which the first alarm was previously set (e.g., without intervening user input causing the visual indication of the time to occur).

In some embodiments, the electronic device detects one or more user inputs for setting (e.g., saving, configuring) the first alarm at the controllable external device. In some embodiments, in response to detecting the one or more inputs for setting the first alarm at the controllable external device, the electronic device initiates a process for configuring the controllable external device to sound an alarm (e.g., at the time at which the first alarm was set, with playback of the tone or media item that was selected for the first alarm). In some embodiments, initiating the process includes transmitting instructions for configuring the controllable external device to sound an alarm at the time at which the first alarm was set.

In some embodiments, in accordance with the determination that the detected user input corresponds to selection of the alarm configuration affordance, the electronic device concurrently displays, with the set of time affordances (e.g., 1614, wheel of time) for setting a time for the first alarm, one or more volume options (e.g., 1466A-1466B, "current" button, "custom" button) for configuring a volume of the first alarm that sounds at the controllable external device.

In some embodiments, while displaying the one or more volume options for configuring the volume of an alarm that sounds at the controllable external device, the electronic device detects a user input for customizing a volume of the first alarm (e.g., via selection of one of the displayed volume options (e.g., "custom" button)). In some embodiments, in response to detecting the user input for customizing the volume of the first alarm, the electronic device displays (e.g., initially displaying) a volume control for adjusting (e.g., via drag input) a volume of the first alarm that sounds at the controllable external device. In some embodiments, the volume control was not displayed prior to detecting the user input for customizing the volume of the alarm. In some embodiments, the electronic device detects one or more user inputs for setting (e.g., saving, configuring) the first alarm at the controllable external device. In some embodiments, in response to detecting the one or more inputs for setting the first alarm at the controllable external device, the electronic device initiates a process for configuring the controllable external device to sound an alarm at the volume that was set via the volume control. In some embodiments, initiating the process includes transmitting instructions for configuring the controllable external device to sound an alarm at the volume that was set via the volume control.

In some embodiments, in accordance with the determination that the detected user input corresponds to selection of the alarm configuration affordance, the electronic device concurrently displaying, with the set of time affordances (e.g., wheel of time) for setting a time for the first alarm, a snooze affordance (e.g., 1620) for enabling a snooze option at the controllable external device. In some embodiments, in accordance with the determination that the detected user input corresponds to selection of the alarm configuration affordance, the electronic device detecting selection of the snooze affordance (e.g., 1620) to enable the snooze option. In some embodiments, in accordance with the determination that the detected user input corresponds to selection of the alarm configuration affordance, the electronic device detects one or more user inputs for setting (e.g., saving, configuring) the first alarm at the controllable external device. In some embodiments, in accordance with the determination that the detected user input corresponds to selection of the alarm configuration affordance, in response to detecting the one or more inputs for setting the first alarm at the controllable external device and in accordance with a determination that the snooze option has been enabled, the electronic device initiates a process to configure the controllable external device to temporarily disable, in response to detecting voice input that satisfies certain criteria (e.g., voice input that is determined to correspond to a phrase such as "Hey Speaker, snooze the alarm"), the first alarm that sounds at the controllable external device.

In some embodiments, initiating the process includes transmitting instructions to the controllable external device to configure the controllable external device to be able to temporarily disable an alarm that sounds in response to detecting voice input that satisfies certain criteria.

Note that details of the processes described above with respect to method 1700 (e.g., FIG. 17 are also applicable in an analogous manner to the methods described below/above. For example, method 1700 optionally includes one or more of the characteristics of the various methods described above with reference to method 700, 900, 1100, and 1500. For example, the controllable external device with multiple components described in method 1700 can be the controllable external device of method 700, which can be configured and accessed using the interfaces described in method 700. For brevity, these details are not repeated below.

FIGS. 18A-18G illustrate exemplary user interfaces for using voice commands to request a digital assistant to play general sounds, in accordance with some embodiments. The user interfaces in these figures are used to illustrate the processes described below, including the processes in FIG. 19.

Figure 18A:
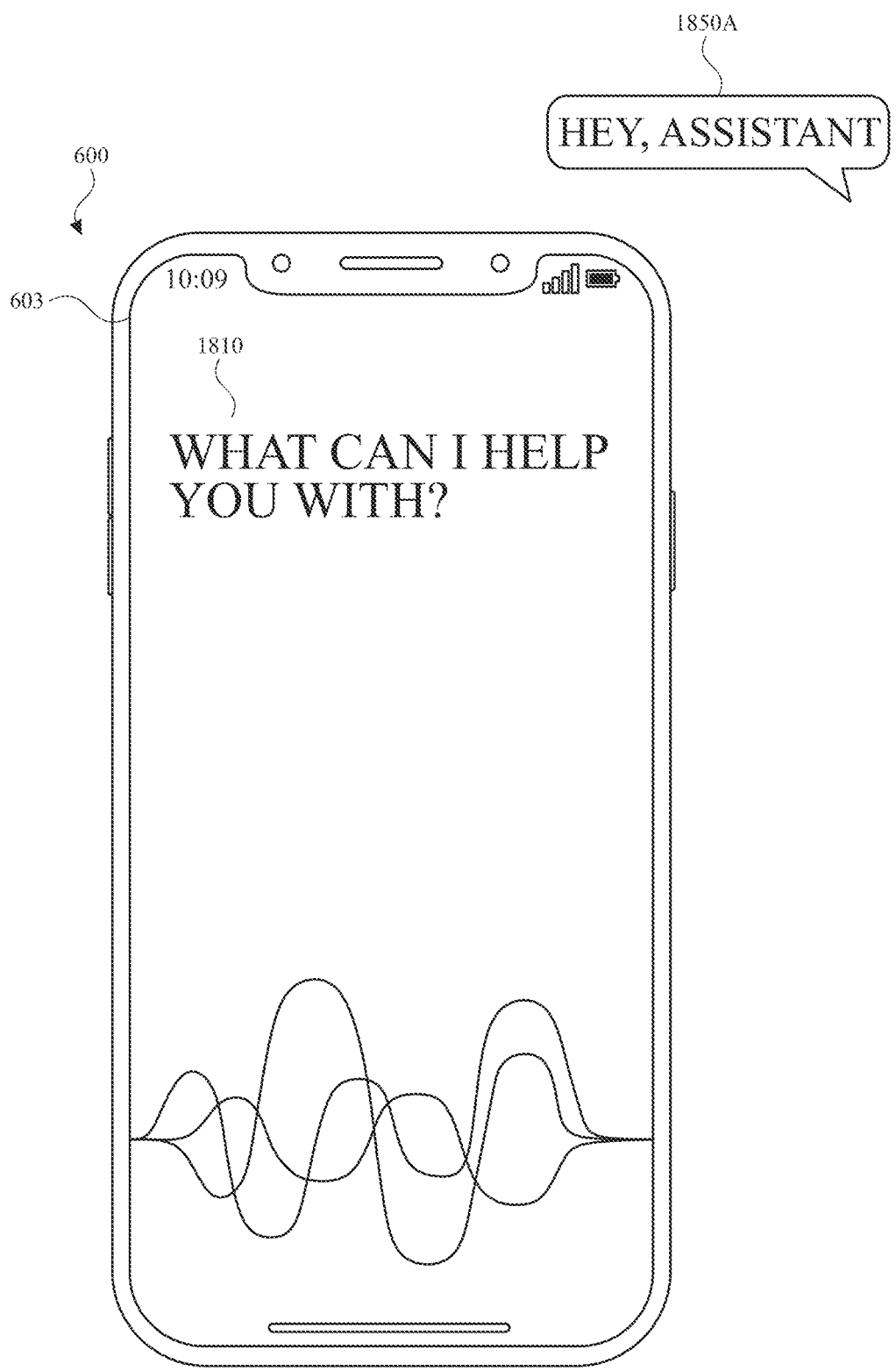
FIGS. 18A-18G illustrate exemplary user interfaces for requesting sounds of a particular type to be played, in accordance with some embodiments.

In FIG. 18A, device 600 receives voice command 1850A (e.g., "Hey Assistant") to activate a digital assistant. Once the digital assistant is activated, device 600 displays an indication 1810 (e.g., text), on display 603, indicating the digital assistant is available.

Figure 18B:
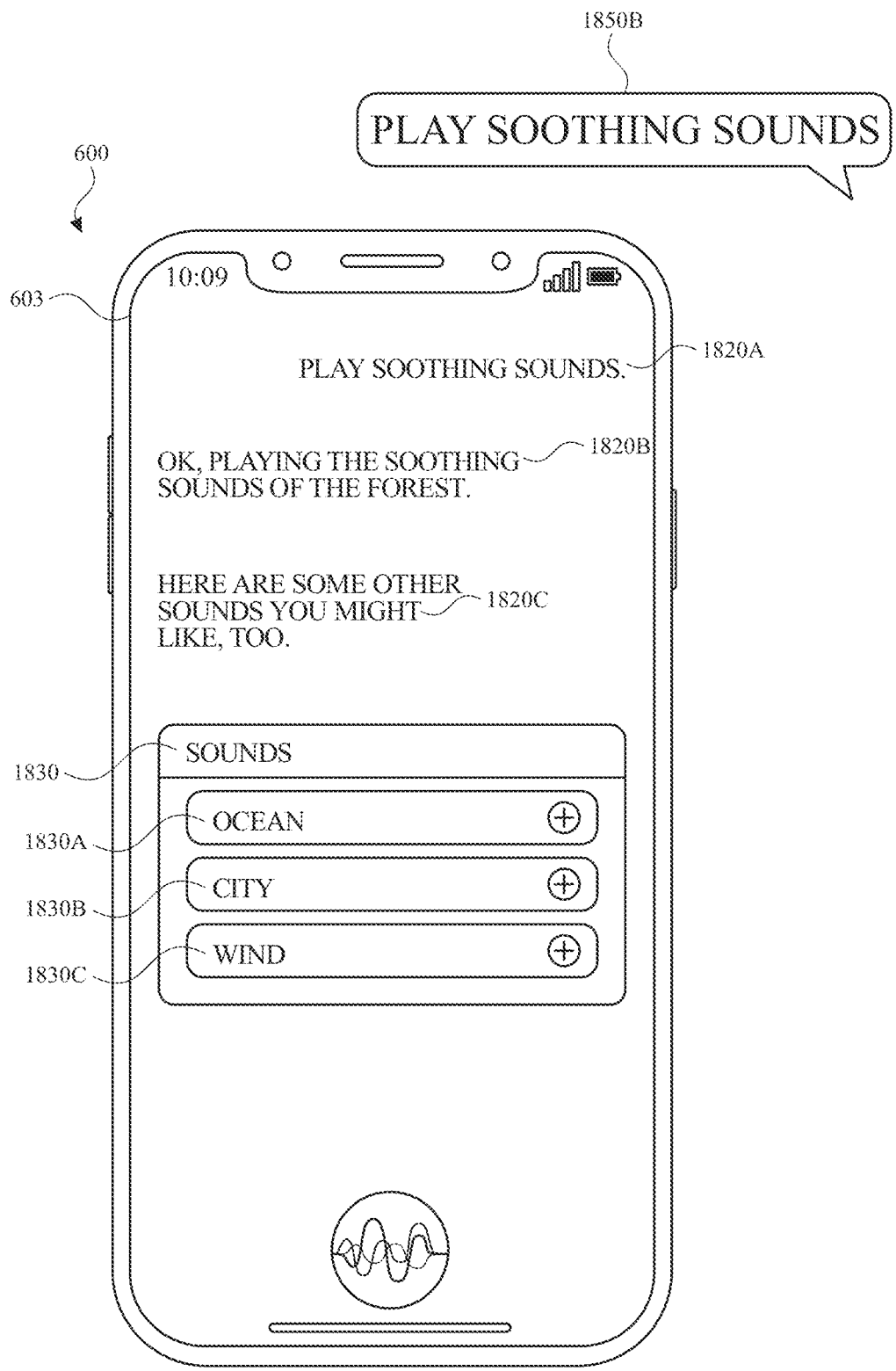
Figure 18C:
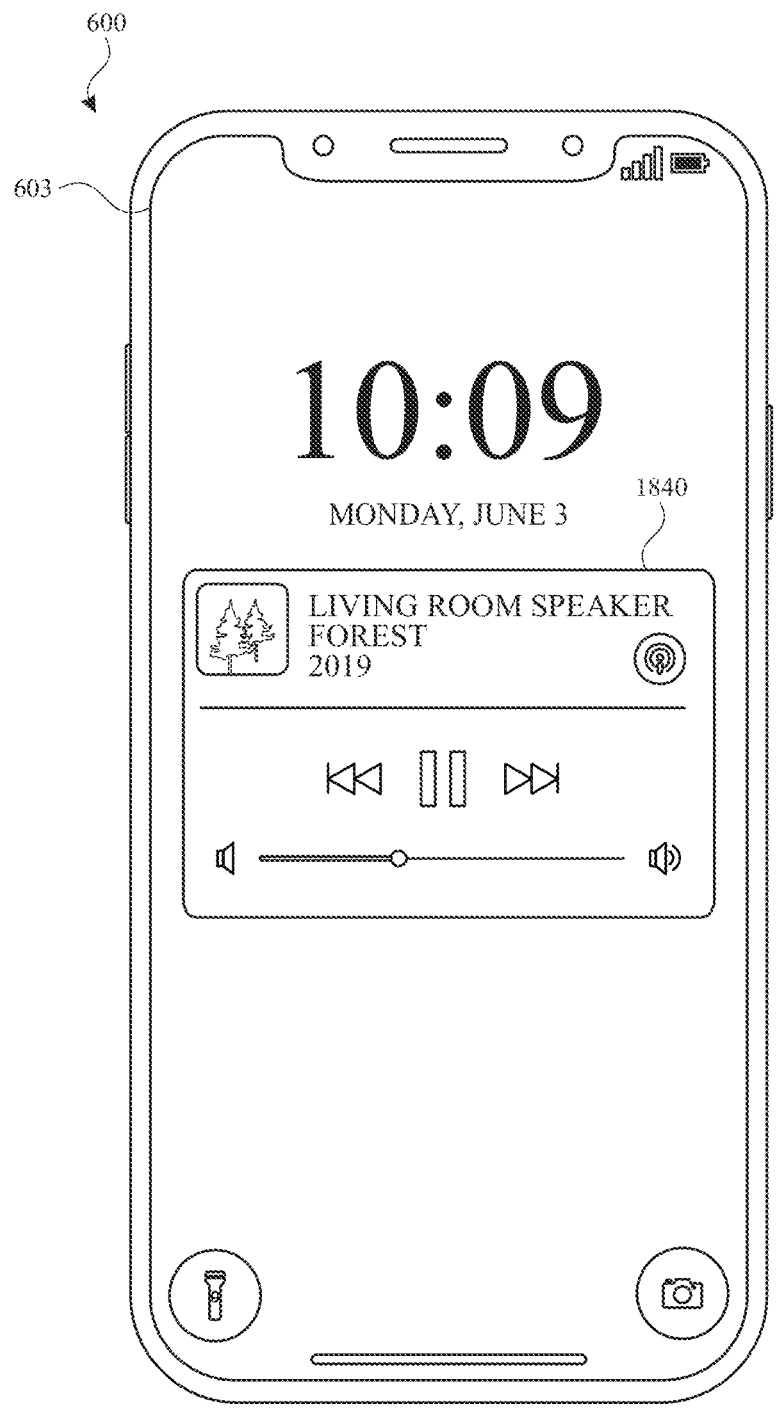

FIGS. 18B-18C illustrate device 600 receiving a voice command (e.g., 1850B) requesting the digital assistant to play a type of media item (e.g., soothing sounds). In response, the digital assistant on device 600, plays a particular item of the requested type (e.g., Forest sounds) and also provides a list of other media items of the requested type (e.g., 1830A-1830C) as alternative options.

In FIG. 18B, device 600 receives voice command 1850B to "Play soothing sounds." In response to receiving voice command 1850B, device 600 displays, on display 603, representation 1820A of voice command 1850B. In some embodiments, device 600 displays a transcript 1820A-1820C of the received voice commands and responses from the digital assistant on display 603 while the digital assistant is activated. In response to device 600 receiving voice command 1850B, device 600 plays a particular item of the requested type (e.g., Forest sounds), as illustrated in FIG. 18B. In some embodiments, the soothing sound does not include instrumental or vocal audio elements (e.g., the sound is a natural sound, not an artificial sound). In some embodiments, the soothing sound includes generated white noise. Device 600 displays representation 1820B of the response to voice command 1850B (and optionally plays a corresponding audio response) from the digital assistant on display 603 indicating that a soothing sound of the Forest is being played. Device 600 also displays representation 1820C, which indicates that there are other available sounds of the same type. Sound list 1830 includes a list of other sound items that are of the same type (e.g., soothing sounds) as the type that was requested. In some embodiments, device 600 displays the soothing sound that is currently being played (e.g., Forest sounds) in the list of sounds that are of the requested type. Device 600 displays sound affordances 1830A-1830C corresponding to soothing sounds of the Ocean, City, and Wind, respectively. A user can select any of sound affordances 1830A-1830C to play the corresponding sound. In some embodiments, device 600 plays an audio response corresponding to the displayed transcript of the responses provided by the digital assistant. In some embodiments, device 600 plays an audio list specifying the list of additional soothing sounds (e.g., Ocean, City, and Wind).

In some embodiments, device 600 receives an additional voice command to play a soothing sound. In response to receiving the additional voice command, device 600 plays a second soothing sound that can be the same soothing sound (e.g., Forest sound) that was previously played or a different soothing sound (e.g., Ocean sound). In some embodiments, device 600 displays soothing sound affordances 1830A-1830C, as illustrated in FIG. 18B, when device 600 determines that device 600 has received a voice command to play a soothing sound less than a first predetermined number of times (e.g., 3 to 5 times). In some embodiments, device 600 does not display soothing sound affordances 1830A-1830C, when device 600 determines that the device 600 has received the voice command to play a soothing sound more than a first predetermined number of times. In some embodiments, the sound affordances representing other available soothing sounds are displayed for a first predetermined number of requests. In some embodiments, when the device has received the request to play soothing sounds more than a second predetermined number of times (e.g., 6 to 10 times), device 600 plays a default or a predetermined soothing sound that was selected prior to the current request. In some embodiments, the default or a predetermined soothing sound is selected based on one or more factors, such as a recency of play or a frequency of play.

In FIG. 18C, while the soothing sound of the Forest is playing, device 600 displays audio playback interface 1840 on display 603. In some embodiments, device 600 plays the soothing sound on an external speaker (e.g., the living room speaker). In some embodiments, device 600 detects input on the fast forward button of audio playback interface 1840. In response, device 600 plays a different soothing sound. In some embodiments, device 600 starts playing a random sequence and/or randomly selected and arranged segments of the particular soothing sound when a soothing sound is requested. Thus, different clips of a particular soothing sound are played if a soothing sound is requested multiple times.

Figure 18D:
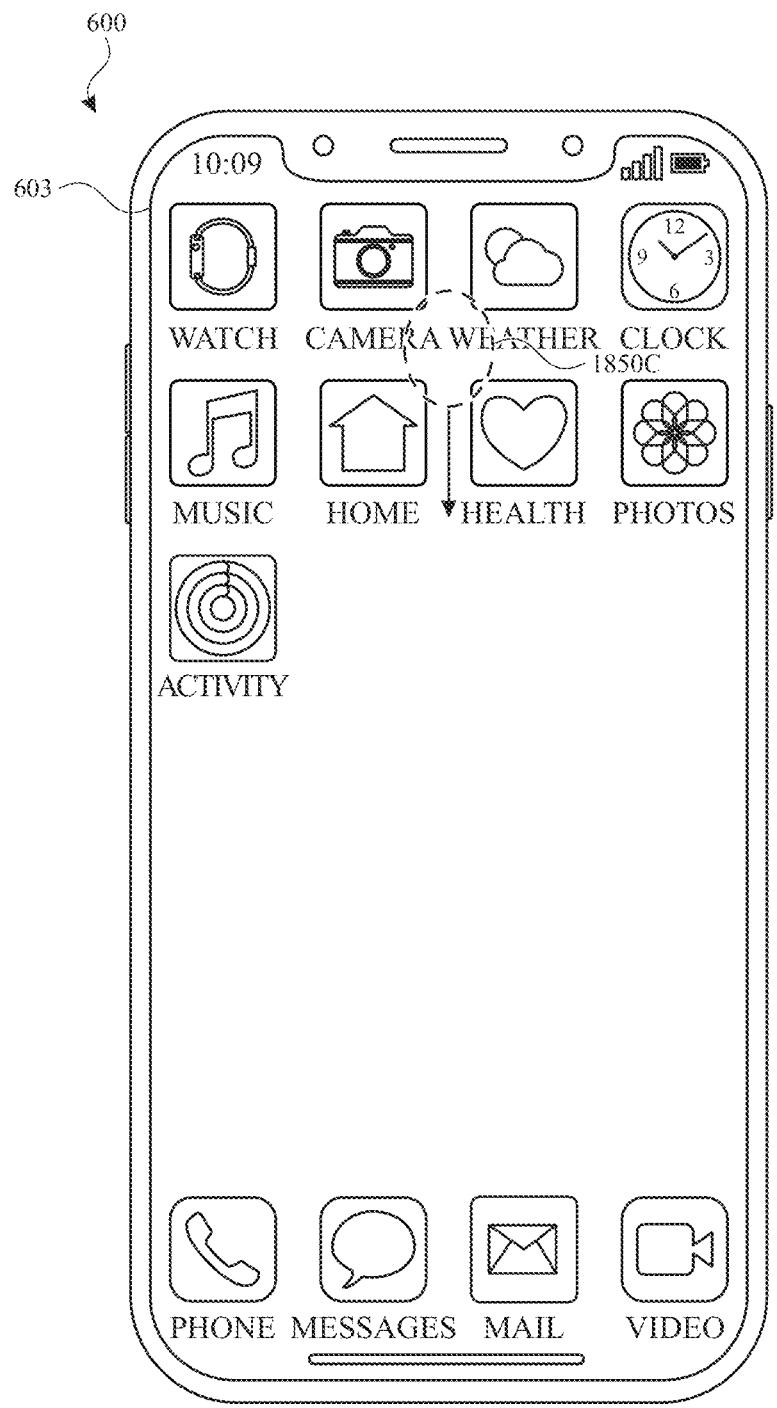
Figure 18E:
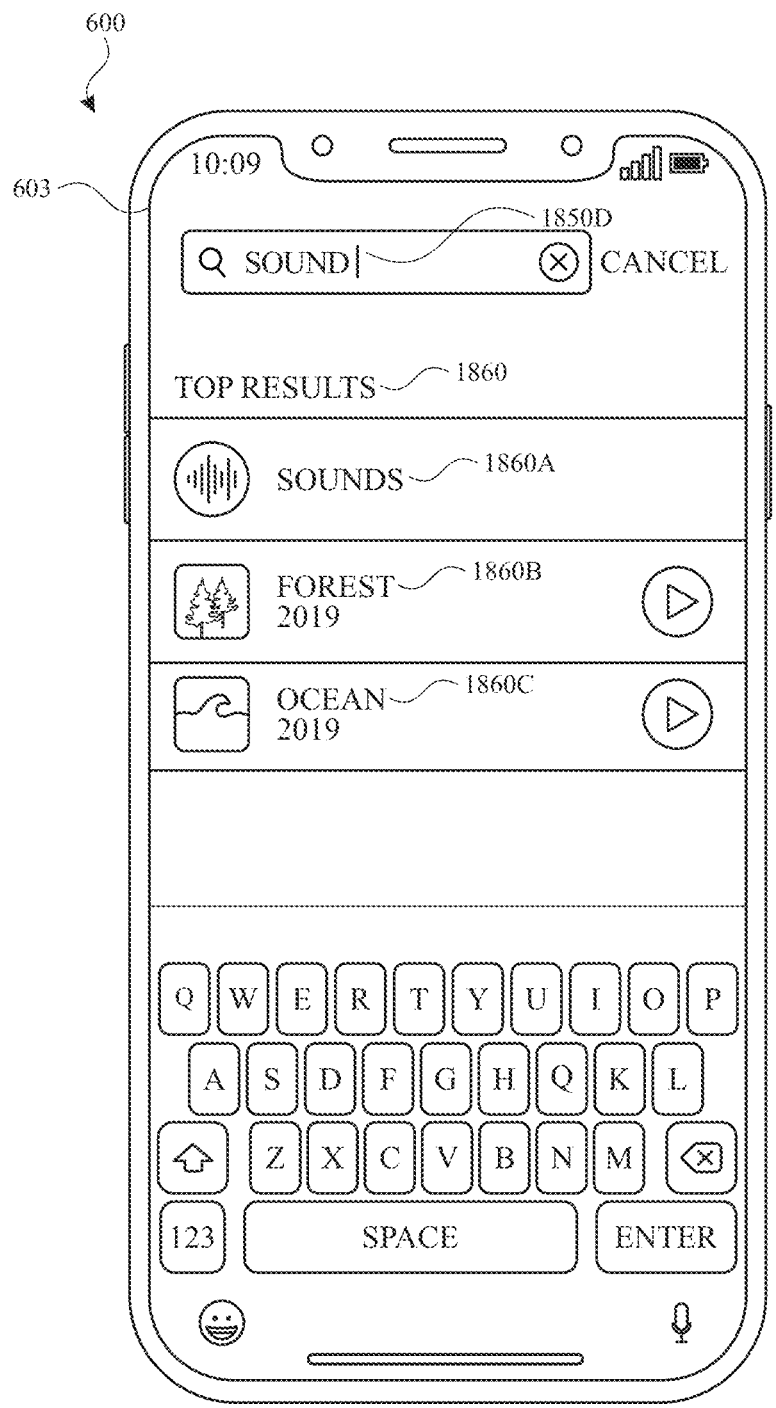

FIGS. 18D-18E illustrate device 600 receiving a request to play sound items using touch input (e.g., instead of a voice command). In FIG. 18D, device 600 detects a swipe gesture 1850C on display 603. In FIG. 18E, in response to detecting swipe gesture 1850C, device 600 displays a search bar. Device 600 detects input 1850D, corresponding to a search request "Sound". In response to receiving the search request 1850D, device 600 displays list of top results 1860 including sound list 1860A. Sound list 1860A includes a list of available sounds: Forest sound 1860B and Ocean sound 1860C. In some embodiments, sound list 1860A includes a list of sounds of different types (e.g., soothing sounds, songs, etc.). Forest sound 1860B and Ocean sound 1860C can be selected to be played from the search results.

Figure 18F:
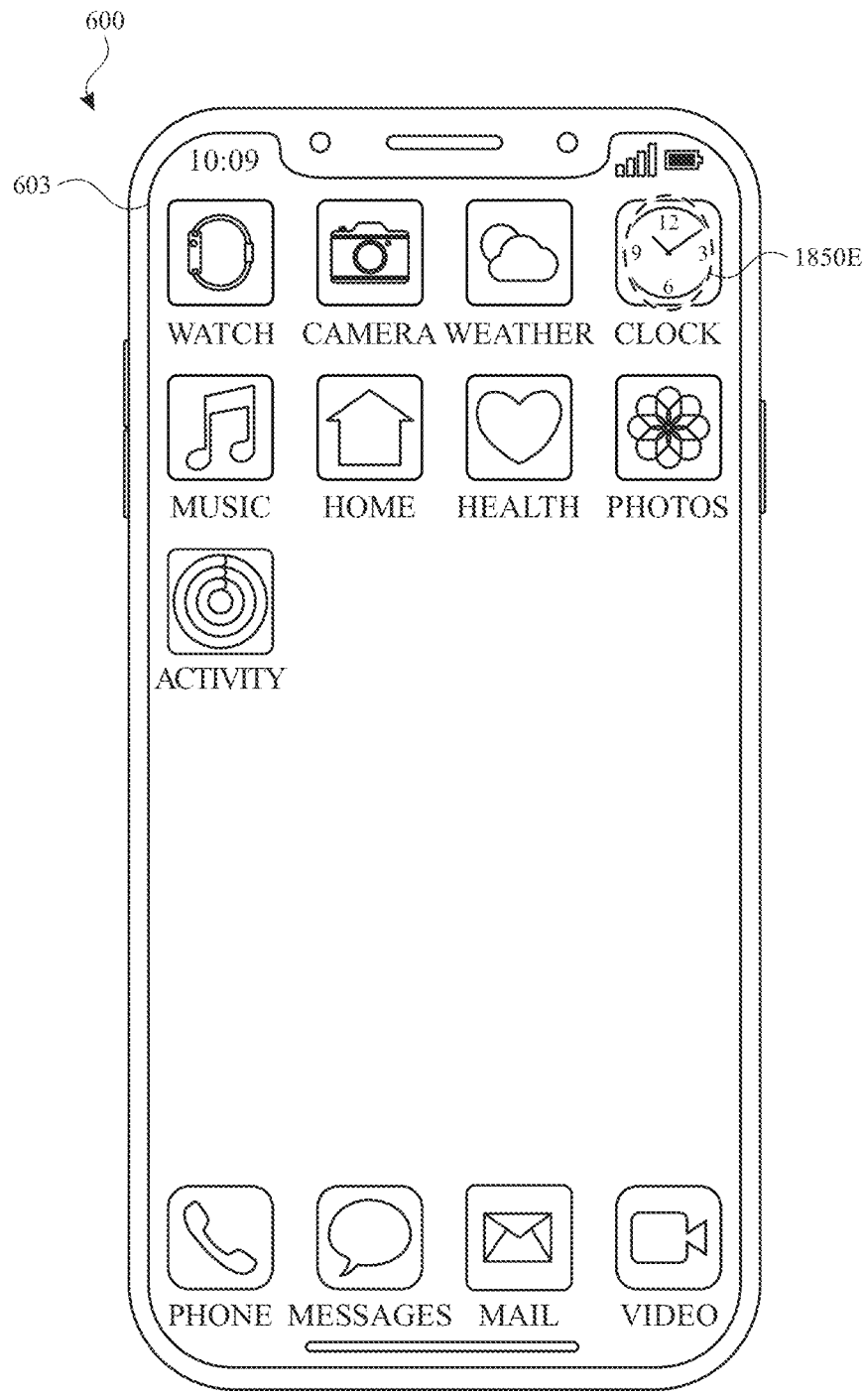
Figure 18G:
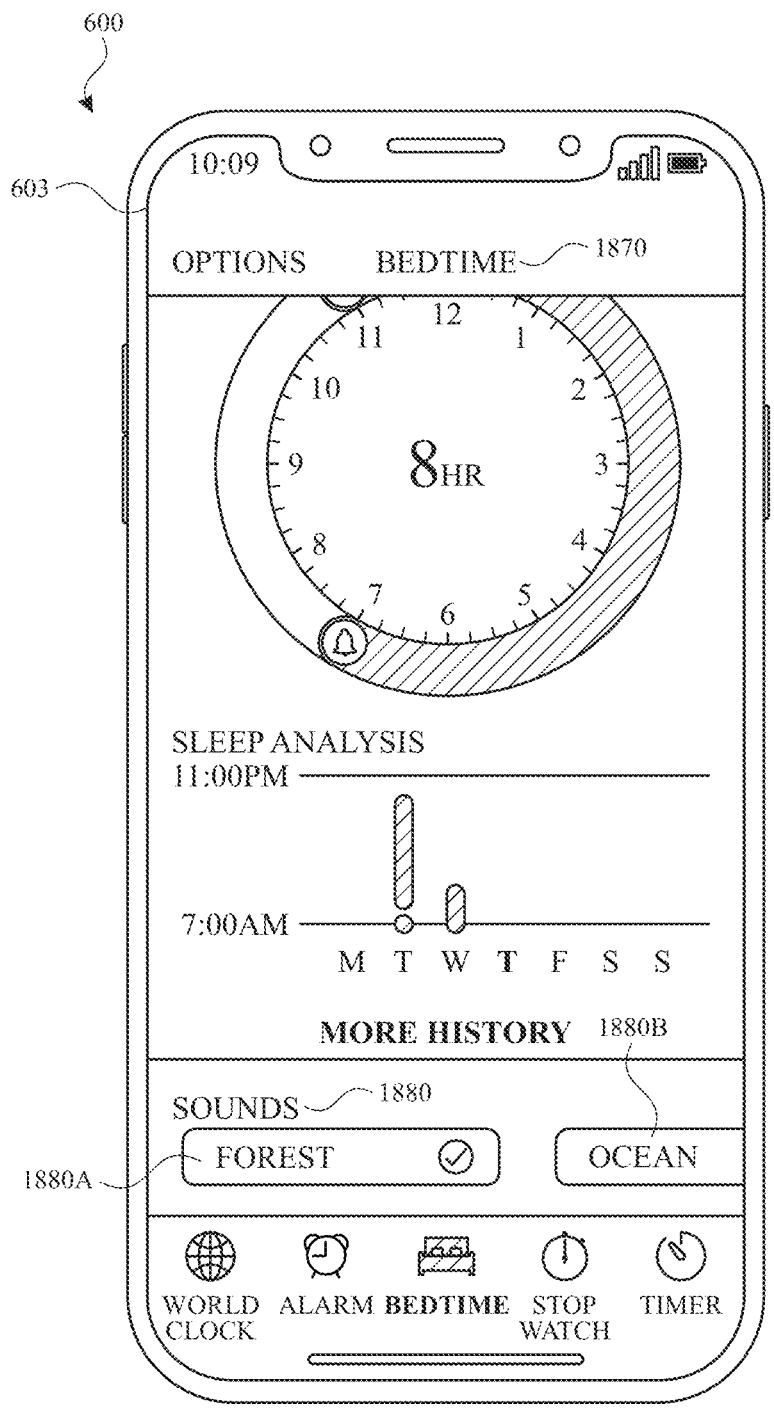

FIGS. 18F-18G illustrates that soothing sounds can be played from a bedtime interface 1870, which is accessible from the clock application. In FIG. 18F, device 600 detects input 1850E corresponding to selection of the clock application. In response to detecting input 1850E, device 600 displays bedtime interface 1870. Bedtime interface 1870 includes sounds section 1880 including a list of soothing sounds that can be played for bedtime. Sounds section 1880 includes soothing sounds: Forest sound 1880A and Ocean sound 1880B. Device 600 can detect a selection of a sound (e.g., 1880A-1880B) listed in sounds section 1880 and begin playing the selected sound.

FIG. 19 is a flow diagram illustrating a method 1900 for using an electronic device to play sounds of a particular type, in accordance with some embodiments. Method 1900 is performed at an electronic device (e.g., 100, 300, 500, 600) with a display device. Some operations in method 1900 are, optionally, combined, the orders of some operations are, optionally, changed, and some operations are, optionally, omitted.

As described below, method 1900 provides an intuitive way for playing an audio media item of a particular type, e.g., without specifying a particular audio media item. The method reduces the cognitive burden on a user for requesting an electronic device to play an audio media item of a particular type (e.g., a category of sounds (e.g., soothing sounds)), without having to identify a specific audio media item, thereby creating a more efficient human-machine interface.

At block 1902, electronic device receives a request (e.g., 1850B) to play a first type of audio media item. The request identifies the first type of audio media item and does not identify a particular audio media item of the first type. In some embodiments, the electronic device (e.g., 600) has access to (stored on the device or accessible to the device) a plurality of particular audio media items (e.g., 1830A-1830C) that are the first type of media item. In some embodiments, the request includes a voice command (e.g., 1850B) to a virtual assistant (e.g., "Play soothing sounds"). In some embodiments, the request includes a verbal trigger (e.g., 1850A) (e.g., "Hey Assistant") that activates the virtual assistant. In some embodiments, the virtual assistant is activated in response to a touch input (e.g., a press of a button or input on a touch-sensitive surface). In some embodiments, the first type of media item (e.g., "soothing sounds") includes a plurality of sub-types (1830A-1830C) (e.g., ocean, city, wind).

At block 1904, in response to receiving the request (e.g., 1850B) to play the first type of audio media item, at block 1906, the electronic device (e.g., 600) plays (e.g., 1840) a first audio media item of the first type of audio media item. In some embodiments, the electronic device first, automatically (e.g., without further input) and/or randomly identifies the first audio media item from the plurality of first type audio media items accessible to the electronic device.

At block 1904, in response to receiving the request to play the first type of audio media item, at block 1908, the electronic device (e.g., 600) displays an affordance that, when selected, plays a second audio media item (e.g., 1830A-1830C) of the first type of audio media item, where the second audio media item of the first type of audio media item is different from the first audio media item of the first type of audio media item. Displaying an affordance with additional media items of the same type as requested provides an intuitive way for the user to select additional audio media items of the same type. The method reduces the cognitive burden on a user for requesting an electronic device to select a audio media item from a set of audio media items of a particular type (e.g., a category of sounds (e.g., soothing sounds)) without having to identify a specific audio media item, thereby creating a more efficient human-machine interface. This also preserves the battery of the device as the number of inputs and additional requests are reduced as additional audio media items of the same type are displayed in addition to a media item of the requested type being played.

In some embodiments, at block 1910, the electronic device concurrently with playing the first audio media item of the first type of audio media item, displays a graphical object (e.g., 1820B, 1840) that identifies the first audio media item (e.g., an item name (e.g., Forest sounds), an image identifying the item).

In some embodiments, after playing the first audio media item of the first type of audio media item, the electronic device receives a second request (e.g., 1850B) to play the first type of audio media item. In some embodiments, the second request identifies the first type of audio media item and does not identify a particular audio media item of the first type. In some embodiments, in response to receiving the second request to play the first type of audio media item, the electronic device plays a third audio media item (e.g., the same item 1840 as the first audio media item of the first type; a different item 1830A, 1830B, or 1830C of the first type) of the first type of audio media item. In some embodiments, in response to receiving the second request to play the first type of audio media item and in accordance with a determination that a first set of criteria are met, the first set of criteria including a criterion that is met when less than a first predetermined number (e.g., 3, 5) of requests to play the first type of audio media item, that do not identify a particular audio media item of the first type, have been received, the electronic device displays a second affordance (e.g., 1830A-1830C) that, when selected, plays a fourth audio media item (e.g., different from the second audio media item; the same as the second audio media item) of the first type of audio media item. In some embodiments, the fourth audio media item (e.g., 1830A) of the first type of audio media item is different from the third audio media item (e.g., 1830B) of the first type of audio media item. In some embodiments, in response to receiving the second request to play the first type of audio media item and in accordance with a determination that the first set of criteria are not met, the electronic device forgoes displaying the second affordance. In some embodiments, the affordances for additional audio media items of the first type are only displayed for a predetermined number of requests.

In some embodiments, after receiving a second predetermined number (e.g., 3, 5) of requests to play the first type of audio media item that do not identify a particular audio media item of the first type, the electronic device receives a third request (e.g., 1850B) to play the first type of audio media item. In some embodiments, the third request identifies the first type of audio media item and does not identify a particular audio media item of the first type. In some embodiments, in response to receiving the third request, the electronic device plays a fifth audio media item (e.g., 1840) (e.g., the same item as the first audio media item of the first type; a different item of the first type) of the first type of audio media item that was selected prior to receipt of the third request (e.g., a default audio media item; a predetermined audio media item). In some embodiments, the fifth audio media item was selected (e.g., preselected) based on one or more factors selected from the group consisting of: recency of play and frequency of play. Playing a predetermined audio media item of a particular type of audio media item after a predetermined number of requests to play a particular type of audio media item provides a more efficient user experience. The method reduces the cognitive burden on a user from having to select a audio media item from a set of audio media items of a particular type (e.g., a category of sounds (e.g., soothing sounds)) after the user has already made the request a second predetermined number of times, thereby creating a more efficient human-machine interface. This also preserves the battery of the device as the number of inputs and additional requests are reduced as the predetermined audio media item is automatically played without requiring additional user input.

In some embodiments, the first type of audio media item is an audio media item that does not include instrumental or vocal audio elements (e.g., the audio media item is a natural sound, a non-artificial sound). In some embodiments, during playback, the audio media item can be paused, but cannot be fast-forwarded. In some embodiments, the audio media item includes generated white noise.

In some embodiments, the first type of audio media item is an audio media item that includes a plurality of randomly selected and arranged segments of audio (e.g., the audio media item was generated by randomly selecting from a plurality of available segments of audio and arranging the randomly selected segments in a randomly selected order).

In some embodiments, the electronic device includes a microphone. In some embodiments, the request to play the first type of audio media item is voice input (e.g., 1850B) detected via the microphone.

In some embodiments, the electronic device includes a touch-sensitive surface. In some embodiments, the request to play the first type of audio media item is a set of one or inputs detected via the touch-sensitive surface.

Note that details of the processes described above with respect to method 1900 (e.g., FIG. 19 are also applicable in an analogous manner to the methods described below/above. For example, method 1900 optionally includes one or more of the characteristics of the various methods described above with reference to method 1500, and 1700. For example, the controllable external device with multiple components described in method 1700 can be the controllable external device of method 1500 and 1700, which can be configured and accessed using the interfaces described in method 1500 and 1700. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims As described above, one aspect of the present technology is the gathering and use of data available from various sources to improve the managing of controllable external devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide improved management and monitoring of devices and to generally improve security (e.g., home security). Accordingly, use of such personal information data enables calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing controllable external devices, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content (e.g., video content) can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device, comprising:
 a display device;
 one or more processors; and
 memory storing one or more programs configured to be executed by the one or more processors, the one or more programs including instructions for:
  displaying, on the display device, a user interface including a first accessory affordance associated with a first controllable external device;

detecting a first input corresponding to selection of the first accessory affordance;

in response to detecting the first input, displaying, on the display device, a first region of the first accessory interface that includes a first control affordance that, when selected, controls a first function of the first controllable external device, without displaying a second region of the first accessory interface;

while displaying, on the display device, the first region of the first accessory interface, detecting a second input; and in response to detecting the second input:
in accordance with a determination that the second input causes a portion of the second region to be displayed that exceeds a threshold amount, updating display of the user interface to display the second region at a top portion of the first accessory interface while ceasing display of the first region, wherein the second region includes one or more settings of the first controllable external device; and in accordance with a determination that the second input does not cause a portion of the second region to be displayed that exceeds the threshold amount, updating display of the first accessory interface based on the second input to a second control affordance in the first region of the first accessory interface without displaying the second region of the first accessory interface.

2. The electronic device of claim 1, the one or more programs further including instructions for:
while displaying, on the display device, the first accessory interface, detecting a third input; and
in response to detecting the third input:
ceasing display of the first accessory interface; and
outputting haptic and audio feedback indicating the first accessory interface is no longer displayed.

3. The electronic device of claim 1, the one or more programs further including instructions for:
in accordance with a determination that the second input causes a portion of the second region to be displayed that exceeds a threshold amount, outputting haptic and audio feedback.

4. The electronic device of claim 1, wherein the first region of the first accessory interface includes:
in accordance with a determination that the first controllable external device is associated with less than a predetermined number of sensors, a set of control affordances corresponding to the sensors of the first controllable device at a first location in the first region; and
in accordance with a determination that the first controllable external device is associated with the predetermined number or more sensors, the set of control affordances corresponding to the sensors of the first controllable device at a second location in the first region that is different than the first location.

5. The electronic device of claim 1, wherein the first region of the first accessory interface includes a second region affordance at a third location in the first region, the one or more programs further including instructions for:
detecting a fourth input corresponding to the second region affordance; and
in response to detecting the fourth input corresponding to the second region affordance, updating display of the user interface to display the second region at a top portion of the first accessory interface while ceasing display of the first region.

6. The electronic device of claim 1, wherein:
the first accessory interface includes a first total number of control affordances, wherein all of the first total number of control affordances are included in the first region and none of the first total number of control affordances are included in the second region.

7. A non-transitory computer-readable storage medium storing one or more programs configured to be executed by one or more processors of an electronic device with a display device, the one or more programs including instructions for:
displaying, on the display device, a user interface including a first accessory affordance associated with a first controllable external device;
detecting a first input corresponding to selection of the first accessory affordance;
in response to detecting the first input, displaying, on the display device, a first region of the first accessory interface that includes a first control affordance that, when selected, controls a first function of the first controllable external device, without displaying a second region of the first accessory interface;
while displaying, on the display device, the first region of the first accessory interface, detecting a second input; and
in response to detecting the second input:
in accordance with a determination that the second input causes a portion of the second region to be displayed that exceeds a threshold amount, updating display of the user interface to display the second region at a top portion of the first accessory interface while ceasing display of the first region, wherein the second region includes one or more settings of the first controllable external device; and
in accordance with a determination that the second input does not cause a portion of the second region to be displayed that exceeds the threshold amount, updating display of the first accessory interface based on the second input to a second control affordance in the first region of the first accessory interface without displaying the second region of the first accessory interface.

8. The non-transitory computer-readable storage medium of claim 7, the one or more programs further including instructions for:
while displaying, on the display device, the first accessory interface, detecting a third input; and
in response to detecting the third input:
ceasing display of the first accessory interface; and
outputting haptic and audio feedback indicating the first accessory interface is no longer displayed.

9. The non-transitory computer-readable storage medium of claim 7, the one or more programs further including instructions for:
in accordance with a determination that the second input causes a portion of the second region to be displayed that exceeds a threshold amount, outputting haptic and audio feedback.

10. The non-transitory computer-readable storage medium of claim 7, wherein the first region of the first accessory interface includes:
in accordance with a determination that the first controllable external device is associated with less than a predetermined number of sensors, a set of control affordances corresponding to the sensors of the first controllable device at a first location in the first region; and in accordance with a determination that the first controllable external device is associated with the predetermined number or more sensors, the set of control affordances corresponding to the sensors of the first controllable device at a second location in the first region that is different than the first location.

11. The non-transitory computer-readable storage medium of claim 7, wherein the first region of the first accessory interface includes a second region affordance at a third location in the first region, the one or more programs further including instructions for:

detecting a fourth input corresponding to the second region affordance; and in response to detecting the fourth input corresponding to the second region affordance, updating display of the user interface to display the second region at a top portion of the first accessory interface while ceasing display of the first region.

12. The non-transitory computer-readable storage medium of claim 7, wherein:

the first accessory interface includes a first total number of control affordances, wherein all of the first total number of control affordances are included in the first region and none of the first total number of control affordances are included in the second region.

13. A method comprising:

at an electronic device with a display device:
displaying, on the display device, a user interface including a first accessory affordance associated with a first controllable external device;
detecting a first input corresponding to selection of the first accessory affordance;
in response to detecting the first input, displaying, on the display device, a first region of the first accessory interface that includes a first control affordance that, when selected, controls a first function of the first controllable external device, without displaying a second region of the first accessory interface;
while displaying, on the display device, the first region of the first accessory interface, detecting a second input; and
in response to detecting the second input:
in accordance with a determination that the second input causes a portion of the second region to be displayed that exceeds a threshold amount, updating display of the user interface to display the second region at a top portion of the first accessory interface while ceasing display of the first region, wherein the second region includes one or more settings of the first controllable external device; and
in accordance with a determination that the second input does not cause a portion of the second region to be displayed that exceeds the threshold amount, updating display of the first accessory interface based on the second input to a second control affordance in the first region of the first accessory interface without displaying the second region of the first accessory interface.

14. The method of claim 13, further comprising:

while displaying, on the display device, the first accessory interface, detecting a third input; and in response to detecting the third input:
ceasing display of the first accessory interface; and
outputting haptic and audio feedback indicating the first accessory interface is no longer displayed.

15. The method of claim 13, further comprising:

in accordance with a determination that the second input causes a portion of the second region to be displayed that exceeds a threshold amount, outputting haptic and audio feedback.

16. The method of claim 13, wherein the first region of the first accessory interface includes:

in accordance with a determination that the first controllable external device is associated with less than a predetermined number of sensors, a set of control affordances corresponding to the sensors of the first controllable device at a first location in the first region; and in accordance with a determination that the first controllable external device is associated with the predetermined number or more sensors, the set of control affordances corresponding to the sensors of the first controllable device at a second location in the first region that is different than the first location.

17. The method of claim 13, wherein the first region of the first accessory interface includes a second region affordance at a third location in the first region, the method further comprising:

detecting a fourth input corresponding to the second region affordance; and in response to detecting the fourth input corresponding to the second region affordance, updating display of the user interface to display the second region at a top portion of the first accessory interface while ceasing display of the first region.

18. The method of claim 13, wherein:

the first accessory interface includes a first total number of control affordances, wherein all of the first total number of control affordances are included in the first region and none of the first total number of control affordances are included in the second region.

* * * * *